May 24, 1955  E. O. LAWRENCE  2,709,222
METHODS OF AND APPARATUS FOR SEPARATING MATERIALS
Filed Oct. 9, 1944  35 Sheets-Sheet 1

INVENTOR.
ERNEST O. LAWRENCE
BY
ATTORNEY.

May 24, 1955   E. O. LAWRENCE   2,709,222
METHODS OF AND APPARATUS FOR SEPARATING MATERIALS
Filed Oct. 9, 1944   35 Sheets-Sheet 2

INVENTOR.
ERNEST O. LAWRENCE
BY
ATTORNEY.

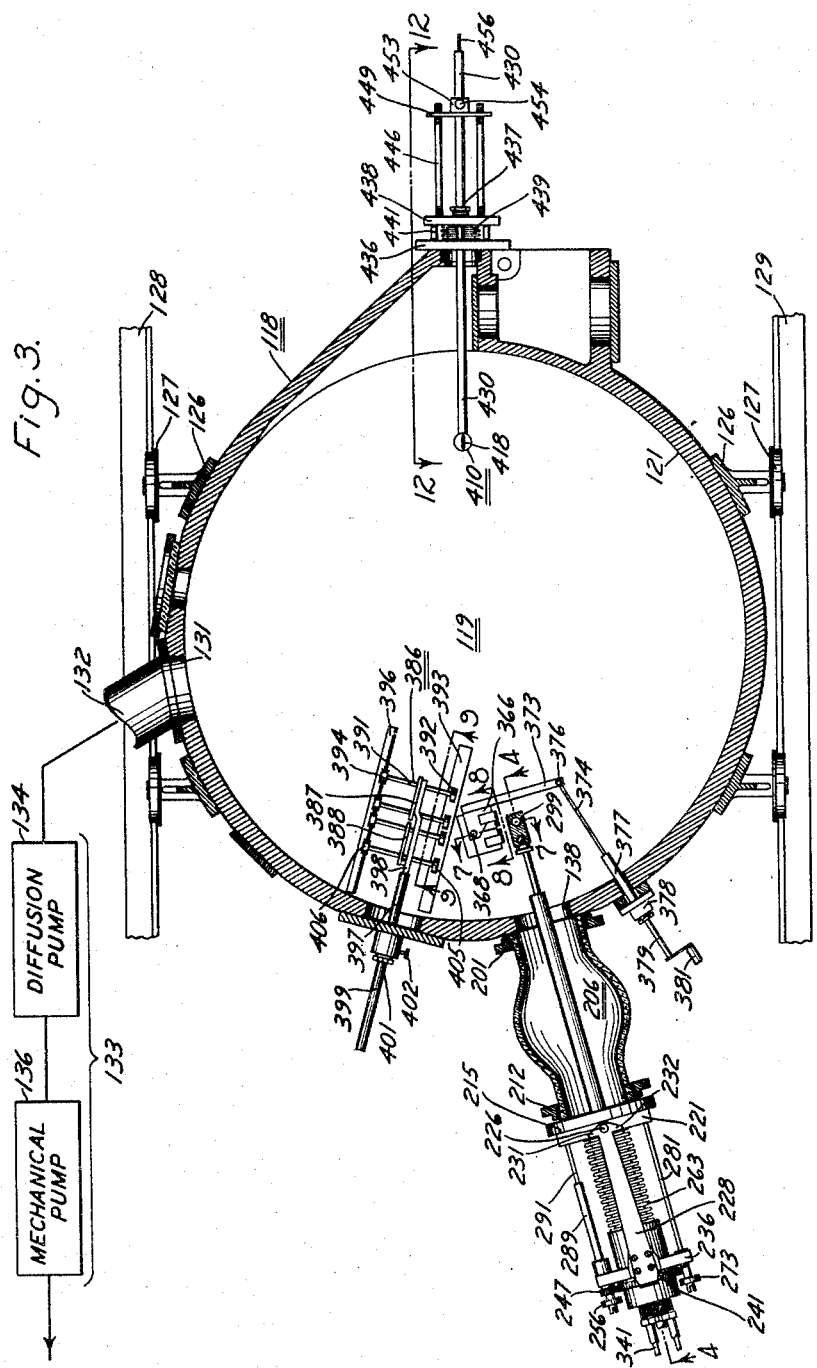

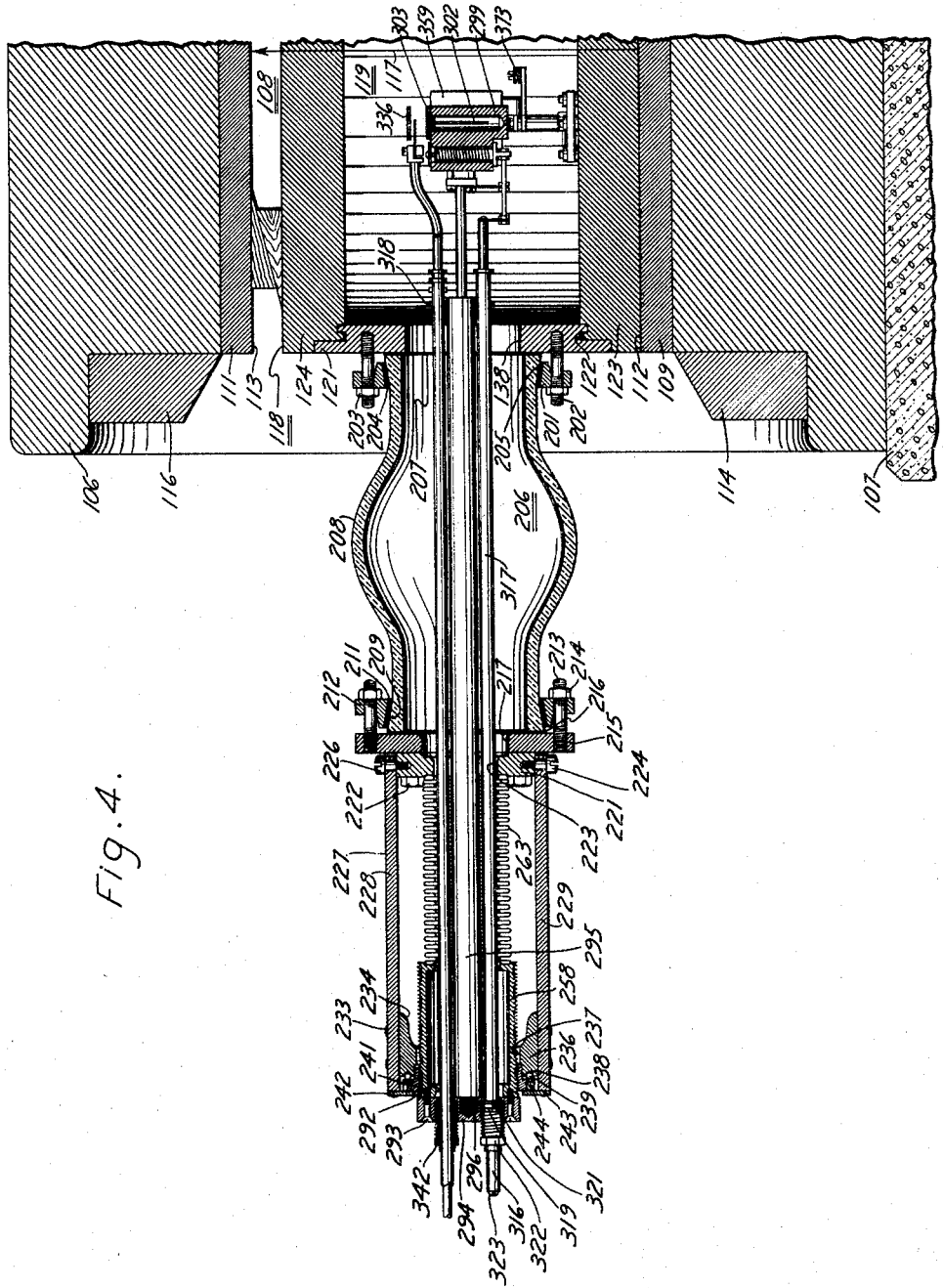

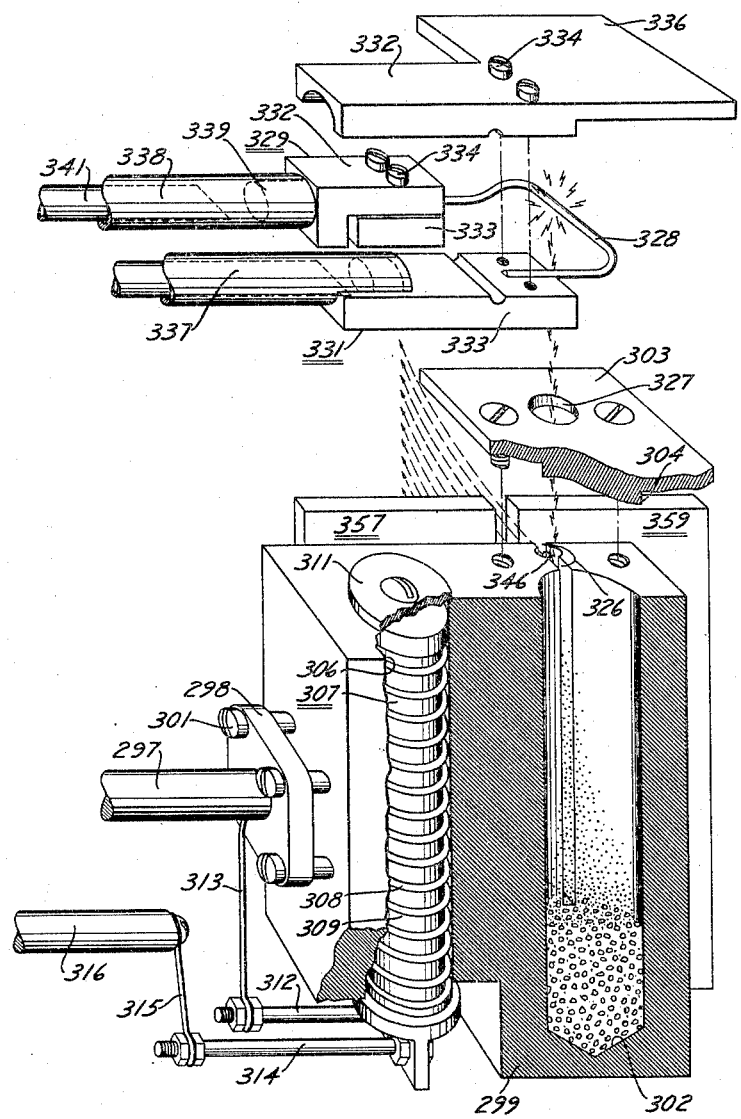

May 24, 1955 E. O. LAWRENCE 2,709,222
METHODS OF AND APPARATUS FOR SEPARATING MATERIALS
Filed Oct. 9, 1944 35 Sheets-Sheet 6
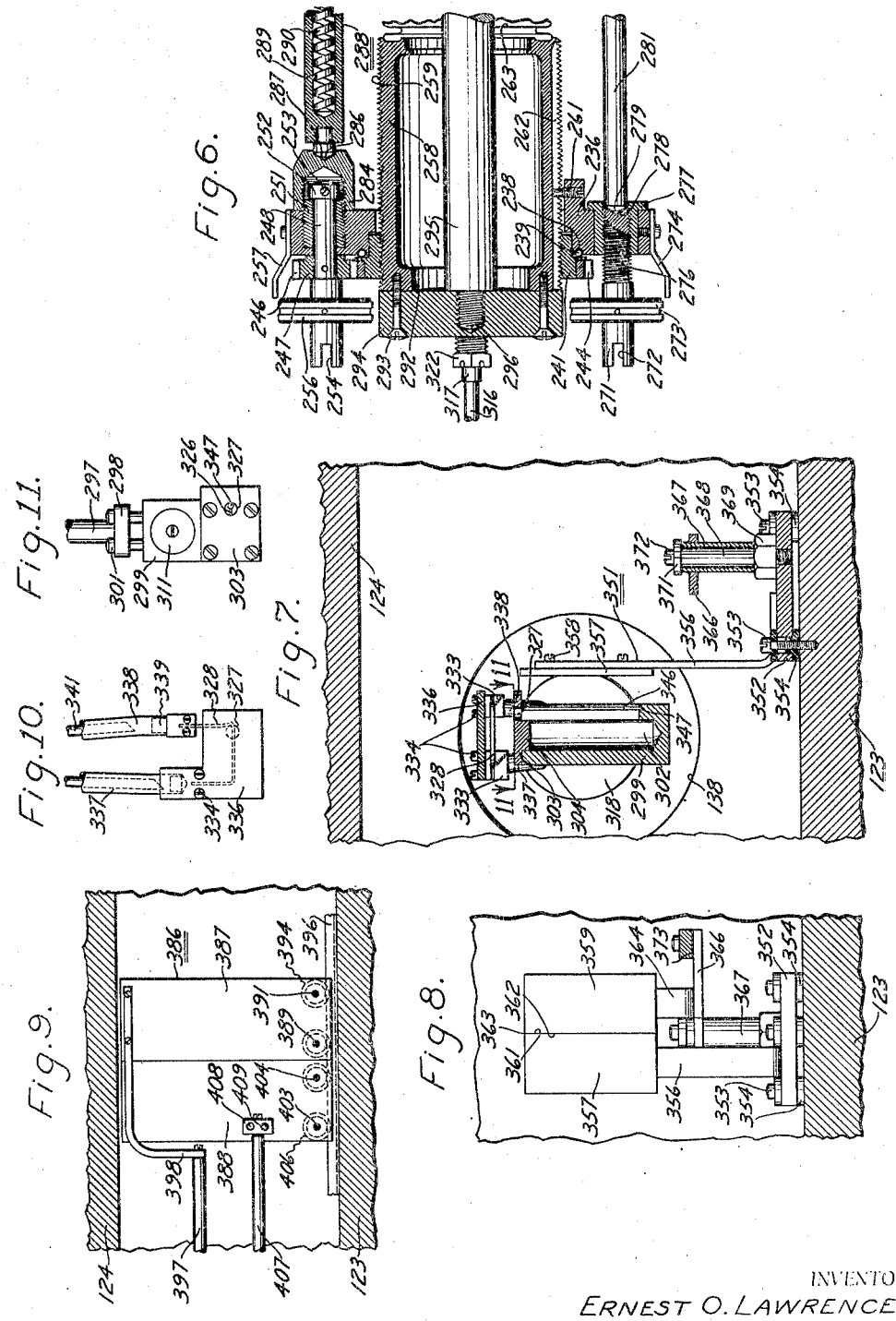
INVENTOR.
ERNEST O. LAWRENCE
BY
ATTORNEY.

May 24, 1955 E. O. LAWRENCE 2,709,222
METHODS OF AND APPARATUS FOR SEPARATING MATERIALS
Filed Oct. 9, 1944 35 Sheets-Sheet 7

INVENTOR.
ERNEST O. LAWRENCE
BY
ATTORNEY.

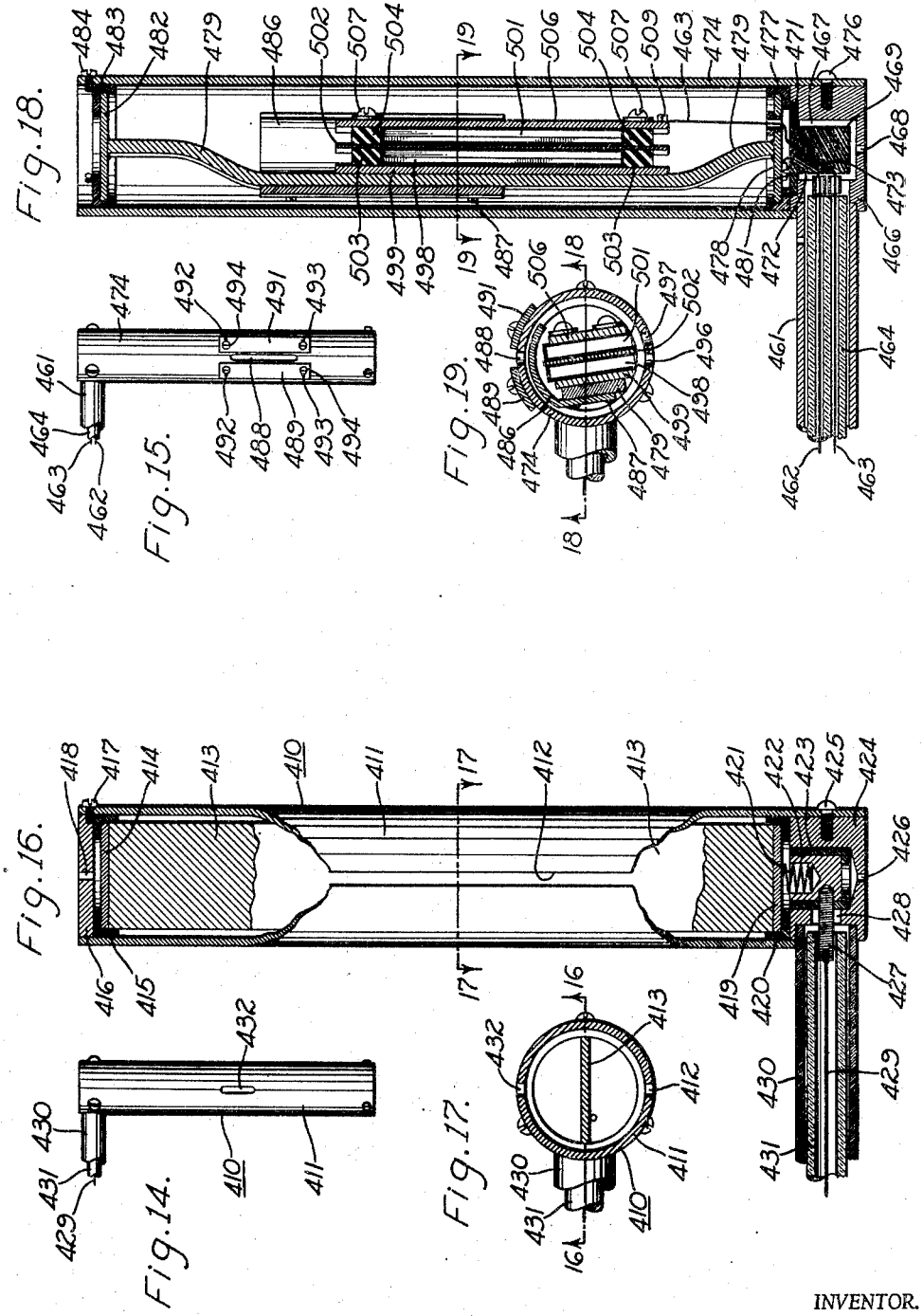

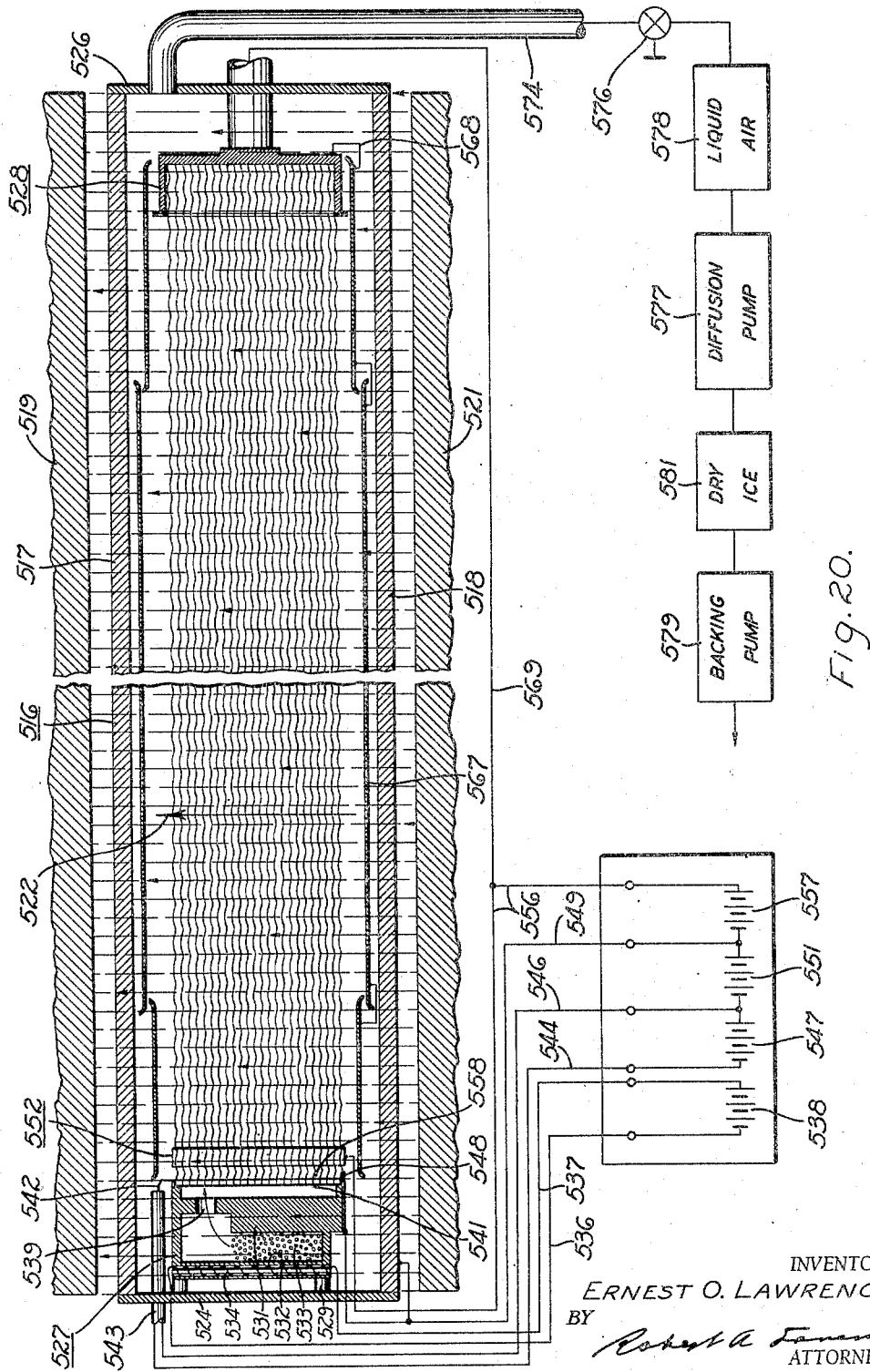

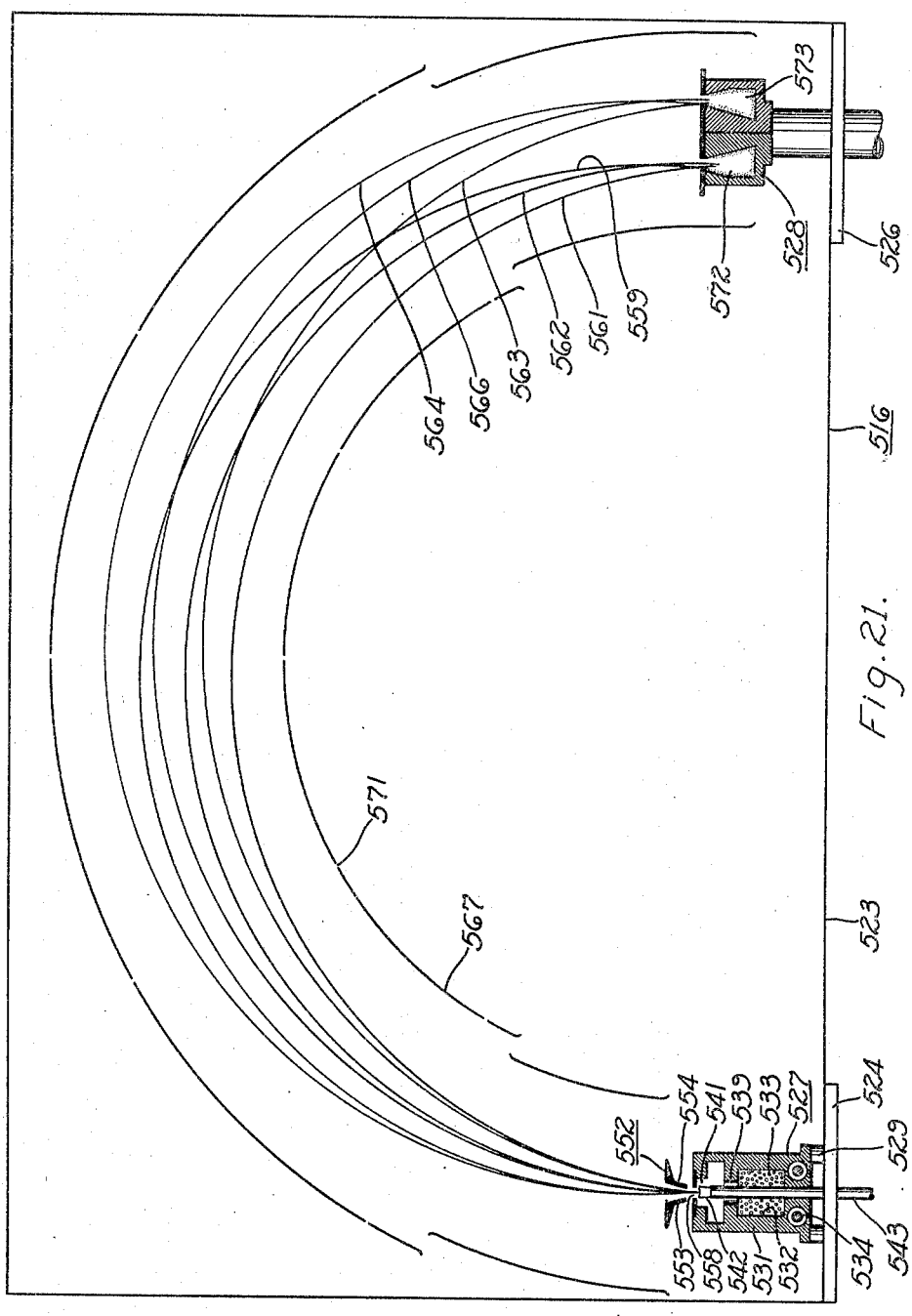

May 24, 1955  E. O. LAWRENCE  2,709,222
METHODS OF AND APPARATUS FOR SEPARATING MATERIALS
Filed Oct. 9, 1944  35 Sheets-Sheet 11

INVENTOR.
ERNEST O. LAWRENCE
BY
ATTORNEY.

May 24, 1955  E. O. LAWRENCE  2,709,222
METHODS OF AND APPARATUS FOR SEPARATING MATERIALS
Filed Oct. 9, 1944  35 Sheets-Sheet 13

INVENTOR.
ERNEST O. LAWRENCE
BY
ATTORNEY.

May 24, 1955 — E. O. LAWRENCE — 2,709,222
METHODS OF AND APPARATUS FOR SEPARATING MATERIALS
Filed Oct. 9, 1944 — 35 Sheets-Sheet 14

INVENTOR.
ERNEST O. LAWRENCE
BY
ATTORNEY.

INVENTOR.
ERNEST O. LAWRENCE
BY
ATTORNEY.

May 24, 1955　　　　E. O. LAWRENCE　　　　2,709,222
METHODS OF AND APPARATUS FOR SEPARATING MATERIALS
Filed Oct. 9, 1944　　　　　　　　　　　35 Sheets-Sheet 16

INVENTOR.
ERNEST O. LAWRENCE
BY
ATTORNEY.

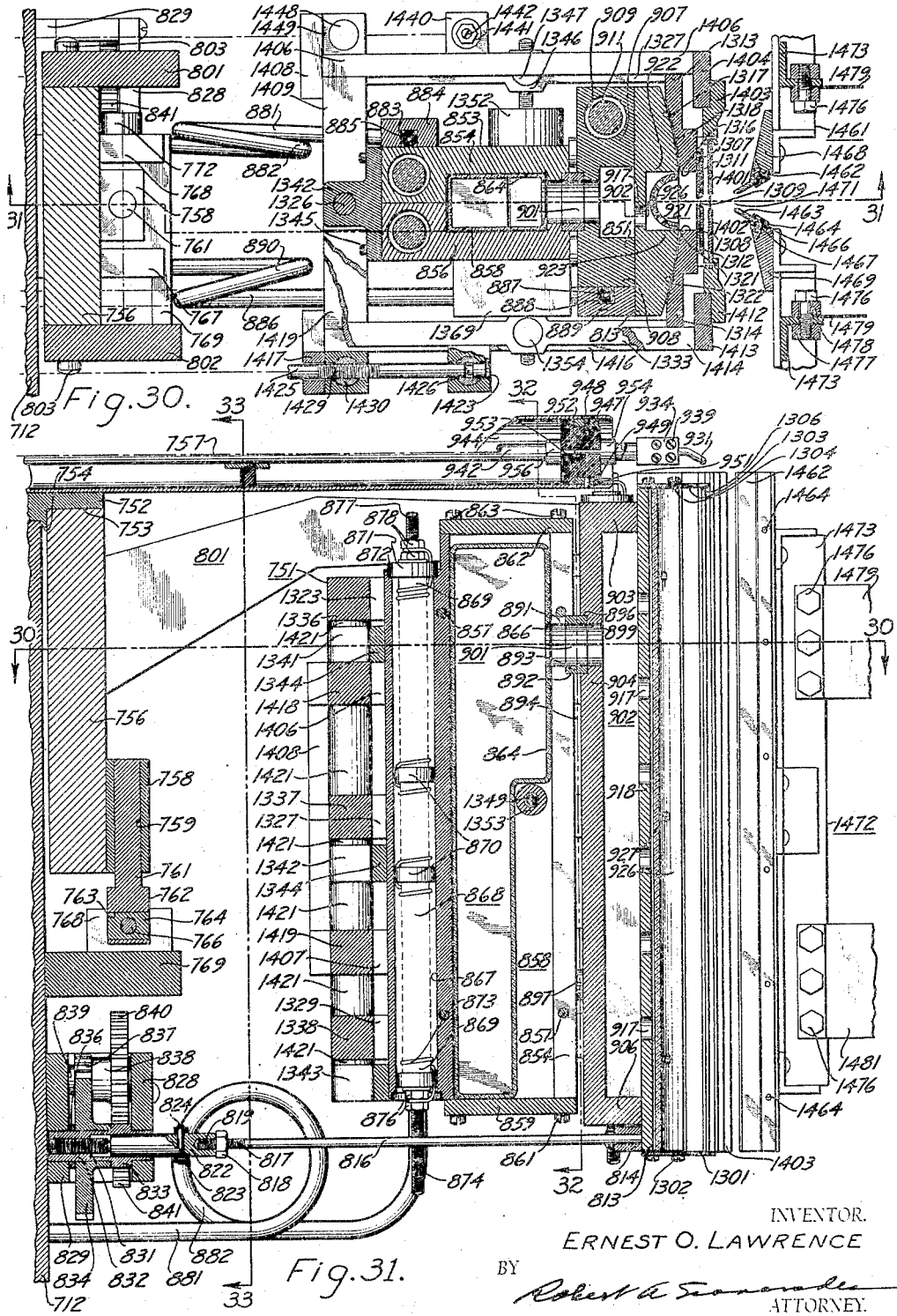

May 24, 1955  E. O. LAWRENCE  2,709,222
METHODS OF AND APPARATUS FOR SEPARATING MATERIALS
Filed Oct. 9, 1944  35 Sheets-Sheet 18

INVENTOR.
ERNEST O. LAWRENCE
BY
ATTORNEY.

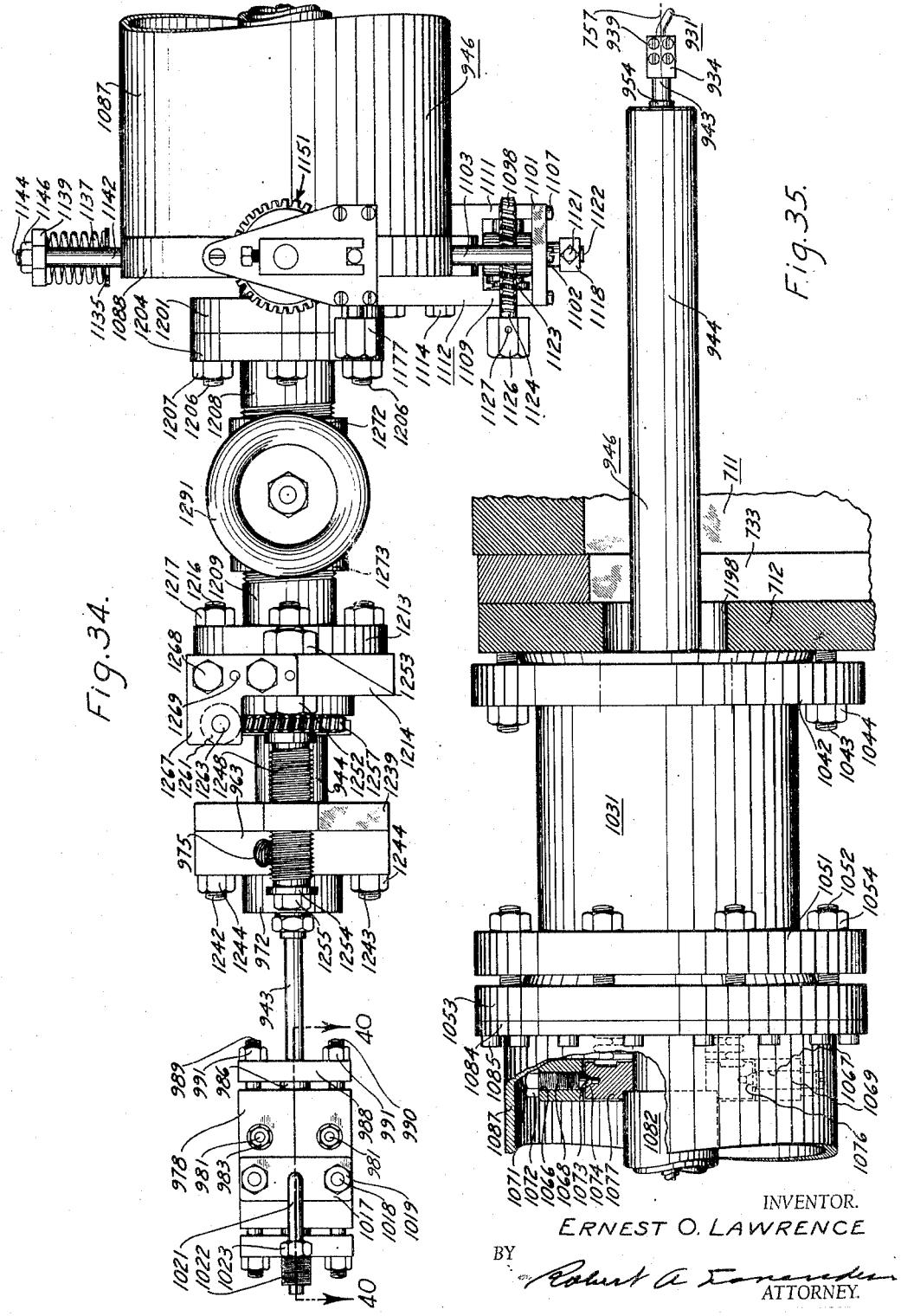

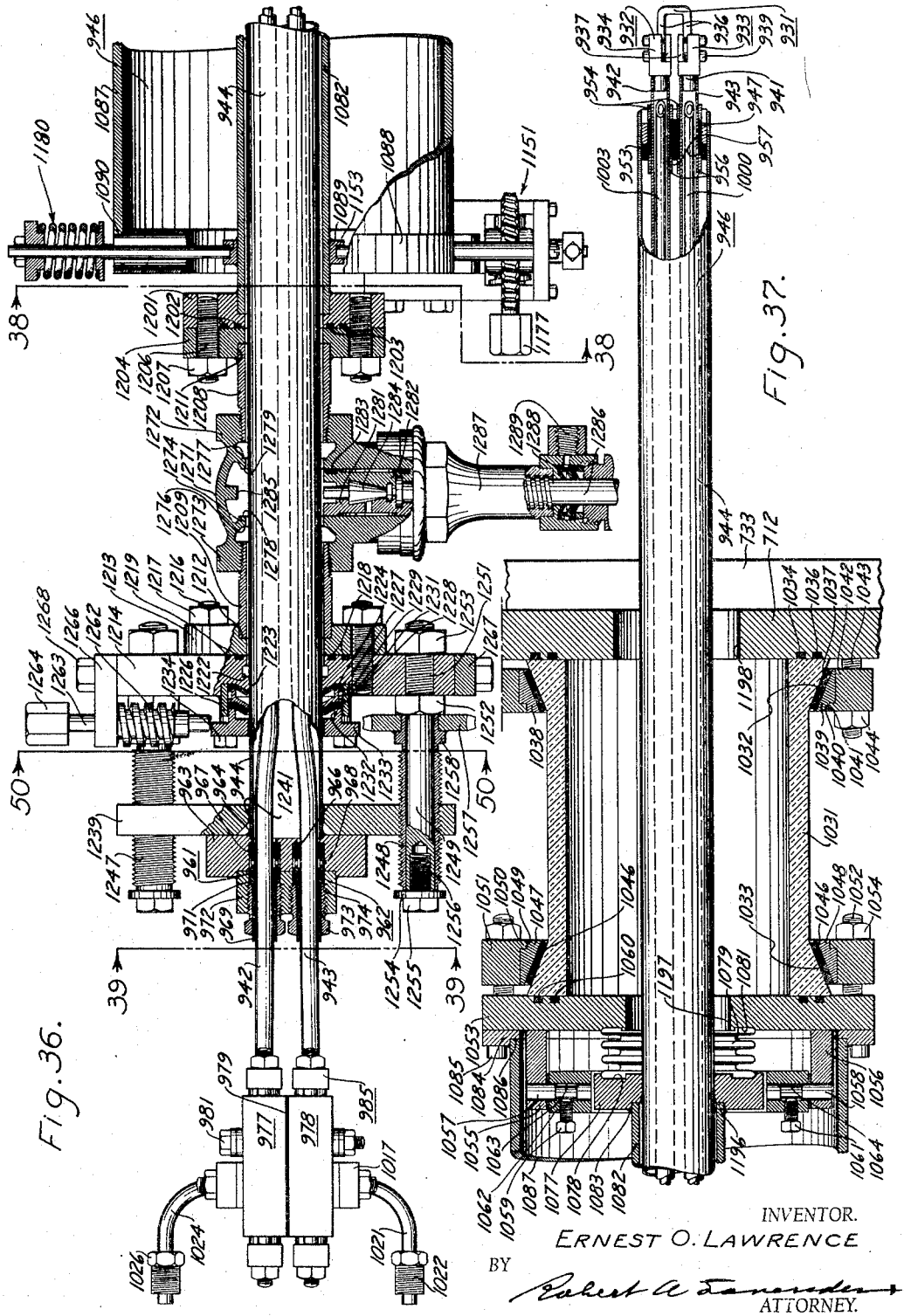

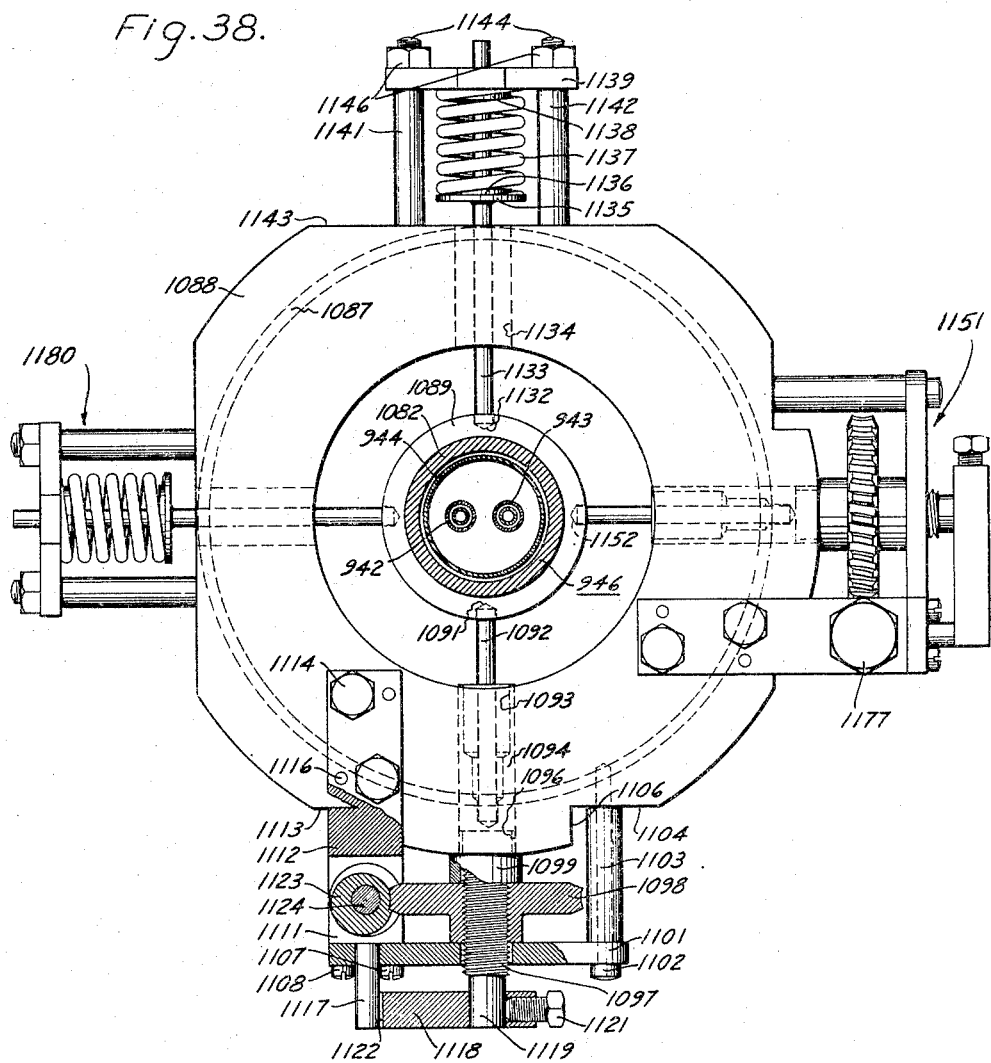

May 24, 1955  E. O. LAWRENCE  2,709,222
METHODS OF AND APPARATUS FOR SEPARATING MATERIALS
Filed Oct. 9, 1944  35 Sheets-Sheet 22

INVENTOR.
ERNEST O. LAWRENCE
BY
ATTORNEY.

May 24, 1955   E. O. LAWRENCE   2,709,222
METHODS OF AND APPARATUS FOR SEPARATING MATERIALS
Filed Oct. 9, 1944   35 Sheets-Sheet 24
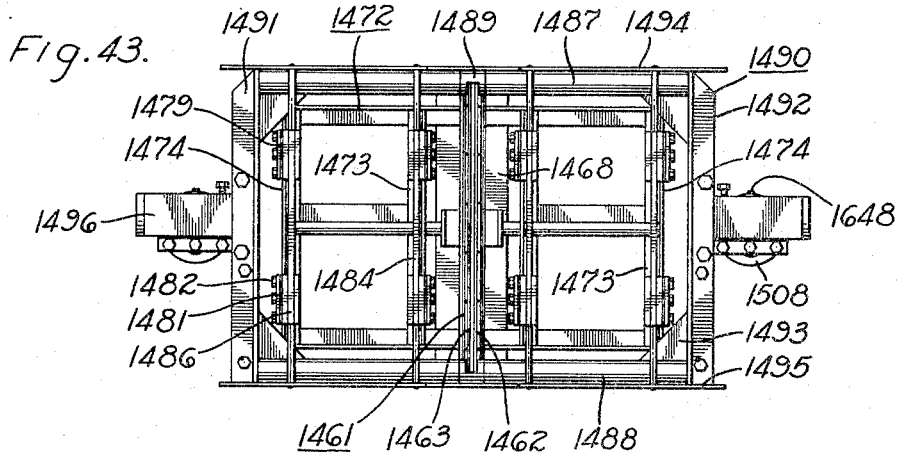
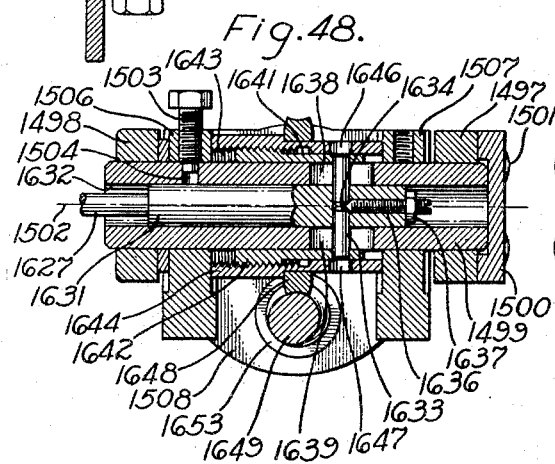
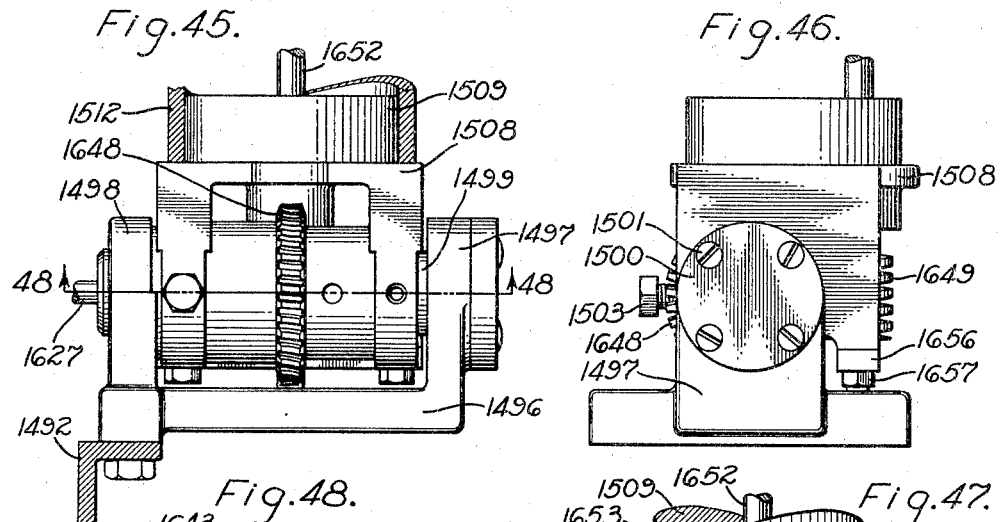
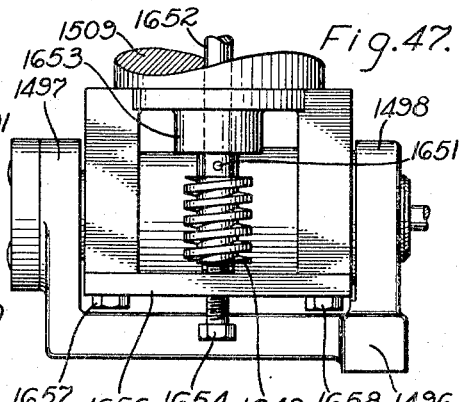
INVENTOR.
ERNEST O. LAWRENCE
BY
ATTORNEY.

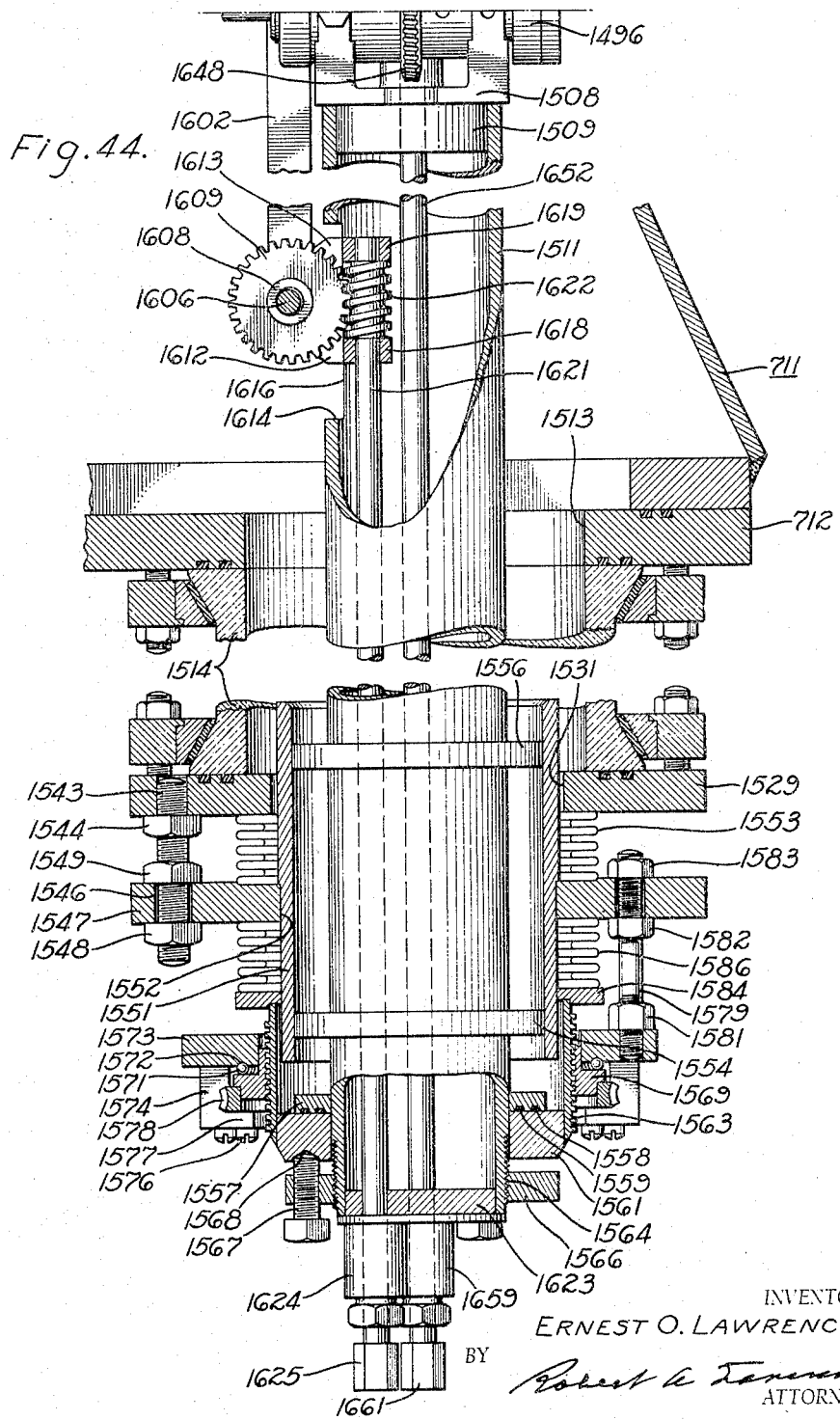

May 24, 1955  E. O. LAWRENCE  2,709,222
METHODS OF AND APPARATUS FOR SEPARATING MATERIALS
Filed Oct. 9, 1944  35 Sheets-Sheet 26

INVENTOR.
ERNEST O. LAWRENCE
BY
ATTORNEY.

May 24, 1955 E. O. LAWRENCE 2,709,222
METHODS OF AND APPARATUS FOR SEPARATING MATERIALS
Filed Oct. 9, 1944 35 Sheets-Sheet 29

INVENTOR.
ERNEST O. LAWRENCE
BY
ATTORNEY.

May 24, 1955      E. O. LAWRENCE      2,709,222
METHODS OF AND APPARATUS FOR SEPARATING MATERIALS
Filed Oct. 9, 1944      35 Sheets-Sheet 30

Fig. 54.

INVENTOR.
ERNEST O. LAWRENCE
BY
ATTORNEY.

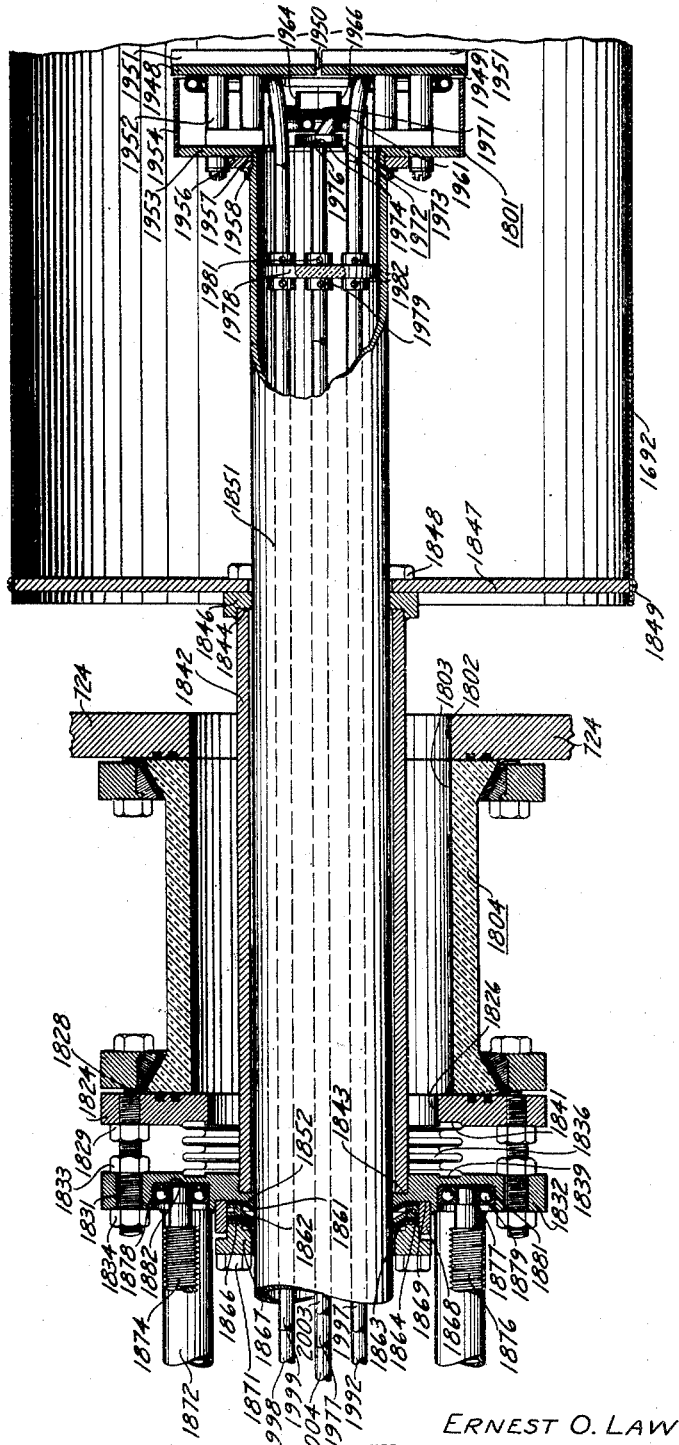

May 24, 1955  E. O. LAWRENCE  2,709,222
METHODS OF AND APPARATUS FOR SEPARATING MATERIALS
Filed Oct. 9, 1944  35 Sheets-Sheet 32
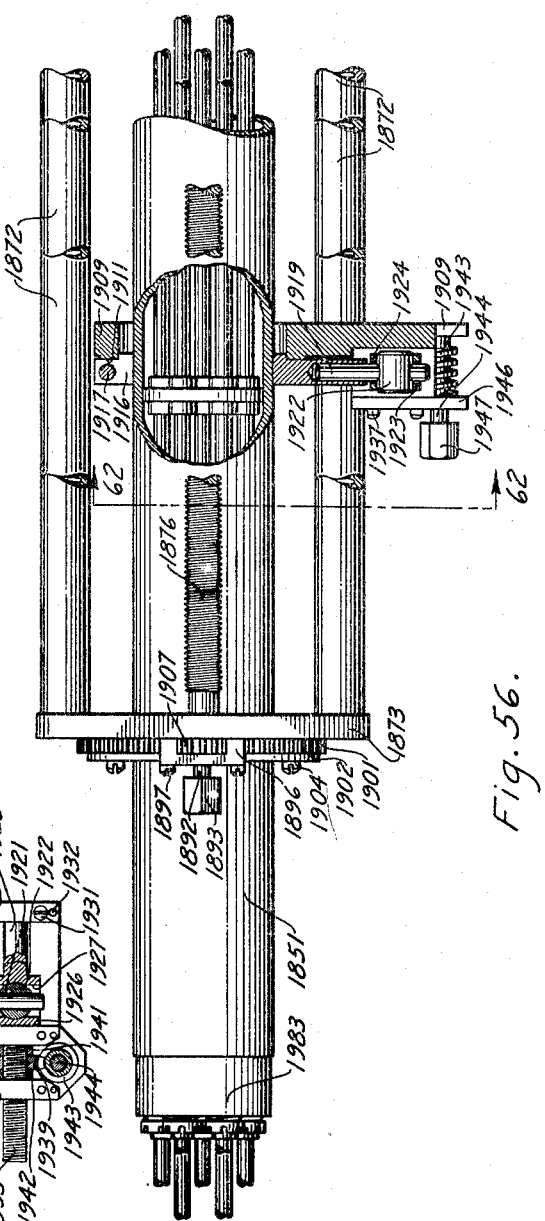
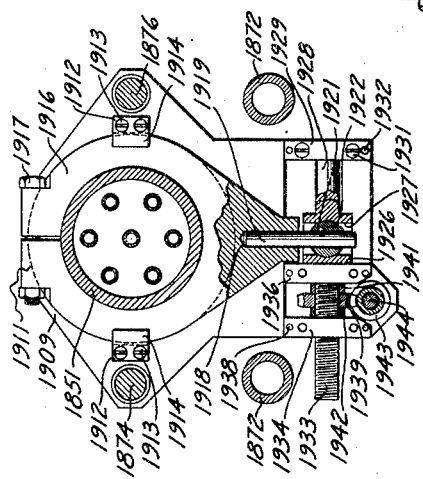
INVENTOR.
ERNEST O. LAWRENCE
BY
ATTORNEY.

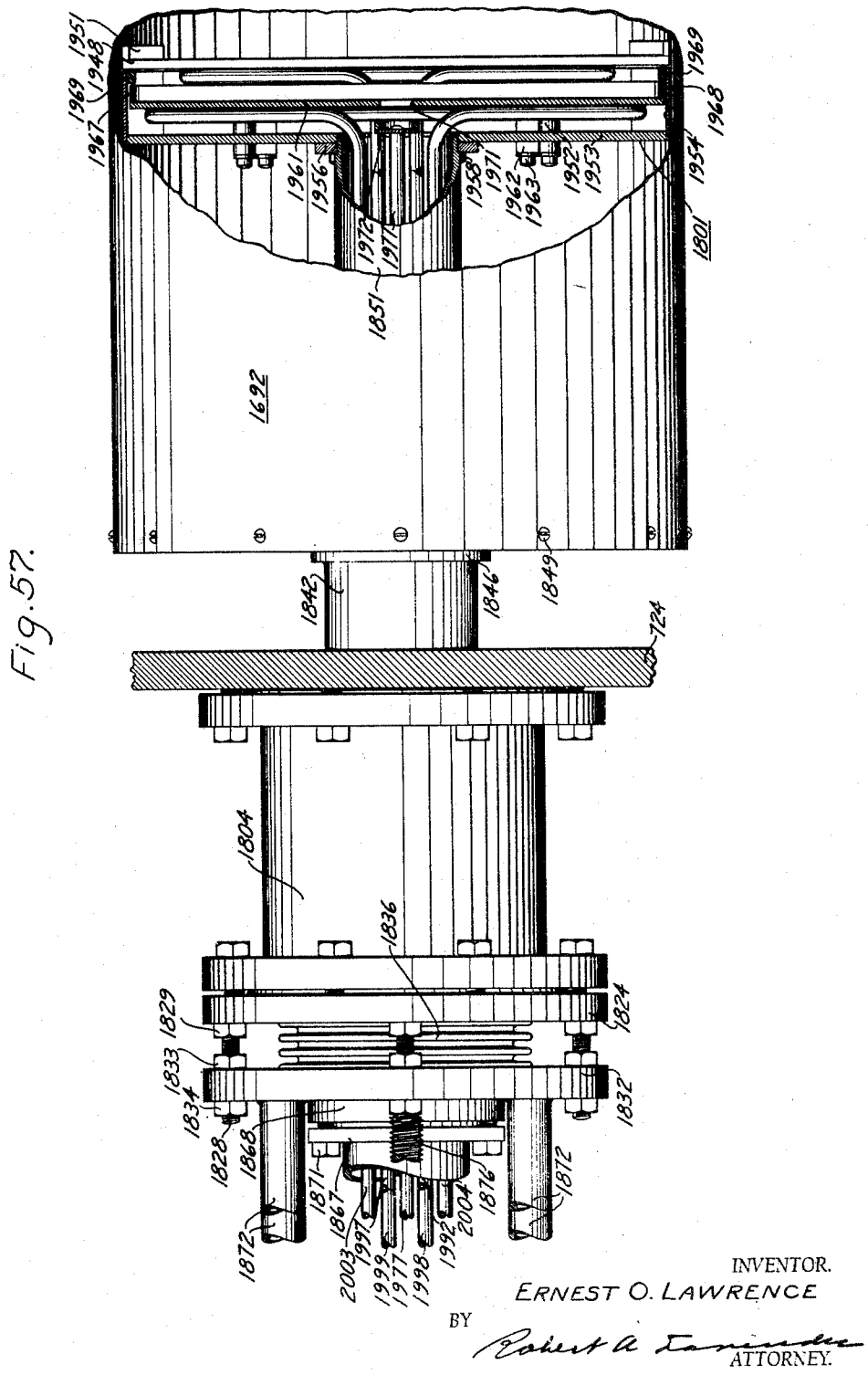

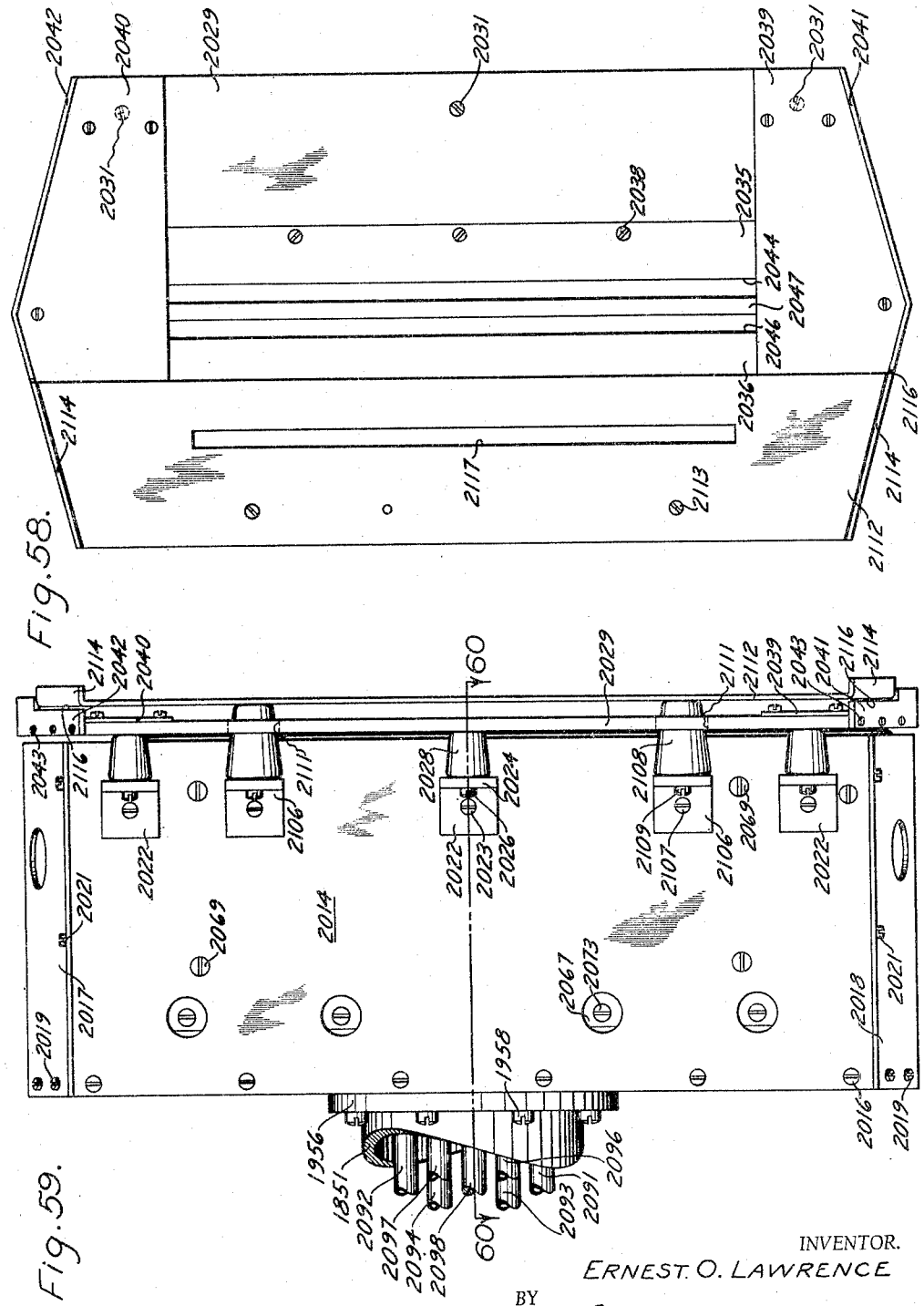

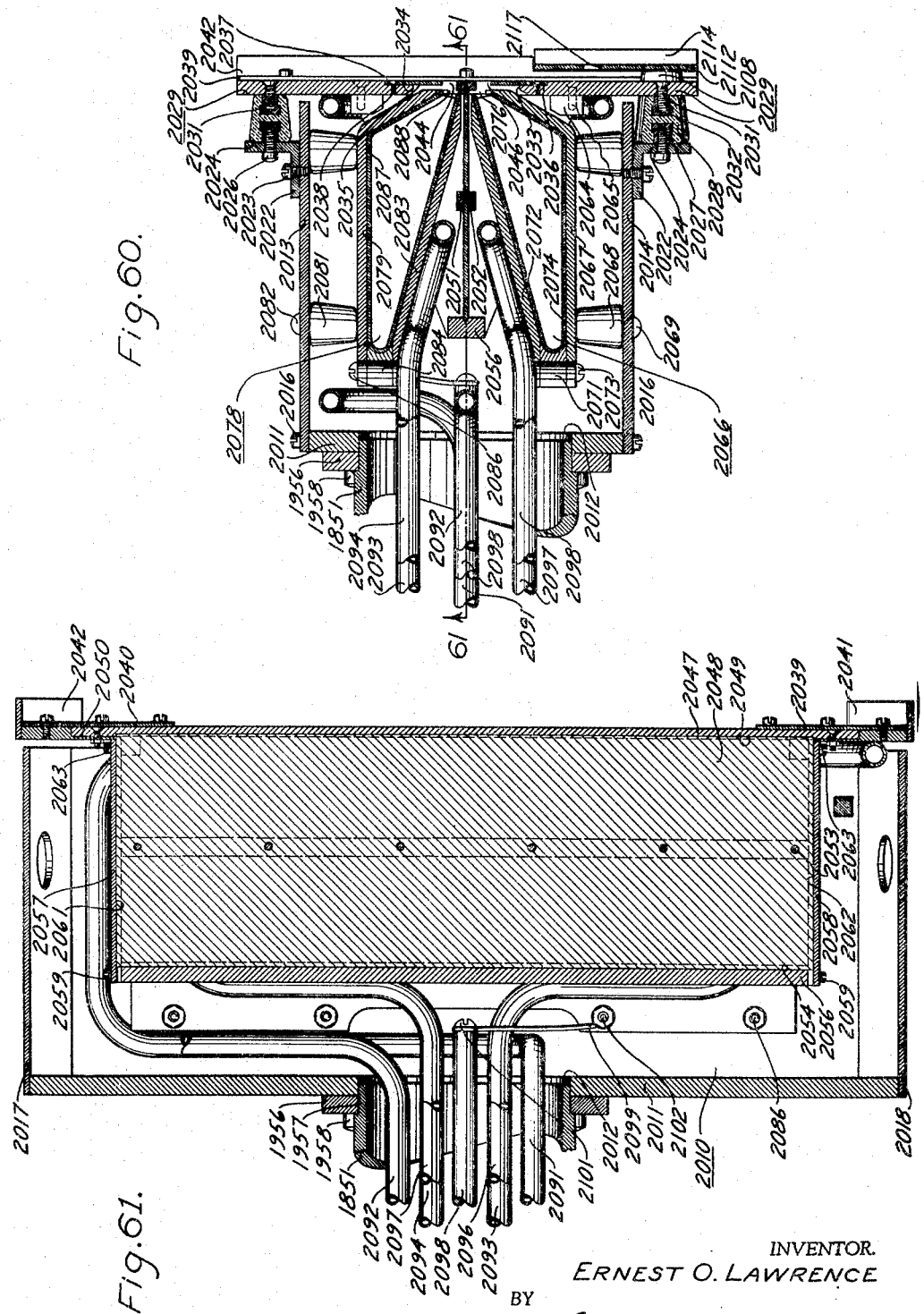

United States Patent Office 2,709,222
Patented May 24, 1955

2,709,222

METHODS OF AND APPARATUS FOR SEPARATING MATERIALS

Ernest O. Lawrence, Berkeley, Calif., assignor to the United States of America as represented by the United States Atomic Energy Commission Application October 9, 1944, Serial No. 557,784

48 Claims. (Cl. 250—41.9)

The general subject of this invention includes the separation of materials of different characteristics into discrete quantities, each of uniform characteristic. More specifically, the method and means of the invention achieve isotope separation or enrichment of an element on a large scale, yielding commercially useful quantities of one or more isotopes of the element.

The term "calutron", as used hereinafter, means any apparatus or machine wherein isotope separation or enrichment is achieved on a large scale yielding commercially useful quantities of one or more isotopes, by appropriate separative action on gaseous ions with electrostatic or electromagnetic means or combinations of them.

In the mass spectrometer or spectrograph, as previously utilized, electrically identical ions are formed at a source where the ions of different nuclear mass are intermingled indiscriminately. The ions are electrically impelled to travel through a highly evacuated space. They are usually under the influence of a magnetic field, so that the ions travel in curved paths to a target. The electrically identical ions travel and arrive in separate locations, depending solely upon their nuclear mass, all other possible differences being minimized or ruled out. At the target, the separated ions are deionized, thereby producing the isotopes in separate or discrete quantities that can be removed from the evacuated space at pleasure.

It is well known that the elements which are isotopic are distributed generally throughout the chemical series and from the lighter end continue through the heavier elements. It is to be noted that the percentage difference in the nuclear masses of the isotopes of the lighter elements is greater than that of the heavier elements. For example, lithium occurs in two isotopic forms, $Li^6$ and $Li^7$ and therefore provides a difference of substantially 15% in the nuclear masses. A heavier element, uranium for example, has several isotopes, $U^{234}$, $U^{235}$, and $U^{238}$, and the maximum difference in nuclear mass between them is less than 2%. It is therefore readily apparent that the separation of the isotopes of lithium may be accomplished more easily than the isotopes of uranium in an apparatus which utilizes difference in mass to produce such separation and this is generally true for the lighter elements as compared to the heavier elements.

When the yield or capacity of a mass spectrometer or spectrograph is to be increased manyfold, say one thousand times, or one thousand thousand times, then the number of ions or particles of similar electrical charge in any volume correspondingly must increase. If the total number of like charges in a given volume is grossly increased, then, the forces of mutual repulsion become extremely large. The concentrated like charges, when considered as a group, constitute a space charge tending to repel other ions and tending to repel each other with such force as to cause disruption of the group, thereby destroying the fundamental requisite for operation of the device and presenting a formidable difficulty.

Such devices, on a secondary ground, have also appeared impossible of use under the circumstances set forth herein, as they have been thought of in terms of beams of positive ions traversing regions of very high vacuum. It has always been considered that a very high vacuum was required to prevent excessive gas scattering of the ions. That is, it has been considered that if many gas molecules remained in the paths of the ion beams, the ions would collide with the gas molecules and be diverted from the predetermined arcuate paths necessary to produce separation.

It therefore appears, in accordance with the foregoing considerations, that discouragingly severe, if not impossible, restrictions are inherent in the mass spectrometer, precluding its use for the separation of large quantities of polyisotopes. Yet, except for the space charge and possibly the gas scattering difficulties, the device appears reasonably adapted for the purpose.

I have, at this apparent impasse, found that the space charge effects believed inherent in a mass spectrometer can be overcome. They can be neutralized by the provision of offsetting charges of opposite sign in and adjacent to the beam. In an instance where the beam ions themselves are positive, there are provided in the beam negative charges (ions or electrons or both) in just the right amount and in just the right distribution to neutralize or substantially to neutralize the positive ion space charge. At the same time, particular care is taken in introducing the neutralizing charges that they are not so numerous as to result in an excessive total amount of particles being present, so that gas scattering does not become excessive. It is, therefore, a part of my finding that the desirable introduction or presence of neutralizing, i. e., negative, particles in the beam should be balanced against the undesirable presence of excessive, scattering particles in the beam.

I have found that both of these ends can be attained; that is, not only can the negative or oppositely charged particles be provided, but also, gas scattering can be prevented from becoming excessive by arranging matters so that the original, i. e., positive, ions in the beam, by collision and by other means effective between such original positive ions and other particles in and adjacent to the beam, produce a sufficient supply of subsequent, i. e., negative, particles just to balance, or nearly to balance, the electrical forces without introducing excessive scattering. Thus, in accordance with my invention, the neutralization or substantial neutralization of space charge of one sign is effectuated by electrons and ions of opposite sign resulting from ionization of the gas through which the beam passes, such gas being sufficiently rare as to avoid undue scattering effects.

The considerations herein apply no matter what the charge of the original ions, whether positive or negative. Neutralization is effectuated by particles of opposite sign. For convenience in description the original ions are generally assumed to be positive.

The ions and electrons for space charge neutralization of a positive beam are formed in various ways, but a prominent way is the ionization resulting from high velocity positive ions passing through gas which is permitted in the path of the beam. Indeed, it appears, in accordance with my invention, that the gas pressures can be arranged at values low enough so that the beam can traverse the system without too serious gas scattering and, at the same time, appropriate so that the beam itself gives rise to sufficient ionization along its path to neutralize the otherwise occurring positive ion space charge. This space charge neutralization has been observed to be so complete that currents thousands of times larger than would otherwise be considered possible can be successfully utilized in a magnetic mass separator. Stated differently, instead of there being a limitation to a maximum of a microampere or so of current in a 180° magnetic mass spectrometer, there has resulted, in accordance with my invention, a neutralization of the beam space charge by ionization sufficient to allow beams of 100 milliamperes and more, with a resulting large and successful heavy isotope separation, and even this value is by no means an upper limit.

The space charge neutralization resulting from ionization of the gas allows the beam ions to travel with controlled, directed velocities. This has been demonstrated on occasions by varying the pressure of the residual gas in the vacuum chamber through which the beam passes, either by altering the pumping system or by introducing a variable leak of gas into the chamber. Under certain conditions of high vacuum it has been found that the ions in the beam do not preserve initial velocities but, as the ions pass along through the beam in the magnetic field of the mass separator, they acquire a spread of velocities, the whole beam "blowing up" so to speak, spreading out in different directions, as would be expected from space charge effects, whereas, when the gas pressure was raised from rather less than $10^{-5}$ mm. Hg to $10^{-4}$ mm. Hg, the blowing-up effect disappeared and the beam was observed to maintain its shape. Clearly, the interpretation of this effect is that the introduction of the additional gas was necessary to produce sufficient ionization to neutralize the space charge.

As a matter of actual practice, in operating embodiments of my invention the actual current densities used are thousands of times the theoretical figure. The described process of space charge neutralization is so effective that, in fact, no limit to current densities due to space charge in the beam region has, as yet, been found.

Now, in accordance with my invention, electrons and negative ions are produced in the beam region, either by a collision between a positive ion and a gas molecule, or by a collision of an ion with the chamber walls. The electrons and negative ions so formed are unable to escape from the beam region, as their energy is lower than the potential existing in the beam region where they are formed. Once formed, they are necessarily held in the vicinity of the beam and their presence is effective to neutralize the space charge of some of the positive ions.

The process of electron and negative ion production is going on continually, so the potential distribution in the beam is determined not by the density of the positive ion charge in the beam, but rather, by the energy and rate of production of electrons and negative ions. The potential distribution is such that all negative ions and electrons can escape at the rate they are produced, the amounts of positive and negative charge adjusting themselves until this condition is achieved. The resulting beam potential is thus determined mostly by the energy possessed by the negative charges when they are formed. In the usual case, and in accordance with the operation described above, the potential of the beam with respect to the surrounding walls is not hundreds or thousands of volts but is, under normal conditions, about or less than one volt.

It is, therefore, an object of the invention to provide a method of and apparatus for effecting the separation of substantial quantities of a polyisotope into its isotopic constituents.

It is another object of the invention to provide a method of and apparatus for effecting the separation of substantial quantities of a heavy element polyisotope into its constituent parts.

An additional object of the invention is to provide a method of and apparatus for effecting the separation of substantial quantities of uranium polyisotope into its constituents, particularly into $U^{235}$ and $U^{238}$.

An additional object of the invention is to provide a means and method of affording polyisotopic separation in substantial quantities.

An additional object of the invention is to provide a way of making and utilizing a device comparable to a greatly enlarged mass spectrometer to separate large or macroscopic quantities of a polyisotope into its constituent isotopes.

A further object of the invention is to prevent the blowing up of a large ion beam.

A still further object of the invention is to provide a means and method of furnishing a thousand or a thousand thousand times the quantity of separated heavy polyisotope previously feasibly separated.

An additional object of the invention is to provide a means and method of separating polyisotopes, not on a laboratory basis, but rather, on a commercial basis.

An additional object of the invention is to provide a means and method of overcoming the effect of space charge in a device of the nature described.

A further object of the invention is to provide a means and method of neutralizing space charge in a device of the nature described.

A still further object of the invention is to neutralize space charge without producing excessive gas scattering.

An additional object of the invention is to provide a means and method of producing large ion currents in vacuum.

Another object of the invention is to provide a means and method of ionizing large quantities of a polyisotope.

A further object of the invention is to provide a means and method of deionizing or neutralizing large quantities of an ionized polyisotope.

A still further object of the invention is to provide a means and method of receiving and retaining deionized material.

Another object of the invention is to provide in general an improved means and method of separating a polyisotope.

An additional object of the invention is to provide in general an improved means and method of separating mixed materials.

Another object of the invention is to provide a means and method of obtaining a desired material in a substantially pure condition.

A further object of the invention is to provide a means and method of obtaining relatively large amounts of $U^{235}$ in substantially pure condition.

Other objects, together with the foregoing, will appear from the following description of the invention and the preferred means of embodying and practicing the invention, having reference also to the included drawings.

In the drawings:

Figure 3 is a cross section on a generally horizontal, transverse plane, disclosing a form of the invention, certain portions being omitted and parts being broken away to increase the clarity of the disclosure.

Figure 4 is a fragmentary view of a portion of the source structure shown in Figure 3, the figure for the most part being in cross section, the plane of section being indicated by the line 4—4 of Figure 3.

Figure 5 is an isometric perspective, with some of the parts in exploded position, and to an enlarged scale, of the structure of the source mechanism illustrated in Figure 4, portions being shown diagrammatically and other portions being omitted for greater clarity of illustration.

Figure 6 is an enlarged detail of a portion of the source supporting mechanism shown in Figure 3, for the most part being in cross section, the plane of which is a transverse diametral plane, portions being broken away to reduce the size of the figure.

Figure 7 is a fragmentary view, being generally in cross section, the plane of which is indicated by the line 7—7 of Figure 3.

Figure 8 is a fragmentary cross section, the plane of which is indicated by the line 8—8 of Figure 3, portions being broken away to reduce the size of the figure.

Figure 9 is a fragmentary cross section, the plane of which is indicated by the line 9—9 of Figure 3, portions being broken away to reduce the size of the figure.

Figure 10 is a fragmentary view, showing largely in plan the details of construction of the cathode support and surrounding mechanism.

Figure 11 is a fragmentary view showing a plan that is comparable to a cross section on a plane indicated by the line 11—11 of Figure 7, disclosing the arrangement and support of the source block.

Figure 14 is a fragmentary side elevation showing the receiver unit of Figure 12 rotated about its longitudinal mounting axis through an angle of approximately 180°.

Figure 15 is a view showing in side elevation a fragment of the alternative receiver unit illustrated in Figure 13, but rotated about its longitudinal mounting axis through an angle of approximately 180°.

Figure 16 is a detail to an enlarged scale of the receiver unit illustrated in Figure 12, portions of the structure being broken away to disclose the interior arrangement, the interior being generally illustrated on a transverse, diametral plane, as indicated by the line 16—16 of Figure 17.

Figure 17 is a cross section of the structure shown in Figure 16, the plane of the section being indicated by the line 17—17 of Figure 16.

Figure 18 is a cross-sectional view to an enlarged scale of the alternative form of receiving unit illustrated in Figure 13, the cross section being on a transverse, diametral plane, as indicated by the line 18—18 of Figure 19.

Figure 19 is a cross section on a transverse, diametral plane, indicated by the line 19—19 of Figure 18.

Figure 20 is a schematic diagram illustrating, in part, in cross section taken on a vertical plane through a development of an alternative form of illustrative elementary structure showing the electrical supply, the pressure mechanism of a structure comparable but alternative in form to the mechanism diagrammatically illustrated in Figure 1.

Figure 21 is a diagrammatic plan, comparable to a cross section on a generally horizontal plane, of the structure generally illustrated in Figure 20, and comparable to Figure 2 but disclosing an alternative structure.

Figure 28:
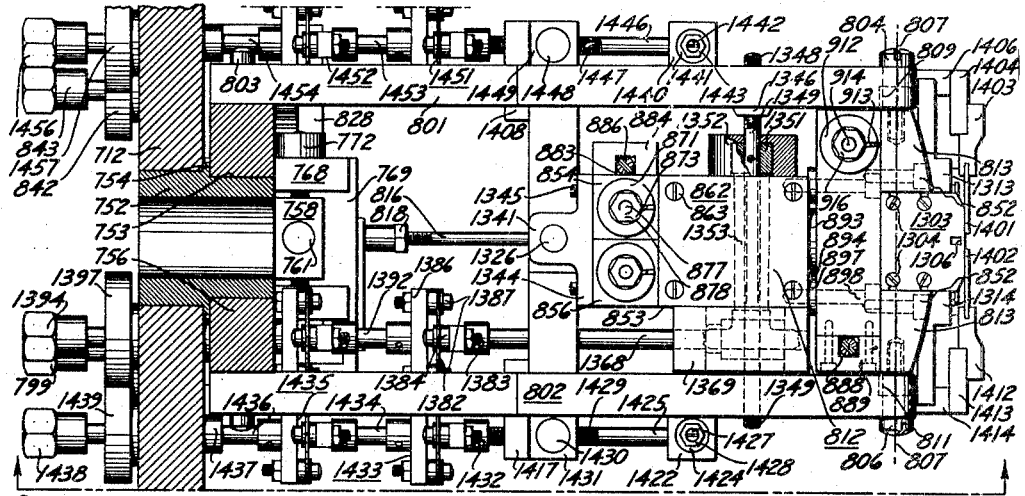
Figure 28 is a cross section on a generally horizontal plane indicated by the line 28—28 of Figure 29 and, for the most part, showing in plan the arrangement of the source unit of the modification of the invention illustrated in Figures 24 et seq., portions of Figure 28 being broken away to reduce the size of the figure.
Figure 29:
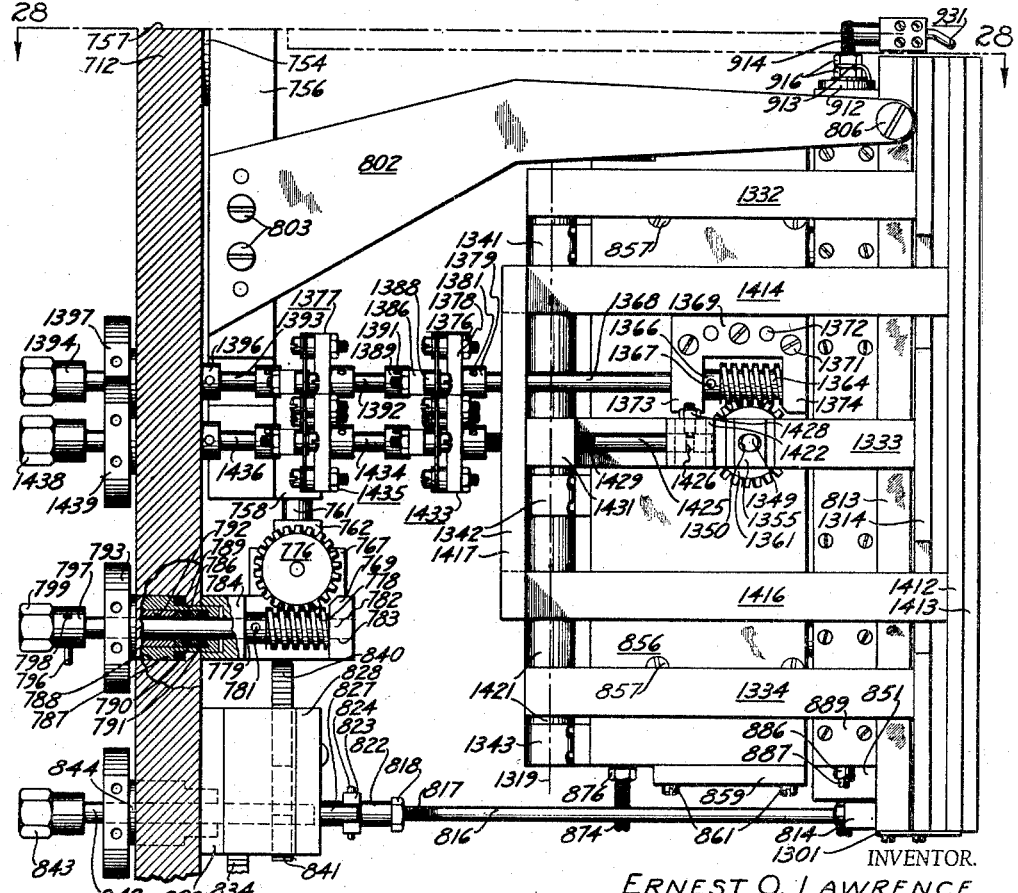
Figure 29 is a cross section on a vertical plane generally indicated by the line 29—29 of Figure 28 and showing, for the most part, a side elevation of the structure of Figure 28 and having portions broken away to reduce the size of the figure.

Figure 30 is a cross section on a generally horizontal plane through the source mechanism as shown in Figure 28, the plane of section being indicated by the line 30—30 of Figure 31, portions being conventionalized by broken lines, portions being omitted to reduce the size of the figure and to improve the clarity of the disclosure, and a part of the associated accelerator mechanism being disclosed on the same cross-sectional plane.

Figure 31 is a view of the mechanism disclosed in Figure 30, the view being a compound cross section, of the several planes of which are indicated by the lines 31—31 of Figure 30, a portion of the associated cathode structure being shown in cross section on a corresponding vertical, diametral, longitudinal plane, parts being broken away to reduce the size of the figure, and various portions of the structure being broken away or omitted to improve the clarity of the disclosure.

Figure 32:
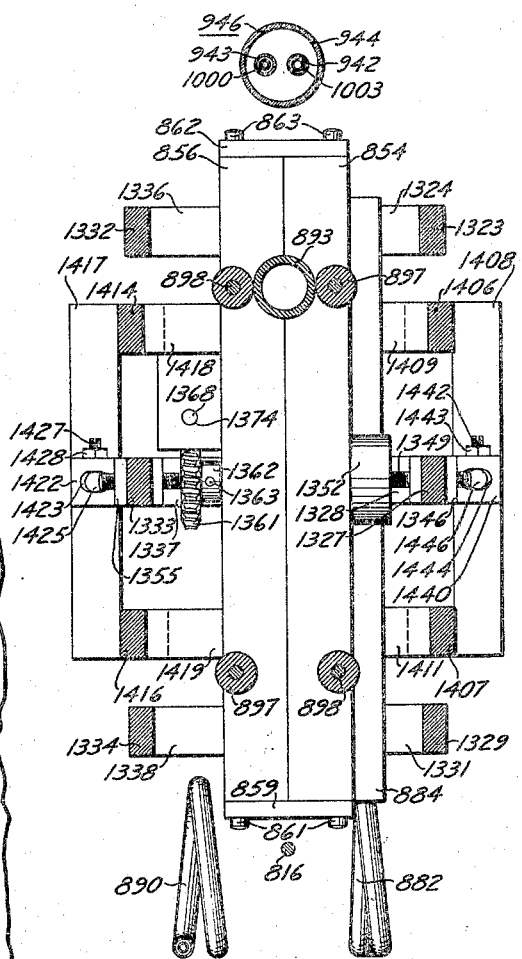

Figure 32 is a cross section, the plane of which is indicated by the line 32—32 of Figure 31.

Figure 33:
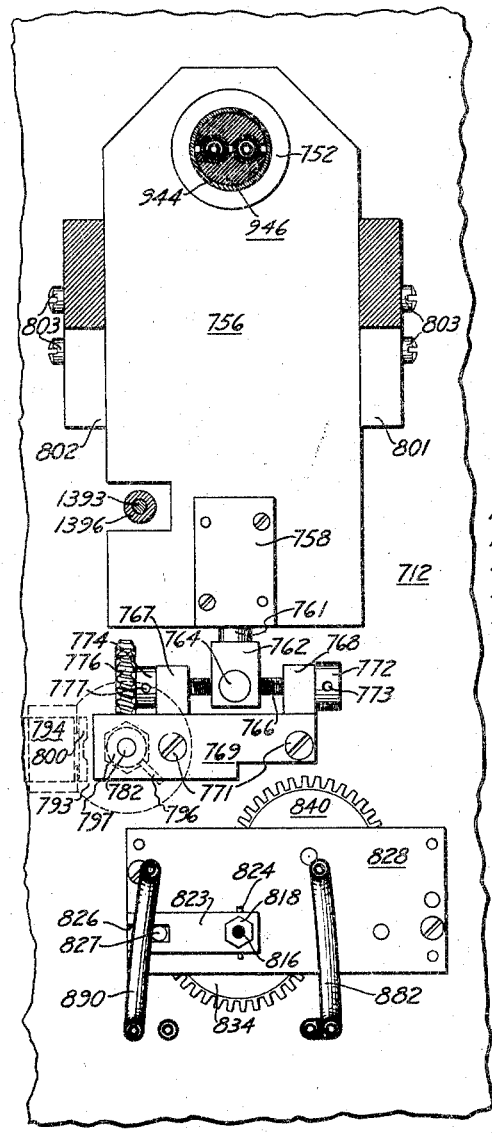

Figure 33 is a cross section, the plane of which is indicated by the line 33—33 of Figure 31.

Figure 24:
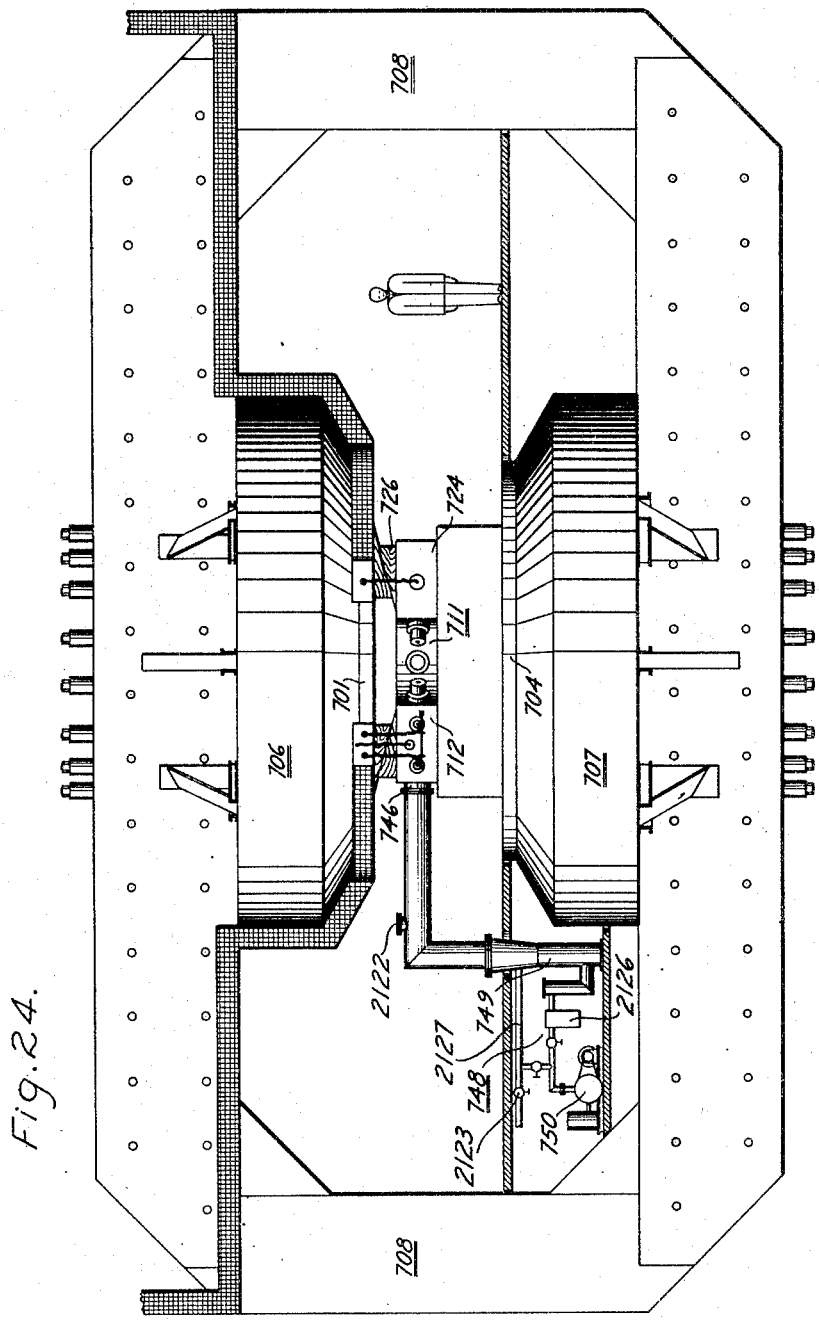
Figure 24 is a front elevation of a magnet structure with a second alternative form of device of the invention associated therewith, portions of the cooperating mechanism being arranged and disclosed schematically, and portions of the associated mechanism being shown in fragmentary form.

Figure 34 is a side elevation of the outboard portion of the cathode supporting and manipulating structure pertinent to the second modified form of structure illustrated in Figures 24 et seq., a portion of the structure being broken away and included in Figure 35.

Figure 35 is a continuation of the structure shown in Figure 34 and is a side elevation of the inboard portion of the cathode structure pertinent to the second modified form of the invention as illustrated in Figures 24 et seq., a portion of the view being in cross section on a vertical, axial plane through the walls of the tank or envelope.

Figure 36 is a view of the structure generally shown in Figure 34, being partially a plan and partially a cross section on a horizontal or transverse axial plane, parts of the structure being omitted and parts being broken away to reduce the size of the figure and to increase the clarity of the disclosure, the structure illustrated being continued in Figure 37.

Figure 37 is a companion figure to Figure 36 and is in general a cross section on a transverse axial plane of the inboard portion of the cathode mechanism as illustrated in Figure 35, portions of the mechanism being shown in plan, and portions of the mechanism being broken away or omitted to improve the clearness of illustration.

Figure 38 is a cross section, the planes of which are indicated by the lines 38—38 of Figure 36, a portion of the figure being broken away to show a part of the adjusting structure in cross section on an adjusting axis.

Figure 39:
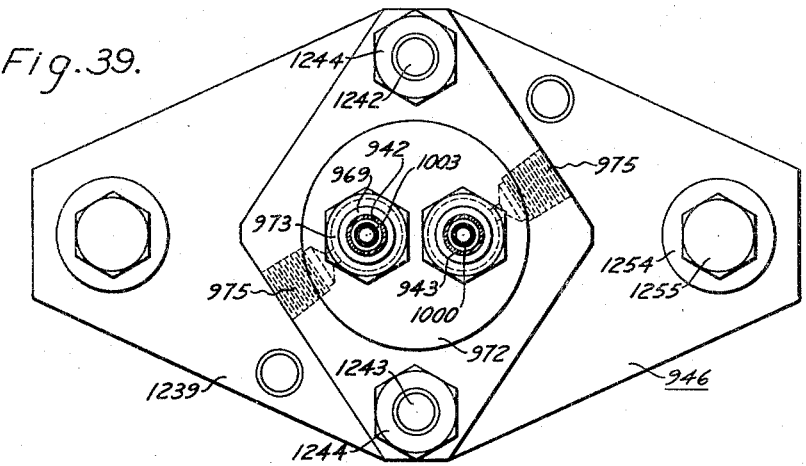

Figure 39 is a detail to an enlarged scale of a portion of the mechanism illustrated in Figure 36, the detail being in cross section, the plane of which is indicated by the line 39—39 of Figure 36.

Figure 40:
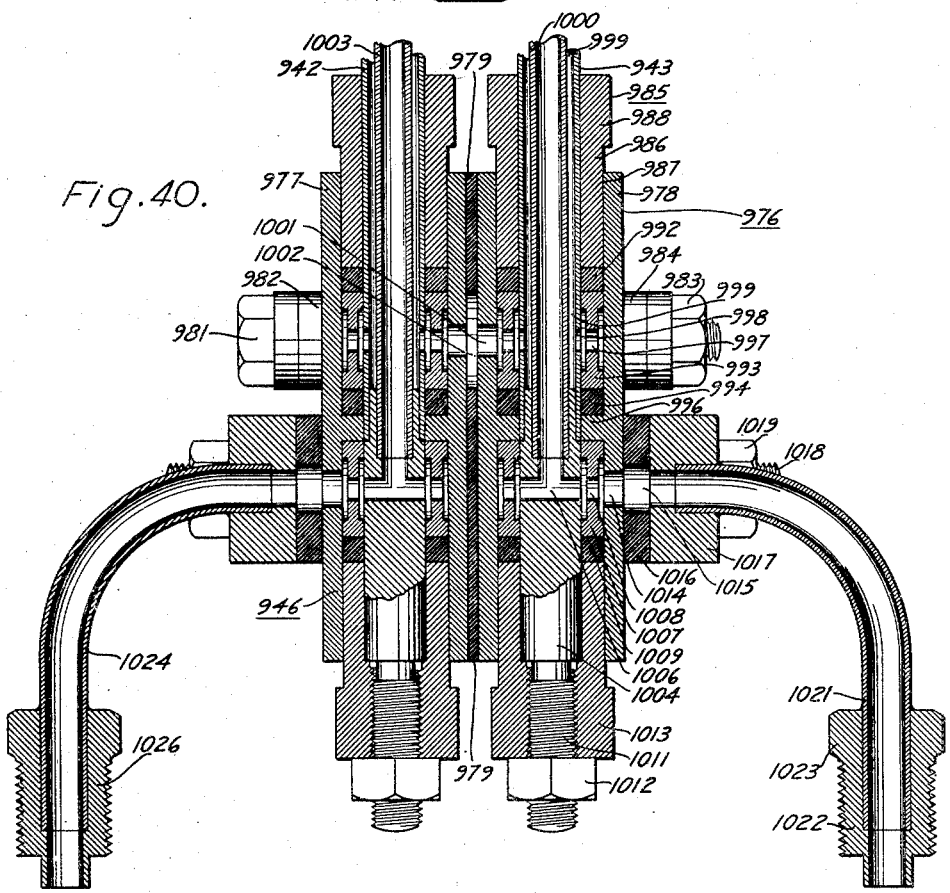

Figure 40 is an enlarged detail of a fluid and electrical connecting mechanism, the figure being a cross section on a generally horizontal plane, indicated by the line 40—40 of Figure 34, the scale being considerably enlarged to disclose the details of construction.

Figures 41, 42:
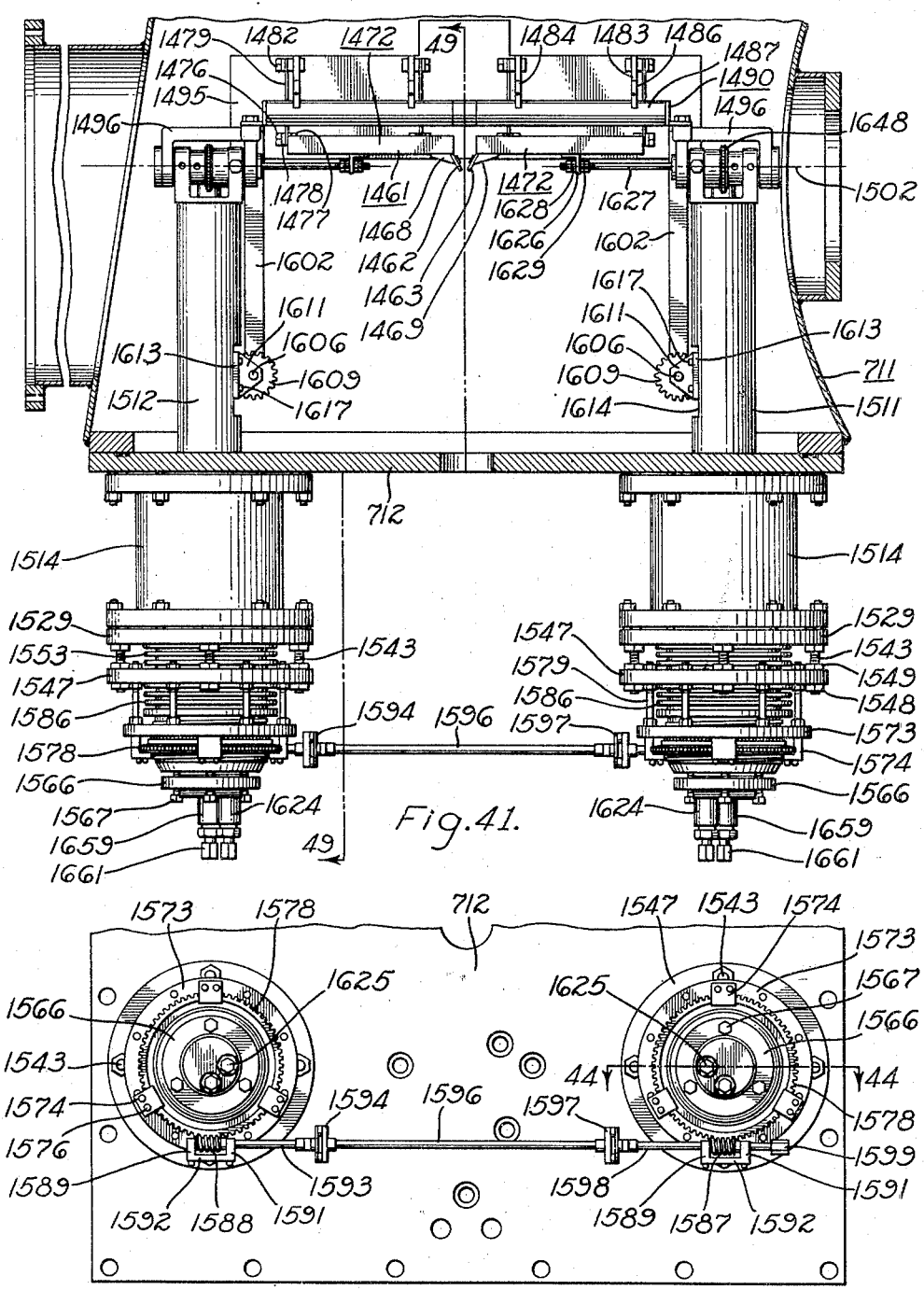

Figure 41 is, for the most part, a plan of the accelerator mechanism incorporated in the second preferred form of the invention illustrated in Figures 24 et seq., a portion of the view being in cross section and some of the normally associated mechanism being omitted to improve the clarity of this view.

Figure 42 is a front elevation of the accelerator mechanism illustrated in Figure 41, a part of the associated face plate being broken away to reduce the size of the figure.

Figure 43 is a rear elevation of the accelerator mechanism illustrated in Figure 41, most of the surrounding mechanism and supporting structure being omitted to improve the clarity of the figure.

Figure 44 is a cross section, the plane of which is indicated by the line 44—44 of Figure 42, a portion of the center of the structure being omitted to condense the figure and a part of the structure being shown in plan, some of the appurtenant structure being broken away and omitted to reduce the size of the figure.

Figure 45 is a plan, to an enlarged scale and rotated through 180° from the position shown in Figure 41, of a portion of the accelerator mounting mechanism and an adjusting drive.

Figure 46 is a side elevation of the structure shown in Figure 45.

Figure 47 is a bottom plan of the structure illustrated in Figure 45.

Figure 48 is a cross section, the plane of which is indicated by the line 48—48 of Figure 45.

Figure 49:
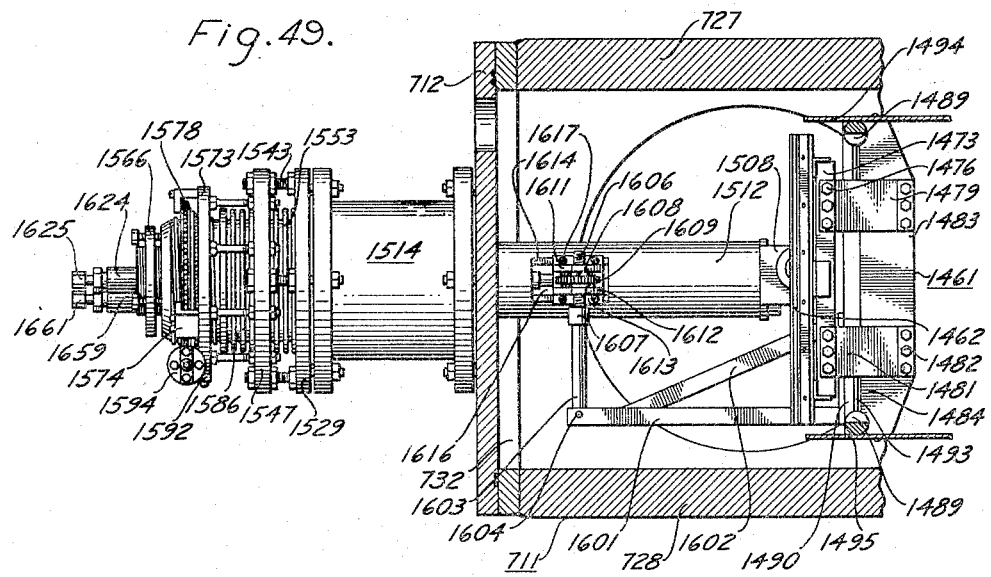

Figure 49 is a cross section, the plane of which is indicated by the line 49—49 of Figure 41, showing in general a side elevation of the accelerator mechanism, the associated structure being omitted to increase the clarity of the disclosure and portions being broken away to reduce the size of the figure.

Figure 50:
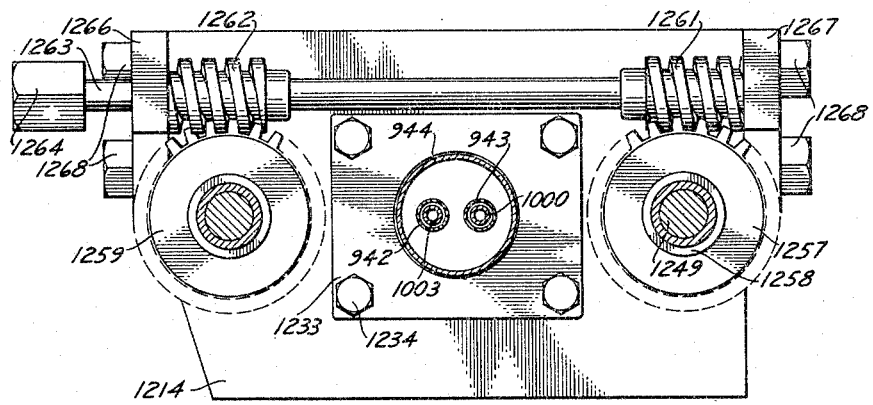

Figure 50 is a cross section, the plane of which is indicated by the line 50—50 of Figure 36.

Figure 51:
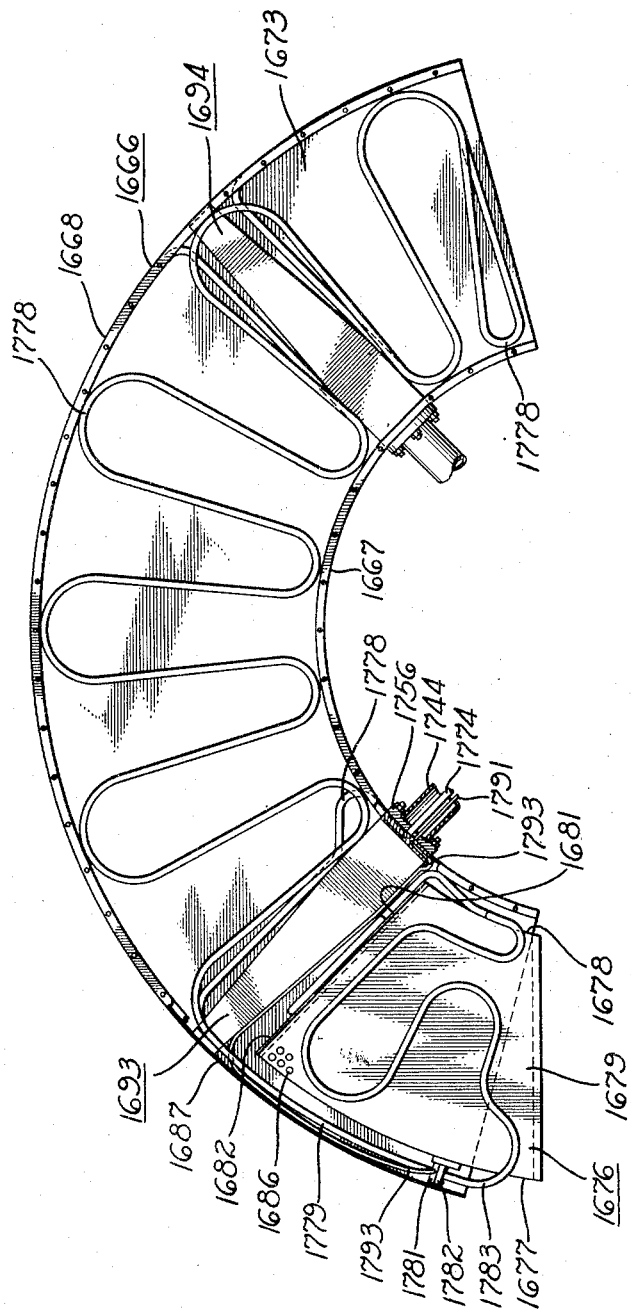

Figure 51 is a plan of a C-liner associated with the second alternative form of the invention illustrated in Figures 24 et. seq., portions being broken away to disclose the interior construction and portions being in cross section on a horizontal, axial plane, parts of the structure being broken away to reduce the size of the figure.

Figure 26:
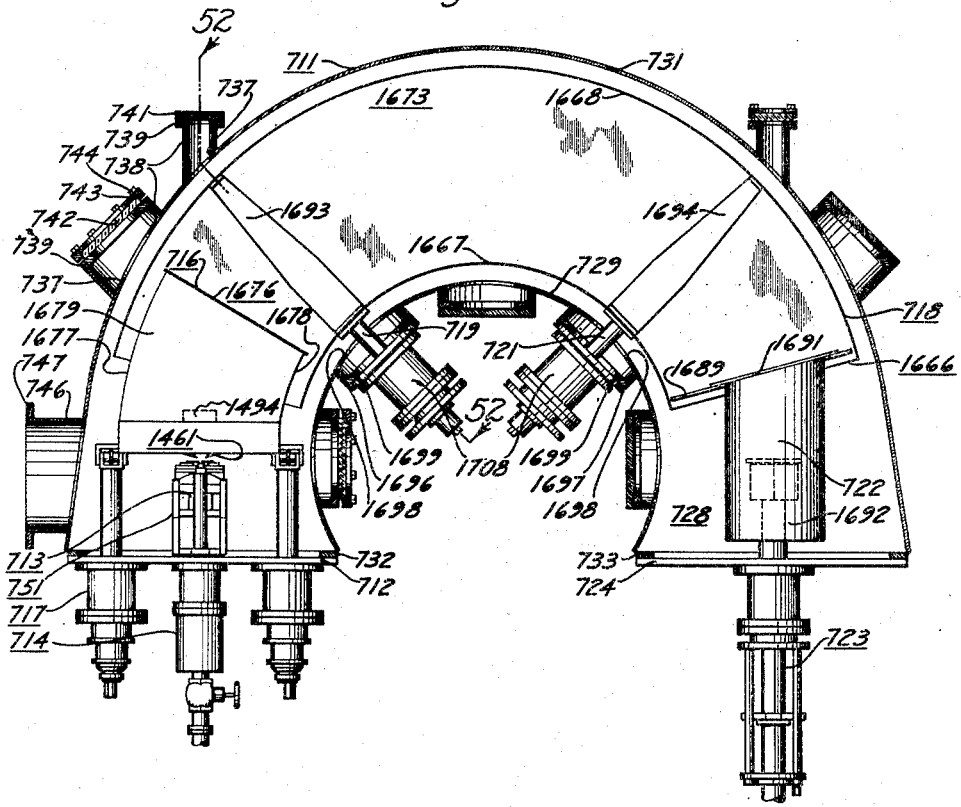
Figure 26 is, for the most part, a cross section in a generally horizontal plane midway of the device shown in Figure 25 remaining parts of the mechanism being shown in plan and portions of the structure not being illustrated to reduce the complexity of the drawing.
Figure 27:
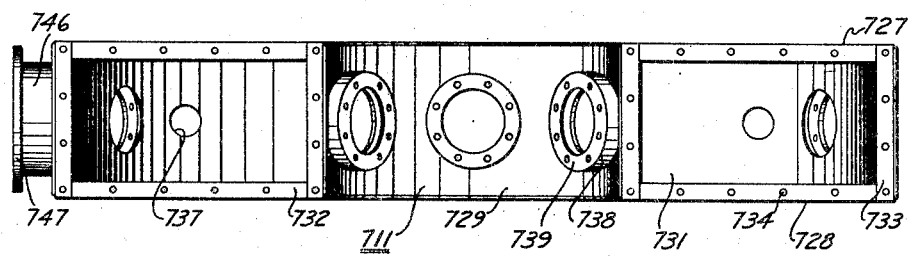
Figure 27 is a front elevation, somewhat comparable to Figure 25, but illustrating primarily the envelope or tank of the second alternative embodiment of the invention, with the various tank appurtenances being omitted.
Figure 52:
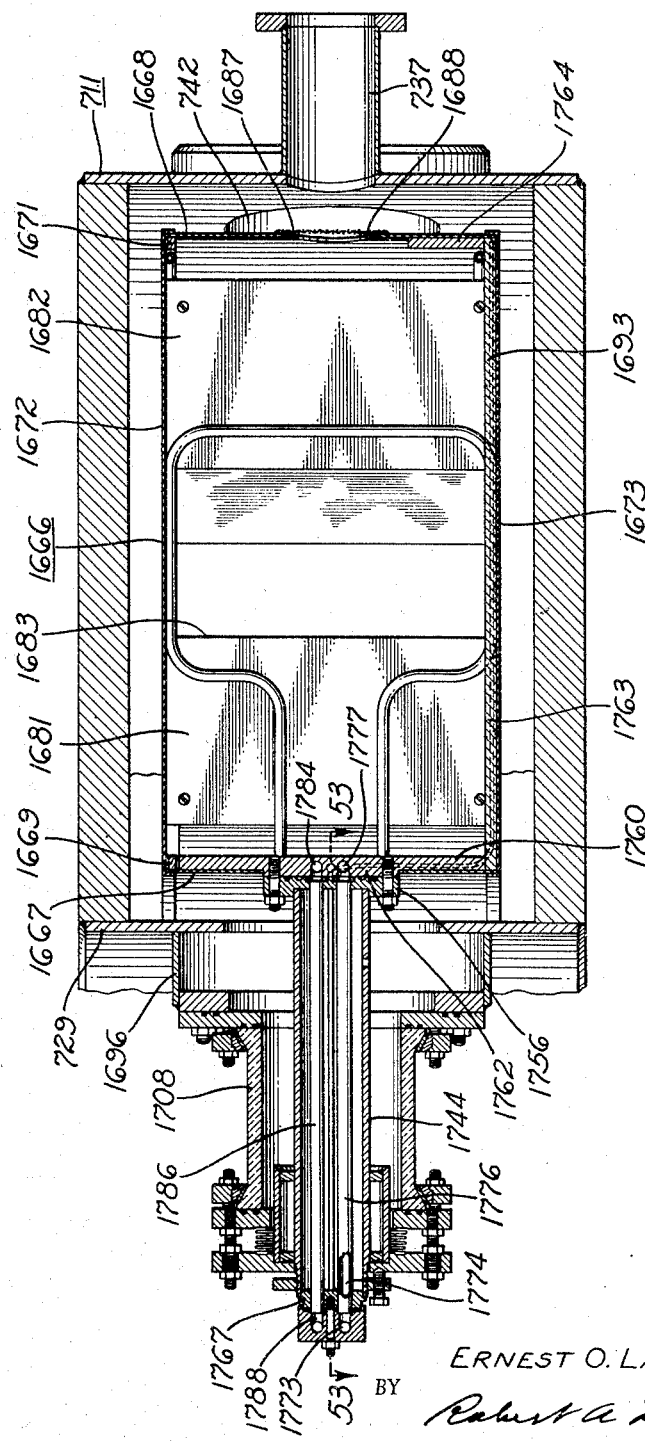

Figure 52 is a cross section to an enlarged scale, the planes of section being indicated by the lines 52—52 of Figure 26.

Figure 53:
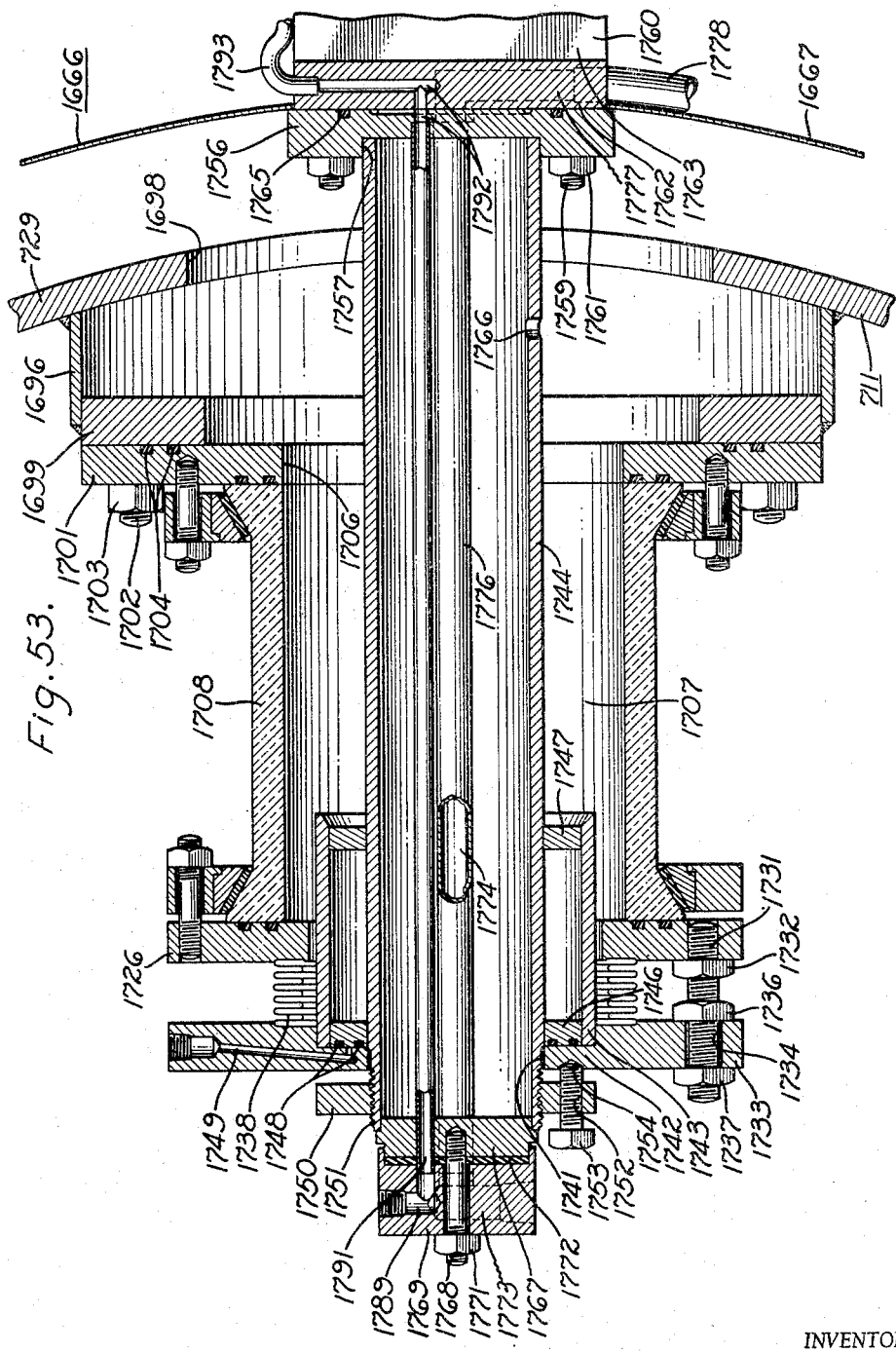

Figure 53 is a cross-sectional view showing to an enlarged scale the structure of the insulating support appearing in Figure 52.

Figure 54 is a cross section on a horizontal, axial plane of a collector mounting mechanism incorporated in the second preferred form of the invention, portions of the figure being broken away to reduce the size of the figure and other portions being broken away to disclose interior construction, the structure being additionally illustrated in Figure 55.

Figure 55 is a cross section on a horizontal, axial plane of a collector mechanism partly illustrated in Figure 54, parts of the structure being broken away to disclose interior construction and to reduce the size of the figure.

Figure 56 is a side elevation of the collector mechanism illustrated in Figure 54, a portion of the figure being broken away to disclose in cross section on a vertical, axial plane a part of the adjusting mechanism, the figure being continued in Figure 57.

Figure 57 is a side elevation of a collector mechanism as illustrated in Figure 55, with portions being broken away to reduce the size of the figure and to afford illustrations of the interior construction, that is generally illustrated in cross section on a vertical, axial plane.

Figure 58 is a plan of an alternative form of collector for use with the mechanism illustrated in Figures 24 et seq.

Figure 59 is a side elevation of the structure illustrated in Figure 58, a part of the mounting being broken away to reduce the size of the figure.

Figure 60 is a cross section, the plane of which is indicated by the line 60—60 of Figure 59, a portion of the supporting stem being broken away to reduce the size of the illustration.

Figure 61 is a longitudinal cross section, the plane of which is indicated by the line 61—61 of Figure 60.

Figure 62 is a cross section, the plane of which is indicated by the line 62—62 of Figure 56.

In its presently preferred embodiment, the invention includes a vacuum envelope within which are provided means for ionizing different materials and for impelling the ionized materials to travel, in accordance with a difference in the materials, to separate targets. There means are provided for deionizing and retaining the separated materials pending their removal from the envelope. Means are also provided for maintaining gas within the envelope so that no serious gas scattering occurs, yet so that electrical charges do not preclude said travel of enormous quantities of ionized materials. The invention also includes impelling ions of different materials to travel, in accordance with a difference in the materials, through a gas to separate destinations, deionizing and retaining the separated materials at the destinations, and maintaining the gas so that no serious gas scattering occurs, yet so that electrical charges do not preclude said travel of enormous quantities of ionized materials.

Figure 1:
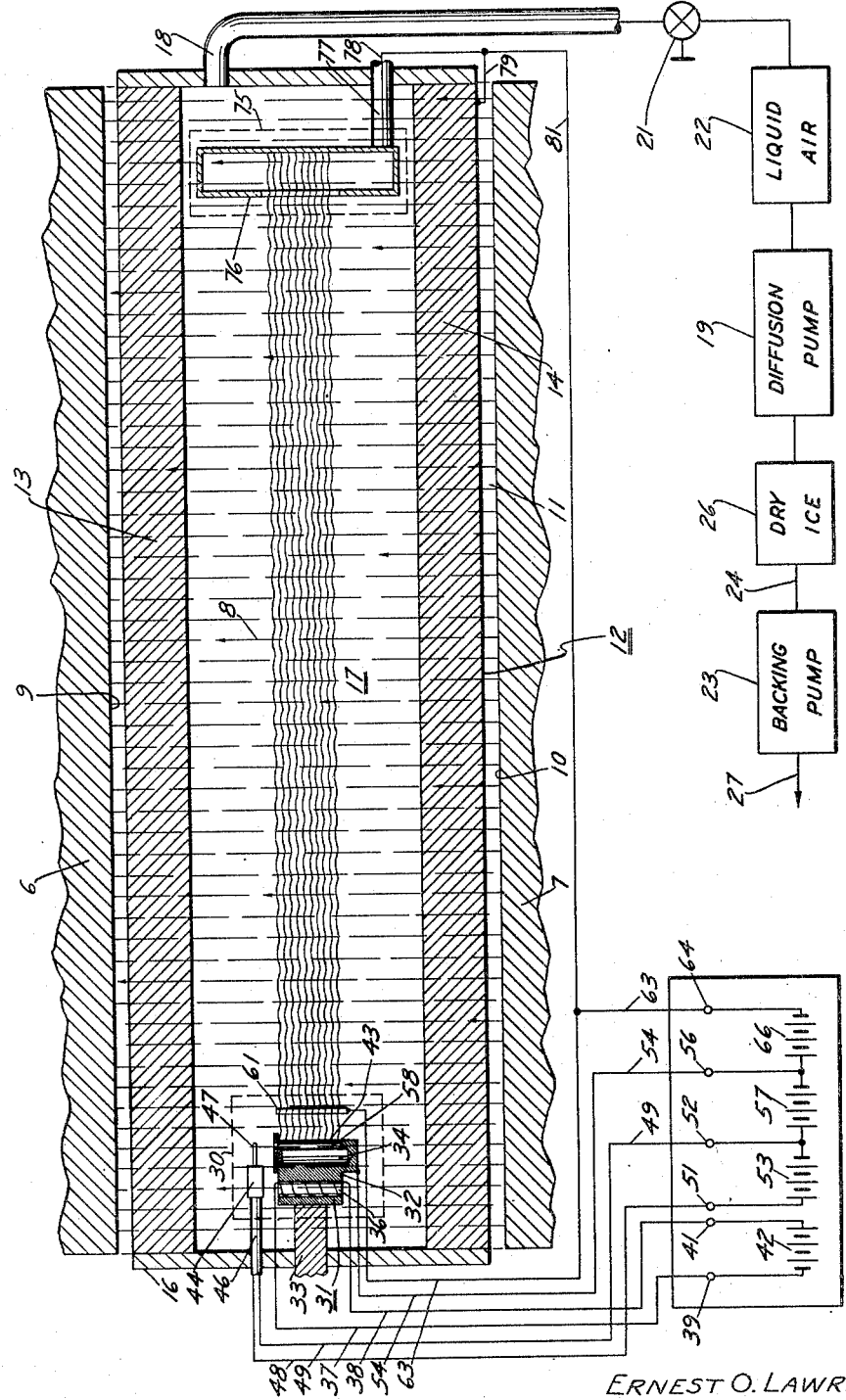
Figure 1 is a non-scalar diagram showing in schematic form a developed vertical section of an elementary form of the device of the invention, together with the electrical and the pressure mechanism.
Figure 2:
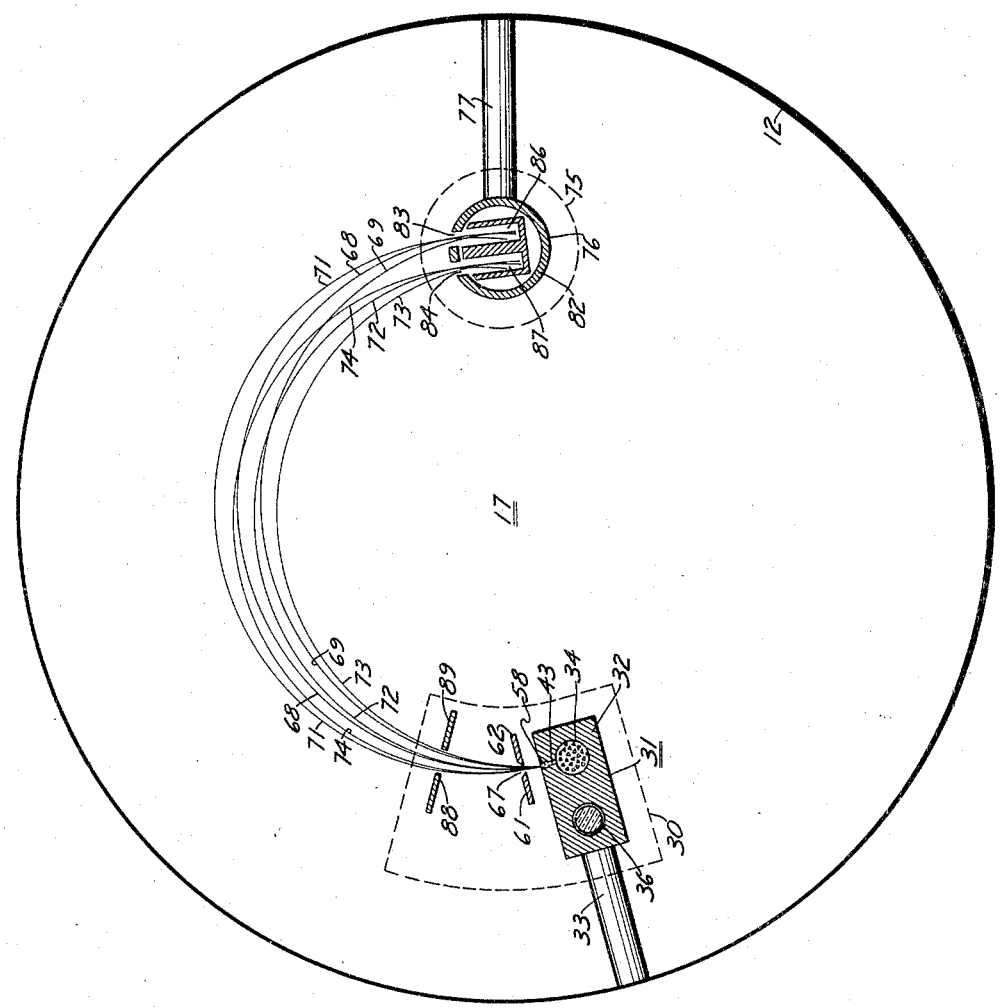
Figure 2 is a diagrammatic plan showing in schematic and undeveloped form the structure illustrated in Figure 1.
Figure 13:
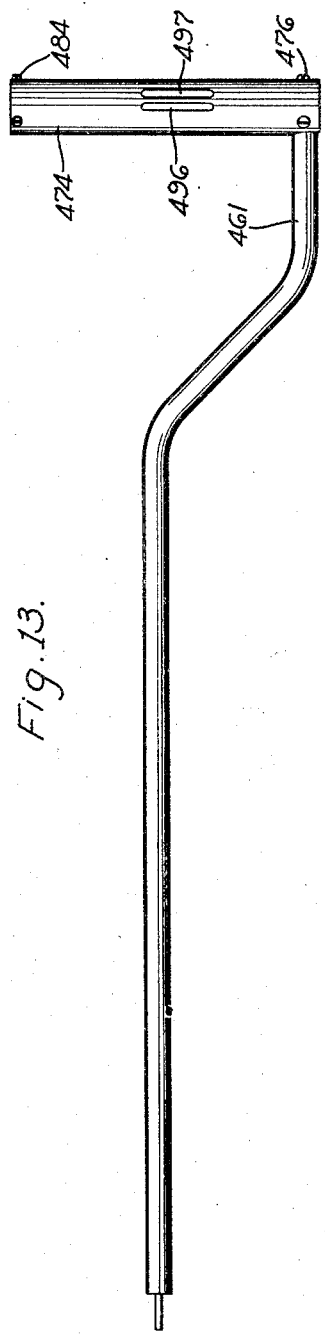
Figure 13 is a side elevation of an alternative form of receiver unit, usable in the environment illustrated in Figure 12.

In accordance with the foregoing, the means and method of the invention are first described in a general case and without regard to specific mechanism. The representative arrangement and operation are schematically illustrated in Figures 1 and 2 of the drawings. The environment and a pervasive part of the invention is a magnetic field. This field is provided by an upper magnetic pole 6 and an aligned lower magnetic pole 7, both poles preferably being circular in transverse contour and being included as parts of a suitable electromagnet. When energized, the magnet is effective to induce between the circular pole pieces 6 and 7 a homogeneous field having a value of the order of 3000 gauss and, for example, having a flux direction represented by the arrow 8. This arrow indicates that the flux extends from the lower pole piece 7 vertically toward the upper pole piece 6, the flux being perpendicular to all important parts of the planar pole faces 9 and 10 of the pole pieces 6 and 7, respectively.

Disposed in the gap 11 between the pole faces 9 and 10 is a tank or envelope 12, preferably of circular, cylindrical, transverse contour and conveniently made up of a relatively thick top disk or plate 13, a relatively thick bottom disk or plate 14 and an encompassing and enclosing side wall in the shape of a circular-cylindrical band 16. The top and bottom plates 13 and 14 are of a metal, such as iron, effective to smooth out any minor irregularities in the magnetic field. There is thus provided throughout the chamber or volume 17 defined by the tank boundaries a quite uniform or homogeneous magnetic flux. The tank 12 is preferably made as nearly as possible hermetically or vacuum tight in order that the interior chamber 17 can be established and maintained at the desired pressure. Sometimes this pressure is above atmospheric, as, for example, when testing the apparatus for leaks, but under normal operating conditions the pressure is reduced below that of the atmosphere to a value of the order of $10^{-4}$ mm. Hg.

The subatomspheric pressure level is established and maintained in the chamber by operation of a vacuum pumping mechanism. This includes a manifold 18 communicating with the chamber 17 and extending to any appropriate type of pump, such as a diffusion pump 19. Included in the manifold 18 between the chamber and the diffusion pump is a shutoff valve 21, so that the pump and the chamber may be isolated from each other. A liquid air trap 22 also is disposed in the manifold and is effective because of its low temperature to cause condensation of many of the gas particles, extracted from the tank 12. A reasonable proportion of the gas molecules will liquify at the temperature of liquid air. The amount of pumping required of the diffusion pump 19 is thereby reduced.

Also included in the vacuum system is a mechanical displacement pump 23, acting as a backing pump for the diffusion pump 19 and connected thereto by a conduit 24. A Dry Ice trap 26 is situated in the conduit 24 and is effective to condense from the vapor passing between the diffusion pump 19 and the backing pump 23 gaseous constituents condensable at the temperature of Dry Ice. Those vapors not condensed by the Dry Ice are removed by the backing pump 23 and discharged to the atmosphere through a pipe 27. By appropriate operation of the backing pump 23 and diffusion pump 19, and by keeping the Dry Ice trap 26 and the liquid air trap 22 supplied with their respective cooling agents, the pressure within the chamber 17 is reduced from an atmospheric or superatmospheric value to the subatmospheric perssure or vacuum of the order previously indicated and is maintained at such value. After the desired low pressure has been attained, it can often be maintained without further use of Dry Ice or liquid air, thus effecting an economy.

Situated within the chamber 17 and preferably supported on the wall 16 in a source region 30 is a structure referred to generally as a "source" or "source unit" and generally designated 31. The source unit is comprised of several components, including a vaporizer 32 or furnace. The vaporizer is generally a block of metal or other suitable heat transferring material, effective also as a container. This block is suitably supported on the wall 16 by a stem 33 that also serves as a conduit for the transfer of power in the form of electricity from the exterior of the tank to the interior thereof.

Disposed within the furnace block 32 is a pocket 34, adapted to receive and temporarily retain a charge or predetermined quantity of mixed materials, i. e., a polyisotope, to be treated and separated into its individual isotopic components. In the present instance the pocket 34 is charged with a supply of uranium polyisotope in the form of a compound such as uranium tetrachloride.

Various other or different materials may be placed within the pocket and may be either in elemental or compound form. Further, the charge material or materials may be solid, liquid, or gaseous when introduced into the device. It is convenient to utilize material that normally, that is, at normal or room pressures and temperatures, is a solid, for greatest ease in handling, but that readily can be converted to a vapor or gas by feasible changes in pressure or temperature or both.

In order to vaporize or convert the solid uranium tetrachloride or other charge material into a vapor or gas, its temperature is elevated, and for that purpose the block 32 adjacent the pocket 34 is provided with an electrical coil heater 36, in good thermal relationship with the contents of the pocket 34. Various heating circuits are feasible. Sometimes circulating hot oil is used. It seems most convenient to use electricity and so the coil 36 is supplied with electricity through conductors 37 and 38, respectively, which extend to the terminals 39 and 41 of a suitable source of electricity, represented by a battery 42.

The illustrated circuit, including the heater 36, the conductors 37 and 38 and the battery 42, is largely schematic. The wires 37 and 38 usually extend through the stem 33, made hollow for that reason. In actual practice controlling and regulating mechanisms are also included in the circuit so that the temperature imparted by the heater 36 to the contents of the pocket 34 is carefully regulated.

The pressure due to the uranium tetrachloride vapor generated in the pocket 34 is higher than the pressure maintained in the chamber 17 by operation of the vacuum system. For that reason, the vapor from the pocket 34 tends to discharge or escape from the pocket through a channel 43 cut in the wall of the block 32 and providing communication between the interior of the pocket 34 and the chamber 17. The channel is preferably a relatively narrow cut of considerable vertical length, disposed so that it is in longitudinal alignment with the flux in the magnetic field. There is consequently afforded a vertical band or ribbon or uranium tetrachloride vapor streaming in a generally horizontal direction from the pocket 34 through the channel 43.

The uranium tetrachloride vapor stream is comprised of molecules that are electrically and magnetically neutral. They have only thermal energies and follow paths that are governed solely by the temperature and pressure differences existing within the pocket 34 and chamber 17 and communicating passageway 43. It is desired to impose other paths on such particles and to make them responsive to governing factors other than mere temperature and pressure conditions. The molecules are, in accordance with the invention, converted from electrically and magnetically neutral particles into electrically and magnetically responsive particles. This is effectuated by ionizing the uranium tetrachloride molecules or particles by treating as many of them as possible to remove or to add one or more electrons.

It would be preferable, so far as at present known, to convert all of the uranium tetrachloride neutral molecules into ionized particles, but there is no feasible way at present available for effectuating such a universal ionization and, consequently, only a portion of the streaming molecules is changed to ions. This change is accomplished by providing, above the block 32 and as part of the source mechanism 31, a supplier of electrons in the form of a cathode, generally designated 44, that includes a stem 46 mounted on the tank wall 16 and at its inner end provided with a filament 47. The filament is conveniently a loop or bar of material such as tantalum or tungsten, strong enough to withstand distorting forces due to the magnetic field and effective when heated to emit electrons.

The filament 47 is heated by electricity supplied through a pair of conductors 48 and 49, respectively, extending to terminals 51 and 52 connected to a suitable source of electrical supply, in the present instance indicated by a battery 53. The temperature of the filament 47 is carefully established and it is, in practice, desirable to include in the circuit with the conductors 48 and 49 suitable controlling and regulating mechanism so that the temperature and consequent electron emission of the filament 47 can be carefully regulated.

The electrons from the filament tend to be constrained to generally vertical paths by the magnetic field in which the filament is immersed, but are additionally constrained and made to follow substantially a columnar path parallel to the direction 8 of the magnetic flux and extending vertically through the block 32. This restraint is effected by connecting the block, particularly the lower portion thereof, in an electric circuit so that the block is at a lower electrical potential and forms an anode to the cathode 44. This is accomplished by running a conductor 54 from the lower end of the block 32 to a terminal 56 maintained at a positive potential with respect to the cathode 44 by any suitable electrical means, herein represented as a battery 57. Since in practice it is normally desired to regulate and control the potential drop between the cathode 44 and the anode 32, there is normally included in the circuit effectuated by the wires 49 and 54 a suitable regulating and controlling mechanism, not shown.

The operating consequence of the electrical connections described is to provide a column or pencil of electrons traveling from the filament 47 down through the channel or slot 43 to the bottom of the block 32. In fact, the channel 43, intermediate its ends, is preferably enlarged to provide a generally circular, cylindrical bore 58 as a general envelope for the stream of electrons. This electron stream, under the described conditions, gives rise to what appears to be an arc of columnar form, having its longitudinal axis parallel to the magnetic flux direction indicated by the arrow 8. The arc column axis extends exactly transversely of the direction of efflux of the uranium tetrachloride molecules streaming out of the pocket 34 into the chamber 17. The arc practically fills the escape channel of the molecules.

The velocities and the directions of the arc electrons and of the molecules differing, there result a number of collisions causing the molecules of uranium tetrachloride to be broken up or to be dissociated and some of the molecules and resulting atoms to be deprived of their own electrons or to acquire extra electrons, one or more electrons being either lost or gained by a proportion of the particles. This results, then, in the production and presence in the issuing uranium tetrachloride vapor of a number of singly, doubly and multiply ionized particles, some negative and some positive. These particles, being ionized, are electrically and magnetically responsive, so that their subsequent travels or paths are controllable by electrical and magnetic means.

The path followed by a charged particle when subject to electrical and magnetic influences is dependent upon the mass of the particle and also upon the sign and the amount of its electric charge. Since all positive ions, for example, have the same sign and all singly ionized particles have the same amount of electric charge, the paths of those particles will depend only upon mass differences in such particles. Thus, under generally identical conditions, of the singly ionized uranium positive particles, those having a mass of 238 units will follow a certain or predetermined, particular path, those having a mass of 235 units will follow a different but nevertheless established and predetermined path, while those having a mass of 234 units will follow still another distinct, predetermined path.

Because the singly ionized positive particles are the most immediately important herein, they alone are further considered at this point. That is, the doubly and multiply ionized positive particles, the negative ions, and the molecules that are not ionized at all and remain neutral are not of immediate concern in the process or operation of the apparatus, so far as present knowledge indicates. Negative particles are repelled and confined to the arc chamber for eventual neutralization by the anode, while neutral particles are withdrawn from the chamber 17 solely by the vacuum mechanism and not by electric or magnetic means and positively ionized particles other than singly ionized ions are caused to take side paths to encounter parts of the tank and to be thereon neutralized.

The singly ionized uranium positive ions, all having the same amount and kind of charge, are to be sent on their three respectively different paths in accordance with their three respectively different masses. For this reason, there is provided a means of imparting to the ions something greatly in excess of the normal or thermal or random energy or velocity that they may have when formed in the arc chamber 58. Energy and velocity are imparted to the positive ions by causing them to fall through a substantial electrical potential difference. This is done by providing as a part of the mechanism adjacent the source 31 an accelerating device including a pair of electrically conducting plates 61 and 62, respectively, disposed at some distance away from the block 32 and located substantially symmetrically at either side of the opening of the channel 43.

Since a potential difference is to be maintained between the block 32 and both of the accelerator plates 61 and 62, these plates are connected together by a conductor 63 that extends to a terminal 64. A potential difference of the order of several thousand volts is maintained between the block 32 and the accelerator plates 61 and 62 by maintaining a potential difference of this magnitude between the conductor 54 and the conductor 63. To accomplish this a battery 66, or other suitable means of maintaining a potential drop, is connected between the terminals 56 and 64 so that the accelerator plates 61 and 62 are several thousand volts negative with respect to the source block 32.

The accelerator mechanism, therefore, acts to repel negative ions and to withdraw the positive uranium ions from the arc chamber 43 and to impart to such ions, as uniformly as possible, a predetermined energy and consequent, corresponding velocities, differing pursuant to the isotope mass differences, but all oriented in the general direction extending from the channel 43 to the gap 67 between the accelerator plates 61 and 62. Their random motions being so relatively slight, the particles move almost solely in response to the acceleration due to the electrical potential drop and, therefore, can be considered to have a large rectilinear motion component due to the action of the electrical field.

But the ions are also moving in a magnetic field. It is a characteristic of such duplex fields that they constrain in the affected particles a motion of a circular nature, the radius of the circular path, other conditions being equal, varying only with the mass of the particular particle. For a particle of the heaviest mass; namely, 238 mass units, emerging from the arc chamber 43 and traveling through the gap 67 on a central or median path, there is described, by reason of the influence of the magnetic field, a median, circular path, illustrated by the semi-circular arcuate curve 68 in Figure 2.

Not all of the ions leaving the arc source under the influence of the accelerator plates 61 and 62 follow a median path. Many of them diverge to the right or nearer the center of the circular path and many others diverge to the left, or farther away from the center of the circular path. As shown in Figure 2, the 238 mass unit particles diverging inwardly follow an arcuate path represented by the line 69, while those of 238 mass units diverging outwardly or to the left follow the curved line 71.

Now, while the paths 68, 69 and 71 continue to diverge leaving the accelerator plates 61 and 62 and also continue to diverge throughout the first 90° of their arcuate extent, nevertheless, because of geometrical considerations, these paths converge during the next 90°. Consequently, at a point approximately a half turn or 180° away from the accelerator plates 61 and 62 all of the 238 mass unit ion paths cross within a relatively limited area. In effect, a geometrical focusing is provided adjacent the 180° point, even though there is a relatively wide angular path divergence at the accelerator plates 61 and 62.

The path divergence is confined almost entirely to divergence in a horizontal plane or in directions transverse to the direction 8 of the magnetic field. There is substantially no divergence in the direction of such field, so that the median path 68 and the extreme divergence paths 69 and 71 of particles of 238 mass units are substantially parallel when considered in a vertical direction and afford a curved ribbon or beam uniform as to height, thin at the ends and thick in the middle as to width, and constituting substantially an envelope of the 238 mass unit positive ions, as illustrated in Figures 1 and 2.

Comparable considerations apply to positive particles or ions having a mass of 235 mass units withdrawn from the arc chamber 43 by virtue of the accelerating influence of the potential drop between the block 32 and the accelerating plates 61 and 62. An ion of 235 mass units leaving the accelerating slot 67 on a median path travels throughout a course represented by the line 72 in Figure 2, while the right and left extremely divergent particles of 235 mass units follow paths represented by lines 73 and 74. These paths are of the same nature as those of the particles of 238 mass units, but are not of the same radius. Since the particles are lighter, their path radius is smaller. The paths come approximately to a geometrical focus a half-turn or 180° away from the source, and spaced from the geometrical focus of the heavier particles by a linear distance corresponding to the three mass units difference between 235 and 238. This linear distance varies from device to device, depending upon other dimensions, and varies also with the difference in mass of the separated materials. It is conveniently referred to as three slugs.

The positive ions having a mass of 234 mass units are of a similar behavior, but since under present circumstances it is not necessary nor desirable to separate the 234 mass unit component from the others, and since there is only one mass unit difference between the 234 mass unit component and 235 mass unit component, the 234 mass unit component can either be considered as neglected or as being included with the 235 mass unit component.

The geometrical relationships indicated in Figure 2 show that a relatively narrow angular divergence of the paths 69 and 71 from the median path 68 produces a fairly sharp focus a half-turn away. The greater the angular divergence, the broader is the focus. It is desirable to increase the angle or amount of divergence, since more material is then withdrawn from the source. Increasing the divergence is an appropriate practice until the radial width of the beams 180° from the source approximates three slugs (in the present case). Greater beam width means that the beams in part overlap so that the separated particles remix.

This remixing is in effect contamination on one isotope by another and is just the reverse of the desired result. However, the amount of remixing, especially at the edges of the beams, is not often serious. Since it is desirable to transmit as many ions as possible in the beam, it is often considered good practice to increase the angular divergence beyond the amount at which the beams are separate. Up to a point the amount of material transmitted increases faster with divergence than remixing increases with divergence. Some remixing is often tolerated in order to increase the amount of yield. At the half-turn point, the beams are not always discrete. This has given rise to a rather loose use of the word "beam" in reference to either of the streams of particles considered separately or to the aggregate ion transmission from the source, and sometimes in reference to luminous bands or to a luminous band only.

For each component it is desired separately to collect, in the present instance only the components $U^{238}$ and $U^{235}$, there is provided at an appropriate location near the respective areas of geometrical focusing of the beam of 238 mass unit particles and 235 mass unit particles in a target or collector region 75, a collector or target, generally designated 76. It is constructed generally of metal and is provided with a support 77 mounted on the tank wall 16.

The collector 76 is preferably maintained at the same electrical potential as the accelerating plates 61 and 62 and, in the present instance, at the same electrical potential as the tank 12. The metallic collector is provided with a conductor 78 joined to a conductor 79 secured to the tank 12. A wire 81 is connected to the conductor 79 and to the conductor 63 and thereby establishes and maintains the various connected parts at about the same electrical potential.

The collector 76 preferably includes an enclosure 82 provided with a pair of apertures 83 and 84, respectively, for the receipt of the 238 mass unit beam component and of the 235 mass unit beam component. Within the collector shell 82 there is provided means for receiving the entering ions and, more especially, for retaining them against scattering out. Thus, there is afforded a pocket 86 designed to receive and especially to retain the 238 mass unit particle beam and there is similarly provided a pocket 87 for receiving and retaining the 235 mass unit particle beam, these pockets being respectively aligned with the apertures 83 and 84. Suitable electrical leads, not shown, from each or from both of the pockets 86 and 87 extend either through one or more current indicating or metering devices or directly to the conductor 78. The ions entering the respective pockets in accordance with their difference in mass contact the pocket walls, are supplied there with electrons and consequently become neutralized.

The result is a substantial deposit of neutral particles in each of the pockets, those particles deposited and retained in pocket 86 being for the most part $U^{238}$ and those particles deposited and retained in the pocket 87 being for the most part $U^{235}$. In an ideal or perfect device all of the atoms in each pocket would be of the same mass value, but in actual operating structures it is found that some particles of each mass get into the pocket reserved for the other mass, either initially or by subsequent scattering, and to this extent the material in each pocket is contaminated.

The contamination may be due to various causes, for example to remixing resulting from wide angular divergence at the source, as described, or for example to gas scattering. The geometrical showing in Figure 2 discloses the ion paths as circular arcs, which they are in practice except for disturbing factors. One of the major disturbances is due to the presence of residual air or in general to gas molecules in the pathway of the ions so that the ions collide with the gas molecules and are diverted largely at random or are scattered. A reduction of the number of gas molecules present reduces the scattering of the beam particles and the ideal situation of Figure 2 is more closely approximated. But a great reduction in the number of gas molecules interferes with space charge neutralization, as described hereinabove. Therefore, some gas scattering is tolerated and results in some contamination.

The contamination, preferably, is maintained at a low value, although the tendency is to admit of higher contamination so that larger quantities of material per unit time are collected.

The amount of the contamination and the exact divergence of the various beams to control their focusing into their respective pockets is assisted by a pair of defining vanes 88 and 89 disposed near the accelerator plates 61 and 62 and athwart the beam paths. The vanes are thus in a position to control the maximum radial width of the beams passing therebetween and to provide a geometrical divergence gauge for the beams.

A method of operation in accordance with the invention can be epitomized in connection with the diagrammatic structures of Figures 1 and 2. A charge of uranium tetrachloride (a polyisotopic compound) is placed in the source pocket 34 and the tank 12 is closed. The Dry Ice trap 26 and the liquid air trap 22 are charged, the valve 21 is opened and the backing pump 23 is started. When the tank interior pressure is somewhat reduced, the diffusion pump 19 is started. The pumps are operated so as to maintain the tank pressure in the neighborhood of $10^{-4}$ to $10^{-5}$ mm. Hg throughout the operation of the device.

When the tank pressure is suitable, the magnet poles 6 and 7 are energized to establish a field of about 3000 gauss and the circuit to the filament 47 is closed with a voltage drop across the filament of about 2 volts and a current flow of 200 amperes. The circuit is closed to the anode 32 and the filament 47 so that a potential difference of about 100 volts exists therebetween and an arc is established. Meanwhile the circuit to the heater 36 is closed and about a kilowatt of electricity flows. The uranium tetrachloride sublimes and flows as a vapor through the arc where, among others, singly charged $U^{238}$ and $U^{235}$ positive ions are formed. These are withdrawn as soon as the circuit to the accelerators 61 and 62 is closed to impose a potential drop of some 10 to 20 kilovolts between the source 31 and the accelerator. The withdrawn ions speed in arcuate paths, as shown in Figure 2, with more or less accuracy into their respective pockets 86 and 87 in the collector 76.

After a period of operation as described, the vacuum mechanism is interrupted, the electrical connections are interrupted, the pressure within the chamber 17 is brought up to atmospheric, the source unit 31 is removed for cleaning and recharging, and the collector 76 is removed and treated for dislodgment of the collected $U^{238}$ and $U^{235}$ atoms. After this treatment, these members can be returned to the tank 12 and the operation can be repeated indefinitely.

Such is the exemplary operation. Such is the operation that is preferably performed with the exemplary device.

The device I constructed (Figures 3 to 19) entails the use or incorporation of a magnetic field of relatively great uniformity and steadiness, that is, a so-called "homogeneous" field. It likewise requires a field of such nature also having a relatively large cross-sectional area or extent. This field is provided by a magnetic field frame 106 (Figure 4) comprised of an iron casting mounted upon a suitable supporting base 107 and forming a substantially closed magnetic path. The path is of a generally circular contour enveloping a central space 108 accommodating two projecting pole pieces 109 and 111, respectively. These pole pieces are circular cylinders in contour and are arranged coaxially with their pole faces 112 and 113, respectively, disposed in substantially parallel horizontal planes.

The pole pieces 109 and 111 are provided with coil windings 114 and 116, respectively, suitably included in a power supplying electrical circuit, not shown. The circuit is capable of energizing the magnet to afford between the pole faces 112 and 113 a magnetic field of generally uniform consistency and of a strength of the order of 3000 gauss. Preferably, the orientation of the magnetic field so produced is such that the direction of the resulting magnetic flux is from the pole piece 109 toward the pole piece 111 as indicated by the arrow 117 in Figure 4.

The space intervening between the pole faces 112 and 113, in accordance with my invention, is occupied by a tank 118 (Figures 3 and 4) enclosing a chamber 119. This chamber enclosing tank 118 is generally a circular, cylindrical structure when seen in horizontal cross section and in side elevation is approximately rectangular. It is conveniently fabricated in several pieces, including a non-magnetic cast metal intermediate cylindrical wall 121 having a tongue and groove connection 122 with a generally circular relatively thick bottom plate 123 and a comparable relatively thick metal top plate 124. When considered together the side wall 121 and the top and bottom plates 123 and 124, respectively, enclose and define the vacuum-tight chamber 119. The relatively thick metal plates 123 and 124 are preferably of magnetic material so that their effect is to iron out any minor irregularities in the magnetic field. A quite uniform flux distribution is afforded throughout the entire interior of the vacuum chamber 119.

For convenience in handling and because of the relatively great weight of the tank or chamber assembly and its appurtenances, the chamber wall 121 at appropriate points is preferably provided with a plurality of brackets 126 extending outwardly in pairs from opposite sides of the side wall 121. The brackets are similar in construction and each of them is provided with a flanged supporting wheel 127 designed to operate upon the associated one of a pair of tracks 128 and 129, respectively, suitably arranged on the base 107 so that the vacuum chamber can readily be moved into position between the pole faces 112 and 113 and can as readily be removed therefrom for inspection, overhaul, or servicing.

In accordance with the invention, the interior of the chamber 119 is connected to means for reducing the pressure existing within the chamber and consequently reducing the density of the atmosphere therein so that the distance between air molecules is much greater than it is at atmospheric pressure. For that reason, the wall 121 at a convenient location in its periphery is provided with an aperture 131 approximately of circular contour affording an egress from the chamber 119 leading into a conduit or manifold 132 connected to an evacuating mechanism usually designated 133. The evacuating mechanism preferably includes a suitably constructed diffusion pump 134 of relatively large capacity, which is assisted or backed by a mechanical vacuum pump 136. By operation of the mechanical and diffusion pumps the pressure within the chamber 119 is reduced to a value within the desired range, which generally is approximately from $10^{-4}$ mm. Hg to $10^{-5}$ mm. Hg.

A so-called "source" unit is disposed at a suitable location on and within the tank. For this purpose, at a convenient point in the side wall 121 the tank is provided with a circular aperture 138 piercing a flattened or planar part of the side wall. Adjacent to and coaxial with the aperture 138 is a mounting collar 201 fabricated in the form of a metal annulus peripherally pierced to receive a plurality of studs 202 anchored in the side wall 121 of the vacuum tank. Cooperating with the studs are nuts 203 that can be selectively tightened in order to urge the collar 201 toward the side wall of the tank. The annular collar 201 on its interior face is beveled to receive a thick gasket 204 of conical form adapted to seat against the correspondingly contoured and flared skirt 205 of a tubular insulator 206. When the gasket is removed, the collar can be slipped over the flared skirt. The insulator is preferably fabricated of a ceramic material chosen for its mechanical and dielectric strength and is flattened to seat on a gasket 207 interposed between the insulator and the tank wall. The insulator is swelled or enlarged intermediate its ends to provide a globular central configuration 208 for greater strength.

The opposite end of the insulator is formed to afford a flared skirt 209. Against the skirt 209 rests a conical, thick gasket 211 squeezed in place by an annular clamp collar 212 peripherally pierced to accommodate a plurality of studs 213. Each of the studs is provided with a cooperating adjusting nut 214 and is anchored in a mounting plate 215. A gasket 216 is interposed between the flat outer end of the insulator 206 and the flat meeting face of the mounting plate 215. A central, circular aperture 217 is provided in the mounting plate. By appropriately locating the collars 201 and 212 and by suitably tightening the nuts 203 and 214, the central aperture 217 can be aligned with the corresponding aperture 138 provided in the wall 121 of the tank. The amount of displacement or adjustment provided by these means is not great but is sufficient to take care of any minor discrepancies in the configuration of the insulator 206 and to provide within relatively narrow limits the desired relationship of the apertures while affording an airtight extension of the evacuated volume.

Secured to the plate 215 so as in effect to form a part thereof is a supplementary plate 221 held in assembled position by studs 222. The axis of the supplementary plate 221 is arranged in coincidence with the central axis of the plate 215 so that a central opening 223 in the plate 221 merges with the aperture 217.

The mounting as so far described is entirely rigid, although slightly adjustable with respect to the tank upon initial installation; yet, in order to afford during operation a relatively wide range of manipulation in certain planes or directions, I provide an adjustable support. To that end the supplementary plate 221 is machined to receive a pair of oppositely disposed, axially aligned pivot studs 224 and 226, respectively, preferably oriented with their axes coincident in a substantially vertical direction. These studs are screwed tightly home in the supplementary plate 221 and serve as pivot bearings for a frame 227 including a pair of sagittal arms 228 and 229. Adjacent its respective pivot 224 or 226 each of the arms is flared to afford opposite projections 231 and 232 acting as stops to limit the amount of angular rotation of the frame 227 about the axes of the pins 224 and 226 by contact with the upstanding surface of the plate 215.

At their remote ends the arms 228 and 229 are secured by a plurality of fastenings 233 to ears 234 integrally formed with a collar 236 defining an aperture 237 that may be axially aligned with the openings 223 and 217. The collar 236 is provided with an annular groove 238 guiding ball bearings 239 abutted by a ring gear 241. The ring gear is held in position against axial displacement but with freedom for rotation by radial fingers 242 and 243, respectively, secured at the ends of the arms 228 and 229. The ring gear 241 around its periphery is serrated to afford gear teeth 244 meshing with mating teeth 246 on a spur gear 247 (Figure 6) fast on a stub shaft 248 partially bearing in the collar 236 and partially bearing in a sleeve 251 screwed into a threaded aperture in that plate and projecting from one side thereof. A collar 252 is engaged with the stub shaft 248 by means of a setscrew 253 to preclude axial translation of the stub shaft but to permit rotation thereof with respect to the mounting collar 236.

The stub shaft 248 is enlarged to abut the gear 247 and at its outer end is formed with a noncircular contour, such as a diametral slot 254, for the reception of a suitable rotating tool. An indicating drum 256 is mounted upon the stub shaft 248 for rotation therewith and is displaceable with regard to an indicating pointer 257 suitably secured to the collar 236. With this arrangement, upon rotation of the stub shaft 248 an indication of the angular displacement of the shaft is obtainable at the same time that the ring gear 241 is suitably rotated.

Advantage is taken of the rotation of the gear 241 to produce an axial translation of a mounting sleeve 258 provided with a relatively fine screw thread 259 for the major portion of its exterior to engage a comparable thread on the interior of the gear 241. The threaded sleeve 258 is prevented from rotating and is constrained to axial translation only with respect to the collar 236 by a set pin 261 seated in an extension of the plate 236 and cooperating with a longitudinal groove 262 cut in the sleeve 258. A vacuum-tight relationship between the sleeve 258 and the supplementary plate 221 is maintained by an expandable metallic bellows 263, at one end firmly secured to the sleeve 258 and at the other end firmly secured to the supplementary plate 221. The bellows 263 not only accommodates axial motion of the sleeve 258 but likewise bends laterally to accommodate swinging of the sleeve and the frame 227 about the axes of the pivots 224 and 226.

The swinging movement is preferably under the control of a manipulating shaft 271, at its outer end provided with a noncircular contour, such as a diametral slot 272, so that an appropriate tool, by engagement with the slot, can impart rotation to the shaft. An indicating wheel 273 is clamped upon the shaft 271 and is movable with respect to a pointer 274 to yield an indication of the relative position of the parts. The shaft 271 is formed with threads 276 to engage a comparably threaded bushing 277 anchored in the collar 236 so that, concurrent with its rotation, the shaft 271 is likewise axially translated. At its inner extremity the shaft 271 is provided with a concavity 278, acting as a seat for the rounded end 279 of a rod 281 extending alongside the frame 227 and likewise having a rounded end 282 seated in a suitable depression in the plate 221.

In order at all times to maintain the rod 281 in close abutment with the plate 221 and with the screw shaft 271, spring pressure is exerted thereupon. This is effectuated through the medium of a thimble 284 screwed upon the sleeve 251 and affording a depressed seat 286 for a bearing point 287 at one end of a telescopic structure generally designated 288. The structure 288 includes an outer sleeve 289 supporting the point 287 and likewise encompasses a relatively strong coil spring 290 bearing against the end of the interior recess of the sleeve 289. The spring also bears against one end of a rod 291 slidably disposed within the sleeve 289 and also seated in a suitable depression in the outer face of the supplementary plate 221.

The effect of this mechanism, due to the expanding urge of the spring 290, is to tend to force the sleeve 289 away from the rod 291 and to tend to displace the pivotally mounted frame 227 in a counterclockwise direction, as seen in Figures 3 and 6, thus exerting spring pressure at all times upon the rod 281. In this fashion a rotary movement of the shaft 271 is effective to swing the adjusting frame 227 in either direction, depending upon the direction of rotation of the adjusting shaft 271, and is therefore effective to swing the axis of the sleeve 258 so that it is either aligned with or makes a selective angle with the axes of the apertures 138, 217 and 223.

To maintain the pressure-tight integrity of the interior of the insulator 206, the bellows connector 263 and the sleeve 258, the apertured end of the sleeve is provided with an inturned flange 292 drilled and tapped to receive fastenings 293 removably securing an end closure 294 in place. The end closure is relatively heavy, to serve as an appropriate support for a stem 295 comprising a rod of metal reduced and threaded at its outermost end to engage a suitably threaded recess 296 in the closure plate 294 so that the rod 295 is disposed rigidly with respect to the sleeve 258 and coaxially therewith. The stem 295 is of sufficient extent to pass through the sleeve 258, to pass through the insulator 206, and to pass through the opening 138 in the tank wall.

Near its innermost end the stem 295 is reduced in diameter and continues as a smaller rod 297, the end being enlarged to provide a mounting boss 298. Thermally and electrically insulated from but fastened to the boss 298 is a source block generally designated 299 (Figure 5). The source block is suitably fabricated of nonmagnetic metal and is removably secured to the boss 298 by fastenings 301. Interiorly the source block 299 is contoured to provide a generally circular, cylindrical cavity 302 designed to receive the polyisotopic or other material to be separated. The material is either disposed loosely within the cavity 302 and in immediate heat transferring relationship to the walls thereof, or is contained in a charge bottle, not shown, itself disposed within the cavity 302. In either event, access to the cavity is had by the temporary removal of a cover plate 303. This is preferably a plate of a suitable metal, having a depending boss 304 extending into the cavity 302 to afford a relatively tight seal. After positioning of the charge within the cavity 302 the cover 303 is returned to its seated and sealed position, substantially as shown in Figures 4 and 7.

In accordance with the invention, the material within the cavity 302 is heated in order to change its state into a gaseous form. For that reason there is provided a heat supply to the block 299. Being of metal, the block is a good thermal conductor, and also is of sufficient mass to constitute a good heat distributor, so that the charge within the cavity 302 is heated quite uniformly. To make use of these attributes, the block 299 is contoured to provide a cavity 306 parallel to the cavity 302 and open at both ends to receive and encompass an electric heating coil 307 preferably comprised of a helix 308 of conducting wire wound upon a ceramic core 309. The core is held in position by a cap plate 311 overlying the top of the cavity 306, while the bottom of the core serves as a mounting insulator.

The two ends of the conducting helix 308 are both brought out to the core bottom insulator. One of the ends is connected to a conducting rod 312 joined by a wire 313 to the enlarged boss 298 on the end 297 of the conducting stem 295. The other helix end, adjacent to the core bottom insulator, is fastened to a conducting rod 314 joined by a wire 315 to a conducting electrode 316 projecting from an insulating sheath 317 disposed parallel to the stem 294. The conductor 316 and its sheath 317 are mounted for simultaneous functioning and motion with the stem 295 by an insulating and apertured supporting disk 318 overlying the stem 295 and encompassing the sheath 317. The conductor 316 and sheath 317 extend parallel to the stem 295 through the insulator 208, through the bellows 263, and through the closure plate 294.

A vacuum seal at the point where the sheath 317 pierces the closure 294 is provided by a flange 319 on the closure, against which a rubber or comparable deformable gasket 321 is pressed by a packing gland 322 threadedly engaging the closure plate 294. The conductor 316 is suitably packed within the insulating sheath 317 for vacuum tightness and at the atmospheric end of such sheath emerges and is provided with a suitable connecting screw 323 for the attachment of an electric wire. Thus, electricity supplied to the conductor 316 is led in through the sheath 317 to the interior of the chamber 119, passes through the conducting rod 314, through the heating coil 307, and through a return conductor wire 313 to the conducting stem 295.

The effect of the energization of the helical coil 307 by activation of the electric supply circuit is to heat the charge block 299 and correspondingly to heat the charge contained in the cavity 302. The gas evolved is permitted to leave the cavity 302 through a vertically extending radial slot 326 intersecting the cavity and also extending substantially the full height thereof, thereby affording communication between the interior of the source block 299 and the interior of the chamber 119.

In order to render the gas particles electrically and magnetically responsive, they are ionized by collision with electrons. These electrons are furnished in an arc established in the immediate vicinity of the slot 326. For this reason, an electron source is provided adjacent to the source block 299 and above an aperture 327 in the cover 303 for defining the path of communication between the slot 326 and the space immediately above. The electron source proper is a filament 328 made either as a wire or as a shape cut from a plate of metal, such as tantalum or tungsten. A selected portion of the filament is disposed in a direct line above the aperture 327 and the slot 326.

The filament 328 is mounted with its ends secured in substantially identical clamps 329 and 331, respectively. Each clamp includes an upper plate 332 and a lower plate 333, urged toward each other by fastening screws 334. The extent of the filament is considerably greater than the size of the aperture 327 so that only a restricted part of the electrons emanating from the filament is permitted to pass into the slot 326. The remaining downwardly traveling electrons from the filament are received on the cover plate 303. In a similar fashion, electrons leaving the filament and traveling upwardly are received on a shield plate 336 overlying substantially the entire filament. The shield is preferably formed integrally with one of the top plates 332 and, therefore, is also held in position by the adjacent fastening devices 334.

Electricity for heating the filament and driving electrons therefrom is supplied to the filament by conductors 337 and 338 (Figures 5 and 10), constructed of tubes sufficiently massive as to constitute also mechanical supports and positioning devices for the filament. The conducting tubes are of such large diameter that they also serve well as water conduits for carrying away excessive heat developed in and about the filament and its mounting.

The tubes 337 and 338, although electrically distinct, are similar in mechanical construction. The tube 338, for example, is closed at its end by a conductor plug 339. Spaced from the plugged tube end is the terminus of an interior water supplying tube 341 having a beveled outlet so that water supplied through the inner tube 341 flows from the beveled outlet into the outer tube 338 and returns through the annular space between the inner tube 341 and the outer tube 338. The comparably constructed and operating tubes 337 and 338 both pass through the insulating disk 318, through the aperture 138, through the insulator 206, the bellows 263 and the closure plate 294.

Each of the outer tubes 337 and 338 is provided with one of an identical pair of electrically insulating and vacuum sealing devices 342, so that the water for cooling the filament mounting is led into the interior of the vacuum mechanism from the atmospheric side without leakage. The two exterior tubes 337 and 338, being electrically distinct from each other, serve as the supply and return leads, respectively, for the electric current utilized to heat the filament 328. The filament current tubes are maintained at a different voltage than the source block 299.

The electrons leaving the portion of the filament immediately above the aperture 327 stream downwardly in a generally vertical direction, largely under the influence of the source block voltage and somewhat confined by the influence of the magnetic field which has a parallel but opposite flux direction, and pass into an especially formed arc chamber 346. This is conveniently constructed by drilling into the block 299 on an axis parallel to the axis of the cavity 302 and so that the chamber 346 merges with the slot 326 adjacent to or just short of the exterior of the arc block 299. By this construction there is provided a continuous, intermediately enlarged passage from the chamber 302 on the interior of the block 299 to the chamber 119. Gas molecules leaving the cavity 302 and passing through the slot 326, because of the pressure difference between the cavity 302 and the chamber 119, necessarily also pass in a generally horizontal direction through the arc chamber 346.

Electrons from the filament passing down through the arc chamber ultimately arrive at an anode surface 347 constituted by a portion of the source block 299 immediately below the aperture 327. The electrons from the filament are impelled to traverse the arc chamber by the potential difference existing between the filament 328 and the anode 347. The electrons passing vertically through said chamber collide with a portion of the horizontally moving gas molecules. The effect of the electron stream colliding with the issuing gas molecules is to ionize a large number of the molecules, either singly or multiply, thereby producing ions of the various charge material isotopes.

The ions as produced have energies of the order only of thermal energies. They have generally random directions, for the most part inclusive of a component extending in a direction from the source chamber 302 through the aperture 326 toward the chamber 119 largely in a horizontal plane without material vertical direction. The paths of the molecules prior to ionization are generally rectilinear since the molecules are not affected by magnetic or electrical fields. Immediately upon ionization, however, the ionized molecules are subject to magnetic influence and to electric influence. Because of the magnetic field, as soon as the molecules change to ions they follow curved paths.

In accordance with the invention, I take advantage of the property of electrical responsiveness of the ions to remove the positive ions from the arc chamber 346 as promptly as they are formed and to impart to them a predetermined direction of motion and, in addition, a predetermined energy increment sufficiently large to render any casual motion components of negligible effect.

The described effects are produced by an accelerating mechanism generally designated 351 (Figures 7 and 8), maintained at an electrical potential different from the potential at which the source block 299 is maintained, and preferably at a potential approximately six kilovolts negative with respect to the source block. The accelerating mechanism is mounted on an insulated plate 352, held by fastenings 353 piercing insulating bushings 354 and extending into the bottom plate 123 of the tank. Secured to the insulated plate 352 is an upstanding metallic bracket 356. To its upper end is secured a generally rectangular, metallic accelerator plate 357, held in place by fasteners 358.

A similar rectangular, conducting accelerator plate 359 is mounted approximately coplanar with the plate 357 and is arranged to be moved from a first, closed position in substantial contact with the plate 357 into a second, open position spaced away from the plate 357. The facing or mutually adjacent edges 361 and 362 of the plates 357 and 359, respectively, define an accelerating slot 363, adjustable or variable in width between virtually nothing and the desired value. To accomplish the desired motion, the accelerator plate 359 is secured to a metal bracket 364 fastened to a lever plate 366 of generally horizontal extent. The plate is provided with a bearing tube 367 journaled on a bearing pin 368 screwed into the plate 352 and having an enlarged hexagonal base 369 for reception of a wrench. A cap washer 371 held in place by a cap screw 372 holds the plate 366 and its associated bushing 367 in position for rotation relative to the mounting pin 368.

Upon rotation of the plate 366 the accelerator plate 359 is comparably moved, and although its motion is rotation about the axis of the pin 368 as a center, the angular extent of the motion is sufficiently small so that the displacement of the plate 359 from a coplanar relationship with the accelerator plate 357 is not detrimental. In fact, transverse displacement of but one of the accelerator plates is an advantage, since the ions traveling from the slot 326 to the accelerating mechanism 351 necessarily follow a curved path under the influence of the magnetic field. The direction of displacement of the accelerator plate 359 is radially inward, so that the plate tends to increase the sharpness of curvature with a wider ion beam.

The lever plate 366 is operated by means of an extending arm 373 at its extremity pivotally fastened to a screw rod 374, the connection being effectuated by a pin 376. The screw rod 374 is maintained nonrotatable by the pin connection 376 and is threaded along the other end to engage an internally threaded, rotatable sleeve 377 piercing the wall 121 of the tank. A combined bearing and vacuum seal 378 is effective to permit rotation but prevents translation of the sleeve 377. As it emerges from the vacuum chamber into the atmosphere, the sleeve is formed into a crank shaft 379, terminating in a hand crank 381.

By appropriate rotation of the hand crank 381 in either direction the sleeve 377 is comparably rotated and by its threaded engagement with the rod 374 causes the rod to be projected or retracted. This produces angular motion of the extension arm 373 and rotates the lever plate 366. The rotation produced is usually through only a relatively restricted angle, so that the difference between the arcuate motion of the extension arm 373 and the rectilinear translation of the threaded end of the rod 374 is compensated for by a yielding or resilient bending of the rod 374.

The positive single ions withdrawn from the arc chamber by the operation of the accelerating means all initially travel very approximately the same arcuate channels within the permitted angular divergence from a median or center path. Near the source they are restricted in their transverse or radial channel width by the slot or opening 363 existing between the accelerating plates 357 and 359. It is preferable to operate the structure with the accelerating plates 357 and 359 spaced sufficiently far apart or arranged to provide a slot 363 of such width that the greater portion of the ion stream passes freely between such accelerator plates without impinging thereon. That is to say, only occasional or random ions collide with the accelerator in its preferred position of adjustment. It is, nevertheless, desirable sometimes to limit the radial extent or width of the beam, and in the present instance that end is attained by a mechanism in addition to the accelerating mechanism. The additional mechanism is effective to prevent the passage of accelerated ions in the event they do not occupy any one of numerous permissible paths located within the desired angle of divergence or departure from the median path.

For this purpose there is disposed within the chamber 119, in the general direction of advance of accelerated ions and on the side of the accelerating mechanism away from the ion source, a beam defining mechanism generally designated 386. This mechanism, as especially shown in Figures 3 and 9, incorporates a pair of substantially identical planar plates 387 and 388, respectively, conveniently fabricated of a conducting metal and arranged to be movable relative to the tank 118 and, in addition, to be movable relative to each other. The motion is preferably one of rectilinear translation in a plane radial with respect to the beam median path.

The plate 387 at its lower end is mounted on a pair of axles 389 and 391, respectively. Each axle at one of its extremities is provided with a plain-rim wheel 392 resting upon a flat track 393 fastened to the floor 123 of the tank. At its opposite end, each of the axles 389 and 391 is provided with a grooved wheel 394 running upon a flanged rail 396 parallel to the rail 393 and secured to the floor 123 of the tank. Thus, the plate 387 is constrained to rectilinear translation.

This motion is produced as desired by means of a manipulating rod 397 fastened to the plate 387 by an angle connector 398 curved to lie outside of the upper extremity of the beam. The rod 397 extends radially outward from the chamber 119 through the wall 121 to an operating extension 399 at a convenient external point. There is afforded a vacuum seal 401 and a position clamp screw 402 at the point of passage of the rod through the wall. The plate 387 can therefore be set at any desired position or can be changed in position at any time.

Quite similarly, the plate 388 is provided with a pair of axles 403 and 404, respectively, having at their extremities plain wheels 405 like the wheels 392, and at their opposite extremities flanged wheels 406 comparable to the wheels 394. The plate 388 is rectilinearly translated by manipulation of a rod 407. The inner end of the rod is reduced in diameter so as to be readily joined to a block 408 connected by fastenings 409 to the plate 388. The rod 407 passes through the wall 121 to the exterior of the tank in the same fashion and with the same appurtenances as the rod 397 and is subject to the same manual operation, so that the plate 388 can be clamped in any selected position or can be moved into any other desired location in order that the width of the beam can be limited to any desired value. Any ions striking the beam defining mechanism are neutralized or grounded, since the defining mechanism is a conductor grounded on the tank 118.

Ions passing from the accelerator through the defining means continue their arcuate travel within the chamber and tend to converge approximately 180° from their origin in the arc chamber. Negative ions multiply ionized and some neutral particles deposit in various locations within the chamber 119. These are not of immediate concern. Attention is directed to uranium singly ionized positive particles. It is often desired to collect such ions pertaining to one or more of the isotopes at the 180° point and in relatively small amounts. That is, sometimes a selected stream or beam of one kind of ions is collected primarily as an electric current rather than as a discrete quantity of substance, in order that the operation of the machine may be tested and checked. In this way the adjustment and mechanical and electrical setting of the various parts can be arranged at optimum values. It is also desirable that different portions of the various beams, or of a composite beam, can be individually examined so that the characteristics of the various portions can individually be determined.

For the foregoing and other reasons I provide, in accordance with my invention, a current collector generally designated 410, especially as shown in Figures 12, 14, 16 and 17. This device comprises a circular, cylindrical, metallic shell 411 having in one portion thereof an elongated slot 412 through which ions can pass. Within the cylindrical shell 411, but spaced from the walls thereof, is diametrally disposed a metallic, electrically conducting plate 413. At one end, the plate is held in position by fixed engagement with a metal centralizing disk 414 seated within a flanged annular packing cup 415 of insulating material. The cup is in turn retained by an end plug 416, removably secured in place by a plurality of radial screws 417. There is afforded a passageway 418 through the plug 416 serving as a pump-out for the space between the plug and the disk 414.

The other end of the plate 413 is fixed to a metallic, conducting disk 419 nested within the confines of a flanged, annular packing 420. The parts are urged tightly into position and firm contact with the disk 419 is made by a metallic coil spring 421 axially disposed and seated within a bored-out plug 422 of metal acting as an electric conductor. The spring 421 serves as a means of insuring good electric conduction between the plate 413 and the plug 422. Encompassing the plug 422 is a thimble 423 of insulating material, in turn seated within the confines of a base plug 424 retained in the end of the cylindrical shell 411 by fastening screws 425. An aperture 426 establishes communication between the interior of the chamber 119 and the space between the plug 422 and base plug 424 for pumping-out purposes. The plate 413 is thus maintained in position within the shell 411, being electrically insulated therefrom but being electrically connected to the plug 422. A screw fastening 427 engages the plug 422, extends through an aperture 428 in the base plug 424 so that it is insulated therefrom, and is joined to an electrical conductor 429.

The shell 411 and its contents are supported upon and firmly secured to a mounting tube 430, also serving as a protector for the conductor 429. The tube 430 and the conductor 429 are insulated by an interposed sleeve of insulating material, such as a glass pipe 431. The tube 430 extends from one end of the normal base of the shell 411 and makes a reverse curve to coincide with an axis of symmetry of the shell 411, and then extends in a rectilinear path through a rotatable mounting in the wall 121 of the vacuum chamber.

Figure 12:
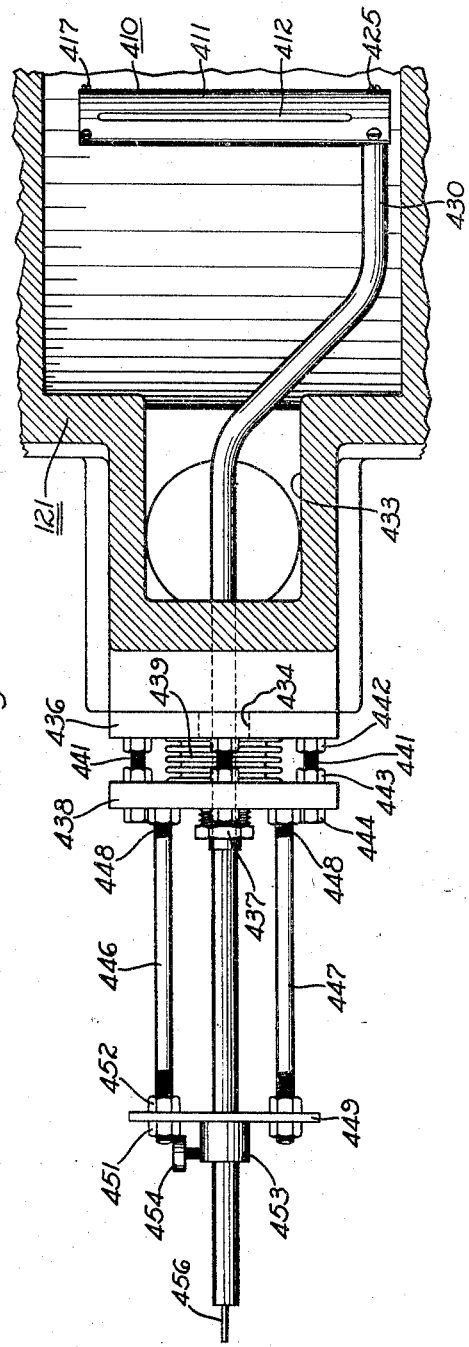
Figure 12 is a detail showing a receiver and surrounding structure, the view being in part a cross section, the plane of which is indicated by the line 12—12 of Figure 3.

With the arrangement of the mounting tube 430 as shown in Figure 12, the slot 412 is normally disposed so as to face and receive the incoming ions. If desired, however, a slot of lesser length may be employed in order to determine the characteristics of a restricted portion of the received beam. This is effectuated by rotating the tube 430 about the axis of symmetry through approximately 180°, thus placing the elongated slot 412 on the downstream side of the shell 411. At the same time, this exposes and positions, for the receipt of ions, a short slot 432 cut through the shell 411 substantially opposite the slot 412. The short slot 432 permits access by ions to the opposite side of the current receiving plate 413. Thus, ions entering the slot 412 or entering the slot 432 contact one side or other other of the plate 413 and merge with neutralizing electrons derived from the electric circuit in which the plate 413 is included.

In accordance with the invention, it is desirable to provide a mounting for the collector 410 so that the collector can not only be rotated through 180° but can also be adjusted up and down, back and forth, and in and out with respect to the tank 118. I, therefore, provide a special mounting as illustrated in Figures 3 and 12. The tube 430 in its coaxial portion passes through an aperture 433 in the wall 121 of the tank and also passes through an aperture 434 in a closure plate 436 secured to the side wall of the tank. The rectilinear stem of the tube 430 passes slidably through a combined mounting bushing and vacuum seal 437 in a plate 438 connected by a bellows 439 to the plate 436 so that a vacuum-tight engagement is afforded.

The plate 438 is maintained in any selected position of orientation with respect to the plate 436 by means of a plurality of adjusting studs 441, interposed between the plates 436 and 438 and provided with jam nuts 442 and 443, respectively. The studs 441 are preferably tightly screwed into and fixed in the plate 436, but pass rather loosely through the plate 438. The plate 438, therefore, can be moved as desired with respect to the plate 436, its adjusted position established by an appropriate positioning of the jam nuts 443, and supplementary jam nuts 444 can then be tightened in order to secure the relationship so established. In this fashion, the axis of the tube 430, and correspondingly the position of the current receiver 410, can be adjusted through various different angles and can consequently be fixed in any desired location within rather wide limits.

To assist in supporting the tube 430 and its appurtenances, there are mounted on the plate 438 pairs of support rods 446 and 447, respectively. Each support rod at its inner end is secured in the plate 438 by fastenings 448 and at its other end is anchored to a mounting plate 449 by means of lock nuts 451 and 452, respectively. The mounting plate 449 extends transversely of the supports 446 and 447 and is provided with a central boss 453 through which the tube 430 passes freely. An adjustable setscrew 454 is threaded into the boss 453 and engages the tube 430 to prevent undue rotation thereof and undesired translation as well.

Passing entirely through the tube 430 is the conductor 429 insulated by the pipe 431. The conductor is well sealed against air leakage and ultimately emerges at the atmospheric end of the tube to provide a connection 456 to an appropriate part of an electric circuit, not shown. This circuit usually includes an indicating device, and sometimes an amplifier as well as an indicator, so that the amount of current flowing through the circuit including the conductor 429 will afford an indication of the quantity of ions being received by the plate 413.

While it is helpful in setting the machine, and is often of interest for technical reasons, to obtain current readings on the collecting mechanism as just described, it is nevertheless the fundamental purpose of the device to achieve separation of sufficient quantities of material so that the material itself is recoverable as a substance and is not merely readable as an electric current.

The collecting device just described is effective to indicate currents, for to do so it is only necessary for it to be momentarily or instantaneously in receipt of a charged particle. The subsequent course of such particle is of no consequence to the current indication. That is to say, if an ion contacts the plate 413 and acquires an electron in the process, a pulsation is afforded in the electrical circuit and a reading may be had. Even so, the now neutralized ion may rebound from the plate 413 or may otherwise be dissipated and not even be discernible nor remain within the shell 411. Current readings at the plate indicate well enough the arrival of ions, but as such are by no means indication of the retention or presence of substantial quantities of deionized, separated material on or near the plate.

It is consequently in accordance with my invention to provide a mechanism that not only receives and effectuates the deionization of the isotopic ions and affords a current reading corresponding thereto, but likewise and more especially is capable, in addition, of receiving the ions, effectuating their deionization and retaining them for future collection in macroscopic quantities. Such a structure is readily interchangeable with the current collecting structure of Figures 12 and 16, and is particularly illustrated in Figures 13, 15, 18 and 19.

In this instance, there is provided a tubular stem 461 in all respects identical with the tube 430, except that it is provided with a pair of electrical conductors 462 and 463, respectively, each being insulated from its surroundings by a suitable insulating sleeve 464. The tube 461 is rotatable within the mounting bushing and the vacuum seal 437 and within the boss 453, and is likewise slidable therein. The inner end of the tube 461 merges with a base plug 466, provided with a central recess 467 connected by a passageway 468 to the interior of the chamber 119, so that there can be a rapid pumping out to subatmospheric pressure. The recess 467 receives an insulating plug 469 having an upper flange 471 centralizing the plug within the base.

The conductors 462 and 463 pass through individual passages 472 and 473 in the insulator 469, and lead to the interior of a circular, cylindrical, metallic sleeve 474. At one of its ends, the sleeve encompasses and is secured to the plug 466 by a plurality of radial fastening screws 476. Disposed against the base plug 466 and against the insulator 469 within the shell 474 is a flanged annular insulating cup 477. Within the cup is nested a conducting disk 478, also serving to centralize within the shell a supporting strap 479 of conducting metal. The conductor 462 is fastened by a connector 481 to the conducting disk 478, and is therefore electrically connected to the conducting and supporting strap 479. Adjacent the remote end of the shell 474, the strap 479 is centrally connected to a locating disk 482 seated within the confines of a cup insulator 483 located within the sleeve 474 and held against axial displacement by removable, radial fastening screws 484.

Between its ends, the supporting strap 479 is offset from its central position and serves as a mounting for a current-receiving plate 486, secured by fastenings 487 and extending around the interior periphery of the sleeve 474 to underlie a restricted aperture 488, of elongated configuration and substantial width, cut in the shell 474. In one rotated position of the supporting stem 461 the single aperture 488 is disposed on the upstream side of the shell in a position to receive a selected part of an oncoming ion beam. The aperture permits the ions to enter the shell and to contact the plate 486 electrically connected by the strap 479 to the conductor 462 so that a current reading can be had with the device in the stated position.

Furthermore, minute, restricted portions of the beam may be so investigated or scanned, since I provide on the exterior of the shell 474 a pair of arcuate masking plates 489 and 491, respectively, located on opposite sides of the opening 488 and pierced by transverse, elongated slots 492 and 493, respectively. Through the slots pass fastening screws 494 engaging the sleeve 474. By loosening the screws 494 and slidably rotating the curved plates 489 and 491 to overlie selected portions of the opening 488, the polar width of such opening may be restricted as desired. Upon tightening the screws 494, there is provided a fixed, restricted opening for beam scanning in any degree of fineness.

There are provided pockets for receiving quantities of material when the stem 461 is rotated through 180° in order to move the opening 488 out of the ion stream, and to position in such stream a pair of receiving apertures 496 and 497, respectively, cut through the wall of the shell 474. The aperture 496 overlies, in the direction of entry of an incoming ion of a predetermined mass, a pocket 498 generally comprising a cup-like, metallic member of generally rectangular configuration, closed on all but one side facing the aperture 496, and preferably closely abutting a conducting plate 499 next to the conducting strap 479.

Similarly, there is provided a second pocket 501 of metallic construction and of comparable generally rectangular configuration, closed on all sides except one facing the opening 497 in the direct path of incoming ions having a different predetermined nuclear mass. The conducting pocket 501 is mechanically mounted by an electric insulating structure including an insulating plate 502 interposed between the pockets 498 and 501 and by a pair of insulating bars 503 and a second pair of insulating bars 504, situated respectively between the plates 502 and 499 and an outer conducting plate 506.

The assembly is held in position by suitable fastenings 507, insulated from the electric portions of the structure and mechanically engaging the strap 479 after passing through the intervening parts. The pocket 501 is electrically intimately connected to the conducting plate 506, in its turn included in an electric circuit by connection to the electric conductor 463, a fastening 509 serving to effectuate the union.

This multi-pocket structure provides a collector having a plurality of electrically conducting, although electrically separate, ion-receiving pockets included in separate electric circuits so that current electrons are available for the neutralization of entering ions, but of such a relatively narrow width and relatively great depth that entering ions are in effect trapped, and are prevented from leaving the collector mechanism. This structure, consequently, is not only a collector in the sense that ions are received, but is in addition a retainer, in the sense that the ions are held or restrained from leaving.

This entire mechanism, after operation for the desired protracted period, is readily removed from the chamber 119, and the contents of the pockets 498 and 501 are removed by suitable means, usually by chemical methods, either separately, if their contents are to be kept separate, or together in the event the materials are to be mixed.

In initiating the operation of the structure, for example with polyisotopic uranium tetrachloride, a quantity thereof is placed in the cavity 302 partially to fill the cavity. The source block is suitably and firmly positioned by manipulation of the various adjustments provided, the entire tank 118 is closed to the atmosphere, and the mechanical pump 136 is placed in operation. This has the effect of withdrawing the atmosphere from the chamber 119 until the pressure therein has been reduced to a low value. Subsequently, the diffusion pump 134 is also placed in operation and is effective to reduce the pressure within the chamber 119 to a still lower value. The evacuation continues until the pressure within the chamber 119, as indicated by the usual type of pressure-indicating mechanism for subatmospheric pressures, is in the neighborhood of $10^{-4}$ to $10^{-5}$ mm. Hg.

When the designated pressure is being or has been attained, the electrical circuit to the heating coil 307 is completed through the conductors 312 and 314 so that heat liberated by the helix 308 is transferred to the material of the block 299. This correspondingly increases the temperature of the walls of the cavity 302 considerably above normal room temperature and to a temperature in the neighborhood of 450° C. At this temperature and at the pressure existing within the chamber, the charge of polyisotopic uranium tetrachloride sublimes, changing its state from the solid, pulverulent or crystalline form into a vapor or gas by the process of sublimation. The vapor pressure of the material is higher than the pressure maintained within the tank, so that the vapor flows from the cavity 302 through the slot 325 toward the interior of the chamber 119.

In the meantime, the electrical circuit to the coil windings 114 and 116 is completed so that the energized coils induce a magnetic field between the pole pieces 109 and 111, thereby producing a uniform magnetic flux through the chamber 119. Also, the electrical circuit to the filament 328 is completed so that electricity flows through the conductors 337 and 338, heating the filament 328 to incandescence and electron emissivity. The filament 328 is, therefore, effective to emit electrons.

A circuit is likewise externally established between the filament 328 and the source block 299. The establishment of this circuit imposes a potential difference between the filament 328 and the source block 299, so that the source block in effect is an anode, and electrons emitted from the filament are impelled to travel through the aperture 327 and through the arc chamber 346 to the anode 347. The potential drop across the filament 328 is conveniently made approximately three volts and the potential drop between the filament 328 and the anode 347 is of the order of 100 volts. There is no potential difference between the anode 347 and the remainder of the source block 299. The potential difference between the surrounding tank 118 and either the source block 299 or the anode 347 is of the order of six kilovolts. The tank is at ground potential and the source, being at a higher potential, is referred to as a "hot" source.

The electron stream emitted from the filament, and coursing downwardly through the arc chamber to the anode under the influence of the voltage difference therebetween, intersects the vapor of the compounded uranium polyisotope streaming through the slot 326 and through the arc chamber 346. Some of the neutral polyisotopic molecules are ionized, principally by collision, and various ions are produced.

These ions are withdrawn from the vicinity of the arc by the operation of the accelerator plates 357 and 359, these being suitably spaced apart by operation of the of crank 381. These are maintained at the potential of the tank wall 118 so that the ions of a positive sign within the arc chamber are subject to an accelerating potential of the order of six kilovolts. This imparts substantially equivalent energies to all of the ions. Those of comparable mass and of the same charge travel from the arc block between the accelerator plates through the accelerator slot 363 in a path that is curved to the right, as seen in Figure 3, for example.

The aggregate of the particles streaming in semicircular paths from the source defines a readily visible beam or beams of a moderately luminous nature and of a bluish color. The beam or beams are transparent, of approximately uniform density, and are normally well-defined at the margin or edges. Occasionally, horizontal striations are visible, extending throughout the entire length of the beam or beams, and appear to be constituted of beam portions of somewhat different densities than the adjacent beam portions. Sometimes these correspond to random deposits of material upon and destroying the regularity of the margins of the arc chamber 346.

The term "beam" is rather loosely utilized to refer not only to the individual beam made up largely of $U^{238}$ particles, for example, but also to refer to the entire stream of particles journeying from the source and comprised not only of $U^{238}$ and $U^{235}$ singly ionized positive particles, but also including gaseous molecules in the vicinity, electrons contained within the beam, negative ions formed within or found within the beam, and other unidentified or miscellaneous particles, and traces or evidences thereof, that occupy the general region of the arcuate paths emanating from the source. Furthermore, the term "beam," often used to refer primarily to the visible, luminous stream of particles, is also applied to effects not directly visible to the unaided eye and sometimes discernible only through electric detection or by other means.

The generally recognized beam is comprised largely of $U^{238}$ and $U^{235}$ particles. It is of a generally electrically neutral character because of space charge neutralization, so that its discrete geometrical form is maintained. The beam travels in an approximate semicircle from the accelerator mechanism and passes between the defining plates 387 and 388 effective to intercept fringing portions of the beam that it is desired to restrain from further travel. The plates 387 and 388 are appropriately set by manipulation of the rods 397 and 407 and are intended primarily to intercept ancillary or stray beam parts and are not principally intended to confine the main beam unduly, nor are they usually intended to produce a defined beam unless such is received from the accelerator mechanism. That is to say, during imperfect or improper operation the regularly defined, sharply delimited main beam emanating from the arc chamber occasionally "blows up," losing all of its sharply defined regular surfaces and filling the entire tank 119 throughout or substantially throughout with a bluish glow. Under these circumstances, the defining plates 387 and 388 are not expected to function to produce a discrete beam.

Also, under some conditions of operation, apparently usually due to an improper pressure within the tank, or due to incomplete space charge neutralization, the beam becomes "hashy." This term, also somwhat loose, is utilized to define a condition wherein the beam is not of a sharply defined nature, wherein the ion-transporting effectiveness of the beam is drastically reduced, and wherein various high-frequency local oscillations of an electrical nature have been observed in portions of the beam. Under these conditions, the defining plates are not expected to produce a sharply bounded stream of ion particles.

Under normal conditions, however, the beam leaving the accelerator and leaving the defining plates is of a discrete, well-determined width radially, being of a divergent nature for the first quarter-turn when considered horizontally. It is substantially of a uniform vertical dimension, it being unnecessary to provide defining plates extending horizontally across the top of the beam and horizontally below the bottom of the beam, since little or no vertical divergence is ordinarily experienced.

Depending largely upon the angular divergence but, as an example, in the region of or beyond the 90° or quarter-turn point, the important components of the beam are more readily discernible as two separate beams, extending approximately for another quarter-turn. One of these, the outermost one, or the one of greater radius, as to uranium content is comprised almost entirely of $U^{238}$ ions, while the innermost beam, of shorter radius, contains very little $U^{238}$ but is comprised almost entirely of $U^{235}$ ions. Since these latter are the ones particularly desired, the collector or receiver, for example, of the kind particularly shown in Figure 18, is arranged so that the aperture 497 is in the path of the oncoming $U^{235}$ ions. With this type of receiver, the aperture 496 is then in line for receipt of $U^{238}$ ions. In adjusting the receiver to this precise position it can initially be located so that but a portion of either one of the beams is received through the aperture 496, and can then be rotated through a half-turn to receive all of the oncoming particles of that kind.

The initial setting of the receiver can also be effectuated by moving the beam or beams slightly by varying the source block to accelerator potential difference, so that the radii of curvature of both the $U^{235}$ beam and the $U^{238}$ beam are varied. It usually is preferable to leave the voltage at a selected value and to manipulate the receiver itself into an appropriate position, this normally being well-enough established by visual observation, since the $U^{238}$ component of the entering beam, in the event the receiver is not properly positioned, impinges upon one side or the other of the aperture boundary and produces a luminous portion.

It is not necessary, either, to make sure that both beams are exactly located with respect to the receiving apertures, since the beams arrive at a fixed distance from each other in proportion to their radii of curvature and in proportion to the difference in mass of the principal ions of which they are constituted. Consequently, if the apertures such as 496 and 497 are appropriately positioned or spaced in the original manufacture of the receiver, for the especial receipt of certain known isotopes, it is thereafter necessary merely to position one of the beams appropriately, whereupon the other beam necessarily falls properly into position.

The receiver is maintained at or very close to the potential of the tank wall 121, although the conductors 462 and 463 are usually connected to meters so that the magnitude of the currents resulting from the receipt of the singly ionized positive ions can be read. These currents are occasioned by the arrival of ions within the pockets 498 and 501, wherein the ions neutralize and are retained. It is the usual experience with a receiver of the type referred to that the ions received and affording a current indication are likewise retained, so that the current readings are a reasonably reliable indication of the receipt and retention of material particles.

Upon continued operation, as described, until the charge within the cavity 302 is substantially or entirely exhausted, an increasing, discrete amount of $U^{235}$ neutral particles is built up in one of the receiver pockets, together with an increasing amount of $U^{238}$ neutral particles in the other receiver pocket. During the entire operation the vacuum is maintained at approximately the value given and the electrical conditions are maintained substantially without change, although some experience has indicated that the current flow and the resulting temperature of the coil 307 should be increased toward the end of a run in order to maintain the desired rate or efflux of uranium particles. Also, some experience has indicated that adjustment is occasionally necessary, both in the temperature of the coil and in the vacuum, if a "hashy" beam develops.

Except for these circumstances, however, the conditions are maintained substantially constant until the charge is exhausted. At that time, the operation of the evacuating mechanism 133 is discontinued, all of the electrical circuits are interrupted, and atmospheric air is permitted access to the interior of the tank 119. Thereafter, the receiver is removed and the deposits within the pockets 498 and 501 are appropriately removed, usually by chemical means. The source block is also removed, is cleaned, inspected, repaired if necessary, and is recharged for a subsequent operation. The filament is at the same time inspected and replaced if necessary. The source parts are returned to the tank and by appropriate manipulation of the various adjustments the source is accurately repositioned in its former location. The receiver, after being cleaned, is restored to the tank and is reconnected electrically for further operation.

At the conclusion of a number of runs, and after the source and receiver have been removed, the entire interior of the tank can be cleaned to remove random and miscellaneous deposits of material traveling through some of the paths differing from the desired particles. In every instance the parts are restored to their original positions and are readied for further operation by manipulation of the sundry adjustments provided, the final adjustments being effectuated at the beginning of or during the continuance of a subsequent collection run.

In this fashion, the mechanism has been repeatedly operated to produce discrete separation of $U^{235}$ material from the polyisotopic uranium tetrachloride originally introduced, and at a single run has produced a quantity of $U^{235}$ of the order of a hundred or so of micrograms.

Since the mechanism just described operated very satisfactorily to produce relatively large quantities of a separated isotope, I then desired to increase the capacity of the apparatus in order to separate even larger amounts of material. The previously described source unit operated at a positive potential with respect to the grounded tank and, correspondingly, with respect to the collector. To enlarge the output, I increased most of the electric values, and as I increased the voltage differential between the positive or so-called "hot" source and the tank I began to encounter trouble with the insulator 208. This and other related phenomena led me to believe that a preferable arrangement for additional power might be to operate the source at substantially the same potential as the grounded tank and to make the accelerator and collector at a potential negative thereto.

In the construction of a device of the present nature, one of the components is some means of establishing the potential or voltage drop between the ion source region and the accelerating mechanism for removing the ions electrically from the source. It is possible either to have the source of ions at an elevated potential with respect to the accelerator, maintained at ground potential or substantially so, or, conversely, to have the ion source itself at or substantially at ground potential and to maintain the accelerating mechanism below ground potential by the requisite amount. The first of these arrangements, namely, with the ion source at a potential positive with respect to ground, is a so-called "hot" source, whereas the arrangement with the source at approximately ground potential and the accelerator at a negative potential with respect thereto is a so-called grounded or "cold" source.

In effect, I considered that for higher powers it might be an advantage to have the potential drop between the source and the collector of a negative character or below ground potential, rather than positive or above ground potential, with the thought that the life of insulators would be improved and that substantially greater potential drops could be accommodated, thereby yielding larger amounts of separated material and a long, trouble-free life of the entire apparatus. The cold source I considered also to have an advantage, in that the volumes or spaces around the ion source are more readily disposed and arranged to avoid unfavorable proximity of positive surfaces and negative surfaces with respect to the direction of the magnetic field, and thus the generation of oscillating electrons is reduced and the deleterious effects thereof are minimized.

It is desirable that all of the charged particles leaving the accelerator pass through a region at the same potential throughout. It is normally not feasible, for safety and mechanical reasons, to maintain the enclosing tank at other than ground potential. Therefore, with the so-called cold source I have provided a liner or insert, disposed within the main tank and having as its primary function the maintenance of an electrically negative, substantially uniform potential with respect to the grounded tank. The liner is not relied upon to resist pressure differences and, in fact, is designed to offer as little hindrance as possible to pressure adjustments within the tank, while maintaining the desired electrical characteristics.

In a fashion similar to the general or diagrammatic showing of the positive potential or hot source previously disposed especially in Figures 1 and 2, there is illustrated in Figures 20 and 21 a schematic arrangement of cooperating parts intended to illustrate in general outline a typical mechanism and its function in accordance with the grounded or cold source arrangement. In this schematic structure there is provided an enclosing vacuum tank or chamber 516 having a top plate 517 and a bottom plate 518 arranged between pole pieces 519 and 521 establishing a magnetic field with a flux direction as indicated by the arrow 522. The plates 517 and 518 are joined by a side plate 523 and removable face plates 524 and 526, respectively carrying a source unit 527 and a collector unit 528.

The source unit 527 is suitably supported by spacers 529 on the face plate and includes a block 531, preferably of metal, contoured to afford an interior charge cavity 532. A mass of charge material 533 is provided within the charge cavity. Customarily this material, as in the preceding general case, is considered to be uranium tetrachloride in powder or granular form but alternatively can be a different uranium compound, such as uranium hexachloride, can be any other polyisotope or material, and can as well be in a gaseous or liquid state as in a solid state.

Since often it is necessary to supply heat to the material 533 in order to afford a working gas, and since the supply of heat is preferably of a readily regulated nature, there is installed in the block 531 an electric heating coil 534 having leads 536 and 537, respectively, extending to a multicell battery 538 or other suitable source of regulable electric supply. When the coil 534 is operated the material 533 is controllably vaporized and flows from the chamber 532 through an orifice 539 into an arc chamber 541 formed in the block 531.

Disposed immediately above the block and arranged just above the arc chamber 541 is an electron emitter in the form of a filament 542, such as a tungsten wire mounted in a cathode frame 543. This frame is secured on the face plate 524 and serves to conduct a pair of leads 544 and 546 from the filament 542 to a battery 547 or other suitable source of controlled electrical energy, so that the filament 542 is electrically heated under careful control to emit a stream of electrons.

This electron stream is directed through the arc chamber 541 to an anode plate 548 located on the block 531 at the bottom of the arc chamber. The anode is connected by a lead 549 to a battery 551, or other suitable source of electricity, at a potential positive with respect to the operating potential of the filament 542. With this arrangement the stream of electrons from the filament 542 crosses through the arc chamber to the anode 548 in a generally vertical direction, largely as guided by the magnetic field flux, and cuts across the path of molecules issuing through the orifice 539 because of the pressure difference between the interior of the chamber 532 and the pressure existing within the interior of the tank 516.

The flow through the orifice 539 and into the arc chamber is, at least in part, a diffusion process, but the precise character of the flow is inconsequential, the important factor being that particles of the polyisotope or other vaporized material are in a position to be bombarded by the electron stream from the filament 542. Because of such bombardment, the particles are given or are deprived of one or more outer electrons and are thereby ionized.

To withdraw ions from the source 527, there is situated within the tank 516 an accelerator 552, preferably comprised of a pair of electrically conducting plates 553 and 554, respectively, connected by a common lead 556 to a battery 557 or electrical source so that the voltage maintained upon the accelerator 552, or so that the potential difference between the accelerator 552 and the arc block 531 is of the order of several kilovolts negative with respect to the source. The accelerator 552, being symmetrically disposed in front of the opening 558 in the arc chamber, is effective upon the positive ions formed therein to withdraw them and impart motion to them directly, in accordance with the acceleration due to the potential difference. Thus, the singly ionized positive particles of $U^{235}$ are made to follow certain arcuate paths within the magnetic field. The divergence of the ions withdrawn is maintained within selected limits and is, preferably, defined by the extreme paths 559 and 561 symmetrical with respect to a central or median path 562. Somewhat comparably, positive ions of $U^{238}$ are accelerated and are, by the magnetic field, compelled to move in arcuate paths, the predetermined extremes being illustrated by the arcs 563 and 564, respectively, in turn symmetrical with regard to a median path 566.

Since the potential of the accelerating mechanism is negative with regard to the potential of the source or of the tank 516 and since the ions following the various paths, for example the path 562 and the path 566, must travel through the tank 516 subject to such negative potential, the extreme paths are encompassed by an arcuate liner 567 extending from a region close to the source unit 527 to a region close to the collector 528. This liner, because of its shape called a "C" liner, is a metallic or other electrically conducting envelope connected by a lead 568 to the collector 528, itself joined by a conductor 569 to the conductor 556, so that the collector and the C liner 567 are established at the same electric potential as the accelerating mechanism 552. The liner 567 is not intended to maintain any pressure difference within the tank 516 and, in fact, is provided with a number of apertures 571 so that the interior of the liner is in free communication mechanically with the interior of the tank 516, although the apertures 571 are so arranged and are only of such extent that the electric field adjacent the paths of the ions is not seriously distorted or disturbed. As a matter of fact, the liner 567 can entirely or in part be fabricated of a screen-like material, the principal requirement being that the mesh or distance between the crossbars be such as to afford the desired electrical conditions and be sufficiently open so that the pumping-out speed of the liner is within reasonable limits.

The singly and positively charged uranium isotopes, particularly $U^{235}$ and $U^{238}$, traveling in the described paths from the source to the receiver 528 substantially entirely at the negative electric potential maintained by the liner 567, are geometrically focused at approximately the 180° point and are received in individual pockets 572 and 573, respectively. They then constitute separate or segregated masses of the individual isotopes originally constituting the polyisotope.

The vacuum mechanism for the tank 516 is virtually the same as previously considered and is connected through a conduit or manifold 574 and a control valve 576 to a diffusion pump 577, preferably through an intervening liquid air trap 578. The diffusion pump in turn is backed by a mechanical vacuum pump 579 connected through a Dry Ice trap 581 so that the effect of the backing and diffusion pumps 579 and 577 and the traps 581 and 578 is continuously to remove molecules from the interior of the tank 516 and to maintain the pressure within the tank at the desired level despite leakage and the continuous efflux of gas from the charge chamber 532.

Figure 22:
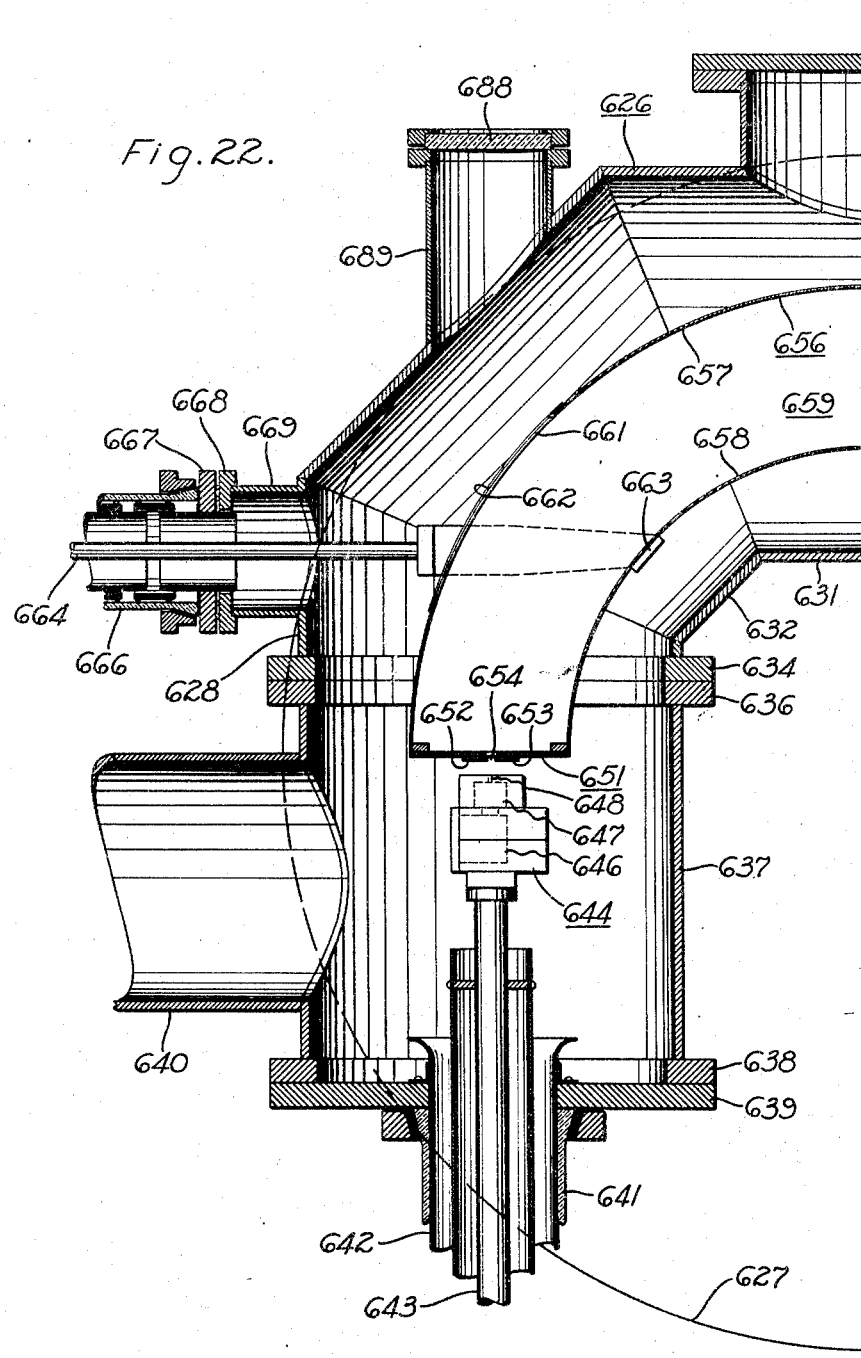
Figure 22 is a cross section on a generally horizontal diametral plane of half of an alternative mechanism comparable to that shown in Figures 3 to 19, inclusive, portions being omitted and other portions being broken away to reduce the size of the figure and to increase the clarity of the disclosure, the center of symmetry of the mechanism being indicated by a dash and dot line.
Figure 23:
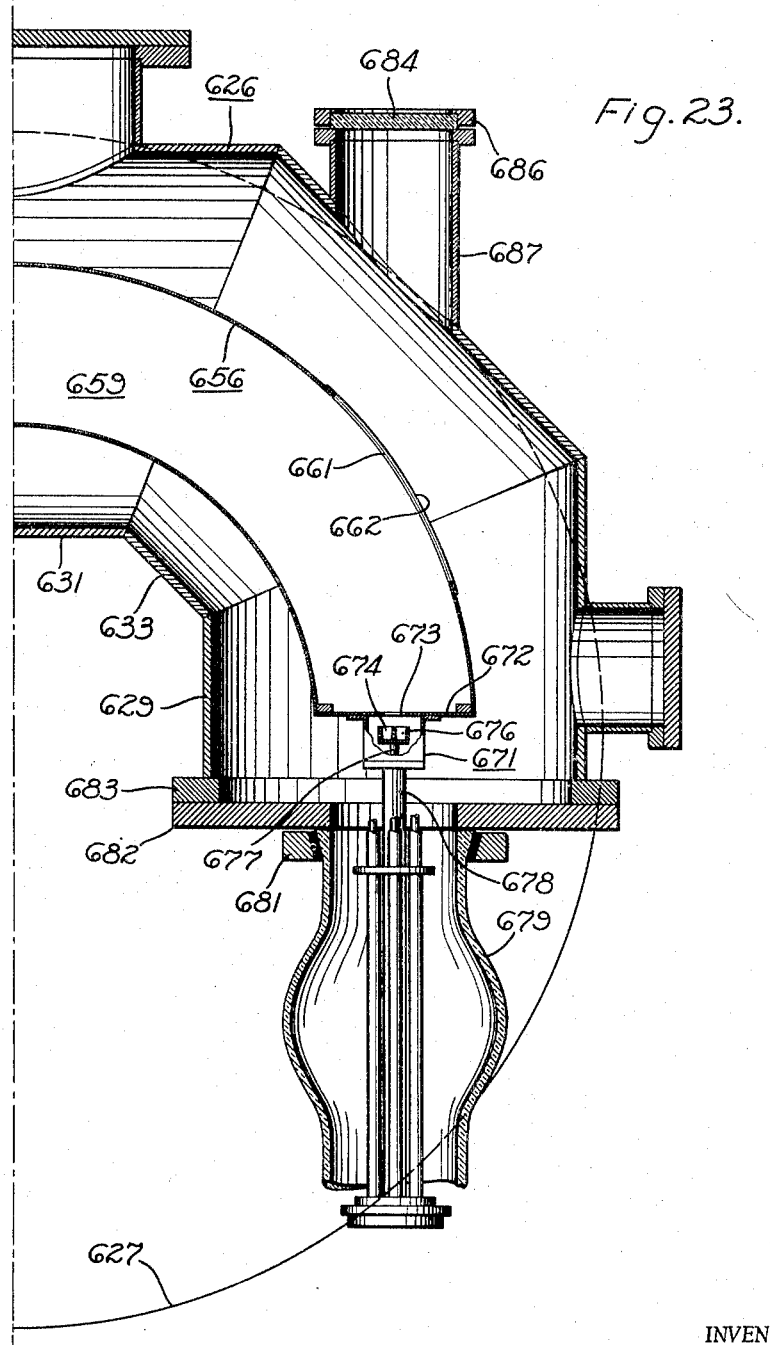
Figure 23 is a companion to Figure 22 illustrating generally on a horizontal diametral plane the other half of the structure disclosed in Figure 22, the plane of symmetry being indicated by a dot and dash line and portions being broken away and being omitted to facilitate illustration.

To determine whether or not the apparent advantages of the cold source according to the previous theoretical summary were real ones and were actually advantageous, I removed the previously described "hot" source structure and replaced it with structure substantially as illustrated in Figures 22 and 23. Many parts of this mechanism are closely related to or are identical with corresponding parts in the structure already described, and hence the illustration of these parts is in some instances not repeated in detail or is omitted entirely where it is adequately clear from the previous illustration and description. General reference is made to the foregoing description and drawings for illustrations and explanations of parts not particularized in connection with Figures 22 and 23.

The grounded source or so-called "cold" source form of the invention, as distinguished from the previously described positive potential or "hot" source form, is embodied by providing a metallic tank, generally designated 626, of an arcuate form symmetrically disposed with respect to a pole face 627 of the magnet so as to be subjected to a uniform or homogeneous magnetic flux. The tank is preferably fabricated of a plurality of end sections 628 and 629, a center section 631, and intermediate sections 632 and 633 of copper tubular pipe, mitered and joined to provide an approximately semi-toroidal container.

One end of the tank, particularly the section 628, is equipped with a fastening flange 634. Secured to the flange 634 by a ring of bolts, not shown, is a comparable flange 636 disposed at one end of a tubular section 637. This section at opposite end is comparably provided with a flange 638 appropriately secured to a face plate 639 effectuating a closure of this part of the tank. A manifold tube 640 intersecting the section 637 affords a large area connection to a vacuum system, not shown, but preferably comprising a large-size diffusion pump backed by a mechanical pump, in order that the pressure within the tank 626 can be reduced to and maintained at a value of approximately $10^{-5}$ mm. Hg.

The plate 639 serves as a mounting for a supporting electrical insulator 641. Since in this form of the device, the source is at ground or tank potential, or nearly so, the insulator 641 serves in this instance merely as a mechanical support and could be replaced by any other suitable support, although the disclosed form of construction is employed for convenience. A metallic sleeve 642 is placed within the insulator to intercept sputtered material. The insulator 641 supports a stem 643 mounting a source unit 644. The source unit is disposed within one end of the tank 626 and preferably within the confines of the section 637. The stem 643 and the source unit 644 are electrically interconnected at the same electric potential as the tank 626 itself, or at a slight difference in potential.

Within the source unit 644 there is provided a chamber 646 for the reception of a mixed material, such as a polyisotope, to be separated, and there is likewise provided an arc chamber 647. An arc is maintained in the arc chamber by an electrode device, not shown, but in all respects comparable in structure and operation to the filamentary electrode structure previously described. The general effect of the arc chamber 647 and of the material chamber 646 is to afford a copious supply of ionized polyisotopic constituents. These leave the source through an aperture or slot 648 affording egress from the arc chamber 647.

In order to induce the ionized particles to leave the arc chamber of the source, I provide an accelerator mechanism 651 inside the tank 626 and spaced a relatively short distance from the source within the section 637. This accelerator mechanism comprises a pair of metallic plates 652 and 653, respectively, spaced apart laterally or transversely to afford an opening 654 therebetween for the passage of ions withdrawn from the source opening 648. The accelerator 651 is maintained at a potential difference from the grounded or "cold" source 644. This potential difference is arranged so that the accelerator is negative with respect to the positive ions.

Since the entire tank 626 in this embodiment of the invention is maintained at zero or ground potential, and since the accelerator 651 is maintained at a potential negative thereto, I preferably incorporate the accelerator 651 with a tank liner 656. This liner is a hollow, metallic member of arcuate contour arranged and disposed substantially centrally within the toroidal tank 626. Preferably, the liner is fabricated of arcuate side plates 657 and 658, respectively, conveniently fabricated of copper, and is completed by top and bottom plates 659 of similar material.

The semiannular volume encompassed by the liner 656 is not physically isolated from the interior of the tank 626 but, on the contrary, it is intended that such volume be in relatively free communication with the interior of the tank, to assist in pumping out the chamber and to maintain the pressure conditions substantially the same throughout the apparatus, and to preclude prolonged outgassing of remote portions of the structure. For this reason, the arcuate walls 657 and 658 are at appropriate intervals interrupted by cut-out openings or windows 661, for example. To preclude an interruption of the electric conditions by the removal of too large a portion of the side wall, the windows 661 are preferably in part covered by a plurality of metallic bars 662, such as wires, so that adequate space is left for pumping out, yet no material disturbance of the electric conditions is caused.

The liner 656, being at the same potential electrically as the accelerator 651, is necessarily maintained in physical position within the grounded tank 626 by some means electrically isolated from the tank 626. For that reason, the portion of the liner 656 adjacent the source 644 is connected to a supporting arm 663 disposed at one end of a supporting stem 664 joined at its remote end to an insulator 666. This is fastened, in a manner comparable to that previously described, to a supporting disk 667 removably bolted to a flange 668 united to a tube 669 intersecting and secured to the tank section 628. In this fashion, mechanical support of one end of the tank liner 656 is afforded, yet the liner is maintained electrically separate from the enclosing tank 626.

With this portion of the apparatus, as so far described, ions leaving the source under the influence of the potential drop of the accelerator 651 have substantially augmented energy and enter the interior of the liner 656 to travel therethrough in arcuate paths. Because of the effect of the magnetic field the positive, single ion paths are approximately circular arcs, differing slightly in location and slightly in radius, in accordance with the respective nuclear mass of the individual isotopes or materials of the polyisotopic or mixed charge. Many of the ions within the liner travel without substantial energy change throughout an approximate half-circle.

The latter part of the ion travel takes place within the terminal portion of the liner 656 extending through the tank sections 629 and 633, respectively. The liner 656 is in this portion supported on a collector unit, generally designated 671, joined thereto by a metallic plate 672. A central opening 673 in the plate permits the passage of the separated ions into the appropriate ones of a plurality of collector pockets 674 and 676, respectively, mounted on a stem 677 supported in a tube 678 extending through and mechanically mounted on an electric insulator 679. The insulator is connected by a vacuum maintaining and supporting clamp 681 to a face plate 682 removably secured to a flange 683 joined to the section 629 of the tank 626.

This arrangement, although electrically isolating the liner 656 and the collector 671 from the tank 626, is nevertheless effective as the mechanical support of the end of the liner and of the collector on the adjacent portion of the tank. By this means, the general potential of the collector 671 and of the liner 656 is maintained negative with respect to the potential of the source end of the tank 626, although the collector pockets 674 and 676 are preferably electrically insulated so that the currents developed in them by the received and neutralized ions can be separately read.

The operation of the collector 671, its general orientation with respect to the opening 673, the pattern made upon the collector by the beams, and the general operation of this portion of the structure can be observed by inspection through a view window 684 clamped in vacuum-tight relation by a flange and ring structure 686 disposed in an extension tube 687 merging with and secured to the tank section 633, substantially in line not only with the collector 671 but also with one of the windows 661. Similarly, an inspection window 688 is mounted in an extension 689 on the section 632, so that a view of the source 644 can be had through the aligned liner window 661.

The cold source mechanism is conditioned to operate by charging the charge chamber 646 with a suitable supply of mixed material; for example, uranium polyisotope. The face plate 639 is tightened in position and all of the openings are appropriately closed. The vacuum mechanism is activated to reduce the pressure within the tank 626 to approximately $10^{-4}$ mm. Hg. pressure. Upon attainment of a pressure approximately of this amount, the electrical circuits are energized so that while the source 644 and the tank 626 remain at ground potential, the accelerator 651, the liner 656 and the collector 671 are all negative with respect to the source at a voltage in the neighborhood of several kilovolts below ground potential.

Upon the attainment of these conditions, the charge in the source unit 644 is heated, as previously described, and ions are appropriately formed. These pass from the source unit through the opening 654 between the accelerator plates 652 and 653, travel in curved paths within the arcuate C liner 656, and finally pass through the opening 673 into the appropriate one of the pair of pockets 674 and 676 in the collector 671. The field through which the ions pass in their arcuate paths is well maintained by the C liner 656, so that the operation of the structure is for the most part at a negative potential. Furthermore, the C liner, although eminently effective to establish and maintain the desired electrical conditions, does not hinder the establishment and maintenance of the desired pressure conditions, in that the windows 661 facilitate continued pumping.

At the conclusion of a run, that is, when the initial charge of material in the source unit 644 has been exhausted, the electrical circuits are interrupted, the vacuum pumps likewise are interrupted, atmospheric air is admitted to the tank 626, the face plate 639 is removed to withdraw the source unit 644 for cleaning, possible repair and recharging, and the face plate 682 is removed. The collector 671 is detached and, preferably, is chemically washed or otherwise treated to recover the segregated and separated materials deposited therein.

With the cold or grounded source made and operated as described, that is, with the arrangement of the collector at a potential negative as related to the source and as related to the enclosing tank, and with the use of a tank liner so that the accelerator and collector potential is maintained in the vicinity of and surrounding the arcuate beam or beams passing from the source to the collector, I found that substantially increased quantities of material could be processed without difficulties ascribable to the effects of oscillation of electrons within the main tank, especially in the source region.

Furthermore, it was found that the liner 656 serves as a mechanical barrier to the further progress of sundry ion beams emanating from the source and of materials other than those which it was desired to collect in the pockets 674 and 676. Such ions contacting the liner become neutralized and deposit thereon. They are thus kept from the vacuum pumping apparatus and so assist in maintaining the desired vacuum conditions within the main tank without overloading the pumping arrangements.

Upon the conclusion of a run and the demounting of the face plate 682 and its associated collector unit 671 and upon the removal of the support 663 from connection with the liner 656, the liner can be rotated from its position within the tank 626 into an exterior position for complete removal. The liner itself can then be washed and restored to original condition for subsequent reinstallation in the tank 626 and for further use.

This mechanism has proved it possible very substantially to increase the quantity of material treated and separated without experiencing substantial difficulties due to electric insulation failures and without other difficulties due to the presence of large amounts of electron oscillation.

The yield of separated or enriched polyisotopic constituent was sufficiently great with the "cold" source mechanism just previously described that a larger structure of the same type appeared feasible. Further, the difficulties anticipated with a source unit maintained at a high positive potential with respect to the enclosing tank were well avoided by the structure just described. I therefore determined to construct a much larger cold source mechanism, with the hope that the yield of separated material would be very substantially increased.

A greatly enlarged mechanism would necessarily entail the provision or utilization of an extremely large magnetic field. By a fortuitous circumstance there was available to me the magnetic structure of the 184-inch or so-called "giant" cyclotron. This is described in "The new frontiers in the atom" from the Smithsonian Report for 1941, pages 163 to 173, Publication 3654, U. S. Government Printing Office, Washington, 1942.

The giant cyclotron magnet structure is representatively and somewhat diagrammatically shown in Figure 24. In broad outline, this incorporates an upper pole piece 701 having a generally horizontal, planar, circular pole face 702, parallel to and spaced from a lower pole face 703 constituted by the terminus of a lower pole piece 704. The lower pole face 703 is substantially the same in area and in configuration as the upper pole face 702, both of the pole faces being almost exactly 184 inches in diameter and being disposed about 72 inches apart. Magnetic flux between the pole faces is maintained by appropriately energized electric coil windings 706 and 707 girdling the poles and arranged within an encompassing magnetic frame 708.

Figure 25:
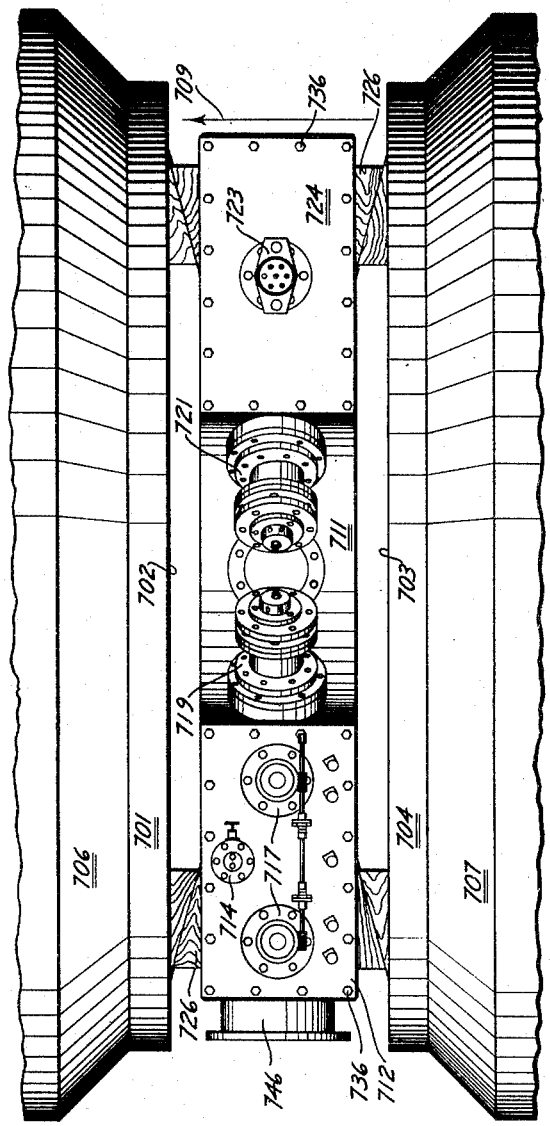
Figure 25 is a view comparable to Figure 24 but showing to an enlarged scale a front elevation of the central portion of the second alternative form of structure in accordance with the invention, portions of the mechanism being omitted or conventionalized to increase the clarity of the disclosure.

The effect of the operation of the magnet is to afford between the pole pieces a substantially homogeneous or regular, non-varying magnetic field. The field direction, that is, the flux direction of the field, is perpendicularly from the lower pole 704 toward the upper pole 701, as represented by the arrow 709 in Figure 25. While the field is somewhat distorted adjacent the marginal edges of the pole pieces, there remains a relatively extensive encompassed region of substantially non-varying, approximately uniform magnetic field.

Situated between the pole faces 702 and 703 and located almost entirely within the homogeneous magnetic field, is a mixed material or polyisotope separating mechanism. In brief summary, this mechanism includes a hollow, C-shaped tank 711, within which a vacuum can be maintained. One end of the tank is closed by a removable face plate 712 serving as a mount for a source mechanism, generally designated 713, effective to receive the materials to be separated and to dispatch them through the tank 711. A cathode structure 714 is mounted on the face plate just above the other source mechanism.

Next to the source there is disposed a transition section 716 comprised of an open-ended enclosure, preferably fabricated of a suitable electrical and thermal conducting material, such as copper, and preferably formed so as to be arcuate in plan and approximately rectangular in cross section. The transition section 716 is supported near an accelerator mechanism 717, mounted upon but insulated from the face plate 712. The transition section fits readily within one end of an arcuate liner 718, termed from its shape in plan a "C" liner. This is preferably constructed of suitable thermal and electrical conducting metal, such as copper. The C liner is held in position by radial supporting arms 719 and 721, connected to but insulated from the tank 711.

Adjacent the far end of the liner 718 and mounted thereon, there is disposed a metal housing 722, of circular cross section. This encloses a receiver unit, generally designated 723, mounted on but insulated from a face plate 724 removably secured to the other end of the tank 711. The receiver or collector is effective to retain separated material passed through the tank.

Electrical conditions are maintained with the source unit 713 at approximately the same voltage as the tank 711. The accelerator 717, the liner 718 and the receiver 723 are all maintained at the same or approximately the same negative potential, several kilovolts below the potential of the tank 711. When these electrical values are maintained and when suitable values of subatmospheric tank pressure and magnetic field intensity are afforded, this structure is effective to separate gross quantities of previously mixed materials or polyisotopes.

While the foregoing brief outline serves as a general identification of the mechanism, a more detailed disclosure follows, to help in understanding its precise construction and mode of operation. Reverting then to the arrangement of the tank 711, it is preferred to mount it removably in position between the pole pieces 701 and 704 by some such means as adjustable wooden wedges 726. The tank itself is preferably fabricated of magnetic material, usually a metal such as iron, and includes a top plate 727 and a bottom plate 728.

These plates are substantially identical and are relatively thick, not only for reasons of mechanical strength and to resist the inward force of the atmosphere due to the relatively low interior pressure, but also to produce an ironing-out or smoothing of any minor discrepancies in the regularity of the magnetic flux. Each of these plates is approximately semiannular in plan, being bounded by a pair of concentric, circular arcs, the inner one extending for an angle of approximately 245°, while the outer one extends for approximately 180° and then merges with tangential portions. Thus the terminals of the tank are flared or are of greater transverse or radial width than the central portion thereof. The top and bottom plates 727 and 728 are held in position and the enclosure of the tank is partially accomplished by an interior metallic side wall 729 and an exterior metallic side wall 731. Neither of these is made much thicker than is considered necessary to resist the inward pressure, and is preferably welded or otherwise fastened in airtight fashion to the top and bottom plates to afford a chamber approximately hemitoroidal, yet rectangular cross section in any polar plane.

The walls of the tank merge with a flange 732 adjacent one terminal of the tank and with a flange 733 adjacent the other terminal of the tank. These flanges are secured by any suitable means, such as welding, to the remaining portions of the tank in order to afford a vacuum-tight connection therewith. They are each provided with a plurality of fastening studs 734 for the guidance and positioning of the source face plate 712, overlying the flange 732, and the receiver face plate 724, overlying the flange 733. These plates are held in position by nuts 736 or other releasable fastenings, so that the fact plates 712 and 724 may be readily removed from or readily restored to position in vacuum-tight relationship with the tank.

The tank walls 729 and 731 are pierced by apertures 737 affording communication with extensions 738 of similar nature but different shapes. Each extension is provided with a flanged terminal 739 for the reception of a blanking-off plate 741 or an observation window 742, held in place by a ring 743 and fastenings 744. For each aperture there can be supplied an alternatively usable set of a blanking-off plate and a window. The interior of the tank can be observed from several vantage points and in several directions, or in the alternative, if observation is unnecessary, the provisions for windows can be sealed for vacuum tightness by use of the blanking-off plates. The extensions 738 are preferably symmetrically arranged on the inner and outer side walls of the tank for the observation of structure disposed adjacent or events occurring in their general vicinity. In this fashion, the events transpiring at various localities throughout the tank can readily be observed visually, or by the use of light-responsive or radiation-responsive instruments.

With the face plates 712 and 724, and the plates 741 or windows 742 in position, the tank 711 is a vacuum-tight vessel or constitutes an air-tight chamber and, in accordance with my invention, I provide means for reducing the pressure within the tank to any desired value within relatively wide limits. Preferably, the vacuum maintained within the tank 711 is of the order of $10^{-4}$ mm. Hg, but may range to a pressure as high or higher than $10^{-3}$ mm. Hg, or as low or lower than $10^{-5}$ mm. Hg. Upon occasion I have even operated at pressures considerably lower than $10^{-5}$ mm. Hg with apparently consistent success and, while I may ultimately decide that these lower pressures are more favorable, still, at the present time I believe that a pressure in the neighborhood of $10^{-4}$ mm. Hg is most satisfactory, under present operating conditions.

In order to maintain vacua of the orders of magnitude mentioned, the tank 711 is provided with a vacuum connection or manifold 746 in the outer side wall 731 and disposed adjacent the source face plate 712. The manifold is preferably a metal tube, connected by welding to form part of the tank 711. The manifold 746 is contoured to provide a flange formation 747 for junction with a vacuum pumping system 748, of the nature shown diagrammatically in Figure 24, and including a diffusion pump 749 and an associated mechanical backing pump 750. The effect of the pumps and appurtenances is to afford a steady, regulated, subatmospheric pressure within the tank 711.

Pursuant to my invention, I dispose within the tank 711 a source unit (Figures 28–33, for instance), generally designated 751, located adjacent the face plate 712 and conveniently mounted thereon for installation and removal as a body with the positioning and withdrawal of the face plate itself. By this means a single tank 711 serves readily over a protracted period, yet numerous different source units can be installed, operated and removed, and various different types of source unit can be operated in the same tank.

It is desired that the source unit include a structure for furnishing ions of the materials or polyisotope to be separated, and that this structure be disposed rather exactly in a particular location and position; that is to say, in a predetermined orientation with regard to the remaining parts of the device. Consequently, I arrange matters so that substantially universal motion of a portion of the source mechanism is readily obtainable. For the foregoing reasons, at an appropriate point near the transverse center and adjacent the upper edge of the face plate 712, I provide a mounting bushing 752, anchored in the face plate 712 and projecting inwardly therefrom, that is, into the chamber 711, to afford a mounting bearing 753 located at a sufficient distance from the interior face of the plate 712 to leave room for an annular thrust flange 754 formed on the bushing 752.

Maintained in appropriate axial and radial position by the bearings 753 and 754 is a pendant plate 756, constrained against all motion except a limited rotation or arcuate oscillation about the center of the bushing 752. This center is coincident with an axis 757 extending horizontally; that is, perpendicularly to the surface of the vertical face plate 712. The restraint upon the pendant plate 756 and the regulation of its arcuate motion is effectuated by a train of mechanism (Figure 33) including a block 758, removably fastened to the pendant plate 756 and provided with a circular, cylindrical bore 759 perpendicular to the axis 757. Within this bore there is slidably disposed a pin 761 extending from the lower end of the bore and formed with an enlargement 762 thereupon. Piercing the enlargement 762 is a longitudinal, circular, cylindrical bore 763. The bore axis is parallel to the axis 757 and receives an operating pin 764 rotatable within the enlargement 762.

The pin 764 is transversely pierced and threaded to engage an operating screw 766, having its axis of rotation extending in a plane perpendicular to the axis 757 and being journaled in bearings 767 and 768, respectively, upstanding from a bracket 769 connected to the face plate 712 by fasteners 771. Axial motion of the screw 766 is restrained by the bearings 767 and 768 due to abutment therewith by a thrust collar 772 connected by a pin 773 to one end of the screw shaft 766, and by the boss 774 of a worm wheel 776 secured to the screw shaft 766 by a pin 777. With this mechanism, the screw shaft 766 is freely rotatable, but is restrained against any axial translation.

To rotate the screw shaft 766 in either direction, as desired, the worm wheel 776 is enmeshed with a worm 778 (Figure 29) disposed with its rotational axis parallel to the axis 757 and provided with an integral boss 779 fastened by a through-pin 781 to an operating shaft 782. Within the tank the operating shaft 782 is journaled in bearings 783 and 784 laterally outstanding from the bracket 769 and, therefore, is held for appropriate rotation with respect to the face plate 712 and against translation with respect thereto, since the length of the worm 778 and of its integral boss 779 is just sufficient to afford axial running clearance between the bearings 783 and 784.

It is necessary for the shaft 782 to extend from within the vacuum chamber 711 to the external atmosphere for convenient operation. This entails the provision of some means for maintaining the vacuum-tight integrity of the tank, yet for permitting the mechanical passage of a rotating operating shaft. For that reason, I provide through the plate 712 an aperture 786. Within this aperture is seated a plug 787 enlarged to be received also in a counterbore 788 in the plate 712. The plug 787 is adjustably and removably held in place by any suitable means, such as studs and nuts, not shown. When the plug is forced home it compresses a sealing gasket 789 to provide a leakproof connection. The interior of the plug 787 is bored out to provide a chamber 790. Within the bored chamber is disposed one or more flexible, resilient, generally conical washers 791, conveniently fabricated of rubber or the like, and held in position by a closure ring 792.

The influence of the atmospheric pressure tending to leak along the shaft 782 is to force the packing washers 791 against the shaft and to preclude the further passage of leakage air. At the same time, the pressure of the conical washer 791 against the shaft 782 is not sufficient to impose any substantial frictional load. Consequently, the mechanism is effective to preclude all but inconsequential leakage, yet it permits ready rotation of the operating shaft.

The plug 787 is extended to provide a mounting flange 793. To the flange is fastened a counter 794 (Figure 33) of any standard type capable of indicating or registering the number of times it has been actuated. In the present instance, the rotations of the shaft 782 are indicated by means of a radially projecting finger 796 extending from a boss 797 fastened to the shaft 782 by a pin 798, the boss also being extended and noncircularly contoured to form a rotating knob 799.

Upon rotation of the shaft by manipulation of the knob 799, the radial finger 796 once each revolution actuates a star wheel 800 disposed in the path of rotation of the finger 796 and forming a part of the counter 794. With this mechanism each rotation of the shaft 782 is registered, so that the total angular motion of the shaft due to twisting of the knob 799 is readily readable.

The rotation of the shaft 782 is imparted to the worm 778. This in turn rotates the worm wheel 776 and the screw shaft 766. The effect of rotation of the shaft 766 is to produce a bodily translation of the pin 764 and with it an accompanying motion of the enlargement 762.

At its lower end the enlargement follows a generally rectilinear path, but because of the constraint upon the pin 761 imposed by the block 758 on the pendant plate 756, the pin 761 not only swings about the axis 757 as a center, but likewise translates axially to a small extent with regard to the pendant plate 756. Thus, the translational movement of the pin 764 due to rotation of the knob 799 is effective to swing the pendant plate 756 about the axis 757 as a center. By carefully observing the reading of the counter 794 and by carefully manipulating the knob 799, the plate 756 can be given any angular position about the axis 757 as a center that the operator desires.

Furthermore, because of the several high-ratio worm and screw translation mechanisms, a very accurate positioning of the pendant plate 756 can readily be obtained without undue care by the operator. In addition, the provision of the several worm and screw mechanisms makes it possible very readily for the operator to change the position of the pendant plate 756, but since the screw threads and worms are of the nonoverhauling type, distributing forces that might otherwise tend to dislodge the plate 756 from its selected angular position are adequately resisted. In this way, an easily and accurately set or adjusted position of the plate is readily maintained despite the imposition of sundry dislodging forces.

The motion or swinging movement of the plate 756 about the axis 757 is imparted to a pair of support arms 801 and 802, respectively. Both arms are fastened to the sides of the pendant plate 756 by removable screws 803 and extend away from the face plate 712 to terminate well within the tank 711. Journalled in the extremities of the arms 801 and 802 is a pair of trunnion screws 804 and 806, respectively, facing each other on a common transverse axis 807 contained in a plane perpendicular to the axis 757. The screws 804 and 806 are not only rotatable within the arms 801 and 802, to provide support bearings 809 and 811, respectively, but also project toward each other to be threaded into a source block mechanism, generally designated 812. Because of the support by the pendant plate 756 and by the mounting pins 809 and 811, the source block is not only orientable about the axis 757, but is likewise freely swingable about the axis 807.

The source block mechanism 812 (Figures 28—33) includes a vertically extending, transverse, metal plate 813, moving or swinging about the axis 807 of the pivot screws 804 and 806, and carrying the remainder of the source block with it in its motion about such axis. This to and fro rocking motion of the source block is effectuated by a mechanism secured to the swinging plate 813 at the lowermost end thereof and symmetrically disposed on the center line. To a boss 814 at the bottom portion of the plate 813 there is fastened a horizontally extending, somewhat flexible, metal rod 816, held in position by solder or other suitable fastening means so that it moves flexibly in unison with the plate.

The rod 816 at its opposite end is provided with threads 817 and a jam nut 818 adjustably securing the rod in position in a threaded recess 819 formed in the end of a nonrotatable shaft 822. The shaft is restrained against rotation by a radial arm 823 fastened to the shaft by a through-pin 824. The arm 823 at its outermost end is formed with a slot 826 making a freely sliding connection with a stud 827 extending from a cover plate 828. This plate serves as a closure for a gear box having a base 829, secured to and projecting inwardly from the face plate 712. With this arrangement, and since the arm 823 is freely slidable along the stud 827, the shaft 822 is similarly axially slidable but is prevented from turning.

The described motion of the shaft 822, that is to say, nonrotational translation, is provided by a threaded extension 831 on the shaft in engagement with a threaded ferrule 832 journaled not only in the cover plate 828, but likewise in the base 829 of the gear box. The ferrule 832 is enlarged adjacent the cover plate 828 by an integrally formed boss 833 abutting the cover plate to preclude axial motion of the ferrule in that direction.

To provide a suitable gear reduction, the boss 833 and the ferrule 832 serve as locators and mounts for a large gear 834 spaced from the gear box base by a washer 836. The gear 834 turns with the ferrule 832 and meshes with a pinion gear 837 on a common hub 838 freely rotatable on a stub shaft 839 fastened between the gear box base 829 and the cover plate 828. A gear wheel 840 is formed integrally with the pinion gear 837 and the common hub 838. Meshing with the gear 840 is a pinion 841 on a shaft 842, not only journaled in the cover 828 and base 829 of the gear box, but also passing through the face plate 712 to the exterior of the vacuum chamber 711. A manipulating knob 843 is provided on the end of the shaft 842.

A vacuum seal 844, of the type previously described in connection with the shaft 782, permits rotation of the shaft 842 without substantial air leakage from the atmosphere to the interior of the tank 711. The seal structure is provided with a flange 846 serving as a mounting for a counter mechanism, not shown, but similar to the rotation counter previously described.

With the described mechanism, rotation by hand of the knob 843 rotates the shaft 842 and turns the pinion 841. This produces a lesser rotation of the hub 838, due to the intermeshing of the small pinion with the larger gear 840, and correspondingly rotates the pinion gear 837. The small pinion 837 meshing with the larger gear 834 rotates the gear 834 at a lesser rate and simultaneously revolves the ferrule 832. The screw threaded engagement between the rotatable ferrule 832 and the translatable extension 831 causes the desired axial motion of the ferrule and, correspondingly, of the rod 816.

The nonoverhauling character of the screw threaded engagement prevents any return motion of the gearing, despite the imposition of considerable stress, and, together with the gear reduction, facilitates the ready manual adjustment of the mechanism, in effect providing a one-way drive locked against reverse dislodgment. Motion of the rod 816 in an approximately rectilinear path oscillates or rocks the plate 813 about the axis 807. There is a slight bending of the rod 816 to compensate for the difference between the rectilinear translation of the rod near the face plate and the arcuate swinging of the end of the rod secured to the plate 813. This is not a disadvantage, inasmuch as the angular sweep of the plate 813 is relatively restricted.

Included in the source block mechanism adjacent to and moving in unison with the plate 813 is a similar plate 851. This is appropriately secured to the plate 813 by fastening devices 852, and in turn supports a furnace block, generally designated 853. Preferably, the furnace block is comprised of a pair of generally similar plates 854 and 856, respectively. These plates are fastened together face to face by through bolts 857 and are, on their meeting faces, contoured or cut out to afford an intervening chamber 858 extending entirely through the furnace block 853. The chamber is closed at the bottom by a plate 859 held in position by fastening screws 861 engaging the blocks 854 and 856, respectively. The chamber is additionally closed at the top by a closure plate 862 removably fastened in position by securing means 863.

Situated within the chamber 858, and readily positioned therein upon temporary removal of the plate 862, is a charge container 864, of any suitable construction. The charge container is sometimes in the form of a bottle, of glass or quartz, and is sometimes in the form of a receptacle of metal, such as stainless steel, for example. It is employed to contain a charge of the mixed materials or polyisotope to be separated, and is conveniently provided with but a single aperture 866. This is normally closed, prior to use, by a stopper or comparable closure (not shown), readily breakable or removable immediately prior to the use or positioning of the container 864 in the chamber 858. Upon the introduction of the charge and its container into the charge block 853, the closure plate 862 is remounted by securing the fastenings 863. In this fashion there is provided an enclosed charge in good thermal contact with the walls of the furnace block 853.

Good thermal contact is considered to be of importance, since for most source materials the temperature thereof is carefully regulated in order to control the velocity or quantity of efflux of molecules from the charge container 864. For this reason, each of the plates 854 and 856 is provided with a throughbore 867, serving as the location of a heater, generally designated 868. While any suitable form of regulable thermal device can be employed, it seems convenient in the present instance to employ a regulated electric heater. This is conveniently fabricated of one or more axially aligned ceramic cores 869, at intervals provided with collars 870 for locating the cores within the bore 867.

The core structure is particularly provided with an enlarged collar 871 at the top, nesting within an annular seating groove 872 formed in the upper portion of the bore 867, so that the core is appropriately positioned and retained by relatively close frictional engagement. Wound upon the core is a helix 873 formed of an electric conductor, at its lower end curled around a metallic stud 874 depending from the center of the insulating core 869. The curled conductor is fastened in place by a pair of jam nuts 876. The helix 873 at its upper end passes through the insulating collar 871 and is secured around a separate, metallic stem 877 by a pair of jam nuts 878.

Each of the furnace plates 854 and 856 is thus provided with an identical heater. These heaters are connected in an electric circuit by suitable leads (not shown, but comparable to those in Figure 1) connected to the stud 874 and to the stem 877, preferably in series with appropriate regulating mechanism. The desired supply of electric current to the helices 873 is appropriately controlled to afford a regulated supply of heat to the metallic furnace plates 854 and 856. These being correspondingly heated, therefore supply the container 864 and its contents with a controlled flow of heat, to result in a controlled temperature condition of the charge within the container and a controlled molecular efflux therefrom.

Temperature conditions in the charge block 853 are also preferably controlled by a fluid circulating system, governable either to supply heat, not usually its function, or to withdraw heat, usually its function. Some charge materials, for example, uranium tetrachloride, require a relatively high temperature for vaporization and require a substantial heat supply to maintain the high temperature. The electric elements are well adapted to this, as they are able quickly to supply large quantities of heat. Although they have no property of extracting heat if the temperature should get too high, this is not important with uranium tetrachloride, as the heat requirements are so great that reduction or cessation of the supply is quickly followed by a drop in temperature.

With a material such as uranium hexachloride, vaporization takes place at a relatively low temperature and the heat requirements are less. A fluid heating system has an advantage in that it is capable of absorbing or withdrawing heat, should the chamber temperature rise too high. A fluid system is somewhat more stable as to temperature under many operating conditions, although it is more difficult to make it quickly responsive to regulatory changes. A fluid system has another advantage in that cold fluid can be circulated through it to bring parts at elevated temperature quickly to room or handling temperature, for example at the conclusion of a run.

In the current instance, both electric and fluid heat exchange systems are provided, to be used separately or together, as appears appropriate. That is to say, the electric elements 873 are normally relied upon as a heat supply, although the fluid system can be supplied with a hot fluid, such as oil, for a similar purpose, but in general operation the fluid supplied is relatively cold, so that the fluid system is used as a cooling device.

The fluid system includes a supply tube 881, entering the tank 711 through a vacuum-tight connection in the face plate 712. The tube is formed into a loop 882 to afford flexibility between the portion of the tube anchored in the face plate and the extended portion of the tube designed to move freely with all of the motions of the furnace block 853. At the far side of the loop 882, the tube extends into a passageway 883 formed in a channel block 884 removably secured to but in good thermal contact with the side of the furnace plate 854, so that there is a ready interflow of heat between the plate 854 and the tube 881 and its fluid content. Return flow from the closed end tube 881 is through an interior tube 885.

A similar heat-exchanging fluid supply tube 886 having an internal return tube 887 passes downwardly through a channel 888 formed in a channel block 889 removably secured in good heat-conducting relationship to the side of the plate 851 so that heat flow between the plate 851 and the tube 886 and its contents is facilitated. Leaving the bottom portion of the channel 888, the tube 886 passes toward the face plate 712, but first is contoured into a loop 890 to permit the flexibility of the tube to be utilized so that motion of the furnace block 853 with respect to the face plate 712 is freely permitted without disturbing the fluid flow. The tube 886 passes from the loop 890 through a vacuum-tight connection in the face plate 712 to the exterior and is joined to the regulated fluid supply.

By appropriate operation of the thermal controlling means for the furnace block 853 the requisite supply of heat is given to the charge within the container 864, so that the charge is maintained at a temperature of the desired value or within a relatively limited range of values. Consequently, the molecules of the charge are sublimed or vaporized and so tend to flow from the container 864 with thermal energies. From the container there is but a single outlet; namely, the aperture 866. The vapor pressure is higher than the pressure within the tank 711 outside the container 864. Consequently, flow takes place from the container through the aperture 866.

The vapor or gas so flowing travels through a registering aperture 891. Half of the aperture is cut in each of the furnace plates 854 and 856. It is enlarged near the surface of the plates to provide a recessed, annular seat 892 for one end of a junction ring 893 seated in the furnace plates 854 and 856 by a clamped engagement therewith. The ring 893 serves to bridge a gap 894 between the furnace block 853 and the plate 851. The ring is tightly engaged in the plate 851 by virtue of a suitable annular seat 896 formed therein. The gap between the blocks is suitably maintained by a plurality of washers 897, each surrounding one of the fasteners 898 holding the blocks 851 and 853 together.

The passage through the ring 893 is continued by a registering aperture 899 in the plate 851 so that the aperture 866 in the charge container 864, the aperture 891 in the plates 854 and 856, the passage through the ring 893 and the aperture 899, all registering, form a passageway, generally designated 901, affording access from the interior of the container 864 to a distribution or plenum chamber 902. The distribution chamber 902 is constituted by an elongated groove depressed or cut into the metal of the plate 851, the chamber 902 being of substantially the same contour as the plate 851 but of lesser extent, to leave a top wall 903, a rear wall 904 and a bottom wall 906 of approximately equal thickness, and also to leave side walls 907 and 908 of considerably greater thickness.

Since the vapor flowing through the passageway 901 into the chamber 902 will condense if unduly cooled, in accordance with my invention I control carefully the temperature of the thermally conducting plate 851. In addition to the heat exchanger tube 886, I preferably provide a through cavity 909 in the wall 907 for the reception of an inserted ceramic core 911, in all respects comparable to the core 869. The core 911 is also similarly mounted in its cavity 909 by an insulating top collar 912. A heating wire 913 extends through the top collar to an anchoring stem 914 having jam nuts 916 threaded thereon to afford a point of connection for a supply and return electric circuit for the heater thus provided. This electric heater, alone or in conjunction with the fluid tube 886 in the block 889 fastened to the wall 908, affords means for maintaining the supply of heat at the desired value or within a relatively small range. Consequently, the temperature existing within the chamber 902 is readily established and maintained at a level precluding vapor condensation.

Vapor which emerges from the passage 901 into the chamber 902 fills the chamber with substantial uniformity because there is little or no flow restriction. The purpose of the distribution chamber largely is to permit equalization in density of the flowing vapor emerging from the container 864. By this means there is provided a relatively uniform, vertically disposed column of the mixed material or polyisotope vapor having a substantially predetermined or regulated range of thermal energies.

The evenly distributed, relatively uniform supply of vapor in the chamber 902 is permitted to flow therefrom through a plurality of staggered, circular apertures 917 formed in the plate 813. These pierce the block through a central, thin wall 918 serving as a septum between the chamber 902 and an arc chamber 921. The arc chamber is in part formed by a channel cut into the plate 813 throughout its entire length to leave the rear wall 918, a side portion 922 and a similar side portion 923. The former side portion is in good thermal contact with the plate 851 adjacent the heater 911, and the latter side portion is in good thermal contact with the plate 851 and the channel block 889 adjacent the tube 886.

The apertures 917 permit steady flow into the arc chamber 921 from the distributing chamber 902 and in order to maintain the uniform flow and consistent density of the vapor there is positioned in the arc chamber, or at least in that portion of it within the plate 813, an arcuate shield or baffle 926, preferably fabricated of quartz or comparable material and suitably supported to occupy substantially the entire width of the chamber 921 between the walls of the side portions 922 and 923, yet being somewhat less in depth than the chamber to afford free lateral communication therein. At selected intervals throughout its length and width, the baffle 926 is provided with generally circular apertures 927 permitting the flow of fluid or gas from behind the baffle into the central portion of the arc chamber 921.

In accordance with my invention, I provide means for rendering the gas molecules in the source mechanism responsive to electric and magnetic control. This is done preferably by ionizing such molecules. Any suitable mechanism may be employed for the purpose, but a convenient method and means is to provide an electric arc in the space containing the molecules.

The term "arc" is used with broad signification herein. The phenomenon referred to occurs in a vacuum, in a magnetic field and between a heated filament and an anode at different voltage and spaced from the filament in a direction parallel to the field. An electric current flows and a rather clearly defined, readily visible, luminous pencil extends between the filament and the anode. Probe explorations show an accompanying plasma. The presence of a magnetic field in the arc region gives rise to somewhat divergent views as to electron behavior there. It was at one time considered that electrons did not move with components directed across the magnetic flux direction, and that consequently an electron stream between the filament and the anode was magnetically confined. It follows that ion production by electrons could then occur only in the electron stream. This does not seem to be entirely true. It has been more recently considered that electrons do move with components directed across the magnetic flux in paths having circular or cycloidal plane projections. This accounts for ion production outside of a geometrically delimited electron stream. In the present device, material separation would be most sharply defined if all the ions originated at a single point or upon a single line parallel to the magnetic field. Only a vanishing number do so. For a large quantity of material to be ionized demands as big an electron stream as possible, to the detriment of geometrical considerations. In practice, the electron stream is, near the filament, caused to have a predetermined cross section. This established shape, or a close approximation of it, appears visually to extend to the anode. There is thus a general geometric control available. Yet, the visual appearance does not necessarily correspond to precise electron stream boundaries, and in fact, boundaries, in the sense of sharp discontinuities, do not seem to exist. Rather, there is a gradual falling off in electron density away from a central point or line. The increasing electron sparseness away from the center, is not necessarily uniform. Rather, there seems to be a central core of fairly governable extent and of perhaps reasonably uniform electron density. Around this there seems to be a rapid reduction in electron density down to values so small they can be neglected. Ion production, it is thought, may take a similar pattern. Thus, while most of the ion production is in a fairly regulable area that can be made to approximate a point as closely or as remotely as seems feasible, ion production outside this area undoubtedly occurs. Hence, the reference herein to an arc is without limitation but is generally to phenomena occurring in the vicinity of the inter-electrode region.

The arc is preferably arranged so that, for the most part, it is of columnar form and so that the luminous portion is a substantially vertical pencil having an axis parallel to the direction of magnetic flux, as indicated by the arrow in Figure 1. As an appropriate means of establishing the electric arc, I provide as one electrode a filament 931, conveniently constructed of any suitable material having the property of discharging electrons. A convenient material for this purpose is one able to withstand substantial temperatures, such as tantalum or tungsten.

The filament is preferably U-shaped in plan and is either circular or rectangular in transverse cross section, in the usual embodiments. In the event the filament is formed of a previously drawn wire, its cross section is usually circular and the filament is made by bending the wire into the desired contour. If the preferred cross section is rectangular, it is convenient to fabricate the filament by cutting it from a larger plate of the requisite material. The consideration which is most important is to have a filament capable of giving an intense, although uniform, electron emission at relatively high temperatures for long periods. It is likewise of considerable importance that the filament be mechanically strong, so that its shape and position, once established, will be maintained during protracted operational periods.

The filament 931 is preferably mounted in clamps 932 and 933, respectively (Figure 37, for instance), each comprising a base portion 934 contoured to receive one-half in cross section of the leg 936 of the filament 931. Each base portion is likewise cut away to receive a retaining plate 937, clamped against the filament by a plurality of tension screws 939 passing through the member 934 and threadedly engaging the plate 937, so that the filament is firmly clamped in position yet, upon manipulation of the screws 939, can be readily removed and replaced by a substitute filament.

Since the filament runs at a relatively high temperature, I preferably provide means for supplying the clamps 932 and 933 with a supply of cooling fluid, and simultaneously, in accordance with my invention, utilize such cooling fluid supplying means as conductors of electricity included in the circuit incorporating the filament. In this way, the filament is readily supplied with a regulated quantity of electric current so that its temperature can be controlled by the current supply and can also be controlled by regulating the supply of cooling fluid.

In addition, I construct the combined cooling supply means and the electric current supply means in such a fashion that they also constitute the mechanical support for the filament. To that end, each of the clamping blocks 932 and 933 is provided with an elongated, integral, circular cylindrical boss 941, fitted within and soldered or otherwise tightly secured to the exposed end of one of a pair of external conducting tubes 942 and 943, respectively. These tubes are conveniently fabricated of copper or comparable material effective as a thermal and electrical conductor.

The tubes are supported and protected or housed in a casing 944, constituting a salient part of an element normally or usually termed a cathode and generally designated 946. The casing 944 is preferably tubular in form, usually fabricated of a metal tube or other relatively rigid shape, normally arranged with the axis of symmetry of the casing coincident with the axis 757. Conveniently, the tube or casing 944 is a circular cylinder, and at its end inside the tank 711 is provided with a metallic ring 947, fitting within the end of the casing 944 and positioned therein against both axial translation and rotation by a pair of fastening devices 948 and 949 (Figure 31).

The later of these device is constituted simply by a pin engaging the ring 947 and slidable in a slot 951 cut axially in the end of the casing 944. The former of these devices is a screw passing not only through the casing 944 and the ring 947, but also extending into and threadedly engaging the upper one of a pair of insulating blocks 952 and 953, respectively. On their adjacent surfaces, these blocks are contoured to form hemicylindrical seats for the tubes 942 and 943, the tubes being anchored against longitudinal or axial displacement in one direction with respect to the block 952 by outer collars 954 around each of the tubes adjacent the end of the casing 944. Displacement of the tubes in the opposite direction is opposed by inner collars 956 comparably positioned around the tubes inwardly of the end of the casing 944, and being provided with conical terminals 957 engaging the insulating blocks 952 and 953 to serve additionally as centering devices.

With the construction of the end of the cathode as described, the filament-supporting tubes 942 and 943 are firmly anchored within the end of the casing 944. Upon removal of the screw 948, the tubes can be thrust forward to bring the supporting blocks 952 and 953 outside of the casing 944, where they can be lifted from the tubes. Upon removal of the blocks, the tubes 942 and 943 can be withdrawn rearwardly. Furthermore, when the tubes 942 and 943 are replaced the cooperation of the insulating blocks and fastening devices 948 and 949 repositions and centralizes the structure accurately.

The tubes 942 and 943, after passing through the insulating blocks 952 and 953, extend symmetrically within the casing 944 until they arrive adjacent the opposite end of such casing, whereat they diverge slightly and then regain their parallelism to pass through the related one of a pair of packing devices generally designated 961 and 962, respectively. These packing devices are substantially identical, so that the description of one applies equally to the other. Each of them is partly formed in a block 963 of metal or other material, conveniently provided with a circular recess 964, serving as a seat for the end of the casing 944. The block and the casing are fastened together, preferably by hard solder or other suitable fastening means.

Within the block 963 around each of the tubes 942 and 943 there is formed a circular, cylindrical passage 966, containing sealing or packing material 967 and a packing spacer 968, all adapted to be held in confined position within the bore 966 around the adjacent one of the tubes 942 or 943 by a flanged sleeve 969, overlying the tube and located within a bore 971, being one of a pair of such bores. Each of these constitutes an extension of the respective one of the bores 966 and pierces a block 972 recessed into and secured, as by hard soldering or other suitable means, to the block 963. The sleeve 969 is held in position by an encompassing packing nut 973.

The outer end of the nut is noncircular to receive a manipulating wrench, while the inner portion is provided with threads 974 engaging comparable threads within the block 972, so that upon rotation of the portion 973 the sleeve 969, the packings 967 and the spacer 968 are all firmly held in vacuum-tight relationship. Thus, there is slight possibility of air-leakage from the exterior to the interior of the tank along the tubes 942 and 943. But if some leakage should occur, it does not extend to the tank 711, for the pierced spacer 968 affords communication with a pump-out connection 975 (Figure 39). In addition, all of the packing material in immediate contact with the tubes, such as the packings 967, the spacer 968 and the sleeve 969, is of an electric insulating material, so that each of the tubes 942 and 943 is electrically isolated from the other tube and from the casing 944, as well.

After each of the tubes 942 and 943 emerges from the packing sleeve 969, it enters into a connection block generally designated 976 (Figure 40), comprised of two substantially identical blocks 977 and 978, preferably fabricated of metal. These are good electrical conductors, but are electrically insulated from each other by an intervening isolating plate 979 of insulating material. The blocks are held in the desired relationship by a pair of through bolts 981, each being surrounded by insulating sleeve washers 982. Each bolt is provided with a securing nut 983, for maintaining pressure against insulating washers 984, so that the electrical separation of the blocks 977 and 978 is maintained although they are, in effect, a mechanical unit.

Since the connections of both of the tubes 942 and 943 to their respective blocks 977 and 978 are substantially identical, a description of one applies equally to the other. Surrounding the tube 943 (Figures 34 and 40), for example, is a thrust T 985 having a circular, cylindrical, central extension 986 fitting slidably within a bore 987 in the block 978, and having a transversely elongated T-head 988, adjacent its extremities pierced to afford a pair of passageways for a pair of securing studs 989 and 990, each of which has a threadedly engaged fastening nut 991 cooperating therewith, so that concurrent rotation of the nuts 991 forces the tubular extension 986 into the bore 987, or upon removal of the nuts 991 the extension 986 can be withdrawn from the bore 987.

When the extension 986 is in assembled position, it abuts against a packing washer 992, interposed between the extension and a pierced spacing sleeve 993, like the packing freely slidable within the bore 987 and in its turn abutting a packing washer 994 also contained within the bore 987 and urged against an inturned flange 996 forming part of the block 978. The packing washers 992 and 994 are thus both compressed by the member 986. The sleeve 993 is internally and externally relieved and is pierced to provide an aperture 997 affording an intermediate passageway. Aligned apertures 998 in the wall of the tube 943 establish communication between an annular space 999 existing between the interior of the tube 943 and the exterior of a smaller squirt tube 1000 extending throughout substantially the entire length of the tube 943. The end of the squirt tube adjacent the filament 931 terminates just short of the end of the tube 943 in the vicinity of the insulating or packing blocks 952 and 953, preferably with an angular terminus. Communication with the annular chamber 999 through the apertured sleeve 993 is extended through a passageway 1001 in the block 978 aligned with an entirely similar arrangement in the block 977. Free flow can occur through a hole 1002 in the insulating plate 979.

Since the tube 942 is provided on its interior with an entirely similar squirt tube 1003, there is with the described mechanism, considering all of the duplicate portions thereof, communication serially from the interior of the squirt tube 1000 through its remote end adjacent the ring 947 into the annular space 999 within the tube 943, thence radially outward through the perforation 998 into and through the sleeve 993. Flow is then through the passageway 1001 and the hole 1002 into the annular space within the tube 942, outside of the squirt tube 1003 for substantially the entire length of such tube, and thence adjacent the ring 947 into the interior of the squirt tube 1003 and back into the block 977. In this fashion, there is provided a path of circulation beginning with the interior of one of the squirt tubes, throughout its entire length, then back through the enclosing tube, across to the other enclosing tube and, after traversing its entire length, back through the other of the squirt tubes.

In accordance with my invention, I provide means for supplying this communicating circuit and, specifically, for supplying one of the squirt tubes with a cooling fluid, such as water, and receiving the returned cooling fluid from the other of the squirt tubes. These mechanisms are substantially identical or are approximately duplicated within the blocks 977 and 978, and a description of one of them applies equally to the other. The squirt tube 1000 is soldered or otherwise tightly fastened into an appropriately bored rod 1004, likewise pierced by a transverse bore 1006, affording communication between the interior of the squirt tube and the exterior of the rod 1004.

This portion of the rod is encompassed by an internally and externally relieved sleeve 1007 provided with radial apertures 1008 and disposed to abut the inturned flange 996 in the block 978. The other end of the sleeve is abutted by a packing gland 1009 encompassing the rod 1004. A threaded extension 1011 on the rod 1004 is engaged by a nut 1012, abutting against a threaded plug 1013 screwed upon the extension 1011 and effective to compress the gland 1009 to preclude leakage of fluid out of the block 978 or along the rod 1004. In this fashion, and by appropriate operation of the nut 1012 and of the pair of nuts 991, the packings are all maintained in leak-tight condition, and furthermore, the blocks 977 and 978 are correctly positioned with respect to the tubes 942 and 943.

The pierced sleeve 1007 is in approximate registry with an aperture 1014 in the block 978 communicating with a passageway 1015 in an insulating sheet 1016, interposed between the block 978 and a fitting block 1017. The block 1017 extends transversely of the block 978 and is held in position with the sheet 1016 in compression by a pair of studs 1018 projecting from the block 978. Both of these are provided with threaded terminals to receive engaging nuts 1019, so that upon securing of the nuts a fluid-tight passageway is provided from the block 978 to the fitting block 1017. Secured to the fitting block by hard solder, or comparable fastening means, is a curved conduit 1021 in communication with the passageway 1015, provided adjacent its free extremity with a threaded engaging fitting 1022, having a wrench-receiving portion 1023 so that the fitting can be connected to any suitable supply conduit having a mating fitting, not shown.

Since the corresponding conduit 1024 of the block 977 is similarly provided with a connecting fitting 1026, there is afforded means for connecting the circulating system into a suitable fluid supply and controlling line. Flow occurs in either direction, for example, through the conduit 1021 into the squirt tube 1000 and from the squirt tube 1003 through the conduit 1024.

The cathode filament support mechanism is preferably situated with respect to the tank 711 so that it is insulated therefrom electrically, yet is mechanically supported on the face plate 712 in such a fashion that the filament 931 is movable inwardly and outwardly of the tank and likewise can be shifted laterally, that is, from side to side, and also can be moved up and down. These various freedoms of motion are for the purpose of permitting an exceedingly accurate positioning of the filament, not only originally, but even after protracted use, when the particular portion of the filament momentarily active may change location.

For these and other reasons I preferably provide in abutment with the face plate 712 and with its axis coincident with the axis 757, a circular, cylindrical, ceramic insulator 1031. The opposite ends of the insulator are provided with flaring portions 1032 and 1033, respectively. The flaring portion 1032 overlies a pair of annular packing gaskets 1034 and 1036, respectively, embedded in the face plate 712 and normally protruding a predetermined distance above the surface thereof. In order to provide a vacuum-tight closure at this location, the insulator 1031 is preferably pressed against the insulating gaskets 1034 and 1036 with a sufficient degree of tightness so that these rings are slightly deformed and serve as an airtight seal.

The mechanism for producing this effect includes a conical washer 1037 overlying the enlarged portion 1032 and encompassed by a pair of half bands 1038 and 1039 of metal carefully contoured so that the washer 1037, itself fairly yielding, will accommodate irregularities but will not be injured. The bands 1038 and 1039 are together provided with a peripheral recess 1040. Into the recess fits an inturned flange 1041 on a locking ring 1042 confining and overlying the bands 1038 and 1039. The ring 1042 is provided with a plurality of apertures therethrough to receive a number of studs 1043 fastened in the face plate 712 and threaded to receive one of a number of fastening nuts 1044.

When the nuts are not in position the insulator 1031 can readily be removed from its position against the face plate 712, but when the nuts 1044 are tightened, a satisfactory mounting for mechanical support and good closure for vacuum tightness are afforded. The half bands 1038 and 1039 allow ready assembly and disassembly of the structure. When the ring 1042 is withdrawn from the studs 1043 toward the center of the insulator 1031, the half bands 1038 and 1039 can be extracted from the encompassing ring 1042, the two halves can be laterally withdrawn, and the ring 1042 can be shifted over the enlarged portion 1032. The nature of the conical engagement between the half bands 1038 and 1039, the ring 1042 and the flaring portion 1032 of the insulator is such that the insulator 1031 tends to be accurately disposed coincident with the axis 757 so that the main portion of the supporting and insulating structure is in alignment with a normal or median position of the cathode casing 944.

In a somewhat similar fashion, the flared enlargement 1033 at the other end of the insulator 1031 is encompassed by a relatively soft packing or gasket 1046, in turn overlaid by a pair of half bands 1047 and 1048 having a stepped portion 1049. Into the step so formed is fitted an inturned flange 1050 on a closure ring 1051. This latter ring is pierced by a number of apertures to permit the passage of studs 1052 arranged in a circle and anchored in a plate 1053. The ring 1051 is drawn toward the plate 1053 and against packing rings 1060 when nuts 1054 screwed onto the studs 1052 are suitably tightened. When the nuts 1054 are removed from the studs 1052 the closure ring 1051 can be withdrawn from the studs 1052 and can be moved toward the center of the insulator 1031. In this retracted position of the closure ring 1051, the two half bands 1047 and 1048 can be extracted from within the ring 1051 and each half can be separated laterally from the insulator. Following this, the ring 1051 can be passed over the enlarged section 1033 for complete dismantling.

Means are provided in connection with the relatively stationary insulated plate 1053 for mounting the cathode mechanism for universal motion; that is, motion having any combination of two components at right angles to each other and perpendicular to the axis 757. For this reason, on the plate 1053 I provided a pair of projecting, apertured ears 1055 and 1056, each being secured by any suitable means, such as by hard soldering, to the plate 1053, and serving as a journal mounting for one of a pair of axially aligned transverse pins 1057 and 1058, respectively.

Each of these pins, although generally circular cylindrical and of uniform diameter, is reduced in size between its ends in order to receive the adjacent one of a pair of cooperating set screws 1059 and 1061. The set screws hold the pins against rotation and also against axial translation in an annulus 1062 provided with radial bores 1063 and 1064 for the reception of the pins 1057 and 1058, as well as being suitably threaded to receive the set screws 1059 and 1061. With this construction the annulus 1062 can be freely rocked about the axis of the pins 1057 and 1058 as the pins turn in the ears 1055 and 1056. The pin axis intersects the axis 757 at right angles, thus providing a freedom of motion about one transverse axis.

The annulus 1062, at points spaced 90° from the axis of the pins 1057 and 1058, and consequently in alignment on a transverse axis perpendicular also to the axis 757, is pierced by aligned threaded apertures 1066 and 1067. Into these are threaded bolts 1068 and 1069, respectively, at their radially outward ends provided with tool-receiving diametral slots 1071 and lock nuts 1072, engaging the bolts and jamming against the annulus 1062 to secure the bolts in any desired or adjusted position.

At their inner ends the bolts are reduced in diameter and are provided with cones 1073 designed rotatably to engage in conical recesses 1074 and 1076, respectively, bored into a ring 1077, normally disposed in its median position axially coincident with the axis 757. Because of the journal connection with the bolts 1068 and 1069, the ring 1077 is freely rockable within limits about the transverse axis of the bolts. These, in turn, being united in motion with the annulus 1062, are rockable about the transverse axis of the pins 1057 and 1058. This structure thus comprises a gimbal mounting to accord the universal motion desired.

To maintain the vacuum-tight integrity of the tank while permitting relative motion between the ring 1077 and the stationary plate 1053, I preferably provide, for example, on the inner face of the ring 1077 an annular recess 1078 serving as a seat for one end of a flexible, metallic bellows 1079, secured by suitable means, such as hard soldering, to the ring 1077. In a comparable fashion, the other end of the bellows 1079 is hard-soldered in position within an annular recess 1081, formed in the outer face of the plate 1053. The exterior of the bellows 1079 is, therefore, subject to atmospheric pressure, while the interior thereof is susceptible to a different pressure.

The universal motion of which the ring 1077 is capable is imparted to it by a metallic tube 1082, having relatively thick walls so that it serves likewise as a firm and rigid support. The tube 1082 is stiff and is fastened in the recessed ring 1077 by a hard solder joint 1083, or in other secure fashion, since it acts as the member for receiving adjusting motion from an adjusting or positioning mechanism provided in accordance with my invention.

This adjusting or orienting mechanism is especially shown in Figures 34, 36, 37 and 38, and includes machinery for moving the tube 1082 and its connected structures in any selected direction having one or more components in a plane perpendicular to the axis 757. For this purpose, to the stationary plate 1053 I secure a fastening ring 1084 by means of securing screws 1085. The ring 1084 is provided on its internal periphery with a grooved seat 1086. Into the seat is recessed one end of an enclosing and supporting tube 1087, fastened to the ring 1084 by hard solder or other comparable means. The other end of the enclosing and supporting tube 1087 is fastened, for example, by hard solder or other comparable means, to a disk 1088 provided with a circular seat 1090 for firm inter-engagement between the disk and the enclosing tube 1087. The disk is of approximately annular form, although its outer periphery is considerably mutilated.

The tube 1082 is freely movable within the shell or enclosing tube 1087, preferably in accordance with very careful mechanical control. For that reason, on the outer surface of the tube 1082 there is provided an extended ring boss 1089, firmly secured to the tube and at its low point centrally countersunk to afford a seat 1091 for a pin 1092 arranged approximately in a radial position and fitting, with a small amount of freedom or play, within the seat 1091. The pin 1092 at its radially outward end is received in a counter-bored socket 1093, of considerably larger size than the diameter of the pin, formed in a translatable sleeve 1094, slidable within a radial bore 1096 through the disk 1088. The sleeve 1094 between its ends is turned to afford threads 1097 engaged by internal threads on a hubbed worm wheel 1098, confined against translation in one direction by a collar 1099 interposed between one side of the worm wheel and the outer periphery of the disk 1088. The worm wheel 1098 is confined on the other side against axial translation by abutment between the hub of the wheel and a cross plate 1101.

One end of the cross plate is secured by a fastening 1102 to the disk 1088, there being a sleeve 1103 encompassing the fastening 1102 and interposed between the inner face of the plate 1101 and a parallel face 1104 provided by an indentation 1106 cut in the periphery of the disk 1088. The other end of the plate 1101 is widened to receive on opposite sides of its center a plurality of fastenings 1107 and 1108 engaging the depending forks 1109 and 1111, respectively, of a mounting block, generally designated 1112. The base of the block 1112 is seated in an indentation 1113 cut in the periphery of the disk 1088 and is removably secured therein by a pair of fastening studs 1114 and locating pins 1116. The cross plate 1101 thus is removably mounted with respect to the disk 1088 and serves as a support for a stationary pin 1117 firmly mounted in the plate and extending with its axis parallel to the axis of the sleeve 1094. A radial arm 1118 is bored to slip over the plain outer end 1119 of the sleeve 1094. One end of the arm is secured by a set-bolt 1121, while the other end of the arm 1118 is provided with a slot 1122 encompassing and freely slidable with respect to the pin 1117.

The effect of this mechanism is to permit axial translation of the sleeve 1094, but to preclude any rotation thereof; thus, upon rotation of the worm wheel 1098 the sleeve 1094 is moved radially of the disk 1088 in a corresponding amount. The threaded relationship between the sleeve 1094 and the worm wheel 1098 is of the non-overhauling type, so that, despite considerable dislodging force, the position of the sleeve 1094 is maintained as established by the corresponding position of the worm wheel 1098.

The worm wheel itself is rotated by virtue of its engagement with a worm 1123 fast on a shaft 1124 journaled in the forks 1109 and 1111 of the block 1112. The worm 1123 is confined between the two forks so that the worm is capable of rotation only and is not capable of axial translation. The worm, being fast on the shaft 1024, rotates therewith and the shaft in turn is rotated manually by a thumb nut 1126 connected to the shaft by a diametral pin 1127. Thus, upon rotation of the thumb nut 1126 in either direction, the worm wheel 1098 is turned, the sleeve 1094 is advanced or retracted in a radial direction and produces a similar translatory motion of the pin 1092. Consequently, the tube 1082 and the ring 1077 are appropriately rocked about the horizontal axis of the pins 1057 and 1058.

Since the pin 1092 merely abuts the bottom of the socket 1093 in the sleeve 1094 and is only loosely seated within the seat 1091 of the ring 1089, I provide means for insuring that these parts are always in contact, so that the rotation of the thumb nut 1126 in either direction is always effective and without any backlash. For this reason, on the tube 1082, diametrically opposite the seat 1091, I provide a similar seat 1132. Within this seat is socketed one end of a generally radially disposed pin 1133, passing through a channel 1134 extending radially through the disk 1088. Between its ends, the rod 1133 is encompassed by a disk 1135, soldered or otherwise suitably secured to the rod and being provided with a peripheral step 1136. Adapted to seat in the step 1136 is one end of a helical spring 1137, arranged coaxially with the pin 1133 and having its other end abutting an annular seat 1138 on the under side of a beam 1139.

The outermost end of the rod 1133 passes through an aperture in the beam 1139 with adequate clearance, having freely slidable relative motion. The beam 1139 spans the space between and is supported upon a pair of tubular columns 1141 and 1142, respectively, at their lower ends resting against a flat surface 1143 constituting a chord of the periphery of the disk 1088. Passing through the tubular columns 1141 and 1142 are studs 1144, having their innermost ends anchored within the disk 1088 and their outermost ends passing through accommodating apertures in the beam 1139. Suitable fastening devices, such as nuts 1146, engage the ends of the studs and hold the beam in place.

The effect of the described structure is to impose a steady force, due to the expanding characteristic of the helical spring 1137, against the tube 1082 in a direction tending to urge all of the moving parts in the motion chain from the thumb nut 1126 in the same direction, so that any clearance or backlash in the mechanism, present originally or developing due to wear, is taken up or rendered ineffective to disturb the precision of adjustment in either direction. In addition, the provision of the spring 1137 has the advantage of affording a yielding pressure on the tube 1082, so that in the event of the imposition of an excessive strain, due to any cause, the spring will yield and preclude the breakage of the mechanism.

The orienting mechanism just described is effective to swing the tube 1082 and the contained cathode casing 944 up and down in a generally vertical direction. In accordance with my invention, I provide means for also swinging the tube 1082 in a generally horizontal direction, and arrange matters so that the tube can partake of intermediate directions of motion, so that the operation or adjustment of one of the mechanisms will not interfere substantially with the manipulation or setting of the other structure.

To carry out these requirements, there is provided a similar orienting mechanism, generally designated 1151, which is located 90 degrees from the socket 1091 and bears against the boss ring 1089 at a socket 1152. Thus by adjustment of a thumb nut 1177, similar to thumb nut 1126, the tube 1082 and the casing 944 are moved a desired amount in a direction transverse to the motion imparted thereto by adjustment of the thumb nut 1126. For maintaining such adjusted position, I prefer to utilize an arrangement, generally designated 1180, similar to the previously described mechanism comprising the helical spring 1137 and located 180 degrees about the boss ring 1089 from the socket 1152. When the knob 1177, for example, is operated, the tube 1082 is shifted laterally or from side to side and the pins 1092 and 1133 move through arcs because the outer end of the pin 1092 is socketed within the sleeve 1094 in a relatively free fashion and the socketed connection between the pin 1092 and the seat 1089 permits of such motion.

Because of its swinging or arcuate motion, the pin 1092 tends to permit the tube 1082 to drop somewhat. This motion is followed by the pin 1133, maintaining a tight engagement and itself partaking of a swinging movement compensated for by an extension of the spring 1137. This freedom of motion of the pin 1133 is readily accommodated within the bore 1134 and by virtue of the loose, sliding connection between the pin 1133 and the beam 1139.

In a comparable manner, when the pins 1092 and 1133 are subjected to rectilinear translation during the operation of the adjusting thumb nut 1126, the affected parts of the horizontal orienting mechanism 1151 and 1180 react in a similar manner to that just described.

The compensating effect described is of considerable importance when large amplitudes of adjustment are imposed upon the tube 1082. In that instance, large adjustment of the mechanism controlled by knob 1177, for example, may require a slight correcting adjustment by the thumb nut 1126, and vice versa. However, for the very small amplitudes of adjustment normally encountered, it is usually feasible to adjust but one of the knobs 1126 or 1177 at a time.

The effect of the adjusting knobs 1126 and 1177 is not only to move the tube 1082 but is likewise to operate the ring 1077 and the vacuum sealing bellows 1079 to produce motion thereof of a swinging character in any direction across the axis 757. Correspondingly, the motion of the tube 1082 is imparted in every respect to the contained cathode casing 944 carrying the filament 931. The casing 944 is supported within the tube 1082, generally with clearance therebetween, but there is contact of the tube 1082 with the inner periphery of a bore 1196 of the ring 1077, so that the inner casing 944 is supported concentrically or coaxially with the outer tube 1082. Where the casing 944 extends through the plates 1053 and 712, it passes through enlarged apertures 1197 and 1198 formed therein, so that the casing 944 can partake of a substantial swinging motion with the axis 757 of the casing pivoting about a point at the intersection of the axes of the pins 1057 and 1058 and of the bolts 1068 and 1069. A number of degrees of freedom of swinging motion of the cathode casing 944 are thus provided.

In addition to the transverse or lateral and vertical or up and down swinging of the casing 944, I provide, in accordance with my invention, means for axially translating the cathode casing 944 into and out from the tank 711, so that the filament 931 can be advanced or retracted with respect to the arc chamber 921. To accomplish this purpose, the tube 1082 on the outboard side of the adjusting pins 1092 and 1133 is set within and secured to an enlarged flange 1201 having a pair of annular grooves 1202 therein for the reception of resilient packing rings 1203. Abutting the flange 1201 is a matching flange 1204, removably secured in position by a plurality of studs 1206 screwed firmly into the flange 1201 and receiving nuts 1207 pressing against the flange 1204.

The flange 1204 is one part of a removable tube section including pipes 1208 and 1209, axially aligned and secured together so that they can be considered as a unit. The pipe section 1208 is seated within an annular recess 1211 provided in the flange 1204 and is secured to such flange, while the section 1209 is similarly mounted within a recess 1212 and is suitably secured to a similar flange 1213. Abutting the flange 1213 is a mounting plate 1214 secured to the flange by a plurality of studs 1216 seated in the plate and equipped with nuts 1217. These press against the flange 1213 to hold it in firm engagement with a pair of packing rings 1218 seated within receiving grooves 1219 cut in the meeting face of the plate 1214. In this fashion, the vacuum-tight integrity of the interior of the tube 1082 is maintained despite the provision of removable flanges 1204 and 1213.

The plate 1214 is provided with a centrally enlarged annulus 1222. On the outboard side of the annulus, the plate 1214 forms a rather closely fitting bore 1223. This bore is a positioning and sliding fit with the interior casing 944, and together with the close fitting bore 1196 constitutes the aligning support for the casing 944. The annulus 1222 is preferably connected to a pump-out or other suitable source of subatmospheric pressure, in order that any undue leakage of air may be stopped before progressing further.

To insure that the leakage of air is at a minimum, yet to permit axial sliding movement of the casing 944 within and with respect to the tube 1082, the plate 1214 adjacent the shoulder 1223 is formed with a recess 1224, receiving a collar 1226 positioned and fastened therein. Within the chamber defined in part by the shoulder 1223 and by the collar 1226 is situated a pair of deformable, generally conical washers 1227 and 1228, preferably of rubber or like material.

To serve as a support in part for the washer 1228, and to afford pumping-out space, there is interposed between the washers 1227 and 1228 a conical disk 1229, having a channeled peripheral band 1231 thereon which in turn communicates with a pumping-out orifice (not shown). The washer 1228 is abutted by an annulus 1232, projecting from a plate 1233 slipped over the casing 944 and adapted to be urged toward the plate 1214 by tightening movement of a plurality of machine bolts 1234 passing through apertures in the plate 1233 and engaging the plate 1214.

By the provision of this mechanism there is afforded a means for permitting free sliding of the casing 944 through the seal comprised of the washers 1227 and 1228, without substantial leakage and with adequate freedom of motion. Thus, on one side of the packing provided by the washers 1227 and 1228 the pressure can be maintained at a value different from the pressure on the other side of such packing.

Accurately controlled sliding motion of the casing 944 with respect to the tube 1082 is provided by a mechanism including a plate 1239 having a central aperture 1241 of slightly larger diameter than that of the casing 944. The plate 1239 is fastened to the block 963 for joint operation therewith by a pair of studs (Figure 39) 1242 and 1243, respectively, seated within the plate 1239 and passing through accommodating apertures in the plate 963 to receive securing nuts 1244. Since the block 963 is securely fastened to the end of the casing 944, the two joined parts 963 and 1239 necessarily move in unison with the casing.

The conjoint axial motion is effectuated by a pair of adjusting screws 1247 and 1248, respectively. These are disposed at opposite sides of the casing 944 and, by similar threaded engagements therewith, produce equal effects upon the opposite ends of the plate 1239, so that a pure axial translation of the casing is produced without any transverse forces which would tend to cause sticking or binding or leakage through the packings 1227 and 1228. Each of the screws 1247 and 1248 is mounted in a similar fashion, so that a description of one mounting is equally applicable to the other.

For example, the screw 1248 is freely journaled upon a supporting pin 1249 provided with a threaded portion 1251 passing through the plate 1214 and anchored in position with respect thereto by a pair of jam nuts 1252 and 1253, respectively. The screw 1248 is confined against axial translation on the pin 1249 at one end by a washer 1254 secured in place by a cap screw 1255 having its threaded pin received in a similarly threaded recess 1256 bored in the pin 1249. The other end of the screw 1248 is confined axially by a worm wheel 1257, joined by solder or other appropriate means to a collar 1258 integral with the screw 1248, so that the worm wheel occupies a position abutting the jam nut 1252.

The worm wheel 1257 associated with the screw 1248, and a comparable worm wheel 1259 associated with the screw 1247, are both driven (Figure 50) in unison by the meshing therewith of a respective one of a pair of worm gears 1261 and 1262, disposed near opposite ends of a cross shaft 1263. Both of the worm gears are secured to the shaft, and so that they may be turned, the shaft is likewise provided with an operating knob 1264. The shaft 1263 is mounted and axially confined by being journaled in a pair of L-shaped plates 1266 and 1267, respectively, disposed in appropriate abutment with the outboard faces of the two worm gears 1261 and 1262. These are secured to the outer edges of the mounting plate 1214 by fastening screws 1268 and locating pins 1269 (Figure 34).

By the provision of this mechanism I have afforded a manually operable mechanism, effective in both directions without substantial backlash. Since it includes various worm and screw mechanisms, it is not, therefore, susceptible to displacement by reverse forces. The structure is effective for minutely regulating the axially adjusted position of the cathode casing 944 and, consequently, of the electrode or filament 931 with respect to the mounting tube 1082. That is, upon manipulation of the knob 1264, the shaft 1263 is rotated. The two worms 1261 and 1262 rotate in unison and cause a rotation of the screws 1247 and 1248 in consonance therewith. Thereby, the plate 1241 is either advanced or retracted by equal forces, applied at opposite sides thereof, and the casing 944 is smoothly and without leakage projected into the tank 711 or withdrawn therefrom.

Since it is sometimes desired to change the filament 931 without otherwise disturbing the apparatus, and since for purposes of adjustment the casing 944 is made axially slidable, I have devised a means for permitting the change of the filament and, in fact, of substantially the entire slidable cathode mechanism, without the necessity of varying the pressure materially within the tank 711. That is, there is afforded a way of changing filaments without making it necessary to let the entire tank 711 down to air.

This mechanism (Figure 36) is included in the unitary structure incorporating the pipe sections 1208 and 1209 and comprises a valve body 1271, at its aligned extremities provided with threaded flanges 1272 and 1273 engaged with the pipes 1208 and 1209, respectively. The valve body 1271 therefore is, in fact, a continuation of the pipes 1208 and 1209 and forms a vacuum-tight extension thereof. This body, on its interior, is pierced by a passageway, generally designated 1274, in every part at least as large in diameter as the exterior diameter of the casing 944, and preferably sufficiently larger to afford adequate sliding clearance.

The interior of the valve body 1271 is spanned by a pair of apertured walls 1276 and 1277, respectively, having smooth opposed or adjacent faces 1278 and 1279. When the tube 944 is withdrawn from its operating position, as shown in Figure 36, each of the faces 1278 and 1279 is adapted to receive the associated one of a pair of disks 1281 and 1282, of a size to overlie the apertured portion of the adjacent one of the walls 1276 and 1277. The disk 1282 on the vacuum side of the apparatus is provided with a deformable seal 1283, contained in a channel in the disk. When the disk is in a closed position, the seal is forced to make a firm contact with the seating face 1279, under the influence of a stemmed wedge 1284, normally interposed between the disks 1281 and 1282. In the closed position of the valve, the wedge is forced into contact with an abutment 1285 integral with the body 1271 and urges the disks 1281 and 1282 axially apart and against the faces 1278 and 1279.

The disks 1281 and 1282 are partially journaled on and carried by a threaded stem 1286 cooperating with a valve cap 1287 engaging the body 1271 and forming therewith a vacuum-tight enclosure. Leakage along the stem 1286 is prevented by a vacuum seal 1288, provided with a pump-out connection 1289 leading to a suitable source of vacuum. Upon rotation of the stem 1286 by a conveniently provided hand wheel 1291 on the end of the stem 1286, the disks 1281 and 1282 are projected or retracted. This motion can be fully accomplished only when the casing 944 is withdrawn from the valve body. In a position of the casing with its end between the valve body and the sealing washer 1227, when the valve is closed a vacuum-tight barrier is formed across the interior of the tube 1082 and the casing can then be fully withdrawn.

With this mechanism in place and with the valve open and the casing 944 positioned, as shown in Figure 36, the operation of changing the filament 931 is readily accomplished by disconnecting the fastenings between the block 963 and the plate 1239 by removing the nuts 1244. The casing 944 is then carefully withdrawn in an axial direction until such time as the filament 931 is positioned between the path of the disk 1281 and the plate 1214, for example, and so that the end of the casing 944 is still within the seal formed by the packings 1227 and 1228. At this point the withdrawal movement of the casing 944 is interrupted. The wheel 1291 is then rotated so as to move the valve into closed position, and so as to press the disks 1281 and 1282 tightly against the faces 1278 and 1279. This maintains the vacuum-tightness of the tank and the casing 944 is then withdrawn the remaining part of the distance, permitting atmospheric air to enter the pipe 1209 up to but not beyond the disk 1281.

When a new filament 931 is to be installed, its associated casing 944 is carefully introduced through the seal formed by the washers 1227 and 1228 and the filament is stopped just short of the disk 1281. The mechanism is permitted to remain in such position until any contained atmospheric air between the seals 1227 and 1228 on the one hand and the disk 1281 on the other is exhausted at least to an equivalent pressure with the tank 711. Thereupon the hand wheel 1291 is manipulated to free the disks 1281 and 1282 by slight axial movement from their seating faces 1278 and 1279, and then to withdraw such released disks from their blocking position in the path of the casing 944 into a retracted position, as shown in Figure 36. Thereupon the casing 944 is thrust axially forward into its final position, as illustrated in the drawing. The block 963 is then in abutment with the plate 1239 and is united therewith by the repositioning and tightening of the nuts 1244.

When current is supplied through the tubes 942 and 943 to the filament 931, the filament is heated to an elevated temperature sufficient to cause the emission of electrons. A large number of the emitted electrons are made to pass from the filament 931 downwardly in the vicinity of the arc chamber 921 and parallel to the direction of the magnetic flux to an anode 1301, preferably comprised of a metal plate secured by fastenings 1302 to the lower portion of the plate 813 so that the anode 1301 is maintained at the same electrical potential as the plate 813. This is a voltage somewhat less than the voltage at which the filament 931 is maintained. A representative value for this voltage difference when the arc is about 12 inches long, as shown in Figure 31, is of the order of 100 volts.

Since the magnetic field is considered by some to have a confining influence upon the electrons emitted from the filament 931, it is not always deemed necessary, in order to have a defined shape of electronic column, to resort to additional defining means. Yet, it is often considered helpful mechanically to confine the shape of the electronic stream leaving the filament or cathode and flowing to the anode 1301. More particularly, it is very desirable to restrict the return flow of charged particles traveling in the direction of or toward the filament. That is to say, electrons originally issuing from the filament tend subsequently to produce a return bombardment of the filament wire 931 by positive particles produced either by collision in the vicinity of the arc chamber or by secondary emission from the anode 1301 or adjacent parts. This action, if sufficiently great, is deleterious.

Consequently, with two aims in view: firstly, to produce a predetermined cross-sectional shape or outline of the electron stream flowing toward the anode, and secondly, to preclude undue bombardment of the filament 931 by returning positive particles, I preferably secure to the top of the plate 813 a confining plate 1303, preferably fabricated of a suitable metal and secured to the plate 813 by suitable fastenings 1304. The plate overlies a portion of the arc chamber 921 and in the desired location is pierced to provide an aperture 1306 of the desired dimensions and contour so that the electron stream passing from the filament 931 through the aperture 1306 has the predetermined or desired cross-sectional configuration.

In many instances the aperture 1306 is made smaller than the projected or facing area of the filament 931 and, in any event, permits the passage in a downward direction from the filament toward the anode of only certain specially located electrons, and likewise intercepts all except a few secondary particles traveling upwardly in a direction from the anode toward the cathode.

By the provision of this mechanism, there is afforded a means for establishing and maintaining a relatively long arc or stream of electrons substantially between the confining plate 1303 and the anode 1301. The stream of electrons or arc has a special configuration and size, being substantially uniform in cross section throughout the major portion of its length. This may be partly or largely because of the effect of the magnetic field.

The stream of electrons follows a path in a vertical direction, intersecting the path or paths of numerous particles or molecules flowing through the apertures 927 and into the arc chamber 921. Since the paths of the electrons and of the particles intersect, there results a large number of collisions between the electrons and the particles and, as a consequence, some of the particles lose one or more of the electrons normally in their surrounding envelope and become at least singly ionized and consequently electrically and magnetically responsive.

It is of great benefit to produce as many collisions as possible, since to do so results in a more favorable or more prolific production of ions, and for that reason I provide means for particularly confining and directing the flow of molecules in somewhat the same way as the flow of electrons is defined by the plate 1303. For this reason, I provide arc defining plates 1307 and 1308, respectively, disposed in the same plane, extending for substantially the entire height of the arc chamber 921, and at their closest approach providing a slot 1309 of a minimum predetermined width. Furthermore, in accordance with my invention, I confine the flow through and beyond the slots and provide an aperture of a favorable cross-sectional contour by supplementing the plates 1307 and 1308 with adjacent overlying confining plates 1311 and 1312, respectively, having their downstream edges beveled. The confining plates are displaceably mounted to slide with respect to the plates 1307 and 1308, so that by individually adjusting the plates 1311 and 1312 the approximate amount of divergence of the slot 1309 can be controlled.

It is desired that the principal defining plates 1307 and 1308, and also the auxiliary confining plates 1311 and 1312, be mutually adjustable, preferably with a simultaneous motion transversely of the arc mechanism, so that the width of the slot 1309 can be externally controlled. For this reason, each of the pairs of plates 1307 and 1311, as well as 1308 and 1312, is mounted on the adjacent one of a pair of quite similar blocks generally designated 1313 and 1314. To the forward inner edge of the block 1313 the plates 1307 and 1311 are fastened. On its forward face, the block is stepped and is contoured to have an inner face 1316 defining a portion of the arc chamber 921. In addition, the block 1313 has a curved or arcuate rear surface 1317 closely overlying a correspondingly curved forward face 1318 defining the adjacent forward portion of the plate 813. The curved surfaces 1317 and 1318 are concentric about an axis 1319 (Figure 29) located on the center line of the source block mechanism 812 and to the rear thereof. The pair of plates 1308 and 1312 is mounted on the block 1314 contoured along one edge 1321 partially to define the arc chamber 921 and contoured to afford a curved rear surface 1322 overlying the curved forward face 1318 of the plate 813, and correspondingly arcuate about the axis 1319.

Means are provided for mounting and moving the blocks 1313 and 1314 and their attached plates. Directly secured to the block 1313 is a side arm 1323 (Figure 32) extending for substantially the full length of the source block mechanism 812 and adjacent its rear end connected to a hinge lever 1324. This is provided at its inboard end with an apertured bearing rotatably encompassing a hinge rod 1326 concentric with the axis 1319, so that the side support arm 1323 and the hinge lever 1324 are movable as a unit about the axis 1319 as a center to displace the plates 1307 and 1311 in an arcuate path. This may be considered, for small amplitudes of motion, to be approximately a transverse straight path.

In addition to the top side arm 1323, the block 1313 is also supported by a central side arm 1327 terminating in a hinge lever 1328 having a boss pivoting around the hinge rod 1326, and by a lower side arm 1329 provided with a hinge lever 1331 ending in a terminal boss likewise pivoting around the rod 1326. The block 1313 and its appurtenances is thus well supported and guided in its swinging movement about the axis 1319 as a center.

In a somewhat similar fashion, the block 1314 is supported and swung in an arc about the axis 1319 by reason of the fact that at intervals along its length the block is secured to a top support arm 1332 (Figure 32), a central support arm 1333, and a bottom support arm 1334, all extending longitudinally of the source block mechanism and adjacent their rear ends being inturned and provided with hinge levers 1336, 1337 and 1338, respectively. Each of the hinge levers ends in a boss that is centrally apertured to rotate freely about the rod 1326 as a supporting pin. The bosses for the various hinge levers and side arms are interspersed. With this mounting, the block 1314 is free to swing in a predetermined arcuate path about the axis 1319 as a center, so that the plates 1308 and 1312 likewise swing about such center. For small amplitudes of motion, the plates can be considered as traveling transversely in a straight line.

In order to position and support the rod 1326 and the various members rotatably mounted upon it, I provide a plurality of substantially identical pillow blocks 1341, 1342 and 1343, respectively. Each of the blocks is pierced by an aperture receiving the rod 1326 with a relatively tight fit, and each of them is also possessed of a pair of oppositely directed ears 1344 (Figure 30). Through the ears pass a plurality of fastening screws 1345, engaged with the adjacent one of the plates 854 and 856, thus serving not only to support the hinge rod 1326 and its attendant structure upon the furnace block 853, but also serving as a tie for assisting in maintaining the plates 854 and 856 in closely abutted relationship.

Although the mechanism supported by the rod 1326 is freely swingable about the axis 1319 as a center, and although the arc defining plates 1307 and 1308 might be individually adjusted and might be individually displaced in different transverse amounts, I primarily prefer, in the present instance, to displace the two plates 1307 and 1308 in equal amounts on opposite sides of the center of the source mechanism and to displace such plates simultaneously. Furthermore, this displacement is preferably made variable during the course of operation of the structure, and while it is possible to preset or initially adjust the plates so that an arc slot 1309 of predetermined transverse dimension is initially established and is subsequently maintained, I prefer to arrange matters so that this transverse distance can be varied within rather wide limits at the will of the operator and during the functioning of the device.

I consequently provide the central side arm 1327, substantially midway between its ends, with an enlarged boss 1346 (Figure 30) formed with a vertically extending circular, cylindrical passageway serving as a seat for a relatively rotatable plug 1347. The plug is transversely pierced by a threaded bore engaged with the threaded end 1348 (Figure 28) of a transverse screw shaft 1349. To accommodate the screw shaft 1349 in several angularly displaced positions thereof with respect to the arm 1327, the boss 1346 is relieved and is provided with transversely elongated openings 1350.

The shaft 1349 is equipped with an enlargement 1351 (Figure 28) in the form of a collar pinned on the shaft and freely rotatable between the confining side walls of the furnace plate 854 on the one hand, and of an attached cup 1352 forming the other restraining wall and removably secured to the plate 854. Except for the restraint transversely or axially of the collar 1351 imposed by the plate 854 and the cup 1352, the shaft 1349 is not restrained. It continues through the furnace block 853, in the center thereof being loosely surrounded by an enclosing tube 1353, and emerges on the far side of the furnace block. The shaft then passes through a plug 1354 freely journaled in an enlarged boss 1355 (Figure 29) formed integrally with the side support arm 1333, and relieved adjacent the portions pierced by the through-shaft 1349. There is thus permitted a relative swinging movement of the threaded shaft with respect to the central support arm, accomplished by relative rotation between the plug 1354 and the arm 1333.

The shaft 1349, where it engages the plugs 1347 and 1354, is threaded in opposite directions; that is, one of the threads is left-hand and the other thread is right-hand. Consequently, rotation of the shaft 1349 produces opposite displacement of the supporting arms 1327 and 1333, these displacements being established at equal amounts on opposite sides of the center line, due to the transverse shaft-restraining action of the collar 1351 and its adjacent parts.

In order to impart the requisite rotational motion to the threaded shaft 1349, that shaft is provided with a worm wheel 1361 having a collar 1362 (Figure 32) fastened by a pin 1363 to the threaded shaft 1349 and engaged with a worm 1364 provided with a collar 1366 fastened by a pin 1367 to an operating shaft 1368. The worm 1364 is confined against axial translation but is supported for rotary movement in conjunction with the shaft 1368 by a yoke 1369 fastened to the furnace plate 856 by a plurality of fastening devices 1371 and locating pins 1372. The yoke is provided with a pair of arms 1373 and 1374 pierced to form journals for the shaft 1368 and closely abutted against the end faces of the worm 1364 and of the collar 1366.

The operating shaft 1368 extends from the yoke 1369 toward the face plate 712, but since the shaft 1368, in addition to its rotation relative to the furnace block 853, must partake of the various rocking motions of the furnace block about the axis 757 and the axis 807, it is provided with means for transmitting rotary motion and for permitting lateral and endwise displacement. This mechanism includes a pair of universal joints generally designated 1376 and 1377, respectively. Although each one of these joints introduces a slight variation in angular velocity when the adjusted mechanism is not in its median or undisplaced position, the joints are arranged so that the variation introduced by one is exactly offset and compensated for by variation introduced in the opposite direction by the other joint.

In this fashion, and also because of the provision of the several worm and screw connections, it is possible exteriorly of the tank to make fine, accurate adjustments of the parts without error due to backlash and without error due to adjusting orientation of the source block. Since each of the universal joints is identical with the other, a description of one of them is equally applicable to the other.

As an example, the universal joint 1376 includes a spider 1378 having a pair of diametrically opposed arms, each merging with a hub 1379 fastened to the shaft 1368 by a pin 1381. Both of the arms of the spider 1378 are connected to a flexible, metallic disk 1382 by through bolts 1383 and interposed resilient washers 1384, so that the spider 1378 is attached to the flexible disk 1382 at two diametrally opposite points.

At intermediate points on the disk 1382, that is to say, at points 90° from the points of attachment of the arms of the spider 1378, there are attached the arms of a spider 1386 by means of through bolts 1387 and interposed flexible washers 1388. The arms of the spider 1386 merge with a hub 1389 fastened by a pin 1391 to an intermediate tumbler shaft 1392, serving as a connection between the universal joint 1376 and the universal joint 1377. Thus, rotary motion of the tumbler shaft 1392 is substantially identical with rotary motion of the shaft 1368. Further, some axial motion is permitted.

The rotation is also substantially identical with rotary motion of a drive shaft 1393 secured to the universal joint 1377 and extending through the face plate 712 to a manipulating knob 1394 provided at the terminus of the shaft 1393 and disposed at a convenient exterior point for manipulation by the machine operator. Where it passes through the face plate 712, the shaft 1393 is provided with a vacuum seal to permit the desired rotational motion of the shaft 1393 while preventing undue leakage of atmospheric air into the tank.

Axial displacement of the shaft 1393 is resisted in one direction by a collar 1396 pinned to the shaft and abutting the inner surface of the face plate 712. Exteriorly of the face plate there is provided a mounting 1397 to resist axial displacement of the shaft 1393 in the other direction and to receive a counting mechanism (not shown), so that each rotation of the shaft 1393 is indicated by a counting register. By the provision of the counting or registering mechanism there is afforded a means for indicating to the operator the number of rotations accomplished by the shaft 1393 and, correspondingly, by virtue of the connecting linkage, the relative amount that the plates 1307 and 1308 have been moved apart or brought together, so that the width of the slot 1309 can readily be exteriorly estimated or determined in any of their positions of adjustment. By the provision of the mechanism for rendering the plates 1307 and 1308 adjustable, there is afforded a way of regulating the area or size of opening releasing material to flow from the arc chamber, and there is consequently afforded a means for affecting the quantity of material discharged from the source mechanism.

I preferably provide a further mechanism, in the form of supplementary plates, for defining the width and contour of the channel occupied by the material flowing from or leaving the arc chamber and in the immediate vicinity of the arc. This additional mechanism is made to depend generally for its adjustment upon the adjustment of the plates 1307 and 1308 and, normally, is intended to be adjusted simultaneously and coincidentally therewith, as an incident of the adjustment of such plates, but, as an extra refinement, there is afforded a means for individual adjustment of the additional defining plates.

In the preferred embodiment of this structure, there is provided a pair of identical plates 1401 and 1402 (Figure 30). The defining plate 1401, for example, is pinned in a slotted holder 1403, channeled to seat against a strap 1404 extending in a generally vertical direction adjacent and parallel to the block 1313. The strap is supported by a pair of rearwardly extending arms 1406 and 1407 (Figure 32), respectively, both of them at their opposite ends being secured to a vertically extending C-shaped tie bar 1408 (Figure 32). To the tie bar 1408 are secured upper and lower radial arms 1409 and 1411, respectively, both being flattened at one end and pierced by cylindrical apertures constituting journals for the arms on the hinge rod 1326.

In a similar fashion, the plate 1402 is pinned in a slotted vertical holder 1412, channeled to interfit with a vertically extending strap 1413 mounted on a pair of arms 1414 and 1416 (Figure 32), respectively, extending longitudinally of the source block mechanism 812, and at their rearward ends secured to a vertical, C-shaped tie bar 1417. To the tie bar 1417 are fastened upper and lower radial arms 1418 and 1419, respectively, both being flattened at one end to interfit with the arms 1409 and 1411, and being pierced by circular, cylindrical apertures forming a bearing connection with the hinge rod 1326. Suitable spacers 1421 are also mounted on the rod 1326.

The mechanism, as thus far described, affords free arcuate swinging of the plates 1401 and 1402 about the axis 1319 as a center, and to control such swinging motion, I provide substantially identical independent mechanisms, one in connection with each of the plates 1401 and 1402.

For the plate 1402 there is mounted on the central side arm 1333 an extension block 1422 (Figures 28, 29, 30 and 32), provided with a longitudinally extending, transversely widened aperture 1423, and an intersecting, vertical cylindrical bore forming a journal for a plug 1424. Extending into and rotatably engaging the plug 1424 is a rotatable adjusting shaft 1425 having a peripheral groove 1426. Into this groove extends the reduced lower end of a locking screw 1427, held by a locking nut 1428 so that the shaft 1425 is freely rotatable and laterally swingable with respect to the block 1422.

Also, the arrangement is such that axial displacement of the shaft 1425 produces a corresponding swinging movement of the block 1422 and its associated mechanism. Since it is desired that such swinging motion be with respect to the block 1314, the shaft 1425 intermediate its ends is provided with a threaded portion 1429 engaging a comparably threaded aperture formed in a plug 1430, freely journaled to turn vertically in a block 1431 centrally secured to the C-shaped tie bar 1417. The block 1431 and the tie bar are relieved to accommodate the rotary and swinging motions of the piercing adjusting shaft 1425. Upon rotation of the shaft 1425, the block 1422 and the block 1431 either approach toward or retreat from each other and there is correspondingly produced a relative motion of the plate 1402 with respect to the plate 1312.

To produce the desired rotary motion, the shaft 1425 is connected by a collar 1432 to a universal joint 1433, in all respects comparable to the universal joint 1376 and joined to a tumbler shaft 1434. An exactly similar universal joint 1435 is connected not only to the tumbler shaft 1434, but is also fastened to an operating shaft 1436. This latter shaft passes through the face plate 712 whereat it is provided with a vacuum seal 1437 to permit the desired rotation of the shaft and to preclude unnecessary or undesired leakage of atmospheric air into the interior of the tank.

The exterior extremity of the operating shaft is provided not only with a manipulating knob 1438, but likewise is designed to cooperate with a counter mechanism (not shown) that can be mounted on a mounting disk 1439, so that upon rotation in either direction of the operating knob 1438 the counting register is comparably actuated to give an indication to the operator of the relative position of the operating shaft 1436 and, correspondingly, of the shaft 1425, so that the relative position of the blocks 1422 and 1431, as well as the relative position of the plates 1402 and 1312, is afforded. The universal joints 1433 and 1435 are sufficiently flexible within the relatively limited range of motion of the plates 1312 and 1402 so that these plates can be moved in unison by operation of the knob 1394, or so that the plate 1402 can be individually adjusted by manipulation of the knob 1438.

In order that the plate 1401 can be similarly adjusted, the arm 1327 is provided with an extended block 1440, having a vertically rotatable plug 1441 journaled therein. Into the upper portion of the plug is threaded a screw 1442 held in adjusted position by a lock nut 1443. The lower end of the screw is reduced in diameter and depends into a longitudinally extending, transversely enlarged passageway 1444 formed in the plug and in the block 1441. Extending into the passageway 1444 is an operating shaft 1446, adjacent one extremity being provided with a peripheral groove engaged by the reduced lower end of the screw 1442, so that the shaft 1446 is capable of rotation and of lateral displacement, but is restrained against axial motion with respect to the block 1440.

The shaft 1446 is formed with threads 1447 engaging cooperating threads formed on the interior of a plug 1448 freely journaled in a block 1449 centrally secured to the C-shaped tie bar 1408. The shaft 1446 extends through the block 1440 and the block 1449 and moves the block 1449 and all appurtenant mechanism with respect to the block 1440 and the mechanism with which it is kinetically integral.

The shaft 1446, after passing through the tie bar 1408, is connected to a universal joint 1451, substantially identical in construction with the universal joint 1376. A similar joint 1452 is connected to the joint 1451 through the medium of a tumbler shaft 1453 and is also connected to an operating shaft 1454 passing through the face plate 712. At its outermost extremity, the shaft 1454 is provided with an actuating knob 1456. There is also provided a vacuum seal where the shaft 1454 passes through the face plate 712, and a mounting 1457 for a counting register to indicate the number of turns of the knob 1456 from any previously identified position.

When the knob 1456 is rotated in either direction, the shaft 1446 is comparably rotated through the medium of the universal joints 1451 and 1452 and the tumbler shaft 1453. The shaft 1446 moves the block 1449 with respect to the block 1440 so that the arms 1406 and 1407 connected to and supporting the plate 1401 are given a relative motion with respect to the arm 1327 and its associated plate 1311.

In this fashion, while the plates 1401 and 1402 are normally moved toward each other and apart along with the plates 1311 and 1312 whenever the knob 1394 is rotated, it is nevertheless possible, in any adjusted position of the knob 1394, either individually or in unison to rotate the knobs 1438 and 1456, thereby correspondingly to produce either separate or conjoint motion of the plates 1401 and 1402, either relative to each other merely, or also relative to the plates 1311 and 1312. Consequently, by the selective manipulation of the knobs 1394, 1438 and 1456 the operator can produce the desired configuration of the terminal or outermost portion of the arc chamber 647 and can control to a nicety the boundary conditions existing in the arc chamber and the conditions governing the efflux of molecules and ions through the slot 1309 and between the plates 1401 and 1402.

The effect of collisions between the electrons flowing in a column between the filament 931 and the anode 1301 and the particles emanating from the arc chamber 921 is to convert many of the electrically and magnetically inert particles into electrically and magnetically responsive or controllable ions.

In accordance with my invention, I preferably impose upon the ions an electrical potential difference of such a great magnitude, and consequently accelerate the ions so much with respect to their original thermal energies, that the difference in energy content of the energized ions is relatively small and of such minor amount as to be practically negligible. As a practical example, the ions are accelerated by being made to respond to or fall through a potential difference four thousand or more times the original thermal energy spread. As an example, a factor of five thousand indicates an accelerating potential difference of approximately 25,000 volts. All of the accelerated ions are possessed of energies differing only 5 volts or so from 25,000 volts. The energy difference from ion to ion under this accelerated condition is but a few hundredths of one per cent. Thus, all of the accelerated ions can, with substantial accuracy, be considered to be possessed of the same energy or velocity; namely, that corresponding to a fall through a potential drop of 25,000 volts.

The entire furnace block 853, as well as the anode 1301, the face plate 712, and the tank 711, are at the same electrical potential. Normally, this is the potential of the electrical ground and gives rise to the designation of this electrical arrangement of the source as a grounded or "cold" source. To establish a negative potential difference of approximately 25,000 volts from the grounded potential of the source block and anode, I preferably provide an accelerator mechanism (Figures 30, and 41 to 50), generally designated 1461, mechanically mounted on the face plate 712 and removable, along with the source, from the tank 711. But the accelerator mechanism is electrically insulated from the tank and from the source, so that it readily can be maintained at a voltage different from that of the tank or source.

The accelerator particularly includes a pair of accelerating plates 1462 and 1463, respectively, equivalently disposed in front of the slot 1309, in approximate symmetry with and on opposite sides of the center line or axis 757 of the source. Each of the plates 1462 and 1463 comprises an elongated strip of carbon or comparable material, arranged in a generally vertical direction with the longitudinal dimension of the piece parallel to the magnetic flux direction. The vertical extent of each of the plates 1462 and 1463 is approximately the same as the vertical extent of the defining plates 1401 and 1402. The plates 1462 and 1463 diverge from the center line of the structure as they are spaced farther from the source, and are mounted in this position by means of fastening bolts and nuts 1464 passing through slots 1466 in the plates and also being seated in suitably formed apertures 1467 piercing each one of a pair of support members 1468 and 1469, respectively.

In accordance with my invention, I prefer that the plates 1462 and 1463 be made adjustable not only upon installation by virtue of the slotted connection of the plates with their fastenings 1464, but also to be spread apart laterally during operation in order to provide a greater space 1471 between the leading or upstream edges of the plates 1462 and 1463, and also to be movable during operation vertically so that the edges of the plates can be maintained in precise alignment with the magnetic flux and with the plates 1401 and 1402, or so that the parts can be maintained out of parallelism at the desired divergence. It is also considered advisable generally to separate the accelerating plates 1462 and 1463 in unison or together, although some individual positioning is of benefit.

Because of these considerations, there is provided a rather generally adjustable or maneuverable mounting structure for the supporting members 1468 and 1469, and since the arrangement is precisely the same for one of the plates 1462 as it is for the other plate 1463, except for a reversal of symmetry, a description of but one symmetrical half of the mounting structure applies as well to the arrangement of the other half of the mounting structure.

The plate 1463, together with its supporting member 1469, is mounted adjacent one end of a transverse frame 1472, fabricated of a plurality of angles, straps and comparable shapes to afford a generally rectangular supporting grid of considerable lateral extent and including a pair of laterally spaced upright angles 1473 and 1474. Fastened to each of the angles by appropriate fastening bolts 1476 and securing nuts 1477, as well as spacers 1478, is one end of a pair of leaf springs 1479 and 1481. Thus, each of the frames 1472 is connected to four flexible leaf springs arranged with each pair in vertical alignment and the corresponding members of both pairs in horizontal alignment.

The vertical dimension of each of the leaf springs is considerable in comparison with the thickness of the spring material, so that these springs are vertically stiff and afford great rigidity of the frames 1472 in the direction of the magnetic field, but because of the thinness of the springs transversely, afford virtually complete transverse freedom of motion of the supporting frame. While the fastened extremities of the leaf springs necessarily move approximately in arcuate paths, still the total amplitude of transverse motion of the supporting frames is of such a small extent that, practically, the frames and their supported accelerator plates 1462 and 1463 are moved virtually in straight lines transversely of the structure.

The springs 1479 and 1481 at their opposite extremities are connected by suitable fastenings 1482, including appropriate nuts, bolts and spacers, to the projecting, trailing margins 1483 of vertical struts 1484 and 1486, respectively, spanning the distance between a top rail 1487 and a parallel bottom rail 1488. Each of the rails is in effect a continuous bar, but in fabrication is provided with a slotted central insert 1489 to afford greater clearance for the ion beam. The rails are included in a mounting frame, generally designated 1490, incorporating side angles 1491 and 1492 connecting the top and bottom rails 1487 and 1488 and joined thereto by corner gussets 1493 so that a rigid supporting framework is afforded for the ends of the struts 1484 and 1486 supporting the springs 1479 and 1481. Rigidity is added to the frame 1490 and electric shields for the beam are provided by centrally extended plates 1494 and 1495 secured to the top rail 1487 and to the bottom rail 1488.

Since all of the leaf springs are similarly secured to the framework 1490, considered as a rigid mounting, the plates 1462 and 1463 can, in effect, be moved toward and away from each other in approximately straight paths in transverse directions relative to the mounting frame. Means are provided for suitably supporting the framework 1490 in the desired location and in such a way that the general plane of the frame can be set at any desired angle within limits.

For this reason, to each of the upright side angles 1491 and 1492 is fastened a joint frame 1496, substantially U-shaped in plan and provided with a pair of bosses 1497 and 1498, respectively. These are mounted to turn upon the projecting portions of a hinge tube 1499 having its outward end covered by a cap 1500 secured to the boss 1497 by a plurality of fastening screws 1501. The hinge tube 1499 is held firmly in position to serve as a pivot for swinging about an axis 1502 by a setscrew 1503. This passes into a radial bore 1504 in the tube 1499 and is likewise threaded into the appropriate one of a pair of forks 1506 and 1507 included in a mounting body 1508. In this way, the tube 1499 is firmly anchored in position and the frame 1496 is readily pivoted with respect thereto about the axis 1502. Since both ends of the frame 1490 are similarly mounted, there is afforded a symmetrical, swinging support for the accelerator plates 1462 and 1463.

Each of the mounting bodies 1508 is formed with an extended, circular, cylindrical boss 1509, turned to a tight fit within the adjacent one of a pair of supporting tubes 1511 and 1512, each firmly secured to its mounting body 1508. These tubes extend through the apertured end of the tank 711 and through the associated one of a pair of enlarged apertures 1513 in the face plate 712. Each tube is mounted on the face plate by a train of intermediate adjusting and orienting mechanism likewise effective to afford electrical insulation between the supporting tube 1511, also intended to serve as an electric conductor, and the face plate 712 and the associated tank structure.

The connection for the tube 1511 on the face plate 712 (Figure 44) is preferably inclusive of a ceramic insulator 1514, similar in structure and mounting to the ceramic insulator 1031, previously described. The insulator 1514 is terminated at and secured to a mounting plate 1529 having a central aperture 1531 which is approximately the same diameter as the interior bore of the insulator 1514 and as the aperture 1513 of the face plate 712.

To afford a universally orientable mounting, the plate 1529 serves as a support for four evenly spaced studs 1543, each being firmly anchored in position by a lock nut 1544. The projecting portion of each of the studs is loosely received in the associated one of a plurality of enlarged apertures 1546 piercing an orienting plate 1547. In its median position, the orienting plate is disposed substantitally parallel to the plate 1529 but it is adapted to be moved out of parallelism with the plate 1529, although maintaining approximately the same central axis as such plate. This motion is accomplished by virtue of the provision of a number of pairs of adjusting nuts 1548 and 1549, respectively, one of each pair being located at each side of the plate 1547 and in engagement with one of the studs 1543. By individually advancing and retracting the nuts 1548 and 1549 on each of the individual studs 1543, the angle between the plate 1547 and the plate 1529 can be adjusted within the desired limitation to any selected value, either as measured in a vertical plane or as measured in a horizontal plane, or in any combination of horizontal and vertical.

The inclination or position of the plate 1547 is imparted to a supporting sleeve 1551, inserted into an aperture 1552 piercing the plate 1547 and preferably fastened thereto by any suitable means such as solder. By reason of this connection, the axis of the sleeve 1551 is inclined according to the inclination of the plate 1547. The motion of the plate 1547 with respect to the plate 1529 is accommodated without danger of air leakage or loss of vacuum tightness by the provision of a flexible metallic bellows 1553 surrounding the sleeve 1551, at one end secured, as by hard soldering, to the plate 1529, and at the other end similarly secured to the plate 1547.

Within the sleeve 1551, at rather widely spaced positions, is disposed a pair of rings 1554 and 1556, respectively, axially slidable within the sleeve 1551 and firmly secured to the exterior of the tube 1511, so that all of the weight borne by the tube 1511 is transmitted through the rings 1554 and 1556 to the sleeve 1551, and so that the angular orientation of the sleeve 1551 is imparted to the tube 1511. Because of the relative sliding motion between the tube 1511 and the sleeve 1551, duplicated in the other half of the mechanism, the accelerator mechanism 1461 can be spaced various, adjusted amounts from the arc mechanism.

Since there are duplicate devices of this type provided at the opposite sides of the accelerator mechanism, the frame 1490 is appropriately supported at any desired elevation within limits, and can be transversely angled within limits to permit the desired orientation of the accelerator plates 1462 and 1463 with regard to the plates 1401 and 1402, all of this orientation and adjustment being effectuated by adjustment of the nuts 1548 and 1549.

Advantage is taken of the sliding connection between the supporting rings 1554 and 1556 and the sleeve 1551. The tube 1511 is extended beyond the ring 1554 and to afford a vacuum-tight connection, is enlarged to provide a radial flange 1557, having in its outer face a pair of packing rings 1558 and 1559, of rubber or like material, adapted to abut against a disk 1561 secured to and forming part of a collar 1563. In order to urge the disk 1561 against the packings 1558 and 1559, the supporting tube 1511 adjacent its outer extremity is provided with peripheral threads 1564, in engagement with which is a ring 1566. This ring carries a plurality of machine screws 1567, threadedly engaging the ring 1566 and adapted to abut the disk 1561 in special depressions 1568 formed therein for such purpose.

For assembly of the structure, the ring 1566 is engaged with the threads 1564 and is turned upon the tube 1511 until a reasonably close approach to the disk 1561 is made. The ring 1566 is stopped in such a position of rotation that the machine screws 1567 are in axial alignment with their respective disk depressions 1568. In this position of the parts the machine screws 1567 are tightened, thereby urging the disk 1561 and the flange 1557 into close abutment, with the packing rings 1558 and 1559 between them being deformed to effectuate a suitable vacuum-tight seal. When the machine screws 1567 are well retracted from the disk 1561 the ring 1566 can be unscrewed and completely detached from the tube 1511 for dismounting of the structure. After the machine screws 1567 have been loosened and the ring 1566 has been detached, the tube 1511 can be withdrawn from the position shown in Figure 44 and the tank interior portion of the structure detached from the tank exterior part of the structure.

The relative sliding motion provided for between the tube 1511 and the sleeve 1551 is effectuated by affording an engagement between the threaded collar 1563 secured to the disk 1561 and an internally threaded annulus 1569 lying against antifriction bearings 1571, located by suitable sockets 1572 in a plate 1573. The plate 1573 serves to confine the annulus 1569 against axial translation but not against rotation, the confinement being in two directions, by virtue not only of the abutment between the annulus 1569 and the bearings 1571, but also by the provision of approximately L-shaped confining fingers 1574, fastened to the plate 1573 by suitable machine screws 1576. The fingers 1574 are provided with inturned lips 1577 overlying the periphery of a worm wheel 1578 fastened upon and in effect integral with the annulus 1569.

With this mechanism, and upon rotation of the worm wheel 1578, the annulus 1569 revolves. Being constrained against axial translation, and because of its threaded connection with the collar 1563, the rotating annulus 1569 causes translation axially of the collar and all of the parts fastened to it, including the tube 1511, all with respect to the position of the plate 1573.

To maintain the plate 1573 in a given location or spacing with respect to the orienting plate 1547, there are threaded into the plate 1573 at evenly spaced points adjacent its periphery a plurality of studs 1579 locked in location by jam nuts 1581 abutting the plate 1573. The studs 1579 pass loosely through apertures in the plate 1547 and are fixed by comparable nuts 1582 and 1583, respectively, threaded on the studs and turned tightly against the orienting plate. Consequently, an appropriate axial location of the plate 1573 with respect to the plate 1547 is afforded. While some slight variation in position of the plates 1547 and 1573 with respect to each other is possible, and such plates can be slightly non-parallel, it is preferred that only very minor adjustments be made in their relative position, and that normally the plates 1547 and 1573 be fixed in position and substantially parallel.

But while these plates are relatively unmoved in the usual case, the collar 1563 moves axially with respect to the orienting plate 1547 and a vacuum-tight connection therebetween is maintained by providing a guiding and mounting flange 1584 tightly fastened to and extending radially from the inner end of the threaded collar 1563 and freely slidable upon the exterior of the supporting sleeve 1551. A metallic bellows 1586 at one end is firmly joined to the flange 1584, for example by hard solder or other suitable means, and at its opposite end is similarly secured to the face of the plate 1547. Thus, while the bellows 1553 accomodates angular variation between the orienting plates 1547 and the mounting plate 1529, the bellows 1586 in general accommodates axial motion between the plate 1547, the plate 1573, the tube 1511 and associated parts.

The axial motion of the supporting tube 1511 is produced by rotation of the worm wheel 1578 and, preferably, the duplicate mechanism for moving the other supporting tube 1512 of the accelerator structure is operated in unison therewith. Thus, as shown in Figure 42, in mesh with the right-hand worm wheel 1578 is a worm 1587, while in mesh with the left-hand worm wheel 1578 associated with the tube 1512 is a worm 1588. Each of these worm wheels is mounted between the forks 1589 and 1591 of a supporting bracket 1592 secured on the subjacent plate 1573. The worm 1588 is fastened on a drive shaft 1593, in turn connected to a universal joint 1594 fastened to an intermediate shaft 1596 spanning most of the space between the adjusting devices. The shaft 1596 is connected to a universal joint 1597 joined to a drive shaft 1598 fastened to the worm 1587 and at its extremity being provided with a manipulating knob 1599.

The worms 1587 and 1588 are rotated in unison, thereby rotating simultaneously the worm wheels 1578 of the two adjusting mechanisms and simultaneously advancing or retracting in comparable amounts the supporting tubes 1511 and 1512, so that the mounting bodies 1508 are likewise advanced or retracted in unison and the axis 1502 in effect is moved toward or away from the source mechanism. The motion of the mounting bodies 1508 in turn advances or retracts the mounting frame 1490, so that the accelerator plates 1462 and 1463 are bodily moved closer to or farther away from the defining plates 1401 and 1402.

While manipulation of the knob 1599 is effective to produce a variation in the horizontal distance between the plates 1401 and 1402 and the accelerator plates 1462 and 1463, I likewise provide, in addition to this distance variation, means controllable from the exterior of the mechanism for varying the vertical angle between these pairs of plates. Like the distance varying mechanism, the angle varying mechanism is duplicated at opposite sides of the structure (Figure 41), so that a description of the mechanism at one side is equally applicable to the mechanism at the other side.

The mounting frame 1490, being connected to the joint frames 1496, pivotally mounted on the hinge tube 1499 to rock about the axis 1502, is maintained in position or is tilted or inclined by a pair of mechanisms, one at each side of the center. Each mechanism (Figures 41, 44 and 49) includes a beam 1601 fastened to one of the side angles 1491 and 1492 of the frame 1499 and braced by a strut 1602 extending between the frame 1940 and the outer end of the beam 1601. At the extremity of the beam 1601 (Figure 49) there is mounted a sleeve 1603, fastened in place by a pivot pin 1604, so that the sleeve can rock slightly with respect to the beam 1601. The interior of the sleeve is threaded to engage the lower end of a screw shaft 1606 anchored in the sleeve 1603 by a lock collar 1607, so that in effect there is provided on the beam 1601 a pivoted, threaded extension.

The shaft 1606 is threaded into the central hub 1608 of a worm wheel 1609 confined between upper and lower fins 1611 and 1612, respectively, projecting from a mounting bracket 1613 secured to the adjacent one of the tubes 1511 and 1512. The bracket partially overlies a cutaway portion 1614 of the tube to provide an aperture 1616 affording communication between the interior and the exterior of the tube. The plate or bracket 1613 is held in place on the tube by fastenings 1617 and the worm wheel 1609 is axially confined by the fins 1611 and 1612, although it is rotatable on and with respect to the screw shaft 1606.

Upon rotation of the worm wheel, the screw shaft is moved in an upward direction or in a downward direction, depending upon the direction of worm wheel rotation, and is effective through the beam 1601 to rock the frame 1490 about the axis 1502. The pivot 1604 and some slight looseness of the threads or bending of the shaft 1606 compensate for the difference between rectilinear translation of the shaft 1606 requisite adjacent the worm wheel 1609 and the swinging or rotational movement of the frame 1490. To afford means to rotate the worm wheel 1609, the bracket 1613 is provided on the interior of the tube 1511 (Figure 44) with a pair of journal bosses 1618 and 1619, respectively, rotatably mounting a driving shaft 1621. To the shaft 1621 between the bearings 1618 and 1619 is secured a worm 1622, meshing with the worm wheel 1609.

The shaft 1621 extends longitudinally through the interior of the associated tube 1511 or 1512 and passes through an apertured end plate 1623 therein, permanently secured in place by hard solder or other suitable means. The shaft 1621 passes through the plate 1623 into and through a vacuum seal 1624, for example, of the type previously described, and emerges into the atmosphere. At its end, the shaft is provided with a manipulating knob 1625 in an appropriate location for adjustment by the user.

Since the mechanisms are in duplicate, it is feasible that the right-hand manipulating knob 1625 and the left-hand manipulating knob 1625 be simultaneously rotated by the operator and simultaneously to rotate the duplicate worms 1622 and, correspondingly, the worm wheels 1609, thus conjointly actuating the screw shafts 1606, the beams 1601, and applying substantially equivalent displacements to the opposite sides of the frame 1490. However, in the event this frame, due to heat or other causes, warps out of planar condition, or if for any reason it is desired to position one side of the frame without positioning the other, either one of the manipulating knobs 1625 can be rotated to the exclusion of the other, and a corresponding displacement of only the related portion of the frame 1490 can be produced.

In addition to the means for advancing and retracting the frame 1490, and in addition to the means for tilting the frame 1490 about the axis 1502, I provide means for moving the plates 1462 and 1463 toward each other or away from each other, and for moving these plates individually or, if desired, in unison. Each plate is provided with a similar mechanism and the description of the mechanism at the right hand in Figure 41, provided for the plate 1463, applies as well to the mechanism associated with the plate 1462.

The frame 1472 is readily movable laterally by flexure of the springs 1479 and 1481, although being restrained against other motions with respect to the frame 1490, so that all that is necessary to move the plate 1463 laterally or transversely is to leave the frame 1490 in any selected one of its adjusted positions and to shift the frame 1472 relative thereto. This is preferably accomplished by providing the frame 1472 with an angle bracket 1626, having an aperture through which an actuating rod 1627 is passed, the rod being rotatably anchored in adjusted position with respect to the angle bracket 1626 by a pair of jam nuts 1628 at one side of the bracket and a similar pair of jam nuts 1629 at the other side of the bracket. The rod 1627 is coincident or coaxial with the axis 1502, so that motion of the mounting frame 1490 and its associated mechanism about this axis is not effective upon the rod 1627, and so that the frame 1490 can be freely rocked about this axis without in any wise disturbing the position of the rod 1627, except possibly to impart a slight rotation thereto, although even this motion is preferably precluded by adjusting the jam nuts 1628 and 1629 to afford a rotatable connection between the angle bracket 1626 and the rod 1627.

The rod 1627 is integrally joined to a plug 1631 (Figure 48), slidably received in a central, cylindrical bore 1632 through the hinge tube 1499 and carrying a transverse pin 1633. The pin is formed with a central positioning groove 1634 accommodating the projecting, pointed end of a locking screw 1636 threaded into an axial bore in the plug 1631 and held in locked position by a lock nut 1637. The pin 1633 so held in the plug 1631 projects laterally therefrom through axial slots 1638 and 1639, respectively, cut in the sides of the tube 1499 so that the pin 1633 and, correspondingly, the plug 1631, are translatable along the axis 1502. The plug 1631 is not rotatable because of the sliding interengagement between the pin 1633 and the walls of the slots 1638 and 1639 in the tube 1499 held by the setscrew 1503 against rotation in the mounting body 1508.

The plug 1631 and the pin 1633 are axially translated with respect to the tube 1499 because the pin is received with a relatively snug fit in apertures in the cylindrical skirt 1641 of a traveling nut 1642 having a central, circular, cylindrical bore and bearing upon the exterior of the tube 1499. The nut 1642 is translatable upon the tube, but is precluded from relative rotation by the pin 1633. Exteriorly, the nut 1642 is in threaded engagement with internal threads 1643 formed in a surrounding sleeve 1644, having its ends in close abutment with the forks 1506 and 1507. Between its ends, the sleeve 1644 is provided with a pair of apertures 1646 and 1647, in one rotated position of the sleeve 1644 being in substantial alignment with the pin 1633.

In this position of the parts, if the fastenings 1501 are removed and the cap 1500 is detached, suitable tools can be engaged with the locking nut 1637 and the screw 1636, so that these can be retracted from engagement with the pin 1633. Then the pin can be driven out through one of the apertures 1646 or 1647, thereby disconnecting the mechanism. When the mechanism is connected, rotation of the enclosing sleeve 1644 is not accompanied by any axial translation, since the sleeve is confined to rotation only. The rotation is productive, because of the connection between the threads 1643 and the nut 1642, of a translation of the nut, and by means of the pin connection 1633, a comparable translation of the pin 1633, the rod 1627, and, therefore, of the frame 1472 and of the plate 1463.

Rotation of the enveloping sleeve 1644 is produced by a worm wheel 1648, fastened on to the periphery of the sleeve 1644 and engaged by a worm 1649. The worm is secured by a pin 1651 to a mounting shaft 1652, journaled adjacent one end in a boss 1653 forming part of the mounting body 1508. The worm is held against axial translation away from the boss 1653 and is maintained in adjusted position by a machine screw 1654. One end of the screw abuts the terminus of the shaft 1652. The screw then is threaded through a bridge plate 1656, spanning the space between the forks 1506 and 1507 and secured to the forks by fastening members 1657 and 1658, respectively.

The mounting shaft 1652 (Figure 44) passes entirely through the associated one of the pair of tubes 1511 and 1512 and extends through the end plate 1623. Therein the shaft extends through a vacuum seal 1659, preferably of the described type, and terminates in a manipulating knob 1661, conveniently disposed for operation. When the knob 1661 is rotated in either direction a corresponding rotation of the shaft 1652 ensues. The worm 1649 rotates the worm wheel 1648, thereby rotating the sleeve 1644. The plate 1463 is shifted toward or away from the center line of the structure, depending upon the direction of rotation of the knob 1661.

In an entirely comparable fashion, the left-hand knob 1661 is effective to manipulate the accelerator plate 1462. Although the manipulating knobs 1661 in the left-hand mechanism and in the right-hand mechanism can be individually operated to position the plates 1462 and 1463 individually, such knobs can be also readily operated in unison and in comparable amounts, so that the plates 1462 and 1463 can be simultaneously and symmetrically positioned with regard to the center line of the structure.

The particles of the polyisotope ionized in the arc chamber and accelerated by the influence of the accelerating mechanism, having fallen through a very substantial potential drop and having been accelerated to high energies or velocities, are likewise impelled by the influence of the magnetic field to follow paths substantially arcuate or semicircular in plan, although each particle is confined approximately to the horizontal plane the particular particle happened to occupy as it left the source. The source, in the present instance, is maintained approximately at ground potential and the accelerating device is at a potential very much lower than ground potential. Further, the tank 711 is not insulated from the source but is at the same potential.

Consequently, in accordance with my invention, there is provided a means for maintaining throughout the entire curved path of travel of the accelerated ions approximately the same potential conditions as exist at the accelerating mechanism. This entails the provision of some structure at a potential different from that of the tank 711 and electrically insulated therefrom, and carries with it the consideration that this mechanism extend substantially the entire distance from the accelerating mechanism to the terminus of the path of the particles. These electrical characteristics must be maintained in consonance with the magnetic field requirements, and also must be consistent with the fact that the mechanism operates at a substantial vacuum.

To comply with all of these requirements and to afford the desired mechanism, I conveniently provide a liner structure generally designated 1666 and particularly illustrated in Figures 26, 51, 52 and 53. The liner itself is a curved box or segment of an annulus rectangular in cross section. It is preferably made up of relatively thin, generally arcuate, inner and outer side walls 1667 and 1668, respectively, of a metal of nonmagnetic nature, such as sheet copper. The walls 1667 and 1668 are supported and held in shape by a metallic skeleton constituting a framework including marginal bar members 1669 and 1671, respectively. These are also of copper and are designed to receive fastening means for removably securing the flanged side walls 1667 and 1668 in position.

The arcuate side walls 1667 and 1668 are supplemented by a generally planar top wall 1672 and a similar planar bottom wall 1673. Both of these are arcuate in plan and are marginally flanged, the bottom wall being seamed to the side walls. The top and bottom walls are conveniently made of metallic sheets, for example of copper. The top wall is removably secured in position by any convenient means, such as machine screws extending into the bars 1669 and 1671. The top wall 1672 and the bottom wall 1673 and the sides 1667 and 1668 form an electrically unitary box stretching approximately a third of a circle in arcuate planar contour, and extend the liner as a whole from a location adjacent the source face plate 712 to a location not far from the face plate 724.

Adjacent its source end, the liner 1666 encompasses a transition liner 1676 (Figure 26), comprising an arcuate segment, rectangular in cross section, including curved side walls 1677 and 1678, respectively, joined with comparable top and bottom walls 1679, all preferably fabricated of sheet copper or comparable nonmagnetic, thermally conducting material. The section 1676 slides within and is supported upon the initial or upstream end of the liner 1666 and is provided with a pair of transverse diaphragm plates 1681 and 1682, respectively, each extending partially across the transition section 1676 to define a central passageway 1683, of adequate width to pass all of the desired particles emitting from the accelerating structure. Unwanted side beams or stray particles can be intercepted by the diaphragm plates made of appropriate size for this purpose. The interior of the transition section 1676 is evacuated to at least the same pressure as exists in the remaining portion of the interior of the tank 711. For that reason, various convenient portions of the walls of the transition section 1676 are pierced by a plurality of apertures 1686, so that particles of material to be evacuated diffuse or flow freely from the interior of the transition section to the exterior thereof and to the interior of the tank 711. At the same time, the apertures 1686 are not of sufficient number or extent materially to interfere with the uniformity of the electrical potential established.

The transition member 1676 virtually encompasses the end of the accelerating structure 1461, particularly overlying the central extensions of the top and bottom plates 1494 and 1495, as shown in Figure 26, with sufficient clearance to permit adjusting motions of the frame 1490. At all times the particles that have left the accelerator are within the transition section 1676, or within the encompassing walls of the liner 1666. The function of the transition section is promptly to surround the issuing particles and to encompass them until they are well within the liner 1666 with a group of surfaces, all at the same potential as the potential of the accelerating structure and of the liner. In this fashion, there is provided an electrically identical but mechanically separate junction between the liner 1666 and the accelerator mechanism 1461. Consequently, a suitable transition is effectuated between the adjustable accelerator and the generally stationary tank liner 1666.

The liner itself, at advantageous portions of its envelope, is pierced by a number of apertures such as 1687, of considerable extent, to afford quick pumping-out conditions and to afford adequate egress for any otherwise entrapped or enclosed molecules. To prevent serious disruption of the electric potential afforded by the walls of the liner, the large apertures, such as 1687, are spanned at relatively close intervals by overlying wires or mesh 1688 of electrically conducting material, electrically united to the liner itself to afford electrical continuity, but not sufficiently closely spaced as to interfere substantially with the discharge of interior molecules. Preferably, also, the apertures, such as 1687, are located in line with the viewing ports, such as 737 and 742, in order that the interruption in the liner wall can be utilized not only as a pumping-out space but also as a viewing aperture.

Opposite its source end that encompasses the transition section 1676, the liner 1666 surrounds but does not touch an approximately radial metal plate 1689 (Figure 26), adequately spaced from the side walls 1667, 1668, and the top and bottom walls 1672 and 1673. An electrical connection (not shown) extends between the liner and the plate so that the electrical conditions of the walls and of the plate 1689 are substantially identical, although the plate is not mechanically supported upon the liner.

Secured to the plate 1689, in firm electrical engagement and mechanical connection therewith, is the flanged inner end 1691 of a collector envelope 1692, supported on the receiver 723. The envelope is approximately circular in transverse cross section and is approximately rectangular in configuration in plan.

The envelope 1692 extends from its flanged end 1691 toward and almost into mechanical contact with the face plate 724, but stops short of such plate to leave sufficient space for good electrical insulation, since the potential of the extension 1692 is the same as that of the liner 1666, while the potential of the face plate 724 is the same as that of the tank 711 and of the face plate 712. The envelope 1692 is like a box, open at both ends, and is primarily for the purpose of affording an extension of the electrically enclosed volume at the accelerator potential.

The liner 1666 and its extended envelope 1692, but not its extended transition section 1676, is preferably supported in an electrically insulated fashion from the arcuate interior side wall 729 of the tank 711. To accomplish this, a pair of supporting devices, generally designated 1693 and 1694, are provided, as shown in Figures 26, 51 and especially 53, but since each of these devices is just like the other, a description of one of them applies to the other, as well.

The inner wall 729 of the tank 711 is at approximately 90° intervals provided with projecting cuffs 1696 and 1697, respectively, of circular, cylindrical contour, welded or otherwise securely affixed to the wall 729. Each of the cuffs 1696 and 1697 encompasses one of a pair of circular apertures 1698 cut through the inner wall 729, and is likewise provided with an inturned annular flange 1699 of relatively heavy metal, welded or otherwise conveniently secured to the associated cuff, say 1696.

Abutting the exterior face of the flange 1699 is an annular plate 1701, held in position by a series of studs 1702, anchored in the flange 1699 and passing through appropriate holes in the plate 1701. Fastenings such as nuts 1703 engage the studs and urge the plate 1701 against the flange to afford a vacuum-tight connection. This is facilitated by the provision of a pair of deformable annular packing rings 1704, of rubber or like material, seated in grooves cut in the face of the plate 1701.

Formed in the center of the plate 1701 is an aperture 1706, substantially continued by a circular, cylindrical interior passage 1707 defined by a ceramic insulator 1708. The ceramic insulator 1708 is similar in structure and mounting to the ceramic insulator 1031 which has been previously described. The insulator 1708 is secured at its outboard end to an annular plate 1726.

Thus there is provided a vacuum-tight, demountable, although rigid, mechanical support, electrically insulated from, but immovable with regard to the supporting tank wall 729.

In accordance with my invention, I provide means, cooperating with the stationary supporting disk 1726, for adjustably or movably mounting the tank liner 1666 and its attachments. For that purpose, the mounting disk 1726 is provided with a series of studs 1731, firmly anchored in the disk 1726 and held therein by jam nuts 1732. The studs 1731 are of considerable length and project far enough to receive loosely a disk 1733, having a plurality of passages 1734 therethrough of somewhat larger diameter than the studs 1731, so that the plate 1733, although mounted on such studs, can be rocked or tipped and advanced or retracted with respect to the plate 1726. The plate 1733 is retained adjustable in any selected projected, tipped or rocked position by a pair of lock nuts 1736 and 1737, respectively, engaging the studs 1731 and designed to be turned tightly against the plate 1733, so that when all of the lock nuts 1736 and 1737 on all of the studs 1731 are appropriately tightened in the adjusted position of the plate 1733, the plate is firmly held as set.

To maintain a vacuum-tight connection between the plates 1733 and 1726 in any relatively oriented position thereof, the separation between the plates is spanned by a corrugated, metallic, flexible bellows 1738. One end of the bellows is secured, as by hard soldering, to the outer face of the plate 1726, and the other end is secured, as by hard soldering or by other suitable fastening means, to the inner face of the plate 1733.

The plate 1733 is not only provided with a central aperture 1741, but is also formed with an annular flange 1742 designed to constitute, with the plate, a centering groove for receiving a cylindrical mounting sleeve 1743 overlying and coaxial with a mounting tube 1744, passing through the aperture 1741 and of sufficient length to extend from the atmosphere through the center of the insulator 1708 to a point adjacent the wall 1667 of the tank 1711.

The sleeve 1743 is united with the tube 1744 by a pair of interposed rings 1746 and 1747, respectively, spaced apart for good bearing support and fastened, as by welding or hard soldering, or the like, both to the sleeve 1743 and to the tube 1744. The ring 1746 and the sleeve 1743 fit firmly within the recess formed in the plate 1733, and are maintained in vacuum-tight relationship therewith. The abutting surfaces are closely sealed by a pair of deformable, annular sealing rings 1748, of rubber or like material, contained in grooves formed in the exterior face of the ring 1746. Any air leakage at this point is rendered harmless by a pump-out passageway 1749 formed in the disk 1733 and leading radially to a connection to a suitable vacuum pump.

To urge the ring 1746 and the plate 1733 into tight engagement, and to deform slightly the packing rings 1748, there is provided a removable securing means. This includes an internally threaded annulus 1750, received upon cooperating external threads 1751 formed on the exterior end of the tube 1744, so that the annulus 1750 can readily be turned upon or removed from the end of the tube. The annulus 1750, at spaced intervals, is pierced by threaded passageways 1752, each designed to receive a machine screw 1753, having not only the customary head but also a rounded end adapted to be seated in cooperating conical depressions 1754, disposed at appropriate locations on the exterior face of the plate 1733.

With this arrangement, the annulus 1750 is turned upon the threaded tube 1744 to a convenient distance and to an angular location so that the machine screws 1753 are substantially in alignment with the depressions 1754 in the plate 1733, whereupon the machine screws are tightened to draw the tube 1744 and the ring 1746 firmly against the supporting plate 1733. When the parts are tightly connected, the tube 1744 is firmly mounted mechanically and is positioned so that its axis is perpendicular to the general plane of the disk 1733, and so that, consequently, the adjustment of the disk 1733, by appropriate manipulation of the jam nuts 1736 and 1737, is effective correspondingly to position the axis of the tube 1744.

In this fashion, the tube 1744 can be given an incline with regard to the tank wall 1667, either in a vertical plane, in a horizontal plane, or in any intermediate plane. Furthermore, if all of the adjusting nuts 1736 and 1737 are changed in the same selected axial direction with regard to the mounting studs 1731, the tube 1744 can likewise be moved axially into and out of the tank 711.

The motion of the tube 1744 is imparted to the tank liner 1666 by virtue of a connection therebetween, formed by a connecting disk 1756 having a depression 1757 turned therein tightly to engage the end of the tube 1744, and secured thereto by hard solder or comparable means. The member 1756 is provided with a ring or series of apertures for the reception of a plurality of studs 1759, anchored in a liner support 1760. The studs are supplied with fastening nuts 1761 for pressing the member 1757 and a circular boss 1762 on the support 1760 into firm engagement. The liner support 1760 is a relatively thick, metallic, L-shaped member, having the boss 1762 on its upright portion, and having a radially extending leg 1763 and an upright terminus 1764. These parts of the support are fastened by soldering, or otherwise, to the inside of the side walls and of the bottom wall of the tank liner.

The engagement between the disk 1756 and the boss 1762 is made vacuum-tight by the provision of a ring 1765, of rubber or comparable deformable material, arranged in an accommodating groove in the disk 1756. Any leakage which flows to the interior of the tube 1744, or any air molecules which are to be removed therefrom, are released through a pump-out aperture 1766 piercing the wall of the tube.

By the provision of the supporting devices 1693 and 1694 constructed in detail as described, the liner 1666 and its extension are adjustably mounted in position within the tank 711 at an adequate insulating distance from the enclosing walls of the tank, at an appropriate location with respect to the ions traveling in arcuate paths through the liner 1666, and in such a fashion that the supporting devices can readily be removed when the liner is to be withdrawn from the tank.

Removal of the liner and its appurtenances is accomplished by the removal of the plate 1701, the removal of the annulus 1750, and the removal of the stem 1744 by dislodgment of the nuts 1761. Then, when either the plate 712 or the plate 724 is removed, the liner 1666 and its extension 1676 can be rotated from operating position within the tank 711 to a position exterior of such tank, completely removed therefrom. The reverse operation readily installs the liner within the tank ready for subsequent operation.

During the operation of source structure considerable heat is evolved and is transferred to the liner, and also some of the ions impinge against the liner and give up their energy to the liner in the form of heat. While it is possible to construct a liner of material and in accordance with recognized schemes for avoiding additional cooling means, I have in accordance with my invention, particularly provided a fluid circulating system, primarily designed for cooling the liner and its appurtenances, but being also available for the supply of heating liquid.

This dual availability is made use of, since sometimes when a liner is first put into a tank and is being evacuated it accelerates the evacuation of the system to increase the temperature of the parts very substantially, so that occluded gases, surface films and the like are more quickly dissipated. Tank heating during initial evacuation is called "baking out" and is accomplished by the circulation of hot liquid through the cooling system.

Following the reduction of pressure within the tank to the desired value, the circulating fluid is reduced in temperature below that of the tank and, in fact, becomes cooling fluid, so that localized overheating of any particular portion of the tank or of the liner is precluded and so that, in general, the energy dissipated within the tank in the form of heat is quickly carried away in the cooling liquid. This prevents a rise in temperature generally, or at localized positions, and avoids the thermal production of deleterious effects in the mechanism.

In accordance with the foregoing considerations and pursuant to my invention, I preferably provide in the outer end of the tube 1744 a plug 1767, fitting snugly enough within the end of the tube to form a vacuum-tight connection therewith. The plug serves as a fastening base for a centrally projecting stud 1768, guiding and supporting in place a connecting fitting 1769 held in tight relationship with the plug 1767 by a fastening nut 1771. A gasket 1772, interposed between the plug 1767 and the fitting 1769, precludes any leakage therebetween.

The fitting is provided with an inlet passage 1773 (Figure 52) connected to any suitable source, not shown, of cooling fluid, such as water, under the control of a regulating valve of any standard kind, not shown, to regulate the flow of water or comparable thermal liquid into the passageway 1773. Merging with and forming a continuation of the passageway 1773 is an interior passage 1774 defined by a tube 1776. This is contained within the mounting tube 1744 to one side of the center line thereof and at its opposite ends is tightly sealed within the plug 1767 and in the disk 1756.

At its inboard end, the passage 1774 is continued by a passageway 1777 formed in the liner support 1760 and turning therein to be continued by a deformable tube 1778, of copper or like flexible material, secured in position by being soldered or otherwise suitably fastened to the adjacent structure of the tank liner 1666. The tube 1778 throughout as much of its length as possible is united closely to the adjacent metal of the tank liner, preferably by means such as solder, copiously applied to increase the thermal path of conduction between the parts. Heat is then more readily transferred from the metal parts of the liner through the walls of the tube to the fluid circulating therein.

The particular configuration or contour or arrangement of the tube 1778 can readily be varied, within limits, in accordance with the particular problems of local overheating which may be encountered in different phases or stages of operation, or with operation upon different materials. That is to say, upon operation with some materials there are not only two or three or four main streams or beams of ions traveling through the tank liner, but there are several additional side beams or bands of much shorter path or of much longer path. These side beams intersect the walls of the liner and, in fact, are directly concentrated upon the walls, each in a relatively restricted area. The location of each area depends upon several factors, one being the particular materials utilized, another being the strength of the magnetic field, and a further factor being the accelerator voltage difference. All of these factors tend to cause a difference in location of impingement of the side beams upon the liner and may call for some readjustment in the particular location and disposition of the cooling tubes for the particular conditions of operation to be met.

In the present instance, the tube 1778, particularly as shown in Figures 51 and 52, is arranged on the side walls 1667 and 1668 of the tank liner, as well as on the top wall 1672 and the bottom wall 1673 thereof, the arrangement being a generally meandering contour with fair regularity, so that no extensive area of the tank liner is left without a portion of the cooling tube being directly attached to it.

Ordinarily, no portion of the cooling tube is provided on the extended envelope 1692 of the tank liner, since experience indicates that the extension does not acquire an excessive temperature. On the contrary, it is found that the transition liner 1676 is susceptible to local overheating and it is conveniently provided with a cooling arrangement. This is accomplished, despite the fact that the section 1676 is removable from the liner 1666, by the provision of an unanchored, relatively flexible tube portion 1779, extending from the tube 1778 to a terminal fitting 1781.

The fitting 1781 is adapted to be tightly joined to a cooperating terminal fitting 1782 forming part of a local circulation tube 1783, preferably formed of copper or the like, and pursuing a generally meandering disposition over the major surfaces of the transition section 1676. The tube 1783 finally returns to the fitting 1782 and its contents are discharged therethrough into a passage formed in the fitting 1781, so that at this point a convenient disconnection is provided for use when the section 1676 is separated from the tank liner 1666. When the members 1781 and 1782 are fastened together the fluid circulation is continuous from the liner tube 1778 thence through the extension tube 1783 over the surface of the extension 1676 and back to the liner tube 1778 again.

Eventually, the meandering tube 1778 returns to the support 1760 and connects through an aperture 1784 leading into the interior of a conducting tube 1786 disposed within the tube 1744 and mounted between the disk 1756 and the plug 1767. As an extension of the interior of the tube 1786 anchored in the plug 1767, and forming a continuation of the passageway through such tube, is a passage 1788 in the terminal 1769. This passage is connected to any suitable conduit for carrying away from the structure the discharged fluid. As a convenience, the passage 1788 can discharge through the air into a receiving bucket, not shown, so that the operator can be visually sure of a circulation of the fluid through the cooling system at all times when such system is supposed to be in operation.

By provision of the fluid circulating system, the tank liner, particularly, and its appurtenant parts, can either be readily brought up to a high temperature for baking-out purposes, or can be reduced from a high temperature for preferred operating conditions. In general, it is possible, in accordance with the operation of this mechanism, to maintain the operating temperature of the tank liner and its appurtenances within very narrow limits, substantially at a predetermined or selected temperature of operation. The desired temperature is kept substantially uniform throughout all of the parts of the liner and thermal warping or distortion of the thin-walled structure is precluded despite what would otherwise amount to localized overheating.

The fluid circulating system is, for the most part, located within the interior of the tank 711 and therefore is subject to the subatmospheric pressure existing and maintained therein. Even with large-size vacuum pumps, it is almost impossible to maintain anything approaching the desired vacuum if there is water or fluid leakage from the circulating system into the interior of the tank 711. This is for the reason that even a small liquid leak produces a very large amount of vapor or gas at the reduced pressure and constitutes a serious source of pressure difficulty.

Since I prefer, despite possible leaks, to utilize a liquid circulating system, I also provide means for overcoming any possible difficulties due to leakage at the connecting parts of the liquid circulating system. For this reason, there is provided in the fitting 1769 a passageway 1789 connected to any convenient part of the vacuum system, and connected to the interior of an evacuating tube 1791, extending through the tube 1744 and firmly mounted at its opposite ends in the plug 1767 and the disk 1756, respectively. A connecting passageway 1792 is provided in the disk 1756 and in the boss 1762, so that a continuous path is provided through the wall 1667 to a tube 1793.

Adjacent the junction of the disk 1756 and the boss 1762 and within the gasket ring 1765, any liquid leakage flows immediately into the interior of the passageway 1792 and is withdrawn into the vacuum mechanism so that it is removed very quickly and is not permitted to escape to any portions of the tank interior where deleterious effects might be caused. The tube 1793 extends across the tank liner (Fig. 51) and to the fittings 1781 and 1782. The interior construction of these fittings is substantially the same as that of the disk 1756 and the boss 1762, so that any leakage transpiring at the point of connection between the separable fittings 1781 and 1782 is immediately discharged into the evacuating tube 1793 and is removed from the vicinity of the tank.

Since all the connections within the tank where the liquid lines are susceptible to leakage are provided with immediate and direct drainage connections to the evacuating system, no substantial difficulty can be experienced with leakage at those connecting points. In fact, a small amount of leakage or minor discharge of cooling liquid through these joints is taken care of completely by the vacuum drainage system and affords no operating difficulty.

From the source where they are heterogeneously intermixed, the ions stream through the liner 1666. There is a characteristic curved path for each ion, depending largely upon its nuclear mass. Consequently, the sundry ions having the same charge segregate themselves to follow paths different as their nuclear masses are different. The myriads of ions in a path constitute a beam. Each beam is ideally comprised solely of ions all of a specific nuclear mass and differing in nuclear mass from the ions of other beams. As they progress through the liner, the distinctively curved beams follow increasingly separated paths. Near the liner exit, each beam is narrowly focused in a restricted area sharply isolated from comparable areas wherein other, related beams may be similarly focused. The particular position in the tank of any one of the ion beam focusing areas at any one time is dependent upon several factors, the most pertinent being the strength of the magnetic field, governing path curvature, other factors being equal, and the voltage drop between the source and the accelerator, governing the amount of energy imparted to the traveling ions and thereby governing focus area location, other factors being equal.

While the magnetic field can be varied from time to time in order to alter the path curvature of any particular ion beam, it is usually easier to maintain the field approximately, or as nearly as possible, at a constant value, and to vary the voltage drop between the source and the accelerator. This, consequently, produces a corresponding variation in the terminal position of any selected beam. Although for particles having the same charge the positions of the various beams relative to each other are established or fixed in accordance with the mass difference in the ion nuclei being transported, and although the variation in accelerator voltage drop will vary the position of all of the various ion beams as a unit or simultaneously, it is nevertheless at present easiest for purposes of control and adjustment to select one of the major beams and to adjust the accelerator voltage conditions in such a way that the selected beam is positioned in a predetermined location. If this is done, the remaining beams necessarily are simultaneously adjusted to lie in corresponding, established positions.

As a point of practical operation, it is considered at the present time to be somewhat easier to adjust a beam so that it falls in a predetermined location prior to the actual collection of material from such beam, since the adjustment entails merely the reading of an electric current and does not entail observation or determination of the quantity of material disposed in any particular location. Current readings, consequently, being of a generally instantaneous nature, can readily be analyzed without appreciable time delay, so that the beam can be positioned as desired very quickly and with a minimum of difficulty. Following the adjustment of the beam into a desired or predetermined location, the beam can be continuously operated in that location until an adequate amount of material has been deposited at the selected place.

In many respects it is difficult to distinguish between measuring currents of electricity due to the completion of their path travel by ions of an isotope, for example, and a deposit of such isotope considered as material. An individual ion arriving at a location whereat it can deionize or neutralize or be combined with a supplied electron again to form a neutral particle, is detectable by an electrically responsive instrument affected by the electron supply. Also, the neutralized ion is a minute particle of the material being considered. Conversion of a positive ion to a neutral particle requires an electron to move into combination with the ion. Such electron motion constitutes a minute electric current. A small group of these flowing electrons comprises an electrically detectable occurrence. But while ion neutralizations are electrically detectable even in very small numbers, the resulting neutral particles are too meager to be observed as accumulated material.

Furthermore, it is entirely possible that an ion can combine with an electron, the latter actuating an electrically responsive device to indicate an electron current, and yet, when the electron has combined with the ion, the resulting neutral particle can leave or may be driven away from the position at which the combination took place. It cannot be found at that location upon search for a mass of deposited material. In this circumstance, there is an electrical indication tending to indicate that the material is being collected in quantity, yet no quantity of material does, in fact, collect. It is consequently necessary to make a distinction between receivers effective to receive ions and to permit them to combine with electrons to afford an electrical indication of the supplied electric current, and collectors of a different nature, effective to do all of these things but, in addition, also effective to retain a sufficient number of received ions so that when neutralized they are lodged in the expected position as a weighable mass of material and can later be removed and handled or treated as any quantity of macroscopic material.

In view of the foregoing, it is possible to provide a receiver merely affording electric current measurements. Such a receiver is very useful in adjusting and setting up the separating apparatus for operation, but the receiver is not effective as a collector to retain and hold any quantity of material in received location. While a collector, as distinguished from a mere receiver, is capable of doing all a receiver can, in addition, it actually retains material in received situs. The design considerations for a collector are quite different from those for a receiver and I have found it proper to design collectors and receivers as two different types of apparatus, one especially for use in current measurements and for adjusting purposes, and the other especially effective in retaining separated materials in received position.

As an example of the first type, of a receiver, there is shown in Figures 54, 55, 56 and 57 a device adapted to be mounted on the face plate 724 and especially arranged for reading ion beam neutralizing currents in the receiving region of the tank 711. This device includes a receiver head 1801, situated within and secured to the liner envelope 1692 so that the envelope is supported and moved with the receiver, there being sufficient clearance between the plate 1689 and the liner 718 for the purpose. In accordance with my invention, I provide means for adjusting the position of the collector head 1801 throughout a relatively wide range in several directions, although the entire collector mechanism is supported on the removable face plate 724 so that the structure as a unit can be installed in or removed from the tank 711.

In order to achieve these ends, the face plate 724 is provided with an enlarged aperture 1802 continued by the central bore 1803 of a mechanical support and electrical insulator 1804, of ceramic or comparable material. The ceramic insulator 1804 is similar to the previously described insulator 1031 both as to structure and means for mounting. The insulator 1804 is thus mounted at one end on the face plate 724 and at the other end on a plate 1824. In this manner there is provided communication, through a central aperture 1826 in the plate 8124, with the chamber 711. When, however, all of the parts associated with the insulator 1804 are assembled, a vacuum-tight, electrically insulated, mechanical supporting arrangement is afforded.

It is considered advisable to provide an adjusting or orienting mechanism so that a supported receiver or collector can be positioned with its axis diverging in any direction from the axis of the insulator 1804. Consequently, projecting from the plate 1824 is a plurality of studs 1828, each having one end threadedly engaged in the plate 1824 and firmly anchored therein by an associated lock nut 1829. Resting upon the plurality of studs 1828, but with a somewhat loose connection afforded by enlarged apertures 1831 therethrough, is an adjusting disk 1832. Because of the enlarged apertures 1831 the disk can be rocked with respect to the plate 1824 into a position entirely parallel to such disk, or into any one of numerous positions inclined to such plate in any direction and at any angle within rather wide limits. The selected position of the plate 1832 is maintained by a pair of jam nuts 1833 and 1834, respectively, threaded upon the studs 1828 and screwed into engagement with the disk 1832.

To accommodate the relative movement during adjustment between the plate 1824 and the disk 1832, yet to maintain a vacuum-tight relationship therebetween, I provide a flexible metallic bellows 1836 between such members and secure one end of the bellows within an accommodating groove 1839 in the disk 1832 and secure the other end of the bellows in an accommodating groove 1841 in the plate 1824, the connections being afforded in each instance by hard solder or comparable fastening means.

Supported on the plate 1832 is a mounting tube 1842. One end of the tube is firmly mounted in a recess 1843, concentrically turned in the disk 1832, and is fastened in position by hard solder or comparable means, so that the mounting tube 1842 is, in effect, integral with the plate 1832 and partakes of the motion thereof. Adjacent its other end, the mounting tube 1842 is seated in a groove 1844 in a collar 1846 and is secured to the collar by soldering or comparable securing means. Held in abutment with the collar is an end plate 1847, forming part of the structure of the envelope 1692. A series of machine screws 1848 passes through the plate 1847 and into threaded engagement with suitably tapped recesses in the collar 1846, so that the plate 1847 is unitarily movable with the tube 1842 and the plate 1832. The periphery of the plate 1847 receives a plurality of fastening devices 1849, such as machine screws, detachably holding the envelope 1692 in place so that this envelope, as well as the plate 1847, forms an integral unit with the mounting tube 1842. Partaking of the mounting tube movement is the current receiver 1801 supported on a receiver tube 1851, slidably held by the collar 1846 and by the cylindrical interior surface of the annular disk 1832, so that motions of the mounting tube 1842 are imparted to the receiver tube 1851, but relative sliding is permitted. Consequently, by appropriately positioning the plate 1832 and by manipulation of the jam nuts 1833 and 1834, the transverse and vertical angular position of the receiver 1801 and its envelope 1692 can readily be established in any desired location with respect to the axis of the insulator 1804. Thus, the receiver can be positioned precisely with respect to a beam.

I have found it very advantageous to be able to move the receiver 1801 into and out from a theoretically ideal position within the tank 711; that is to say, according to the diagrammatic disclosure in Figure 21, it is apparently preferable to have the receiver 1801 located 180° from the arc chamber 621, or comparable source of ions. While this is true so long as the source is considered as a point or line, it does not necessarily follow when the source is an area or volume such as a columnar arc. In practice I have found that optimum results are obtained under varying conditions of operation by moving the collector 1801 into and out of the tank so that its position, although approximately 180° from the ion source, is either more or less than that amount in numerous instances. The most advantageous position is therefore normally found by a trial and error adjustment of the receiver in a direction into or out from the tank, that is, axially toward or away from the wall 724.

For the foregoing reasons, the receiver tube 1851 is made controllably slidable within the mounting tube 1842, that is, translatable along its axis in either direction, and in order to preserve the vacuum-tight integrity of the tank I provide a vacuum seal between the tube 1851 and the mounting tube 1842. The disk 1832, surrounding its central opening, is outwardly flared to form a conical support 1852 for positioning a deformable gasket 1861, such as a rubber disk. The gasket is held by a washer 1862, having a plurality of radial apertures 1863 therein leading to a peripheral groove 1864 affording communication from the interior of the seal to a pump-out passage, not shown. A second deformable washer 1866 overlies the conical washer 1862.

The entire seal assembly is compressed by a gland 1867, loosely fitting over the tube 1851 and slidably disposed within a collar 1868 seated in a groove 1869 turned in the outer face of the disk 1832. The collar is secured therein by hard solder or comparable means. Machine screws 1871 pass through receiving apertures in the gland 1867 and engage with the threads of suitably threaded apertures in the disk 1832. By the provision of this mechanism, I afford a construction permitting free axial sliding motion of the receiver tube 1851, while at the same time preserving a vacuum-tight connection.

In order to move the receiver tube 1851 axially with respect to the remaining part of the structure, the disk 1832 is, in effect, extended by four tubular struts 1872, symmetrically arranged around the tube 1851 and at their inner ends firmly anchored to the disk 1832. At their outer ends, the struts are as firmly anchored in a journal plate 1873 (Figure 54). The plate 1873 in effect forms a supporting unit with the disk 1832 and partakes of all of the motions of such plate with respect to the insulator 1804.

Interposed between and parallel to the side pairs of the struts 1872 are two adjusting screws 1874 and 1876, respectively, threaded for substantially their entire length and confined against axial translation and for rotation only by suitable mountings in the disk 1832 and the plate 1873. At its end adjacent the disk 1832, each of the screws 1874 and 1876 is reduced in diameter to receive the inner race 1877 of a ball bearing, generally designated 1878, and including a plurality of antifriction balls 1879 running in an outer race 1881. The outer race is pressed into a receiving socket 1882 sunk in the outer face of the disk 1832, so that there is provided by this means an antifriction mounting for the screws 1874 and 1876 at their innermost ends.

Adjacent their outer ends, each of the screws 1874 and 1876 is enlarged to form a plain bearing 1883 journaled in a receiving bore 1884 piercing the plate 1873 and affording a bearing mounting for the outer end of the screw shaft. The screw 1874 is extended by a reduced spindle 1886, at its outer end carrying a manipulating knob 1887 secured in position by a pin 1888 passing through the knob and the spindle. A bearing bridge 1889 forms a journal support for the spindle 1886 and at its opposite, spaced ends abuts the plate 1873. The bridge is fastened to the plate by a pair of machine screws 1891.

Quite similarly, the screw shaft 1876, at its outer extremity, is provided with a spindle 1892 carrying a manipulating knob 1893, held in place by a through-pin 1894, and is journaled in a bridge 1896. The spaced-apart bridge ends are secured by fastenings 1897 to the mounting plate 1873. By the provision of this mechanism, there is afforded means so that rotation of the manipulating knob 1887 rotates the screw 1874 and rotation of the manipulating knob 1893 rotates the screw 1876.

While the structure is satisfactory as described, I preferably provide means for insuring that the two shafts 1874 and 1876 are always rotated in unison and so that rotation of either of the knobs 1887 or 1893 will produce a similar rotation in unison of the shafts 1874 and 1876. Consequently, there is secured to the spindle 1886 by a pin 1898, a spur pinion 1899, spanned by the bridge 1889 and meshing with a spur gear 1901. The gear 1901 is rotatable upon a ring 1902 seated within a depression 1903 formed in the outer face of the plate 1873 and firmly secured thereto by fastenings 1904. A flange 1906 on the ring 1902 overlies part of the gear wheel 1901 and, together with the plate 1873, confines the gear against axial displacement, while permitting free rotation thereof. Meshing with the gear wheel 1901, just as the pinion 1899 meshes therewith, is a pinion 1907, connected to the screw shaft 1876 by a pin 1908. With this gear train, rotation of either of the spindles 1886 or 1892 by either of the knobs 1887 or 1893 produces a simultaneous and equivalent rotation of the screw shafts 1874 and 1876.

Advantage is taken of the rotation in unison of the shafts 1874 and 1876 to provide a balanced translating force for sliding the receiver tube 1851 axially into and out from the tank. Riding on and threadedly engaging both the screws 1874 and 1876 is a transverse carriage 1909 (Figures 54, 56 and 62), bodily translated when the screws 1874 and 1876 are rotated. The carriage 1909 is formed with a central, circular boss 1911. At diametrically opposite sides of the boss are seated a pair of retaining clips 1912, fastened to the carriage 1909 by a plurality of machine screws 1913. Axially confined between inturned flanges 1914 on the clips 1912 and the face of the boss 1911 on the carriage 1909 is a plate 1916, mounted on and firmly secured to the tube 1851 by a clamp bolt 1917 pinching together the upper, split portion of the plate, so that the plate 1916 and the tube 1851 necessarily partake of the same motions. Since the plate 1916 is confined axially to move with the carriage 1909, the carriage, as it is compelled to travel by rotation of the screws 1874 and 1876, comparably compels travel of the tube 1851. In this fashion, the tube is advanced and retracted pursuant to rotation of either of the knobs 1887 or 1893.

A further manipulation of the tube 1851 is afforded in that the tube is made rotatable about its own axis so that the receiver 1801 can be inclined at any desired angle within rather wide limits, or can be accurately positioned in a precisely upright orientation. The rotation of the tube 1851 is accomplished by rotating the plate 1916 about the axis of the tube. For this reason, the plate 1916 is provided with a depending portion extending between the two lowermost of the struts 1872. The plate is bored out to provide a recess 1918 receiving a fixed pin 1919 substantially rigid with the depending portion.

The pin extends from the plate 1916 to pass through a bore 1921 in a transverse plug 1922 journaled at its opposite ends in the side walls 1923 and 1924, respectively, of a slide 1926. The central, enlarged portion of the slide is provided with a transverse channel 1927 to accommodate swinging motion of the pin 1919. The slide 1926 at one end is formed as a circular cylinder 1928, adapted to slide in a bearing block 1929 upstanding from the face of the plate 1909. The block is attached to the plate by fastening devices 1931 and locating pins 1932.

The other end of the slide 1926 is provided with a threaded extension 1933 passing through and supported by a pair of bearing blocks 1934 and 1936, respectively, upstanding from the face of the plate 1909. The bearing blocks are secured in position by fastening devices 1937 and locating pins 1938. Thus, the slide 1926 is guided by the bearing blocks 1929, 1934 and 1936 to move in a rectilinear path transversely of the plate 1909. During this time, the plug 1922 rotates slightly and the extension 1919 is swung in an arc about the axis of the support tube, the range of rotation of the plate 1916 being established by the bearing block 1936 at one end and by the bearing block 1929 at the opposite end.

In order to produce transverse translation of the slide 1926, the threaded extension 1933 thereof is engaged by the comparably threaded interior of a worm wheel 1939 held in position between the bearing blocks 1934 and 1936 by an integral collar 1941 on one side and by a separate collar 1942 at the opposite side. The worm wheel 1939 is in mesh with a worm 1943 mounted upon and integral with a driving shaft 1944 journaled at one end in the carriage 1909. At the other end, the shaft 1944 is journaled in a plate 1946 held by the fastenings 1937 in a position spanning the bearing blocks 1934 and 1936.

A manipulating knob 1947 is mounted on the shaft 1944 so that upon rotation of the knob the shaft and worm likewise rotate. This causes the worm wheel 1939 to rotate and thereby displaces the slide 1926, thus swinging the plate 1916 and the receiver tube 1851. By the provision of this mechanism, therefore, I afford a means effective accurately to rotate the receiver tube and, more particularly, to hold the receiver tube in any selected angular position within the range of motion permitted by the structure. By the provision of non-overhauling worm and wheel driving mechanism, there is assurance that the imposition of even severe forces upon the receiver tube or upon the receiver itself will not dislodge those elements from any adjusted position.

By appropriate manipulation of the adjusting jam nuts 1833 and 1834, by appropriate manipulation of either of the knobs 1887 or 1893, and by the appropriate manipulation of the knob 1947 the mounting tube 1842 and the receiver tube 1851 can be positioned at any desired angle either vertically or horizontally with respect to the axis of the supporting insulator 1804, can be moved in a direction toward or away from the mounting plate 724, and can be rotated throughout any desired angle within the limits of the structure about the axis of the receiver tube 1851. These adjustments can be made either singly or in any desired combination so that the receiver head 1801 can be appropriately disposed in any desired or predetermined location within the tank 711.

The receiver mechanism, movable with the receiver head 1801 and included therein, is, in the present instance, particularly designed for the reception of ions and the measurement of electric current incident upon the reception thereof. It is also, in the present instance, especially designed for the reception of a single ionic beam. It is, therefore, provided with a pair of metal face plates 1948 and 1949 (Figures 55 and 57), spaced apart to define a central slot 1950. Each of these at its upper and lower edges is formed with a strengthening flange 1951. The face plates 1948 and 1949 are mounted on a plurality of insulators 1952, spacing them accurately from but connecting them for support to a metal base plate 1953. Surrounding and secured to the base plate is a metallic side wall 1954 extending toward but spaced from the face plates 1948 and 1949 to constitute an enclosure for the interior receiver mechanism.

The base plate 1953 is detachably secured to a flange 1956 extending radially outwardly from and secured to the receiver tube 1851 by means of hard solder or other suitable fastening means. The end of the tube 1851 is formed with a channel 1957 for the reception and alignment of the flange 1956. A number of fastening devices 1958 pass through the flange 1956 and engage the base plate 1953 so that the receiver head 1801 is removably secured in place upon the receiver tube 1851, it being contemplated that receivers and collectors of various different types may be mounted upon the tube 1851, each being suitably contoured to form a connection with the flange 1956. The two plates 1948 and 1949 are thus firmly supported upon the receiver tube 1851, with the slot 1950 central with respect to the axis of the tube 1851 and in precisely the desired location to admit any selected ion beam or any selected portion of an ion beam.

Ions approaching the receiver in the predetermined location pass through the slot 1950 between the plates 1948 and 1949 and are received on a subjacent metallic plate 1961. The plate 1961 extends for substantially the full length of the face plate slot 1950 and is supported in the desired position with respect thereto by suitable electric insulators 1962. These are properly spaced and mounted upon the base plate 1953 with fasteners 1963 to locate the plate 1961 not only with respect to the base plate 1953, but also with respect to the plates 1948 and 1949. The plate 1961 is supplemented by a pair of side angles 1964 and 1966, respectively, securely fastened to the plate 1961 and at the ends of the plate connected by bridges 1967 and 1968, respectively, forming end walls for the plate. Between the upstanding end walls 1967 and 1968 of the plate 1961 and the rear face of the plates 1948 and 1949, the side walls 1954 of the receiver are supplemented by inwardly projecting rims 1969.

Material flowing through the slot 1950 is appropriately intercepted by the subjacent plate 1961. Since this plate is electrically insulated from both of the face plates 1948 and 1949, as well as from the remaining portions of the receiver (such as the base plate 1953), it is feasible, by appropriate electrical connections and devices, to read the electric current flowing in the plate 1961 by reason of ion reception and neutralization thereon. In the main, the receiver as so far described is adequate for ordinary purposes. By appropriately adjusting or orienting the position of the receiver, or by varying the factors affecting the ion beam position so that the beam itself moves over the face of the receiver, it is possible to get ion beam current readings and to determine the relative relationship of the receiver to the beam or any selected portion thereof.

In some instances, it is desirable to read currents not from the entire height of a selected beam, but rather only from a vertically restricted or limited portion thereof, and for use in such instances the plate 1961 is modified. It is not entirely continuous and uninterrupted, but rather, adjacent its center it is pierced by a relatively narrow slot 1971, of limited height. Only a narrow beam or a narrow beam portion and a relatively small part of the vertical expanse of the beam can pass through the slot 1971. The ions passing through the slot 1971 come into contact with a receiving cup 1972. This is a metallic or electrically conducting device formed of a peripheral rim 1973 securely fastened to a base disk 1974.

The cup 1972 is not connected to surrounding parts of the receiver, but is held in position in the desired location by being fastened by a machine screw 1976 to one end of a supporting and electrically conducting rod 1977. The rod passes axially through the center of the receiver tube 1851 and in its central location is supported by an insulating disk 1978 pressed into the interior of the tube 1851. The rod 1977 is held in location with respect to the tube 1851 by a pair of collars 1979 and 1981, respectively, fastened by setscrews 1982 to the rod.

Continuing through the length of the tube 1851 to the exterior end thereof, the rod passes through and is insulated from an end plug 1983 (Figure 54). The plug has a peripheral groove 1984 fitting into and joined, as by hard solder, to the end of the tube 1851. To preclude leakage of air along the rod, there is provided a series of insulating, packing disks 1986, received within a cup 1987 bored in the central portion of the plug 1983 and interiorly threaded to be engaged by the exterior threads of a packing plug 1988. When tightened, the plug 1988 is effective to force the packing disks 1986 into close engagement with the rod 1977 to preclude leakage at that point. An insulating sleeve 1989 is interposed between the packing plug 1988 and the rod 1977.

The rod is, in effect, held in stationary, central location within the receiver tube 1851 without danger of leakage and with appropriate electrical insulation. The terminal of the rod 1977 is equipped with a machine screw 1991 provided for the connection of an electrical conductor, so that current flowing through the cup 1972 can also be transmitted through suitable registering or indicating devices, not shown.

The reception of ions by the various plates 1948, 1949 and 1961 is normally accompanied not only by a flow of electric current characteristic of the amount of ion neutralization on each of those plates, but is also accompanied by the conversion of a great deal of energy into the form of heat. Unless conducted away, the incident heat is destructive of the apparatus.

In accordance with my invention, I therefore preferably provide means for supplying each of the plates with a cooling fluid or liquid, preferably circulated at a sufficient rate to maintain the temperature of these parts below a selected maximum value and for including each of the several plates 1948, 1949 and 1961 in a separate electrical circuit in order that the current to each may be separately indicated or registered. For these two reasons, a metallic, tubular conduit 1992 (Figure 54) is passed through the end plug 1983 and is surrounded with a packing structure 1993 comparable to the packing 1986. The outer end of the conduit 1992 is provided with a pipe connection 1994 for the reception of any standard form of pipe joint effective to supply a cooling liquid to the conduit 1992. The conduit end is also provided with a disk 1996, of metal or other electrically conducting material, so that a wire can be attached to it for inclusion of the conduit 1992 in an electrical circuit.

After it passes through the packing 1993, the conduit 1992 extends throughout the length of the tube 1851 and passes through the insulating disk 1978 (Figure 55), then turns to lie closely adjacent the center of the plate 1949. The conduit is thermally and electrically united by copious amounts of solder, or by other comparable fastening means, to the plate. From close to the middle of the plate, the conduit 1992 extends to a point near the bottom of the plate, whereat it makes a loop, extends upwardly, and is always in contact with such plate to a point adjacent the top thereof. It then makes a return loop, constituting a return extension 1997 of the conduit 1992. This passes downwardly toward the center of the plate and finally turns away from the plate to enter the tube 1851. Therein it passes through the insulator disk 1978, traverses the full length of the tube 1851, and eventually emerges from the tube for connection to a return liquid line.

In a somewhat comparable fashion, at the opposite side, symmetrically, of the end plug 1983, there are provided the lower, supply leg 1998 and the upper, return leg 1999 of a conduit provided with end fittings 2001 for connection into a liquid cooling circuit and into an electric circuit. These legs are likewise provided with packing glands 2002 where they pass through the end plug 1983 and extend for the entire length of the tube 1851, appropriately passing through the insulating disk 1978. Upon emerging from the tube 1851, the conduit legs are curved into immediate proximity with the plate 1948 and form a virtually closed, elongated loop. As completely as possible, the legs are securely soldered to the back of the plate 1948 and extend for approximately the full length thereof, so that fluid passing into the supply leg 1998 loops around in back of the plate 1948, absorbing heat therefrom, and emerges through the return leg 1999.

Similarly, another pair of fluid conduit legs 2003 and 2004 is provided. Each of them has a suitable cooling liquid connector 2006 at its external end and is equipped with a packing structure 2007 where it passes through the end plug 1983. The legs 2003 and 2004 longitudinally traverse the interior of the tube 1851, being disposed therein just above and just below the rod 1977. The two conduit legs 2003 and 2004, after traversing the length of the tube 1851 and passing through the insulating disk 1978, turn in opposite directions and form a flat loop transversely of the tube to lie closely against the rear face of the plate 1961. The conduit loop is thermally and electrically united to the plate by hard solder or other convenient securing means, so that heat evolved in the plate 1961 is readily transferred to the conduit loop, and so that the liquid circulating through the legs 2003 and 2004 is effective to carry away the heat. At the same time, the conduit is effective to serve as an electrical conductor, so that the plate 1961 can be included in a circuit having indicating or registering devices therein.

By the provision of the electrically isolated plates 1948, 1949 and 1961, electrically distinct from each other and from the remaining parts of the receiver structure, such as the tube 1851 and the base plate 1953, there is afforded means for separately indicating the electrical conditions produced in different locations by the local action of sundry portions of the ion beam or beams striking those parts of the receiver. The ions neutralizing in the various portions of the collector by acquiring electrons thereat cause corresponding currents to flow, and by comparing the several currents it is possible to derive considerable information concerning the ion beam or beams.

By utilizing the manipulating or adjusting mechanism for moving the receiver appropriately, or by leaving the receiver stationary and appropriately moving the ion beam or beams, it is possible to explore the different beam localities or, in effect, to sample different cross-sectional regions of the beam or beams and by appropriate correlation of the electrical indications to make the desired adjustments or regulations of the beam or beams of the receiver, or of both. Furthermore, either a relatively large, average sample of the beam may be used for obtaining a reading by utilizing the current in the plate 1961, for example, or a relatively minute sample may be used for a reading by taking the current from the cup 1972. If the beam is not well located on the receiver, a substantial difference in reading between plates 1948 and 1949 will afford information of this condition.

In short, by provision of a receiver effective to receive very heavy ion currents and to receive parts of them separately, and by provision of a mechanically adjustable receiver movable in various directions and in various amounts, I have provided a structure useful in determining the beam conditions existing in the receiver region of the separator and in indicating the appropriate adjustments or changes necessary or desirable for preferred operation.

Careful exploration of the terminal portion of the beams arriving in the receiver region, particularly with a receiver of the type just described, indicates that the simple, geometrical concepts of the beams and of the beam paths and of their locations and relative arrangements, while fundamentally true, are not always precisely achieved in practice. If the ion source is operated at a low output in relation to its full capacity; if the horizontal angular divergence of the particles leaving the source is small; if the vacuum conditions are favorable; if the arc is steady; and if the magnetic field is uniform, it is possible, in the receiver or target region to measure a beam cross section electrically. This yields a cross section constituting a close reproduction or image of the rectangular ion source in a location appropriate to identically charged ions of a certain nuclear mass only. Careful measurement shows the receiver image to have rather sharp boundaries, a height about the same as that of the source, and a width a little greater than that of the source. It can be concluded that there is little or no vertical divergence of the beam and only a small amount of horizontal divergence thereof.

Exploration of a receiver image shows that within its boundaries it is comprised rather uniformly of identically charged ions all of the same nuclear mass. Only a negligible quantity of ions of other nuclear masses are present. This indicates an almost complete segregation of ions of one kind (one nuclear mass) from all other particles present at the source or encountered en route through the tank. This is a practically complete separation and constitutes the removal of one material, for example, one isotope, from all other materials, or isotopes, no matter how heterogeneously intermixed they may have been previously.

The consistent uniformity of the receiver image in identically charged ions of but one nuclear mass persists up to the image boundaries, but just outside the boundaries the situation is abruptly changed and of the various identically charged ions exteriorly detected, virtually none are of the one, particular nuclear mass.

Further transverse exploration can be carried out either by moving the receiver transversely toward or away from the source and hence transversely with respect to the beams at the receiver region, or by changing the ion accelerating voltage and thereby causing the beams in succession to traverse or sweep over the stationary receiver. In either case, the image comprised of identically charged ions all of the first nuclear mass is removed from centralization upon the receiver and a nondescript intermediate reception occurs until in a predetermined position spaced from the first image another beam image is centralized upon the receiver. This second image, like the first, is virtually a sharply defined reproduction of the ion source. It is comprised almost entirely of ions having charges identical to those in the first image but having a second nuclear mass distinct from the first nuclear mass, being rather well concentrated within the second image, and not being found elsewhere in significant quantity. Here again is an almost complete isolation and separation from previous environment of identically charged ions nearly all of a second, distinctive nuclear mass. They are uniformly distributed within their image boundaries and are but sparsely distributed elsewhere.

Further relative traverse of the receiver and beams reveals still a third sharply defined image comprised almost solely of identically charged ions of a third nuclear mass not elsewhere detectable in quantity. So can be found a fourth image and a fifth and even more, each a well defined segregation of identically charged ions of a distinctive nuclear mass characteristic of the image location and not found elsewhere, each image being discrete, with its lateral boundaries well spaced from the lateral boundaries of adjacent images. Of course, if identically charged ions of but one or two nuclear masses are the only ones introduced, but one or two images may result. The usual case described involves images due to several nuclear masses, to multiply charged ions, and to ionized compounds. Fifteen or twenty distinct images are not unusual.

The orderly array of sharp, separated images is not always attained. Many circumstances, such as transmission of very dense ion beams, wide ion divergence from the source, ion scattering due to collisions in the beams, undue variations in ion energy, irregularities in the magnetic field, local scattering or sputtering in and adjacent the receiver, all tend to blur the images. This means that an ion destined for one image may fall a little outside it or perhaps may fall in another, wrong image entirely. As the blurring or defocusing gets more acute, the images, in effect, diffuse into their neighbors. Then a traverse of the receiver no longer shows spaced, sharply defined images. Rather, a traverse shows varying intermixtures of ions with the density or concentration of a specific ion increasing or being greater in the image location of that ion. There is a varying concentration, greater in the predetermined location and gradually falling off either side thereof as neighboring ion concentrations increase. It can no longer be said that all of the identically charged ions of a certain nuclear mass are within an image boundary and that none are outside it. It can only be said that the intermixed identically charged ions at the receiver are in certain locations enriched in ions of a particular nuclear mass.

If the enrichment is perfect, the situation is identical with a perfect image. With blurred, merging images, the enrichment is less than perfect. In fact, enrichment can diminish through all degrees until the ion concentration of a particular nuclear mass is the same as in the original material. Then there is no enrichment. If the concentration is diminished even farther, and it readily can be, an actual impoverishment results. The concentration of ions of a specific nuclear mass then is even less than in the original material.

Sharp images, maximum enrichment seem to go with processing at a slow rate. If the amount of material processed or the rate of processing are greatly increased, the degree of enrichment decreases. The choice is between small ion beams with sharp images and maximum enrichment or large, wide angle ion beams with blurred images and less than maximum enrichment. The relationship is not simple. It sems to be that a small reduction from maximum in the degree of enrichment permits a large increase in the quantity of material separated. In practice, a precise selection in made to balance the quantity of material handled against the enrichment desired.

By appropriate use of the receiver to explore and scan the beam or beams under various conditions of operation, the most favorable circumstances for desired results can be determined. It remains to replace the receiver with a collector mechanism capable of operating under the favorable circumstances to receive and retain one or more separated materials, and to present the separated materials, or the enriched materials in separate, predetermined locations for removal therefrom at the conclusion of a run, or at appropriate intervals.

A suitable collector; namely, a device of the type capable not only of receiving ions, neutralizing them, and affording an indication of the neutralizing current, but also of discretely retaining or separately confining the neutralized ions in predetermined, separate locations, is particularly illustrated in Figures 58 to 61 of the drawings. This collector head 2010 can be conveniently substituted for the receiver head 1801, as shown in Figures 55 and 57, inasmuch as the collector and receiver stem mechanism is identical, the differences between the collector and the receiver arising only in the terminal or head portion of the structure. If desired, a separate stem can be supplied for each unit and can be interchanged along with the interchange of the receiver and collector heads. In practice, both systems have been utilized. For convenience in description herein, it is assumed that the stem tube 1851 is either identical or duplicated for the receiver and the collector. In either case, the stem tube 1851 terminates in a flange 1956 designed to receive removable fastenings 1958.

In the case of the collector head 2010, there is mounted on the stem tube 1851 by means of the fastenings 1958 a base plate 2011, fabricated of metal or the like, generally planar in extent, hexagonal in shape, and provided with a central, circular opening 2012. This fits readily over the end of the stem tube 1851. The plate 2011 abuts the flange 1956 and is pierced by the fastenings 1958 so that a detachable but firm supporting engagement is afforded. On the metallic base plate 2011 are secured side plates 2013 and 2014, respectively, likewise fabricated of metal and being approximately rectangular in configuration. The plates 2013 and 2014 are secured to the base plate by suitable fastening screws 2016. The ends of the base plate 2011 are extended to receive end plates 2017 and 2018, respectively, of relatively thin metal, bent to form dihedral angles coinciding with the contour of the ends of the base plate 2011 and appropriately secured thereto by fastening devices 2019. Furthermore, the end plates 2017 and 2018 are held firmly against the side plates 2013 and 2014, in turn thereby supported and reinforced, by fastening devices 2021. By this construction there is provided a metallic, box-like enclosure, complete except for its top.

Pursuant to the invention, it is considered desirable to provide a top for the collector electrically insulated from although mechanically supported by the remainder of the collector head. To accomplish this purpose, both of the side plates 2013 and 2014 support a plurality of angle brackets 2022, uniformly distributed along the length of the side plates and secured thereto by appropriate fasteners 2023. The angle brackets are provided with outstanding portions 2024, pierced to receive machine screws 2026. These threadedly engage internally threaded, metallic sockets 2027 firmly embedded in supporting insulators 2028 of ceramic material, or other suitable mechanically effective, electrically nonconducting material. The insulators 2028 are firmly held and supported on the outstanding portions 2024 when the machine screws 2026 are thoroughly tightened.

Spanning the distance between the supporting insulators 2028 and overlying the top of the collector head in order approximately to complete the enclosure thereof, is a relatively thin metal top plate 2029, like the base plate 2011 in shape and at appropriate intervals provided with apertures for accommodating fastening machine screws 2031. These engage receiving thimbles 2032 embedded in the ceramic insulators 2028 so that, although electrically insulated from the remaining part of the structure, the metal top plate 2029 is mechanically united therewith. By this construction, the plate 2029 is of a size and shape to overhang and to protect the end plates 2017 and 2018 and the side plates 2013 and 2014.

The top plate 2029 is not solid or continuous across the face of the collector head, but rather is provided with a large central opening 2033, in part defined by cutaway edges 2034 parallel to each other, symmetrical about the central axis of the structure, and extending for almost all of the full length of the plate 2029 to provide a central, rectangular opening having a height comparable to the arc height and a total width somewhat greater than the radial width of the beams of the several isotopes or materials to be collected.

In order accurately to define the sides of the openings provided for the passage of the ion beams, and particularly since beams impinging upon the metallic parts of the collector produce localized overheating thereof, quickly destructive of the material of the collector, I have consequently found it advisable to provide marginal plates 2035 and 2036. Each of these is constructed of a relatively unaffected material, such, for example, as graphite or commercial solid carbon. The plates 2035 and 2036 are, if desired, of relatively pure carbon, but commercially obtainable graphite blocks are readily machined into the necessary shapes and are appropriately drilled for fastening devices and serve the desired purpose admirably.

While the shape of the marginal plates 2035 and 2036 admits of considerable variation, I have found in the present instance that it is satisfactory to provide geometrically quite plane strips of relatively thin, rectangular cross section and of somewhat greater length than the length of the opening 2033. Each of the carbon strips 2035 and 2036, being thinner than its adjacent and associated portion of the plate 2029, is conveniently positioned and mounted thereon by being seated in an appropriate recess 2037 milled in the plate along the edge of the opening 2033 and being secured in position by removable fastenings, such as machine screws 2038.

Because the opening 2033 is of considerably greater width than is normally needed, the width of the marginal plates 2035 and 2036 is such that they define rather accurately the desired outer edges or the width of the beam or beams to be admitted into the collector. The remaining, exposed width of the plates 2035 and 2036 is sufficient to intercept the remaining portion of any coincidentally arriving ions not sufficiently sharply focused to pass within the defined opening.

Since the total length of the opening 2033 and of the opening defined partially by the plates 2035 and 2036, is somewhat greater than the height of the beam it is desired to receive, the length of the opening is preferably shortened to a selected amount defined by a pair of metallic end sheets 2039 and 2040, respectively. Each of the sheets extends transversely of the collector, not only overlying the top plate 2029, but also overlying the extremities of the defining plates 2035 and 2036. The sheets are secured in place by suitable fastenings, such as fillister head machine screws, threaded into the underlying plate 2029. The sheets 2039 and 2040 extend precisely to the edges of the top plate 2029. The exposed ends of the plate 2029 and of the overlying sheets 2039 and 2040 are protected by upstanding marginal strips 2041 and 2042, respectively, held in position by machine screws 2043 passing through the marginal strips and seated within the ends of the plate 2029.

In this fashion, there is afforded a mechanically protected, electrically insulated, and thermally inert reception area for the mixed material or polyisotopic beam or beams, a portion of this area affording an opening having its outer edges, top and bottom accurately defined. In the event it is desired to vary the defined margins of the opening 2033, the marginal plates 2035 and 2036 may be readily replaced by others of different size and contour after the sheets 2039 and 2040 have been removed, and the end sheets themselves can be replaced by others of different size to vary the total length of the opening.

The number of openings provided in the face of the collector is entirely dependent upon the number of ion beams it is desired to receive and to retain. If but a single ion beam is to be received and retained, only a single opening, such as 2033, is desirable and necessary. If a plurality of beams are to be separately received, an equivalent number of separate openings is advisable. In the present instance, it is desired to receive and retain the ions of two separate beams, one of them being made up almost entirely of $U^{238}$ ions and the other being made up almost entirely of $U^{235}$ ions with, as a minor contaminant, some $U^{234}$ ions.

For that reason, the general opening 2033 is conveniently subdivided into two openings, individually designated 2044 and 2046, by the provision of a strip 2047 extending throughout the length of the opening 2033 with its edges parallel to the edges of the plates 2035 and 2036 and fastened within recesses 2050 in the top plate 2029. The strip thus defines the interior margins of the beam apertures 2044 and 2046. The two openings 2044 and 2046 are consequently made of the desired width and length and have appropriate transverse positions or locations.

The center lines of the openings 2044 and 2046 are spaced apart an amount regulated by the mass difference of the particular materials or isotopes that are being collected. Since the nuclear mass of $U^{238}$ is approximately 238 mass units it is represented by the number 238 and the nuclear mass of $U^{235}$ is approximately 235 mass units it is represented by the number 235, the difference in nuclear mass of these isotopes is represented by the difference of these numbers, or the number 3. When stated in terms of linear measurement in the scale of the apparatus, the dimension between the center lines is termed 3 slugs, a slug being a linear dimension equivalent to the diametral distance apart of ions of one mass unit difference in nuclear mass in the location within and under the conditions of operation of the particular device. Thus, it is said that the center line of the opening 2044 for $U^{235}$ is 3 slugs away from the center line of the opening 2046 for $U^{238}$.

The $U^{234}$ is also received through the opening 2044 although, properly speaking, for such an operation this opening should be 4 slugs from the center line of the $U^{238}$ opening 2046, since there is a 4-mass-unit difference between these two isotopes. The amount of $U^{234}$ is so small that it can, in effect, be neglected. Furthermore, the actual width of the openings 2044 and 2046 is such that while their center lines are only 3 slugs apart, the distance from the center line of the opening 2046 to the marginal edge of the opening 2044, as defined by the plate 2035, is approximately 4 slugs. While not centrally received, the $U^{234}$ ions are nevertheless, for the most part, capable of passing through the opening 2044.

The strip 2047 acts as an initial divider defining the internal limits of the openings 2044 and 2046 that the different isotopic beams pass through, and this division is maintained and continued by a central diaphragm 2048. This diaphragm is a rectangular, metal plate, having its upper edge received in a rabbet 2049 cut in the meeting face of the strip 2047 and extending for nearly the full length of the strip. The central portion of the diaphragm 2048 is stiffened and reinforced by a pair of longitudinally extending straps 2051 and 2052, respectively, disposed adjacent each other on opposite sides of the diaphragm. The straps are fastened together by pins 2053 passing through the two straps and also through the diaphragm to afford, in effect, a central enlargement thereof.

The lower edge of the diaphragm 2048 is received in a longitudinal rabbet 2054 cut in the facing surface of a beam 2056 extending longitudinally of the collector structure. The beam is suitably hung in approximately triangular end plates 2057 and 2058, being fastened by machine screws 2059 to the converging or apex portions thereof. The end plates 2057 and 2058 are each scored by rabbets 2061 and 2062, respectively, receiving the ends of the diaphragm 2048, so that the diaphragm 2048 is surrounded on all sides by rabbeted connection to afford a barrier centrally of the collector, impervious to the passage of particles. The end plates 2057 and 2058 are at their upper corners connected by fastenings 2063 to brackets 2064 secured to the under side of the cover plate 2029 by screws 2065. In this fashion, there is provided an interior structure, supported on the insulated top plate 2029 and consequently at the same electrical potential as the plate, effective to divide the interior of the collector into two principal compartments.

Merely admitting the various ions into the interior of the collector through the openings 2044 and 2046, permitting them to neutralize, and attempting to collect them simply upon any electrically appropriate surface is, in my experience, not in itself adequate to assure good retention of the received material in segregated positions. Consequently, and in order to insure proper retention of the neutralized material, I provide, for example, behind the opening 2046 a pocket 2066 comprising a compartment in longitudinal section approximately rectangular but in cross section approximately triangular. This construction affords interior surfaces so arranged and angularly disposed that incident ions rebounding from the surfaces tend to remain within the confines of the pocket without scattering back out from the pocket through the opening 2046.

The desired type of structure is fabricated of a bent, metallic outer wall 2067, having one portion substantially parallel to the side plate 2014. The wall 2067 is secured to but is electrically insulated from the plate 2014 by the interposition of ceramic insulators 2068, generally like the insulators 2023, and held in place by fastenings 2069. The portion of the wall 2067 adjacent the opening 2046 is sharply bent toward the opening but is terminated so that an adequate gap for insulation remains between the margin of the wall 2067 and contiguous metal parts.

Supported by the outer wall 2067 is a metal spacer plate 2071 disposed between the wall 2067 and an inner, metallic plate 2072 to form bottom and end walls. The wall 2067, the spacer plate 2071, and the inner plate 2072 are all held in predetermined, assembled relationship by fasteners 2073 passing through all three of these parts. The inner plate 2072, at its lower portion, is bent to lie approximately parallel to the wall 2067 to provide a good abutment with the sides of the spacer plate 2071, but is then bent away from the outer wall 2067 so that it is especially disposed out of parallelism with the outer wall. The inner plate 2072 is terminated short of the central diaphragm 2048 and short of the opening 2046 so that it is electrically separate from its surroundings.

The interior of the pocket 2066, as defined by the wall 2067 and the plates 2071 and 2072, is lined by a continuous, folded, metallic sheet 2074, constituting a lining envelope. The sheet is disposed in close relationship with the metallic walls of the pocket to afford a suitable electrical path therebetween and extends very close to the aperture 2046, although terminating short thereof. The margins of the lining sheet are spaced apart to afford an opening 2076 so that there is direct communication from the opening 2046 into the interior of the pocket 2066 through the opening 2076. Ions passing between the central strip 2047 and the marginal plate 2036 continue through the opening 2076 and are neutralized upon contact with the lining 2074. Because of the shape and disposition or inclination of the walls of the pocket 2066, the neutralized particles are retained therein. There is no substantial scattering or re-emergence of particles from the pocket, so that after a period of operation a substantial mass, or quantity or amount of $U^{238}$ is found within the pocket 2066. This is either pure $U^{238}$ or, as the separator is most often operated, is material highly enriched in $U^{238}$, or, in other words, is largely $U^{238}$ with some proportion, usually small, of other materials.

In a generally comparable fashion, but with mirror symmetry with respect to the central plane, the collector is provided with a second pocket, generally designated 2078, of approximately the same contour as the pocket 2066 and disposed on the opposite side of the diaphragm 2048. The pocket 2078 is in part formed by a metallic outer wall 2079 mounted on but electrically separated from the side plate 2013 by insulators 2081 and fastenings 2082. Like the wall 2067, the wall 2079 extends for most of its length parallel to the plate 2013 and then turns abruptly toward the center of the structure. It terminates short of mechanical contact with any of the adjacent metallic portions in order to afford an insulating gap therebetween.

An inner plate 2083 is appropriately spaced from the wall 2079 by an intervening spacer 2084, constituting also the bottom and end boundaries of the pocket. The wall 2079, the plate 2083 and the spacer 2084 are all firmly united by fastenings 2086 passing through these several parts to hold them in an established relationship. The plate 2083 in its lower part is parallel with the wall 2079, but in its remaining part is divergent therefrom. The plate 2083 extends toward the opening 2044, but stops short of the opening and short of the surrounding metallic members, so that the resulting gap affords electrical insulation therefrom.

Within the pocket 2078 there is provided a metallic lining 2087, constituting an inner envelope in immediate abutment with the metallic surroundings, so that a firm electrical connection is established. The lining is of the same general configuration as the wall 2079 and the plate 2083 and has its edges so disposed as to define an opening 2088 underlying the opennig 2046 and in effect constituting a continuation thereof. Ions of $U^{235}$ and of $U^{234}$ passing through the opening 2044 continue on through the opening 2088 to the interior of the pocket 2078, wherein they contact one of the interior walls and become neutralized.

Because of the angular configuration of the several side walls, the ions are effectively trapped or confined and ultimately deposit without any significant proportion scattering from or leaving the interior of the pocket through the opening 2044. Because of these conditions, the entering ions not only contact the walls of the lining, wherefrom they acquire electrons for neutralization, but after a period of operation a quantity of material, principally $U^{235}$, is found to have accumulated in macroscopic amounts within the pocket. Thus, there is afforded a pair of individual pockets for receiving and retaining or collecting segregated, macroscopic quantities of isotopes or other materials separated by the operation of the remaining parts of the structure.

In a fashion somewhat comparable to the arrangement utilized, as illustrated in Figures 54 to 57, for conducting a cooling liquid as well as affording electrical connections to the various parts of the receiver, there is similarly provided for the collector a series of conduits serving both as cooling fluid or liquid conductors and electrical conductors. Even though the same receiver stem tube 1851 is utilized, it is preferred to utilize different fluid conductors for the collector, although these are connected exteriorly of the stem to the same liquid supply and disposal pipes in the fashion described in connection with the receiver arrangement shown in Figures 54 to 57.

In a comparable manner, there passes through the stem 1851, as illustrated in Figures 59 to 61, a cooling liquid conducting tube 2091, also serving as an electrical conductor. The tube passes longitudinally through the stem 1851, being mechanically supported therein but appropriately electrically insulated therefrom. As it emerges from the stem tube 1851 and passes through the opening 2012, the tube 2091 makes a relatively abrupt turn parallel to the base plate 2011 and extends alongside the side plate 2013 nearly to the end wall 2017. Adjacent the end wall, the tube turns and passes to the under surface of the top plate 2029.

Up to this point, the tube 2091 is entirely out of electrical contact with any of the structure within the collector and consequently is electrically insulated therefrom. But the tube is joined to the plate 2029 by heavy solder or comparable means, so that there is not only an electrical connection between the tube 2091 and the face plate, but there is also an excellent thermal path. Heat developed in the top plate by impingement thereon of various ions losing their energy thereto is rapidly conducted through the walls of the tube 2091 and to the cooling liquid therein, promptly effective to carry the developed heat away.

Thermal absorption is facilitated by fastening the tube 2091 throughout substantially the entire length of one side of the plate 2029, then looping it around the end of the opening 2033, still in contact with the plate 2029, and finally returning it along the opposite side of the plate nearly to the end plate 2017. Adjacent this end plate the tube follows its previous configuration, passing near but being spaced from the plate 2017, and then turning into a return branch 2092 of the same tube. The return branch enters the stem tube 1851 and extends to the connecting part of the liquid circuit. Thus, the top plate 2029 and its appurtenant parts are maintained in thermal and electrical contact. Through the tube 2091, the top plate is suitably included in an appropriate electrical circuit.

Passing likewise through the stem tube 1851 is an incoming leg 2093 of a conduit emerging into the interior of the collector and turning toward the end plate 2018, but stopping short thereof. The conduit 2093 makes a loop in contact with the inner plate 2083 and is connected thereto by solder or other suitable thermal and electrical conducting junction. The conduit 2093 makes substantially a closed loop extending throughout the entire length of the plate 2083 and, near the end plate 2017, turns back to constitute a return leg 2094, passing through the aperture 2012 and extending through the interior of the stem tube 1851 to a point of connection in the liquid circuit. The conduit, including the legs 2093 and 2094, is electrically separate from the remaining part of the structure except the pocket 2078. Thus, the pocket and its appurtenances can be maintained in the desired electrical circuit, and since cooling liquid is supplied thereto by the conduit, the pocket 2078 can be operated at the desired temperature.

There is also provided a supply leg 2096 of a conduit system extending through the aperture 2012 from the tube 1851 and having a configuration quite comparable to that of the leg 2093, but rather being secured by solder or comparable electrical and thermal conducting means to the inner plate 2072 of the pocket 2066. The conduit leg preferably extends for substantially the full length of the plate 2072 in order not only to afford a satisfactory electrical connection thereto, but also to provide satisfactory thermal transfer over approximately the entire inside portion of the pocket. A return leg 2097 corresponds in position and in mirror symmetry with the return leg 2094. It passes through the stem 1851 to a suitable exterior point for connection to the liquid circulating system. Thus, the pocket 2066 is not only readily included in an electrical circuit separately from the remaining portions of the collector, but likewise can readily be operated at the desired temperature.

In addition, the series of conductors within the stem tube 1851 is inclusive of a central conductor 2098, not designed to carry liquid and, therefore, not made tubular. It is a rod serving solely as an electrical conductor and extends through the opening 2012, terminating just inside of the collector head 2010. A wire 2099, fastened in place on the conductor 2098 by a screw 2101, extends from the conductor to a point of attachment 2102 to one of the fastenings 2086 on the walls of the pocket 2078. In this fashion, an additional electrical circuit is provided through the tube 1851, and is ordinarily connected only in the event the circuit through the legs 2093 and 2094 is not available or if the legs themselves are omitted, as they may be under light load conditions. Reception of $U^{235}$, for example, is sufficiently slow that normal heat dissipation without forced cooling is satisfactory.

It is often desired to adjust the mechanism and to locate the parts accurately before actually embarking on a collection run. During this time of preliminary operation, ion beams of grossly irregular character may pass through the openings 2044 and 2046, contaminating the pockets. Sometimes, even though a retaining collector is utilized, it is desired only to read electric currents. For both these reasons, I provide a means on this collector for reading an electrical current from a principal beam away from the openings 2044 and 2046, or from any selected beam. While current readings can also be obtained by utilizing the apertures 2044 and 2046, it is likewise of assistance to have an additional mechanism responsive either to one of the beams normally received in one of these apertures, or responsive to another beam normally not collected, but having a position known with respect to the position of the normally collected beams.

For these purposes, the side plate 2014 is provided with supplementary supporting brackets 2106, secured thereto by fastenings 2107 and supporting elongated insulators 2108, held in place by machine screws 2109. The insulators 2108, except for their greater length, are the same type as the insulators 2028 and extend through apertures 2111 formed through the overhanging edges of the top plate 2029. Supported on the insulators 2108, at a position spaced away from the outer face of the plate 2029, is a supplementary face plate 2112, preferably constituted of a metal sheet of generally trapezoidal configuration, secured in position by fastenings 2113 entering the insulators 2108 to afford a suitable mounting. The supplementary plate ends are out-turned to constitute flanges 2114, spaced from but constituting substantial continuations of the end strips 2041 and 2042, the strips being cut away to provide gaps 2116 affording electrical isolation between the supplementary plate 2112 and the remaining part of the structure. To avoid floating, the plate 2112 is preferably connected to ground through an appropriate circuit.

At a suitable location in the plate 2112 there is provided a defining aperture 2117, preferably of rectangular contour, of a length approximately equivalent to the length of the apertures 2044 and 2046, and preferably of approximately the same width as either of those apertures. The opening 2117 is located above the metal top plate 2029 so that ions passing through the aperture 2117 are received on the metal plate 2029. By appropriately connecting the plate 2029 in an electrical circuit, the ions passing through the aperture 2117 can be detected by measurement of the deionizing current flowing through the plate 2029. The strength of the beam passing through the aperture 2117 is thereby indicated and is useful as a showing of the relative position of the device, either measured from the aperture 2117, or measured from the apertures 2044 and 2046. In this way there is afforded a supplementary mechanism for taking current readings as an aid in positioning the collector and for use in scanning the ion beams, and for other purposes.

The collector and retaining structure is effective to operate throughout protracted periods without overheating and to receive separately in discrete volumes macroscopic amounts of separated, neutralized materials, such as polyisotopes.

In considering the operation of the structure shown in Figures 24 to 62, it is assumed that the mechanism has not previously been operated and is at room temperature, with all of the parts assembled and in correct adjustment and alignment, except that the source face plate 712 (Fig. 25) and the receiver face plate 724 are detached from the tank 711 but are adjacent the tank ready to be fastened in position thereon. This arrangement is readily accomplished by having adequate lengths of flexible electric and liquid conduits connected to the face plate mechanisms and to the various circuits concerned. By the provision of portable mechanisms and extended, flexible connections it is possible to arrange the face plates at convenient positions for preliminary and subsequent operation, while minimizing the amount of effort necessary actually to place the structure into operation. Conveniently, in practice, the face plates 712 and 724 are arranged to be mounted on tracks or carriers or dollies, not shown, for ready ease in handling.

In initiating the operation of this structure and in carrying out the calutron method of the invention, there is separately provided a charge bottle such as the charge container 864 (Fig. 31), preferably partially filled to a convenient load level under chemically clean conditions. The size or amount of the charge is variable. In a representative case the charge bottle contains approximately 150 grams or a comparable amount of charge material, such, for example, as uranium tetrachloride in solid form, that is, in granular or crystalline form. Conveniently, the charge container is filled to the chosen level in the chemical laboratory and is then tightly sealed by a cork or stopper, not shown, adequate to engage the sides of the aperture 866. A number of charge containers can readily be loaded and prepared in advance and stored for future use. If the atmosphere is excluded, no serious deterioration occurs during reasonable time periods.

When it is to be used, a charge container is then brought to the vicinity of the detached face plate 712 and the top plate 862 is removed from the charge chamber 858 by the removal of the securing screws 863. The stopper or other closure for the charge container is removed, the container is positioned within the chamber 858, as illustrated in Figure 31, and the top plate 862 is then repositioned and is fastened in place by the tightening of the screws 863.

After the charge container has thus been opened and suitably fastened in enclosed position, the source unit is ready for assembly within the tank 711. The face plate 712 is moved into proximity with the flange 732 (Figure 26) and an application of an appropriate vacuum sealing compound is made to the meeting surfaces of the tank and of the face plate. This sealing compound is preferably a mixture of grease and rubber substance effective to prevent air leakage at the flange joint even under relatively high vacuum conditions. After the compound has been liberally applied, the coated parts are ready for abutment. The face plate 712 is then positioned on the tank with the tank studs 734 passing through the aligned openings in the face plate. The stud nuts 736 are threaded upon the studs and are tightened evenly around the entire periphery of the source face plate with sufficient force to provide an airtight connection.

An entirely similar technique is employed in mounting the receiver or collector face plate 724. This face plate and the adjacent tank flange 733 likewise have their meeting faces smeared with the sealing compound. Then the face plate is suitably positioned with the adjacent studs 734 passing through the apertures in the face plate, and the stud nuts 736 are uniformly tightened to provide an airtight connection. Thus, since it is assumed that all other atmospheric vents are closed, when both of the face plates 712 and 724 have been positioned, the tank 711 becomes an airtight vessel or vacuum envelope. The structure is then in suitable condition for a reduction of the pressure within the tank to any chosen subatmospheric value within the design limits of the device.

The arrangement of the vacuum mechanism for this structure is schematically shown in Figure 24 and in principle is the same as diagrammatically illustrated in Figure 20. The beginning of the evacuation operation is, preferably, the charging of the Dry Ice trap 2126 (581 in Figure 20). This trap is preferably filled with a mixture of carbon dioxide and acetone and when it is appropriately charged the mechanical pump 750 (579 in Figure 20) is started in operation. The effect is to remove air from the interior of the tank 711. This can be done either in series through the as yet inactive diffusion pump 749 (577 in Figure 20), or by initially by-passing the diffusion pump through the use of a shunt pipe 2127.

The operation of the mechanical backing pump 750 is continued for a protracted period until the pressure within the tank 711 is reduced to a value of some 50 to 70 microns, as measured by a mercury McLeod gauge. In the event this degree of evacuation is not readily attained and promptly maintained, say within a period of approximately a half-hour, then it is likely that leaks exist in the tank 711 or its appurtenances. These can be due either to oversight through failure to close some aperture, or can be due to poor fit or fabrication of the parts, to warpage of the structure, or possibly to internal leaks from the water lines. In any event, the customary vacuum or laboratory leak technique is utilized to insure that no substantial leaks are permitted to continue to exist.

As soon as the appropriate vacuum value is attained by the operation of the mechanical pump 750, the diffusion pump 749 (577 in Figure 20) is relied upon to reduce the pressure still further. In the event the previous operation of the mechanical pump has not employed the shunt conduit 2127, then it is necessary to leave the diffusion pump cold during the preliminary mechanical pumping and at this stage to place the diffusion pump into operation by supplying it with cooling fluid and by energizing its heating mechanism.

The diffusion pump takes a protracted period to come into operating equilibrium. It is usually possible to save some of this time by initially utilizing the shunt conduit 2127, by-passing the diffusion pump, and during this time or previously placing the diffusion pump in preliminary operating condition by allowing it to get into its operating equilibrium without doing any actual pumping upon the tank. In either event, when the diffusion pump is ready to operate it is appropriately connected so as to be effective to withdraw additional air from within the tank 711, thereby reducing the interior pressure still further.

The operation of the diffusion pump is greatly assisted by appropriate charging of the liquid air trap 2122 (578 in Figure 20). The liquid air trap may be initially charged at the commencement of the diffusion pump operation so that condensable vapors are deposited upon it and do not pass through the diffusion pump itself. These vapors, in condensed form, can be entirely removed from the system by removal and cleaning of the air trap whereupon they are deposited. After cleaning, the liquid air trap is replaced. As an alternative technique, the liquid air trap is not initially charged, but as much of the vapor as possible is removed from the system by and through the diffusion pump itself. Later the liquid air trap is charged.

The former procedure has the advantage that the vapors are not passed through the diffusion pump and cannot adversely affect the diffusion pump liquid, while the latter technique has some advantage in removing the vapors more quickly from the system, although greater danger of contamination of the diffusion pump liquid exists. In either style of procedure, the diffusion pump is maintained in operation, appropriately backed by the continued operation of the mechanical pump, until such time as the pressure within the tank 711 is lowered to an indicated value in the range of $10^{-4}$ to $10^{-5}$ mm. Hg. As promptly as this pressure or vacuum is established and is steadily maintained the structure is ready or conditioned for subsequent operation.

When the tank has been properly brought down to the desired pressure value, steps are taken to insure the circulation of an adequate supply of cooling liquid through various of the instrumentalities that otherwise might operate at excessive or destructive temperatures. A supply of cooling liquid is made to circulate to the filament support by appropriately establishing flow through the conduits 1021 and 1024 (Figures 36 and 40). This establishes a cooling liquid flow through the tubes 942 and 943 and the quantity flowing is regulated to make sure that the filament 931 cannot be overheated. At about the same time, cooling fluid is made to flow in a circuit including the tubes 1776 and 1786 (Figure 52), so that the tube 1778 and the connected tube 1783 (Figure 51) conduct a flow fully capable of carrying away excess heat from the liner and its associated structures.

Furthermore, the liquid circuit including the tube 2091 (Figure 61) and its return branch 2092, the tube 2093 and its return leg 2094, as well as the tube 2096 and its return leg 2097, are all suitably supplied with circulating liquid so that various portions of the collector 2010 are prevented from exceeding a satisfactory operating temperature. In addition, a fluid circuit is completed through the supply tube 886 (Figure 30) and the return tube 887 so that the mixing chamber plate 851 will be maintained below an excessive temperature. It is not customary or necessary to produce any fluid flow at this time through the tube 881 and its return tube 885, although if, due to the nature of the charge or for other reasons, there is any danger of excessive heat developing in this portion of the structure, fluid circulation through this passage is preferably arranged.

As promptly as water or other cooling fluid is circulating well through all of the circuits to the portions of the structure susceptible to overheating, the mechanism is ready for further steps toward placing it into operation. It is to be emphasized that an adequate supply of cooling fluid is highly desirable, since, occasionally, parts of the beam or beams, particularly side beams, impinge upon very restricted portions or areas of the structure and quickly produce local overheating and even destruction or burning out unless there is surely available an adequate supply of cooling liquid to carry away the localized, intense heat.

When, therefore, there is an assurance of an adequate flow of cooling liquid through all of the cooling circuits, an electric circuit is completed to the heater 868 and a sufficient supply of electricity, for example, 500 watts, is caused to flow in that circuit to supply heat to the charge within the charge receiver 864 so that the temperature of the charge or of the adjacent mechanism is brought up to a value in the neighborhood of about 450° C. This temperature is appropriate for uranium tetrachloride. For other charge materials, such as uranium hexachloride or uranium bromide or uranium fluoride, different temperatures will be established. In any case, the temperature is sufficient to convert the charge from its solid state at normal conditions to a gaseous state for use in the separation of its constituents.

At about the same time, an electrical circuit is completed to the heating wire 913 (Figure 28) surrounding the core 911, so that the metal defining the arc chamber 921 is brought up to a sufficiently high temperature so that vapor flowing therethrough will not readily be condensed, but rather will be maintained in gaseous condition. In fact, it is preferred to heat the walls adjacent the arc chamber to a slightly higher value, that is, to a temperature, for example, in the neighborhood of about 475° to 500° C., thus insuring that the material discharged by vaporization from the charge receiver will continue to flow freely through the tortuous passageway of the arc chamber and its associated structures.

The heating period necessary to bring the various members of the source unit 751 approximately to the temperatures desired varies somewhat with the speed it is deemed advisable to add heat. Under normal circumstances, it is preferred to take between one and two hours for initial heating to insure that all of the parts are evenly raised to the elevated temperatures in order to avoid the introduction of excessive strains in the mechanism due to irregular heating.

When the charge container and the entire source unit are approximately at the desired temperatures it can be exepected that vapor is being produced within the charge receiver and is being discharged therefrom through the aperture 866 into the chamber 902 and thence into the arc chamber 921. The vapor flows from the arc chamber into the interior of the tank 711 and, unless otherwise treated, eventually flows through the diffusion pump and the mechanical pump to the atmosphere. The vaporization of the charge having been established without substantial or excessive condensation in the source unit, it is feasible to provide a magnetic field.

This is accomplished by closing the electrical circuits leading to the coil windings 706 and 707 (Figure 24) of the electromagnet, thereby establishing between the pole pieces 701 and 703 the desired magnetic field having a value in the neighborhood of 3000 gauss. At about this time it is also advisable to complete an electrical circuit establishing a voltage difference between the filament 931 and the anode 1301. An exemplary value is 200 volts. This circuit for the structure shown in Figure 31 is identical with that shown diagrammatically in Figure 20 and its closure constitutes the completion of a circuit equivalent to the circuit supplied by the battery 551 in Figure 20. During the time this voltage difference is impressed between the filament and the anode and during the heating of the parts, it is possible that some intermittent and sporadic sparking may take place, but this is usually of a random nature and is normally effective to remove or vaporize the material causing it, thereby being self-eliminating and avoiding later sparking difficulties.

The filament power is then made available to heat the filament 931 by completing a circuit thereto through the tubes 942 and 943 so that the filament is appropriately supplied with a current of electricity, is raised to an elevated temperature, and emits electrons. A sample value of filament current is 400 amperes and voltage is two volts. This filament circuit is comparable to that completed by the battery 547 in Figure 20. Since there is already impressed a potential difference between the filament and the anode, since the magnetic field is available, since vapor is present, and since the filament current is being supplied, an arc is struck between the filament and the anode extending through the arc chamber 921. In the event the arc does not immediately strike, the filament current and the voltage drop between the filament and the anode are varied, that is to say, are both raised and lowered in unison or at random until values are established suitable for the initiation and continuance of an electric arc.

It is not generally found possible to strike an arc until the magnetic field has been established and it is normally true that the arc comparably extinguishes itself when the magnetic field is interrupted. However, the various electrical and magnetic values do not seem to be precisely fixed and when the magnetic field is first turned on a reasonable adjustment of the filament current and the filament to anode voltage drop may be necessary before appropriate values are found effective to produce a satisfactory arc extending through the arc chamber.

The next step in initiating operation of the structure is gradually to apply a potential difference between the source unit and the accelerating mechanism by suitably regulating a circuit including the accelerator and the source block. The circuit it is necessary to complete at a relatively low initial voltage corresponds to the circuit including the battery 557 in Figure 20.

In the event the voltage difference between the source unit and the accelerator mechanism is increased too rapidly, arc discharges and sparking amounting to an excessive extent may occur. These ordinarily are fleeting phenomena, usually due to the presence on the mechanism of vaporizable or organic material, such as a fingerprint, that gradually vaporizes or burns off as the voltage is increased. If, however, an excessive increase is made, the sparking is also likely to be excessive. The voltage should again be lowered until the sparking disappears, whereupon the increase can be resumed. The voltage difference having finally been brought to its desired value, for example, 20 kilovolts, the source unit and accelerator are ready for protracted operation.

As an alternative step, and if desired, the accelerator voltage can be impressed upon it even before the arc is struck and quite easily during the initial heating-up period. This affords a longer time in the preliminary stages for excessive superficial impurities to be vaporized or to spark and to be carried away.

After the arc has been struck and the accelerator energized, as the uranium tetrachloride vapor passes through the arc chamber it is ionized and the ions are withdrawn from the region of the arc by the voltage difference betweena the source unit and the accelerator. Since the radius of curvature of the beam depends upon the voltage difference between the source block and the accelerator, the curvature of the issuing beam at first, before the full acceleration voltage is applied, is quite sharp, so that the beam, having only a short radius, runs into the metal of the liner inner side wall 1667. As the voltage difference between the source unit and the accelerator is gradually increased, the radius of the beam correspondingly increases until, finally, the beam extends more or less centrally through the liner and terminates on the collector structure 2010.

Preferably, the accelerator voltage is raised to a sufficient extent so that the beam radius is somewhat excessive and the beam, therefore, passes quickly over the openings 2044 and 2046 and instead impinges upon the supplementary face plate 2112. This is for the reason that during the starting operation and until all of the instrumentalities are suitably adjusted, the beam adjacent the collector may not be too clearly defined and may not produce too exact a separation, so that material at this period introduced into either of the collector pockets 2066 or 2078 may very likely be considered as a contaminant of subsequently received, relatively pure material. It is, consequently, preferred initially to have the beam voltage slightly increased so that the beam strikes the plate 2112, for example, in a location with the $U^{238}$ portion of the beam centered as well as may be on the aperture 2117.

With this adjustment of the parts, the current meter connected to the plate 2029 is affected by the received $U^{238}$ passing through the aperture 2117 and affords an index of the character of operation of the structure. It is not necessary to rely upon the provision of a meter to indicate the reception of the $U^{238}$ beam on the plate 2112, since this plate is readily visible through the window in the wall 731 of the tank immediately opposite to or in axial alignment with the collector. The voltage between the source unit and the accelerator can readily be varied until by meter reading or by visual inspection the beam is appropriately received upon the plate 2112.

The width of the beam pattern upon the target is, among other things, dependent upon the transverse or angular divergence of the beam adjacent the source. This in turn depends largely upon the configuration of the electric field in the region between and adjacent the arc chamber exit and the accelerator structure. By adjusting or moving the arc jaw plates 1308 and 1311, the arc slits 1401 and 1402 and the accelerator plates 1462 and 1463, and also by adjusting the voltages impressed thereon, the ambient field is established in a desired fashion to affect or to control the beam divergence. In this way, the beam pattern on the receiver, the beam width, and the amount of material transmitted will affect and control.

At this stage of establishing operation a beam has been produced and separation of ions according to their nuclear mass differences is taking place, although no retention of the separated ions in separate areas may be occurring. Furthermore, it is not certain that the most favorable or optimum operating conditions have as yet been attained. It is, therefore, preferred practice to inspect and, if necessary, vary all of the various controls and adjustments in an endeavor to produce a maximum quantity output and a maximum separation of the various ions.

For that reason, attention is again directed to the source. The filament current is carefully varied and finally adjusted to make sure that it is established at a value to produce a maximum beam. Similarly, the voltage drop between the filament and the anode is varied between narrow limits and is finally set at the value wherein the maximum beam is produced. Comparably, the voltage difference between the source block and the accelerator is slightly varied to insure that the beam in its maximized form is positioned where desired on the collector.

At this stage it is also well to check all of the various adjustments of the source unit, of the cathode unit, and of the accelerator structure. Presumptively, these are all appropriately set before the face plate 712 is fastened onto the tank, but occasionally discrepancies exist unnoticed and occasionally discrepancies arise after assembly. For example, positional shifts may be due to heat warpage, to displacement by magnetic force, and to mounting strains or various other causes.

In any event, the position of the filament 931 is very carefully checked and, preferably, is slightly varied between rather narrow limits until it occupies a position wherein the beam is at its optimum condition. This is accomplished by operating the knob 1264 so that through the connected gear and motion trains the filament is moved to and fro to overlie more or less precisely the aperture 1306 in the confining plate 1303. Additionally, the manipulating knob 1177 is rotated and the knob 1126 is also turned so that the axis of the cathode is varied in a vertical plane, in a horizontal plane, or in a plane having horizontal and vertical components, until the filament 931 is positioned for the best beam production.

Attention is then paid to the position of the source unit, particularly by observing the position of the beam pattern produced on the collector. For example, the entire source unit is rocked upon its transverse axis 807 by appropriate rotation of the knob 843 to make sure that the origin of the beam adjacent the arc is approximately a rectilinear source parallel to the flux direction of the field in that area. Also, by appropriate rotation of the knob 799 the source unit is rocked laterally about the axis 757 coincident with the center of the cathode so that the rectilinear source coincides in this plane with the direction of the field flux.

Following the optimum positioning of the source block itself, the knob 1394 is rotated so that the opening 1309 is transversely varied and is established at the desired distance by moving the arc defining plates 1307 and 1308 and the arc confining plates 1311 and 1312 toward and away from each other in amounts to produce the maximum effective beam. In a comparable fashion, the knobs 1438 and 1456 are also manipulated so that the plates 1401 and 1402 are appropriately positioned for the production of the best beam. It is entirely possible that these plates will be finally located slightly asymmetrically with regard to the center line of the source unit and the individual adjustment provided for the plates 1401 and 1402 permits them to be disposed in positions most conducive to the best beam.

Attention is then directed to the orientation and adjustment of the accelerator mechanism so that the plates 1462 and 1463 are properly located. This is accomplished by rotating the knob 1599 and thereby changing the longitudinal distance between the accelerator plates 1462 and 1463 and the arc plates 1401 and 1402. Since a large potential drop exists between these structures they must be placed sufficiently far apart so that sparkovers between them do not occur, and yet they should be so disposed that the electrical field shape induced between the members is proper to assist in producing an electrostatic focusing of the ion stream issuing from the arc chamber.

When the accelerator plates 1462 and 1463 have been appropriately spaced in distance they are checked for vertical positioning by operation of the knob 1625 and are spaced transversely or laterally at appropriate distances either symmetrically or asymmetrically with regard to the center line by appropriate rotation of the knobs 1661. These latter adjustments are individual, since the accelerator plates most often are displaced laterally from the center line of the source unit in a direction toward the collector, because the curvature of the ion beam begins between the source unit and the accelerator plates. To accommodate this curvature, the accelerator plates are slightly displaced and their best position is achieved by an empirical adjustment of the mechanism.

When these various adjustments of the source and accelerator mechanisms have been completed the arc should be steady and uniform and the beam should be a maximum. The collector current being read should be at a virtual maximum and should be quite uniform in time as well. If these conditions have been attained it can be understood that the production of the beam is as efficient as possible under the circumstances.

It is then desirable to direct attention again to the collector structure. The collector is moved axially into and out from the tank by rotation of either of the knobs 1887 or 1893 until the collector aperture 2117 is substantially at the narrowest cross-sectional area of the beam. This particular portion of the beam is illustrated in Figure 2, and is also illustrated in Figure 21, wherein it is shown in connection with a structure of the type employing a tank liner.

When the collector has been appropriately positioned axially so that it is at the narrowest cross-sectional part of the beam, the knob 1947 is revolved to rock or twist the collector head about its longitudinal axis so that the longitudinal dimension of the collector aperture 2117 coincides with the corresponding longitudinal dimension of the beam being received. In this way, the collector aperture is made to coincide exactly with the minimum cross-sectional plane of the beam adjacent the collector region. If this is not so, attention must be directed to the adjusting nuts 1829, 1833 and 1834. These are appropriately manipulated to incline the axis of the collector either in a horizontal plane, in a vertical plane, or in a plane having both vertical and horizontal components, so that ultimately the collector will be appropriately oriented and located.

As soon as the collector has been properly positioned during the steady state of operation, it is feasible to begin the collection of separated material. This is accomplished by quickly reducing the excess voltage difference between the source unit and the accelerator structure to a value such that the portion of the beam primarily comprised of $U^{238}$ ions is directly received through the aperture 2046. This should occur solely upon reduction in voltage, without other variations, assuming that the relative positions of the collector portions are such that this relationship exists between the aperture 2117 and the aperture 2046. Simultaneously, upon receipt of the $U^{238}$ beam through the aperture 2046 a somewhat smaller beam of $U^{235}$ is received through the aperture 2044. The $U^{238}$ arriving in the pocket 2066 produces a sizeable deionizing current capable of being externally read. When this current is a maximum it is taken as an indication not only that a maximum amount of $U^{238}$ is being received in the pocket 2066, but also as an indication that an appropriate quantity of $U^{235}$ is likewise and necessarily being received in the pocket 2078.

Since the $U^{238}$ beam leaves a visual trace upon any portion of the exterior of the collector that it strikes, visual observation will indicate whether or not the beams are appropriately passing into the reception apertures 2046 and 2044. Additionally, current readings from the pocket 2066 alone or from both of the pockets 2066 and 2078 can be looked to for this indication. If the two beams are sharp and distinct, both will be centered on their pockets simultaneously so that maximum current readings will occur together from both pockets. Either or both readings can then be used as guides in centering the beams. If the two beams have wide divergence and are sufficiently diffuse so that some $U^{238}$ falls as contaminant into the $U^{235}$ pocket, then the $U^{235}$ pocket current is ascribable to both isotopes. Under such circumstances it is well to review the adjustments to make sure the $U^{238}$ pocket current is a maximum, and then to increase the source to accelerator voltage difference, thereby to reduce the $U^{238}$ current somewhat and simultaneously to reduce the $U^{235}$ pocket current because of the resulting reduction in contamination. A point is found at which the ratio of $U^{238}$ pocket current to $U^{235}$ pocket current is as large as is consistent with a large $U^{238}$ pocket current.

When all of these adjustments have been set at their best possible values the machine is permitted to continue operation. This continued operation constitutes a collection run and can extend over a period of days, depending largely upon the amount of charge available in the charge bottle.

It is observed that during the course of the collection run it is necessary gradually to increase the heating current flowing to the heater supplying the charge bottle. It would appear that the charge of uranium tetrachloride is not sufficiently homogeneous all to vaporize at the same temperature. Some fractions or portions appear to vaporize at somewhat lower temperatures during the beginning of the run and the remaining portions to vaporize progressively at somewhat higher temperatures. In order to secure a continued supply of vapor throughout a protracted period the heat supply is gradually increased and the resulting temperature is gradually increased.

This increase is not very substantial for some time but finally becomes more and more pronounced until ultimately the temperature is necessarily raised to a value not to be exceeded. This marks the end of the collection run. During this time it has been the experience that some ten to fifteen grams of charge are consumed per hour under the general circumstances mentioned. When the end of the run is indicated by the maximum permissible temperature of the charge, the run is terminated.

Conclusion of the operation is readily accomplished by promptly interrupting the supply of electricity maintaining the accelerator at a different voltage from the arc block. Simultaneously, the arc voltage is shut off by interrupting the circuit including the filament and the anode. Similarly, the circuit to the filament 931 is appropriately interrupted so that no more electricity flows thereto. The electricity supplied to the charge heater, as well as electricity supplied to the arc chamber heater is interrupted. Power to the magnetic field is shut off.

At this time, cooling water is supplied copiously to all possible cooling water circuits and connections, whether or not they have been in active use during the run. This applies particularly to the cooling water connections to the source block and including the tubes 881 and 886. During this time the vacuum mechanism is maintained in continuous operation in order to pump out of the tank any material that might otherwise deposit thereon and have to be removed during the preliminary period of a subsequent run.

The cooling and vacuum pumping operations are continued for approximately one and one-half to two hours or more, depending somewhat upon room temperature conditions, until the structure has been fairly gradually cooled approximately to or slightly above room temperature. It is most feasible to cool the device rather gradually, in order to avoid the production of heat strains due to differential cooling of adjacent parts. It is highly desirable to cool the structure virtually to room temperature, since at elevated temperatures fumes emanating from the structure are extremely obnoxious if permitted to escape to the atmosphere. When the structure is at an appropriately low temperature the vacuum pumps are discontinued. Both the diffusion pump and the mechanical pump are deprived of electricity for heating and for driving purposes, respectively, and the diffusion pump is permitted to cool.

The vacuum to the tank can now be destroyed by admitting atmospheric air thereto. This is done in any convenient way, for example, by opening an air cock 2123 (Figure 24) and permitting sufficient atmospheric air to enter the tank so that the pressure inside it equals that of the atmosphere. It is then feasible to remove the source face plate 712 for removal of the charge bottle and for general cleaning and overhauling preparatory to a subsequent run. It may be found that some parts have failed for various causes and they can readily be replaced at this time. It may be found that some portions have warped and should be replaced or straightened. In any event, the source unit is reconditioned for further operation.

The collector face plate 724 is likewise removed and the collector head 2010 is preferably removed so that the segregated and deposited material within the pockets 2066 and 2078 can be recovered. This recovery of deposited material is preferably effectuated by chemical washing processes so that the pockets 2066 and 2078 are cleaned and subsequently returned for reinstallation in the collector head. This is repositioned on the collector face plate 724 and the structure is then restored to its original condition, ready for a repetition of the collecting run.

In the event it is desired to accumulate large quantities of the same material, usually the object of the operation of the machine and of the conduct of the process, it is advisable to make the initial charge of material in the charge receiver as large as possible. This is for the reason that the time consumed in initially pumping the tank down to a suitable vacuum and heating the parts preparatory to a collection run and, similarly, the time consumed in letting the tank "down" to air and permitting it to cool for disassembly is no greater for a continuous run of long duration than it is for a run of short duration. Hence, in order to keep the inactive time as small in proportion as possible to the running time, it is necessary that the charge be increased in volume initially as much as feasible, because it is the amount of initial charge that primarily determines the length of a continuous run. It is true that occasionally mechanical or electrical difficulties or failures interrupt an otherwise satisfactory run, but apart from these adventitious factors the quantity of charge initially supplied is the governing item.

During a long run it is usually possible to leave the mechanism virtually unattended except for general supervision to make sure that small variations in the power supply do not produce undue variations in the carefully set values of current and voltage initially established, and in order that minor changes due to slight variations in magnetic flux, for example, can readily be detected and promptly compensated for.

During a run primarily to recover any one or two desired materials received in the collector pocket or pockets there are also deposited within the interior of the vacuum envelope and on different portions of the structure other materials emanating from the source mechanism and, because of their nature, not entering into the receiver mechanism. For example, during an operation on uranium with uranium tetrachloride supplied to the charge receiver, it is found that at various positions along the interior wall of the tank or along the interior wall of the liner, there are disposed neutralized particles that had been carried there by beams of various uranium and chlorine compounds both singly and multiply ionized. For example, there can be found deposits produced by the beams of $UCl_3^+$, $UCl_2^+$, $UCl^{++}$, and $UCl_2^{++}$. There are other materials deposited as well, but these examples indicate the type and nature of by-product materials supplied. These sometimes include eighteen or twenty different compounds and ionizations. Any of these considered to be valuable can be recovered from the deposited area in addition to the recovery of the primary products.

In the operation of the structure and the performance of the process on any particular material it is possible to provide an "impoverishment" of the material rather than an "enrichment," if desired. For example, the proportions of $U^{235}$ to $U^{238}$ in naturally occurring uranium are established. The material recovered as $U^{235}$ in the normal operation of the device is virtually or largely deprived of $U^{238}$. Hence this product can be looked upon either as uranium greatly enriched in $U^{235}$ or can, conversely, be considered as uranium greatly impoverished in $U^{238}$. The same alteration in proportions of initially introduced material can be utilized either to produce a final product enhanced in one component or diminished in another component.

It is not essential that the material initially introduced be a naturally occurring polyisotope, such as naturally occurring uranium. It is feasible to separate any intermixed or intermingled materials capable of producing ions distinguishable from each other by differences in nuclear mass. Since this is true, it is not essential that the initial material mixture be made up necessarily of the same chemical elements, as various different elements in intermixed form can readily be separated.

Because of the general separating ability of the machine and method, it is not important that any particular fixed or predetermined initial relative proportions be observed in the charge material. For example, the proportions of naturally occurring uranium can be the proportions of the material initially supplied and the separation due to operation of the structure can be carried out to a point so that in the collector the $U^{235}$ is no longer $1/139$ of the amount of $U^{238}$ present, but rather is $1/10$ of that amount. The end material of the initial run can then be reintroduced into the charge receiver for a subsequent run. That is, the once treated material having its proportions one part $U^{238}$ and $1/10$ part $U^{235}$ is again put through the process and is, for example, then recovered from the receiver in proportions of one part of $U^{238}$ and one part of $U^{235}$. By multiply processing materials, it is feasible to reduce the total bulk that must be handled and to improve the general efficiency of the operation. In a comparable fashion, it is entirely feasible to retrieve the $U^{234}$ as a separate and distinct entity from the $U^{235}$ if it is desired to do so, although normally the $U^{234}$ is disregarded.

The materials actually introduced into the charge receiver are not particularly critical, except that they must be capable of ionization, preferably with a ready control of their rate of efflux from the charge zone. In picking the particular charge material it is an advantage not only to choose one that is readily ionizable, but also one unlikely to produce by-products apt to condense or deposit on critical portions of the mechanism. For example, under some conditions uranium tetrachloride tends to deposit in solid form on the arc and accelerator plates and when it does so it distorts the shape of the electrical fields in the accelerator region and appears correspondingly to distort the beam itself.

In choosing the materials going into the charge receiver, it is also important carefully to choose the materials of which various parts of the mechanism, particularly in the source region, are fabricated, since during the operation of the device, the structural materials themselves are sometimes ionized and are carried around in the beam and are found in the collector. For example, portions of the source fabricated of copper and of carbon sometimes sputter away or are ionized and carried into the collector in quantities sufficiently large to be taken into account during the chemical cleaning of the collector as a part of the recovery operation. While copper and carbon are relatively easily dealt with during the chemical recovery operation, it is found that some materials utilized as alloying agents in stainless steel, for example, are somewhat difficult to take into chemical account. An example is molybdenum. Thus, it is advisable in designing the source portion especially to choose materials not only capable of withstanding very high temperatures, and not only serving as excellent thermal conductors in order to prevent excessive localized temperatures, but also that will not introduce elements hard to remove from the collector, or elements whose chemical separation from the uranium is difficult after removal from the collector.

The foregoing considerations apply equally to the fabrication of the collector structure, with special regard to its resistance to the chemical treatment employed in recovering the primarily desired material. For example, acid washes are often encountered in the chemical removal process and it is desirable that the materials of the collector be inert or substantially inert to the wash chemicals in order not to introduce any deleterious or undesired foreign matter.

In the general operation of all of the forms of the invention disclosed herein, it appears to be advantageous very carefully to establish the voltage difference between the source block and the accelerator mechanism, as this voltage difference appears to exert considerable effect upon the shape of the arc plasma surface extending between the sides of the arc block aperture. When the voltage is too low this plasma surface even extends outwardly from the arc block into the main tank and produces a widely divergent beam. As the voltage is increased, the arc plasma surface retreats within the arc block and assumes a concave form conducive to good beam focus. The factors here are the provision of a large plasma surface in order to afford a large production of ions, and yet a surface of an appropriate contour to foster good beam focus.

Distinct from the arc plasma is the beam plasma, precisely defined and readily visible when the space charge neutralization is complete or substantially complete. The beam plasma under these circumstances in effect is bounded by an envelope of substantially the geometrical contours illustrated herein. The plasma boundary represents a sharp distinction between the plasma of the beam itself and the surrounding atmosphere, in that voltage measurements by probe extending transversely of the beam show approximately a one-volt difference between the beam and its surroundings and indicate that this difference occurs almost entirely at the surface or boundary of the beam plasma. In the event this voltage difference or distinct boundary of the beam plasma is not discerned, it is concluded that space charge neutralization is not adequate or complete.

The beam itself, when the apparatus has settled to a steady state of operation under appropriate conditions of functioning on uranium tetrachloride, is usually a medium blue color, rather thinly transparent, very distinctly distinguished from the surrounding atmosphere and background, and maintains its shape and path quite steadily, but occasionally is horizontally or longitudinally striated. The striations may be due to the deposit of small particles on the arc aperture plates or upon the accelerator plates, or to slight irregularities in the bounding edges of these parts, producing small deviations in the field. Occasionally during operation there may be an electrical discharge at the source in the nature of a spark. When this occurs momentarily, the beam is instantly interrupted, but as promptly reconstitutes itself.

In all forms of the invention disclosed herein it is possible to attain the goal initially set, to separate discretely very large or macroscopic or commercial quantities of mixed materials, not only materials made up of the lighter elements, but also charges made up of the heavier elements. In accordance with the structure and method of invention, it is now possible to provide large quantities of ionically separated materials, and particularly to provide macroscopic amounts of $U^{235}$ separated and segregated from its previous intimate intermixture in normally occurring uranium.

What is claimed is:

1. A separator comprising an ion source mechanism, an ion receiver mechanism, an electrically conducting tank enclosing said mechanisms and constituting a vacuum vessel, means for establishing the potential of said mechanisms at different values, means for establishing the potential of said tank at the value of said ion source mechanism, an electrically conducting liner within said tank, and means for establishing the potential of said liner at the value of said ion receiver mechanism.

2. A separator comprising a vacuum vessel, an ion source within said vessel, an ion receiver within said vessel, a liner within said vessel extending substantially between said source and said receiver, and means for establishing said liner and said receiver at one potential and said source at a different potential.

3. A separator comprising a source unit including means forming a charge chamber having an outlet aperture, and a removable charge container disposed within said charge chamber and having an opening adapted to register with said aperture.

4. A separator comprising a source unit including means forming a charge chamber having thermally conducting walls and an aperture therein, a removable charge container disposed within said charge chamber and having an opening adapted to register with said aperture, and means for effecting a thermal transfer through said walls to a charge in said container to drive vapor of said charge through said opening and said aperture.

5. A separator comprising means for establishing a magnetic field having a predetermined flux direction, a mounting having a predetermined orientation with respect to said flux direction, a source unit including means for producing a linear arc, means for supporting said source unit upon said mounting for swinging movement about an axis perpendicular to said flux direction, and means for swinging said source unit about said axis to dispose said linear arc in said flux direction.

6. A separator comprising means for establishing a magnetic field having a predetermined flux direction, a mounting having a predetermined orientation with respect to said flux direction, a source unit including means for producing a linear arc, means for supporting said source unit upon said mounting for swinging movement about two axes perpendicular to said flux direction and to each other, and means for swinging said source unit about said axes to dispose said linear arc in said flux direction.

7. A separator comprising means for establishing a magnetic field having a predetermined flux direction, a vacuum envelope disposed in said field and including a mounting having a predetermined orientation with respect to said flux direction, a source unit including means for producing a linear arc within said envelope, means for supporting said source unit upon said mounting for movement about an axis perpendicular to said flux direction, and means controllable outside said envelope for moving said source unit about said axis to dispose said linear arc in said flux direction.

8. A separator comprising means for establishing a magnetic field having a predetermined flux direction, a vacuum envelope disposed in said field and including a mounting having a predetermined orientation with respect to said flux direction, a source unit including means for producing a linear arc within said envelope, means for supporting said source unit upon said mounting for movement about two axes perpendicular to said flux direction and to each other, and means controllable outside said envelope for moving said source unit about said axes to dispose said linear arc in said flux direction.

9. A calutron comprising a vacuum envelope, a source unit including means forming an arc chamber disposed within said envelope and having an opening therein, and means controllable outside said envelope for varying the size of said opening.

10. A calutron comprising a source unit including means forming an arc chamber having an opening therein, plates disposed at each side of said opening and movable toward and away from each other to overlie more or less of said opening, and means for moving said plates in unison.

11. A calutron comprising a source unit including means forming an arc chamber having an opening therein, first plates disposed at each side of said opening and movable toward and away from each other to overlie more or less of said opening, second plates disposed at each side of said opening overlying said first plates and movable toward and away from each other to overlie more or less of said opening, and means for moving said first plates and said second plates.

12. A calutron comprising a vacuum envelope, a source unit including means forming an arc chamber having an opening therein, plates disposed at each side of said opening and movable toward and away from each other to overlie more or less of said opening, and means controllable outside said envelope for moving said plates.

13. A calutron comprising a vacuum envelope, a source unit including means forming an arc chamber having an opening therein, first plates disposed at each side of said opening and movable toward and away from each other to overlie more or less of said opening, second plates disposed at each side of said opening overlying said first plates and movable toward and away from each other to overlie more or less of said opening, and means controllable outside said envelope for moving said plates.

14. A calutron comprising a vacuum envelope including a mounting, a source unit supported on said mounting and including an arc chamber having an opening therein, a cathode unit supported on said mounting and including a filament, and means controllable outside said envelope for moving said filament with respect to said opening.

15. A calutron comprising a vacuum envelope including a mounting, means supported on said mounting and forming an arc chamber within said envelope, a cathode unit supported on said mounting and including a filament within said envelope, and means controllable outside said envelope for moving said filament with respect to said arc chamber.

16. A calutron comprising a vacuum envelope including a mounting, a cathode unit supported on said mounting and including a filament tube having an axis, means for moving said filament tube along said axis, means for moving said filament tube transversely of said axis, means for rotating said filament tube about said axis, and means controllable outside said envelope for operating said moving and said rotating means.

17. A calutron comprising a vacuum envelope including a mounting, an outer tube movably supported on said mounting, means for swinging said tube with respect to said mounting, an inner tube axially slidable within said outer tube, means controllable outside said envelope for sliding said inner tube within said outer tube, a filament mounted on said inner tube and disposed within said envelope, means extending through said inner tube for conducting electricity from outside said envelope to said filament, and means for maintaining the vacuum-tight integrity of said envelope despite the motions of said tubes.

18. A calutron comprising a vacuum envelope including a mounting, an outer tube movably supported on and insulated from said mounting, means for swinging said tube with respect to said mounting, an inner tube movably supported within said outer tube, means controllable outside said envelope for moving said inner tube with respect to said outer tube, a filament mounted on said inner tube and disposed within said envelope, means extending through said inner tube for conducting electricity from outside said envelope to said filament, an anode supported on said mounting, and means for including said filament and said anode in an electrical circuit.

19. A calutron comprising a vacuum envelope, a source unit within said envelope adapted to supply ions for travel in a predetermined path, a pair of accelerator plates disposed within said envelope on opposite sides of said path, and means controllable outside said envelope for moving said plates relative to each other.

20. A calutron comprising means for establishing a magnetic field having flux in a predetermined direction, a vacuum envelope within said field, a source unit within said envelope adapted to supply ions for travel in a predetermined path, a pair of accelerator plates disposed within said envelope on opposite sides of said path, said plates having facing edges disposed in said direction, and means for moving said plates relative to each other while maintaining the disposition of said edges in said direction.

21. A calutron comprising a vacuum envelope, a source unit within said envelope adapted to supply ions for travel in a predetermined path, a pair of accelerator plates disposed on opposite sides of said path, means for moving said plates relative to each other in a direction across said path, and means for establishing a potential difference between said source unit and said accelerator plates.

22. A calutron comprising a vacuum envelope including a mounting, a source unit within said envelope and supported on said mounting, said source unit having a discharge opening, a pair of accelerator plates supported on said mounting and disposed on opposite sides of said opening, means for changing the position of said accelerator plates with respect to said opening, and means for establishing a potential difference between said source unit and said accelerator plates.

23. A calutron comprising a vacuum envelope including a mounting, a source unit within said envelope and supported on said mounting, said source unit having a discharge opening, a pair of accelerator plates supported on said mounting and disposed on opposite sides of said opening, means controllable outside said envelope for changing the position of said accelerator plates with respect to said opening, and means for establishing a potential difference between said source unit and said accelerator plates in all positions thereof.

24. A calutron comprising means for establishing a magnetic field having a predetermined flux direction, a vacuum envelope within said field, a source unit within said envelope, said source unit having a discharge opening with its center line parallel to said flux direction, a pair of accelerator plates disposed on opposite sides of said opening parallel to said center line, said plates having straight facing edges, and external means for moving said plates angularly with respect to said center line.

25. A calutron comprising means for establishing a magnetic field having a predetermined flux direction, a vacuum envelope within said field and including a mounting, an accelerator mechanism within said envelope movably supported on said mounting, said mechanism having a linear effective edge, and external means for moving said mechanism to rotate said edge angularly with respect to said flux direction.

26. A calutron comprising means for establishing a magnetic field having a predetermined flux direction, a vacuum envelope within said field and including a mounting, an accelerator mechanism within said envelope movably supported on said mounting, said mechanism having a pair of relatively movable, linear effective edges, means controllable outside said envelope for moving said edges relatively, and means for moving said edges angularly with respect to said flux direction.

27. A calutron comprising a vacuum envelope, a source unit within said envelope for supplying a stream of ions, and means including a pocket for receiving and retaining ions from said stream, said pocket having a narrow inlet opening for admitting ions and a wall disposed opposite said opening and inclined at an acute angle with respect to the trajectories of ions admitted therethrough.

28. A calutron comprising a vacuum envelope, means for supplying a stream of ions within said envelope, and a pocket for receiving and retaining ions from said stream, said pocket having walls that converge at an acute angle.

29. A calutron comprising a vacuum envelope, means for supplying a stream of ions within said envelope, and an ion-receiving and retaining pocket having a width defined by walls that converge at an acute angle toward an inlet opening of lesser width.

30. A calutron comprising a vacuum envelope, means for supplying a stream of ions within said envelope, and an ion receiver having an outer shell provided with an opening therein, and an inner pocket having an aperture aligned with said opening.

31. A calutron comprising a vacuum envelope, means for supplying a stream of ions within said envelope, and an ion receiver having an outer shell provided with a plurality of openings therein, and a plurality of individual inner pockets each having an aperture therein aligned with one of the openings in said shell.

32. A calutron comprising a vacuum envelope, means for supplying a stream of ions within said envelope, and an ion receiver including an outer shell having an opening therein, a pocket within said shell having an aperture in alignment with said opening, and a lining covering the interior of said pocket except for said aperture.

33. A calutron comprising a vacuum envelope, means for supplying a stream of ions within said envelope, and an ion-receiving pocket having a predetermined width and having an opening of lesser width and of a contour comparable to the cross-sectional shape of the ion beam to be received.

34. A calutron comprising a vacuum envelope, a source unit for supplying a stream of ions in a predetermined location within said envelope, an ion receiver within said envelope, means included in said receiver for defining an opening to receive said ion stream, and means for moving said receiver to dispose said opening in a predetermined location along the path of said ion stream.

35. A process of separating mixed materials of different nuclear masses comprising producing ions of said materials of the same charge sign in quantities to foster a space charge of disruptive effect, and providing an ambient atmosphere for said ions at a pressure of the order of $10^{-4}$ to $10^{-5}$ mm. Hg.

36. A process of operating a calutron having means for producing two ion streams a predetermined distance apart and two receiving elements disposed substantially said predetermined distance apart comprising directing said two ion streams to a location disposed a given distance from said two receiving elements, and then producing relative motion between said two ion streams and said two receiving elements an amount substantially equal to said given distance, whereby said two ion streams are respectively received by said two receiving elements.

37. A process of operating a calutron having means for producing two ion streams a predetermined distance apart and two receiving elements disposed substantially said predetermined distance apart comprising directing said two ion streams to a location disposed a given distance from said two receiving elements, and then moving said two ion streams with respect to said two receiving elements an amount substantially equal to said given distance, whereby said two ion streams are respectively received by said two receiving elements.

38. A process of operating a calutron having means for producing two ion streams a predetermined distance apart and two receiving elements disposed substantially said predetermined distance apart comprising directing said two ion streams to a location disposed a given distance from said two receiving elements, and then moving said two receiving elements with respect to said two ion streams an amount substantially equal to said given distance, whereby said two ion streams are respectively received by said two receiving elements.

39. The method of operating a mass separator having an adjustable ion beam projecting mechanism and a pair of beam intercepting devices comprising directing said beam to be intercepted by one of said devices during adjustment of said projecting mechanism, and after adjustment of said mechanism projecting said beam to the other of said devices.

40. A calutron comprising an evacuated envelope having a wall, a cathode tube supported on and extending through said wall, a pair of mutually insulated electrically conducting tubes extending through said cathode tube, a heat evolving filament electrically connected to said pair of tubes, and means for circulating a cooling fluid through each of said pair of tubes for carrying away heat from said filament.

41. A calutron comprising an evacuated envelope having a wall, a cathode supporting tube extending through said wall, a pair of mutually insulated electrically conducting outer tubes extending through said cathode tube, a heat evolving filament electrically connected to said outer tubes, a pair of inner tubes each extending partially through an associated one of said outer tubes, and means for including each of said associated inner and outer tubes in a separate cooling fluid circulating circuit.

42. A separator comprising an ion source mechanism, an ion receiver mechanism, an electrically and magnetically conducting tank enclosing said mechanisms and constituting a vacuum vessel, an electrically conducting and nonmagnetic liner adjustably mounted on insulating means within said vessel between said mechanisms, means controllable externally of said vessel for adjusting the position of said liner, and potential means connected between said source and said receiver for establishing a voltage difference therebetween, said source being electrically connected to said tank and said liner being electrically connected to said receiver.

43. In a separator having an evacuated tank, means for establishing a magnetic field along a given axis through said tank, an ion source mechanism disposed within said tank, and an ion receiver mechanism disposed within said tank, the combination comprising accelerating electrodes disposed in alignment with an opening in said ion source for withdrawing ions therefrom and projecting said ions transversely of said magnetic field to said receiver, an electrically conducting liner mounted within said tank for surrounding a substantial portion of the path of said ions with an equipotential surface, and a transition member mounted on said electrodes and terminating within said liner for extending said equipotential surface for the remaining portion of the path of said ions.

44. In a separator having an evacuated tank, means for establishing a magnetic field along a given axis through said tank, an ion source mechanism disposed within said tank, an ion receiver mechanism disposed within said tank, the combination comprising accelerating electrodes disposed in alignment with an opening in said source for withdrawing ions therefrom and projecting said ions transversely of said magnetic field to said receiver, an arcuate, electrically conducting and nonmagnetic liner mounted within said tank between said source and said receiver surrounding the path of said ions with an equipotential surface for a substantial portion of said path, and an electrically conducting and nonmagnetic transition member mounted on said accelerating electrodes and terminating within said liner for extending said equipotential surface the remainder of the path of said ions, said transition member being electrically connected to and mechanically independent from said liner.

45. A process of separating mixed materials of different nuclear masses comprising producing ions of said materials of the same polarity in quantities to foster space charge of disruptive effect, and controlling the ambient atmosphere for said ions at a pressure substantially $10^{-4}$ mm. Hg for providing particles of opposite polarity upon collisions between molecules of said atmosphere and said ions in quantities to offset said disruptive effect.

46. A process of separating mixed materials of different nuclear masses comprising producing ions of said materials of the same materials, accelerating said ions in quantities to foster space charge of disruptive effect, and providing an ambient atmosphere for said accelerated ions at a pressure of the order of $10^{-4}$ to $10^{-5}$ mm. Hg.

47. A calutron comprising a vacuum envelope, means for supplying a stream of ions within said envelope, an ion receiver disposed in said envelope in intercepting relation with said streams of ions, means controlled outside said envelope for moving said receiver along the path of said stream of ions, and means for angularly adjusting the position of said receiver with respect to said stream of ions.

48. A calutron comprising a vacuum envelope, means for supplying a stream of ions within said envelope, an ion receiver disposed in said envelope in intercepting relation with said stream of ions, means controlled outside said envelope for moving said receiver along the path of said stream of ions, and means controlled outside said envelope for angularly adjusting the position of said receiver with respect to said stream of ions.

References Cited in the file of this patent

UNITED STATES PATENTS

| | | |
|---|---|---|
| 1,011,160 | Coffin | Dec. 12, 1911 |
| 1,143,327 | Snook et al. | June 15, 1915 |

(Other references on following page)

UNITED STATES PATENTS

| Number | Name | Date |
|---|---|---|
| 1,253,156 | Coolidge | Jan. 8, 1918 |
| 1,264,270 | Carpenter | Apr. 30, 1918 |
| 1,948,384 | Lawrence | Feb. 20, 1934 |
| 2,009,444 | Gebhard | July 30, 1935 |
| 2,034,571 | Found | Mar. 17, 1936 |
| 2,218,886 | Krause | Oct. 22, 1940 |
| 2,221,467 | Bleakney | Nov. 12, 1940 |
| 2,305,458 | Ruska et al. | Dec. 15, 1942 |
| 2,370,673 | Langmuir | Mar. 6, 1945 |
| 2,374,205 | Hoskins | Apr. 24, 1945 |
| 2,378,962 | Washburn | June 26, 1945 |
| 2,380,502 | Clark et al. | July 31, 1945 |
| 2,416,318 | Hotine | Feb. 25, 1947 |
| 2,450,462 | Washburn | Oct. 5, 1948 |

FOREIGN PATENTS

| Number | Country | Date |
|---|---|---|
| 299,735 | Great Britain | Oct. 30, 1928 |

OTHER REFERENCES

Coggeshall et al.: Review of Scientific Instruments, vol. 14, May 1943, pages 125–129.

Tuve et al.: Physical Review, vol. 48, August 1, 1935, pages 241–244.

Lawrence et al.: Physical Review, vol. 50, December 15, 1936, pages 1131–1136.

Straus: Physical Review, vol. 59, March 1, 1941, pages 430–433.

Journal of Applied Physics, vol. 13, September 1942, pages 530–537 and 558. Copy in 73–18.

Oliphant et al.: Proceedings of the Royal Society of London vol. 146A, 1934, pages 922–929.

Smythe et al.: Physical Review, vol. 51, February 1, 1937, pages 178–182.

Nier: Review of Scientific Instruments, vol. II, July 1940, pages 212–216.